US011030756B2

(12) United States Patent
Crain et al.

(10) Patent No.: US 11,030,756 B2
(45) Date of Patent: Jun. 8, 2021

(54) SYSTEM AND METHOD FOR POSITION TRACKING USING EDGE COMPUTING

(71) Applicant: 7-Eleven, Inc., Irving, TX (US)

(72) Inventors: Jon Andrew Crain, Grapevine, TX (US); Sailesh Bharathwaaj Krishnamurthy, Irving, TX (US); Kyle Dalal, Coppell, TX (US); Shahmeer Ali Mirza, Celina, TX (US)

(73) Assignee: 7-Eleven, Inc., Irving, TX (US)

( * ) Notice: Subject to any disclaimer, the term of this patent is extended or adjusted under 35 U.S.C. 154(b) by 0 days.

(21) Appl. No.: 17/104,323

(22) Filed: Nov. 25, 2020

(65) Prior Publication Data

US 2021/0082130 A1   Mar. 18, 2021

Related U.S. Application Data

(60) Continuation-in-part of application No. 16/663,633, filed on Oct. 25, 2019, now Pat. No. 10,885,642, and
(Continued)

(51) Int. Cl.
*H04N 5/247* (2006.01)
*G06T 7/292* (2017.01)
(Continued)

(52) U.S. Cl.
CPC ......... *G06T 7/292* (2017.01); *G06Q 30/0201* (2013.01); *G06T 7/60* (2013.01);
(Continued)

(58) Field of Classification Search
CPC ........... H04N 5/247; G06T 7/292; G06T 7/70; G01G 19/40
See application file for complete search history.

(56) References Cited

U.S. PATENT DOCUMENTS

| 5,013,896 A | 5/1991 | Ono et al. |
| 6,437,819 B1 | 8/2002 | Loveland |

(Continued)

FOREIGN PATENT DOCUMENTS

| CA | 1290453 C | 10/1991 |
| CA | 2201423 C | 10/1998 |

(Continued)

OTHER PUBLICATIONS

Krishnamurthy, S. B. et al., "Scalable Position Tracking System for Tracking Position in Large Spaces," U.S. Appl. No. 16/663,633, filed Oct. 25, 2019, 117 pages.
(Continued)

*Primary Examiner* — Y Lee
(74) *Attorney, Agent, or Firm* — Baker Botts L.L.P.

(57) ABSTRACT

A tracking system includes a camera subsystem that includes cameras that capture vide of a space. Each camera is coupled with a camera client that determines local coordinates of people in the captured video. The camera clients generate frames that include color frames and depth frames labeled with an identifier number of the camera and their corresponding timestamps. The camera clients generate tracks that include metadata describing historical people detections, tracking identifications, timestamps, and the identifier number of the camera. The camera clients send the frames and tracks to cluster servers that maintain the frames and tracks such that they are retrievable using their corresponding labels. A camera server queries the cluster servers to receive the frames and tracks using their corresponding labels. The camera server determines the physical positions of people in the space based on the determined local coordinates.

5 Claims, 65 Drawing Sheets

Related U.S. Application Data a continuation-in-part of application No. 16/663,415, filed on Oct. 25, 2019, now Pat. No. 10,878,585, and a continuation-in-part of application No. 17/018,146, filed on Sep. 11, 2020, which is a division of application No. 16/663,415, filed on Oct. 25, 2019, now Pat. No. 10,878,585, application No. 17/104,323, which is a continuation-in-part of application No. 16/991,947, filed on Aug. 12, 2020, which is a continuation of application No. 16/663,669, filed on Oct. 25, 2019, now Pat. No. 10,783,762, application No. 17/104,323, which is a continuation-in-part of application No. 16/941,787, filed on Jul. 29, 2020, which is a continuation of application No. 16/663,432, filed on Oct. 25, 2019, now Pat. No. 10,769,450, application No. 17/104,323, which is a continuation-in-part of application No. 16/941,825, filed on Jul. 29, 2020, which is a division of application No. 16/663,432, filed on Oct. 25, 2019, now Pat. No. 10,769,450, application No. 17/104,323, which is a continuation-in-part of application No. 16/663,710, filed on Oct. 25, 2019, which is a continuation-in-part of application No. 16/663,766, filed on Oct. 25, 2019, and a continuation-in-part of application No. 16/663,451, filed on Oct. 25, 2019, and a continuation-in-part of application No. 16/663,794, filed on Oct. 25, 2019, and a continuation-in-part of application No. 16/663,822, filed on Oct. 25, 2019, and a continuation-in-part of application No. 16/941,415, filed on Jul. 28, 2020, which is a continuation of application No. 16/794,057, filed on Feb. 18, 2020, now Pat. No. 10,769,451, which is a continuation of application No. 16/663,472, filed on Oct. 25, 2019, now Pat. No. 10,614,318, application No. 17/104,323, which is a continuation-in-part of application No. 16/663,856, filed on Oct. 25, 2019, and a continuation-in-part of application No. 16/664,160, filed on Oct. 25, 2019, and a continuation-in-part of application No. 17/071,262, filed on Oct. 15, 2020, which is a continuation of application No. 16/857,990, filed on Apr. 24, 2020, now Pat. No. 10,853,663, which is a continuation of application No. 16/793,998, filed on Feb. 18, 2020, now Pat. No. 10,685,237, which is a continuation of application No. 16/663,500, filed on Oct. 25, 2019, now Pat. No. 10,621,444, application No. 17/104,323, which is a continuation-in-part of application No. 16/857,990, filed on Apr. 24, 2020, now Pat. No. 10,853,663, which is a continuation of application No. 16/793,998, filed on Feb. 18, 2020, now Pat. No. 10,685,237, which is a continuation of application No. 16/663,500, filed on Oct. 25, 2019, now Pat. No. 10,621,444, application No. 17/104,323, which is a continuation-in-part of application No. 16/664,219, filed on Oct. 25, 2019, and a continuation-in-part of application No. 16/664,269, filed on Oct. 25, 2019, and a continuation-in-part of application No. 16/664,332, filed on Oct. 25, 2019, and a continuation-in-part of application No. 16/664,363, filed on Oct. 25, 2019, and a continuation-in-part of application No. 16/664,391, filed on Oct. 25, 2019, and a continuation-in-part of application No. 16/664,426, filed on Oct. 25, 2019, and a continuation-in-part of application No. 16/884,434, filed on May 27, 2020, which is a continuation of application No. 16/663,533, filed on Oct. 25, 2019, now Pat. No. 10,789,720, application No. 17/104,323, which is a continuation-in-part of application No. 16/663,901, filed on Oct. 25, 2019, and a continuation-in-part of application No. 16/663,948, filed on Oct. 25, 2019.

(51) Int. Cl.
  *G06Q 30/02* (2012.01)
  *G06T 7/60* (2017.01)
  *G06T 7/70* (2017.01)

(52) U.S. Cl.
  CPC .............. *G06T 7/70* (2017.01); *H04N 5/247* (2013.01); *G06T 2207/10016* (2013.01); *G06T 2207/30196* (2013.01); *G06T 2207/30232* (2013.01)

(56) References Cited

U.S. PATENT DOCUMENTS

| | | | |
|---|---|---|---|
| 6,725,206 | B1 | 4/2004 | Coveley |
| 7,613,322 | B2 | 11/2009 | Yin et al. |
| 7,672,876 | B2 | 3/2010 | Bonner et al. |
| 7,844,509 | B2 | 11/2010 | Bodin et al. |
| 7,848,964 | B2 | 12/2010 | Bonner et al. |
| 9,014,999 | B2 | 4/2015 | Turbell et al. |
| 9,159,047 | B2 | 10/2015 | Winkel |
| 9,477,955 | B2 | 10/2016 | Goncalves |
| 9,886,827 | B2 | 2/2018 | Schoner |
| 9,911,290 | B1 | 3/2018 | Zalewski et al. |
| 9,972,187 | B1 | 5/2018 | Srinivasan et al. |
| 9,984,354 | B1 | 5/2018 | Chinoy et al. |
| 9,996,818 | B1 | 6/2018 | Ren et al. |
| 10,055,853 | B1 | 8/2018 | Fisher et al. |
| 10,064,502 | B1 | 9/2018 | Gyori et al. |
| 10,104,345 | B2 | 10/2018 | Masood et al. |
| 10,127,438 | B1 | 11/2018 | Fisher et al. |
| 10,133,933 | B1 | 11/2018 | Fisher et al. |
| 10,134,004 | B1 | 11/2018 | Liberato, Jr. et al. |
| 10,140,483 | B1 | 11/2018 | Huebner et al. |
| 10,140,820 | B1 | 11/2018 | Zalewski et al. |
| 10,157,452 | B1 | 12/2018 | Tighe et al. |
| 10,169,660 | B1 | 1/2019 | Ren et al. |
| 10,181,113 | B2 | 1/2019 | Rivalto et al. |
| 10,198,710 | B1 | 2/2019 | Hahn et al. |
| 10,230,866 | B1 | 3/2019 | Townsend et al. |
| 10,244,363 | B1 | 3/2019 | Niranjayan et al. |
| 10,250,868 | B1 | 4/2019 | Arnold et al. |
| 10,262,293 | B1 | 4/2019 | Prater et al. |
| 10,268,983 | B2 | 4/2019 | Kumar et al. |
| 10,282,852 | B1 | 5/2019 | Buibas et al. |
| 10,291,862 | B1 | 5/2019 | Liberato et al. |
| 10,296,814 | B1 | 5/2019 | Kumar et al. |
| 10,303,133 | B1 | 5/2019 | Dhalla et al. |
| 10,318,907 | B1 | 6/2019 | Bergstrom et al. |
| 10,318,917 | B1 | 6/2019 | Goldstein et al. |
| 10,318,919 | B2 | 6/2019 | Bermudez Rodriguez et al. |
| 10,321,275 | B1 | 6/2019 | Orlov et al. |
| 10,332,066 | B1 | 6/2019 | Palaniappan et al. |
| 10,332,089 | B1 | 6/2019 | Asmi et al. |
| 10,339,411 | B1 | 7/2019 | Hua et al. |
| 10,353,982 | B1 | 7/2019 | Kumar et al. |
| 10,360,247 | B2 | 7/2019 | Hebbalaguppe et al. |
| 10,366,306 | B1 | 7/2019 | Raghavan et al. |
| 10,368,057 | B1 | 7/2019 | Saran et al. |
| 10,384,869 | B1 | 8/2019 | Shiee et al. |
| 10,388,019 | B1 | 8/2019 | Hua et al. |
| 10,442,852 | B2 | 9/2019 | Thiagarajan et al. |
| 10,438,277 | B1 | 10/2019 | Jiang et al. |
| 10,445,694 | B2 | 10/2019 | Fisher et al. |
| 10,459,103 | B1 | 10/2019 | Shi et al. |
| 10,466,095 | B1 | 11/2019 | O'Neill et al. |
| 10,474,991 | B2 | 11/2019 | Fisher et al. |
| 10,474,992 | B2 | 11/2019 | Fisher et al. |
| 10,474,993 | B2 | 11/2019 | Fisher et al. |
| 10,475,185 | B1 | 11/2019 | Raghavan et al. |
| 10,504,199 | B2 | 12/2019 | Tada et al. |

(56) References Cited

U.S. PATENT DOCUMENTS

| | | | |
|---|---|---|---|
| 10,614,318 | B1 | 4/2020 | Mirza et al. |
| 10,621,444 | B1 | 4/2020 | Mirza et al. |
| 10,685,237 | B1 | 6/2020 | Mirza et al. |
| 10,769,450 | B1 | 9/2020 | Krishnamurthy et al. |
| 10,769,451 | B1 | 9/2020 | Mirza et al. |
| 10,789,720 | B1 | 9/2020 | Mirza et al. |
| 2003/0107649 | A1 | 6/2003 | Flickner et al. |
| 2003/0158796 | A1 | 8/2003 | Balent |
| 2006/0279630 | A1 | 12/2006 | Aggarwal et al. |
| 2007/0011099 | A1 | 1/2007 | Sheehan |
| 2007/0069014 | A1 | 3/2007 | Heckel et al. |
| 2007/0282665 | A1 | 12/2007 | Buehler et al. |
| 2008/0226119 | A1 | 9/2008 | Candelore et al. |
| 2008/0279481 | A1 | 11/2008 | Ando |
| 2009/0063307 | A1 | 3/2009 | Groenovelt et al. |
| 2009/0128335 | A1 | 5/2009 | Leung |
| 2010/0046842 | A1 | 2/2010 | Conwell |
| 2010/0138281 | A1 | 6/2010 | Zhang et al. |
| 2010/0318440 | A1 | 12/2010 | Coveley |
| 2011/0246064 | A1 | 10/2011 | Nicholson |
| 2012/0206605 | A1 | 8/2012 | Buehler et al. |
| 2012/0209741 | A1 | 8/2012 | Bonner et al. |
| 2013/0117053 | A2 | 5/2013 | Campbell |
| 2013/0179303 | A1 | 7/2013 | Petrou et al. |
| 2013/0284806 | A1 | 10/2013 | Margalit |
| 2014/0016845 | A1 | 1/2014 | Gazit et al. |
| 2014/0052555 | A1 | 2/2014 | MacIntosh |
| 2014/0132728 | A1 | 5/2014 | Verano et al. |
| 2014/0152847 | A1 | 6/2014 | Zomet et al. |
| 2014/0171116 | A1 | 6/2014 | LaMarca et al. |
| 2014/0201042 | A1 | 7/2014 | Meyer |
| 2014/0342754 | A1 | 11/2014 | Liu et al. |
| 2015/0029339 | A1 | 1/2015 | Kobres et al. |
| 2015/0312445 | A1 | 10/2015 | Cha et al. |
| 2015/0379366 | A1 | 12/2015 | Nomura et al. |
| 2016/0092739 | A1 | 3/2016 | Oami et al. |
| 2016/0098095 | A1 | 4/2016 | Gonzalez-Banos et al. |
| 2016/0205341 | A1 | 7/2016 | Hollander et al. |
| 2017/0150118 | A1 | 5/2017 | Pacheco et al. |
| 2017/0323376 | A1 | 11/2017 | Glaser et al. |
| 2018/0048894 | A1 | 2/2018 | Chen et al. |
| 2018/0109338 | A1 | 4/2018 | Walden et al. |
| 2018/0150685 | A1 | 5/2018 | Ebrom et al. |
| 2018/0374239 | A1 | 12/2018 | Wallack et al. |
| 2019/0043003 | A1 | 2/2019 | Fisher et al. |
| 2019/0138986 | A1 | 5/2019 | Puerini et al. |
| 2019/0147709 | A1 | 5/2019 | Schoner |
| 2019/0156274 | A1 | 5/2019 | Fisher et al. |
| 2019/0156275 | A1 | 5/2019 | Fisher et al. |
| 2019/0156276 | A1 | 5/2019 | Fisher et al. |
| 2019/0156277 | A1 | 5/2019 | Fisher et al. |
| 2019/0156506 | A1 | 5/2019 | Fisher et al. |
| 2019/0236531 | A1 | 8/2019 | Adato et al. |
| 2019/0244386 | A1 | 8/2019 | Fisher et al. |
| 2019/0244500 | A1 | 8/2019 | Fisher et al. |
| 2019/0251499 | A1 | 8/2019 | Kumar et al. |
| 2019/0313063 | A1 | 10/2019 | Wang et al. |
| 2019/0347611 | A1 | 11/2019 | Fisher et al. |
| 2020/0013180 | A1 | 1/2020 | Yamaura et al. |

FOREIGN PATENT DOCUMENTS

| | | |
|---|---|---|
| CN | 110009836 A | 7/2019 |
| EP | 0348484 A1 | 1/1990 |
| WO | 2019032304 A1 | 2/2019 |

OTHER PUBLICATIONS

Boulio, C. A. et al., "Sensor Array for Scalable Position Tracking System," U.S. Appl. No. 16/663,415, filed Oct. 25, 2019, 113 pages.

Paul, D. et al., "Custom Rack for Scalable Position Tracking System," U.S. Appl. No. 16/633,669, filed Oct. 25, 2019, 110 pages.

Krishnamurthy, S. B. et al., "Tracking Positions Using a Scalable Position Tracking System," U.S. Appl. No. 16/633,432, filed Oct. 25, 2019, 122 pages.

Krishnamurthy, S. B. et al., "Topview Object Tracking Using a Sensor Array," U.S. Appl. No. 16/663,710, filed Oct. 25, 2019, 199 pages.

Krishnamurthy, S. B. et al., "Detecting Shelf Interactions Using a Sensor Array," U.S. Appl. No. 16/663,766, filed Oct. 25, 2019, 205 pages.

Vakacharla, S. et al., "Topview Item Tracking Using a Sensor Array," U.S. Appl. No. 16/663,451, filed Oct. 25, 2019, 204 pages.

Mirza, S. A. et al., "Detecting and Identifying Misplaced Items Using a Sensor Array," U.S. Appl. No. 16/663,794, filed Oct. 25, 2019, 200 pages.

Mirza, S. A. et al., "Sensor Mapping to a Global Coordinate System," U.S. Appl. No. 16/663,822, filed Oct. 25, 2019, 204 pages.

Mirza, S. A. et al., "Sensor Mapping to a Global Coordinate System Using a Marker Grid," U.S. Appl. No. 16/663,472, filed Oct. 25, 2019, 206 pages.

Mirza, S. A. et al., "Shelf Position Calibration in a Global Coordinate System Using a Sensor Array," U.S. Appl. No. 16/663,856, filed Oct. 25, 2019, 206 pages.

Magee, M. R. et al., "Customer-Based Video Feed," U.S. Appl. No. 16/664,470, filed Oct. 25, 2019, 103 pages.

Mirza, S. A. et al.,"System and Method for Presenting a Virtual Store Shelf That Emulates a Physical Store Shelf," U.S. Appl. No. 16/664,490, filed Oct. 25, 2019, 103 pages.

Nguyen, T. N. et al.,"Contour-Based Detection of Closely Spaced Objects," U.S. Appl. No. 16/664,160, filed Oct. 25, 2019, 199 pages.

Mirza, S. A. et al.,"Object Re-Identification During Image Tracking," U.S. Appl. No. 16/664,219, filed Oct. 25, 2019, 201 pages.

Chinnam, M. M. et al.,"Vector-Based Object Re-Identification During Image Tracking," U.S. Appl. No. 16/664,269, filed Oct. 25, 2019, 199 pages.

Mirza, S. A. et al.,"Image-Based Action Detection Using Contour Dilation," U.S. Appl. No. 16/664,332, filed Oct. 25, 2019, 199 pages.

Mirza, S. A. et al.,"Determining Candidate Object Identities During Image Tracking," U.S. Appl. No. 16/664,363, filed Oct. 25, 2019, 201 pages.

Mirza, S. A. et al.,"Object Assignment During Image Tracking," U.S. Appl. No. 16/664,391, filed Oct. 25, 2019, 198 pages.

Krishnamurthy, S. B. et al.,"Auto-Exclusion Zone for Contour-Based Object Detection," U.S. Appl. No. 16/664,426, filed Oct. 25, 2019, 199 pages.

Mirza, S. A. et al.,"Multi-Camera Image Tracking on a Global Plane ," U.S. Appl. No. 16/663,533, filed Oct. 25, 2019, 198 pages.

Mirza, S. A. et al.,"Feedback and Training for a Machine Learning Algorithm Configured to Determine Customer Purchases During a Shopping Session At a Physical Store," U.S. Appl. No. 16/663,564, filed Oct. 25, 2019, 97 pages.

Mirza, S. A. et al.,"Identifying Non-Uniform Weight Objects Using a Sensor Array," U.S. Appl. No. 16/663,901, filed Oct. 25, 2019, 199 pages.

Magee, M. R. et al., "System and Method for Populating a Virtual Shopping Cart Based on Video of a Customer's Shopping Session At a Physical Store," U.S. Appl. No. 16/663,589, filed Oct. 25, 2019, 103 pages.

Magee, M. R. et al., "Tool for Generating a Virtual Store That Emulates a Physical Store ," U.S. Appl. No. 16/664,529, filed Oct. 25, 2019, 100 pages.

Mirza, S. A. et al.,"Sensor Mapping to a Global Coordinate System Using Homography," U.S. Appl. No. 16/663,948, filed Oct. 25, 2019, 197 pages.

Mirza, S. A. et al.,"Action Detection During Image Tracking ," U.S. Appl. No. 16/663,500, filed Oct. 25, 2019, 198 pages.

Mirza, S. A. et al.,"Action Detection During Image Tracking ," U.S. Appl. No. 16/793,998, filed Feb. 18, 2020, 198 pages.

Mirza, S. A. et al.,"Action Detection During Image Tracking," U.S. Appl. No. 16/857,990, filed Apr. 24, 2020, 200 pages.

Mirza, S. A. et al.,"Action Detection During Image Tracking," U.S. Appl. No. 17/071,262, filed Oct. 15, 2020, 198 pages.

(56) References Cited

OTHER PUBLICATIONS

Mirza, S. A. et al., "Sensor Mapping to a Global Coordinate System Using a Marker Grid," U.S. Appl. No. 16/941,415, filed Jul. 28, 2020, 205 pages.
Mirza, S. A. et al., "Multi-Camera Image Tracking on a Global Plane," U.S. Appl. No. 16/884,434, filed May 27, 2020, 200 pages.
Boulio, C. A. et al., "Sensor Array for Scalable Position Tracking System," U.S. Appl. No. 17/018,146, filed Sep. 11, 2020, 107 pages.
Paul, D. et al., "Custom Rack for Scalable Position Tracking System," U.S. Appl. No. 16/991,947, filed Aug. 12, 2020, 109 pages.
Krishnamurthy, S. B. et al., "Tracking Positions Using a Scalable Position Tracking System," U.S. Appl. No. 16/941,787, filed Jul. 29, 2020, 112 pages.
Krishnamurthy, S. B. et al., "Tracking Positions Using a Scalable Position Tracking System," U.S. Appl. No. 16/941,825, filed Jul. 29, 2020, 114 pages.

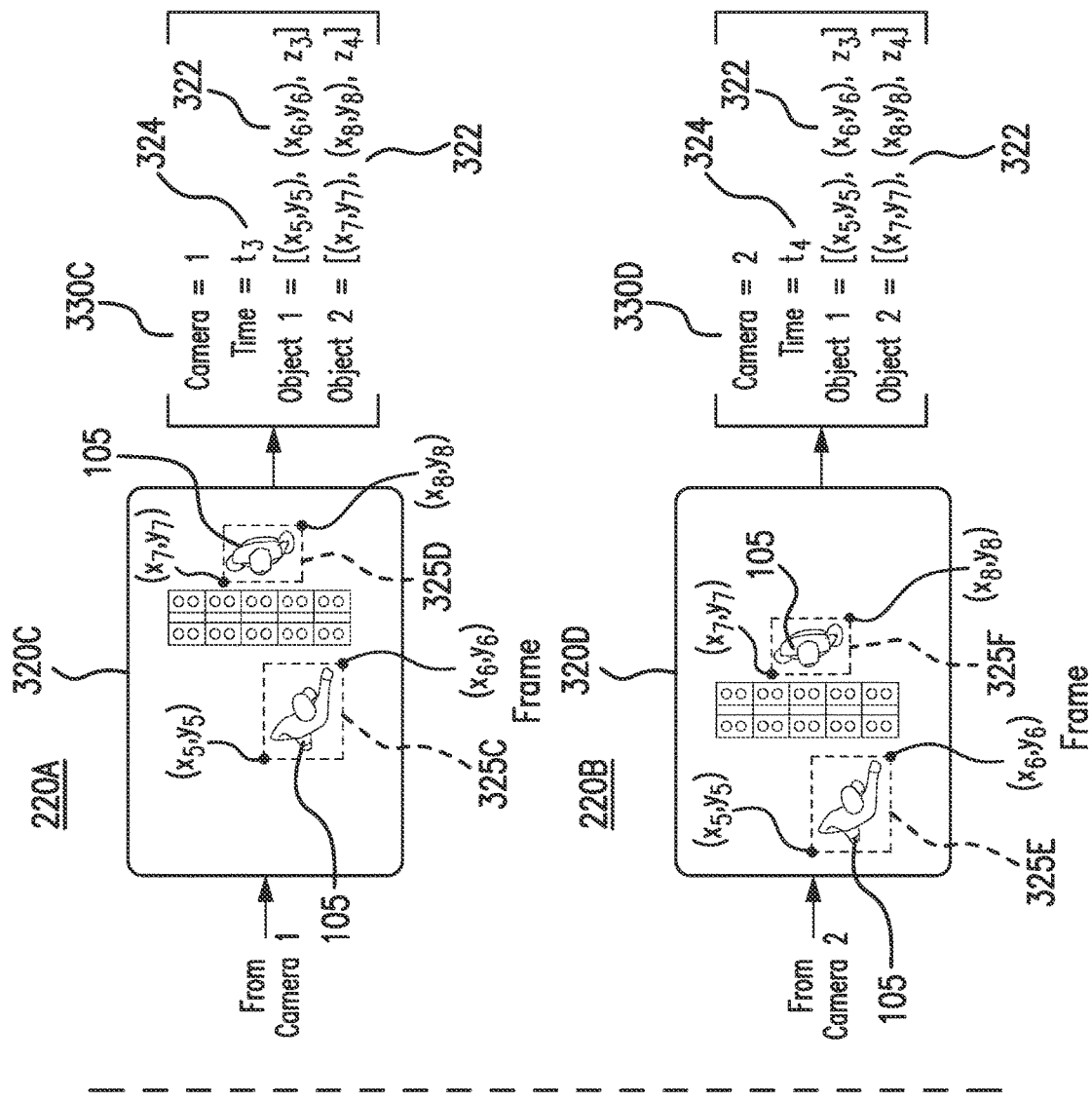
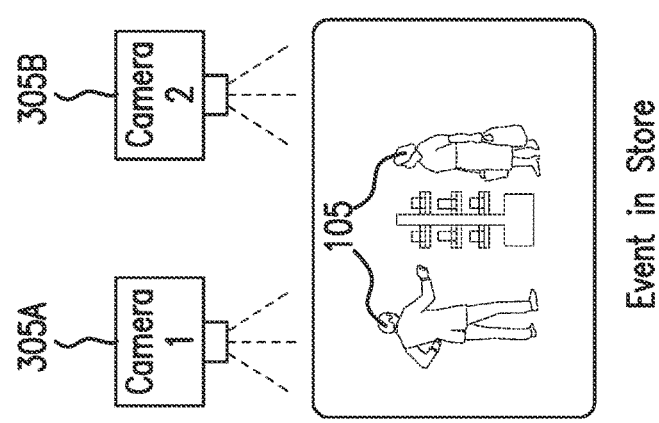
FIG. 3H

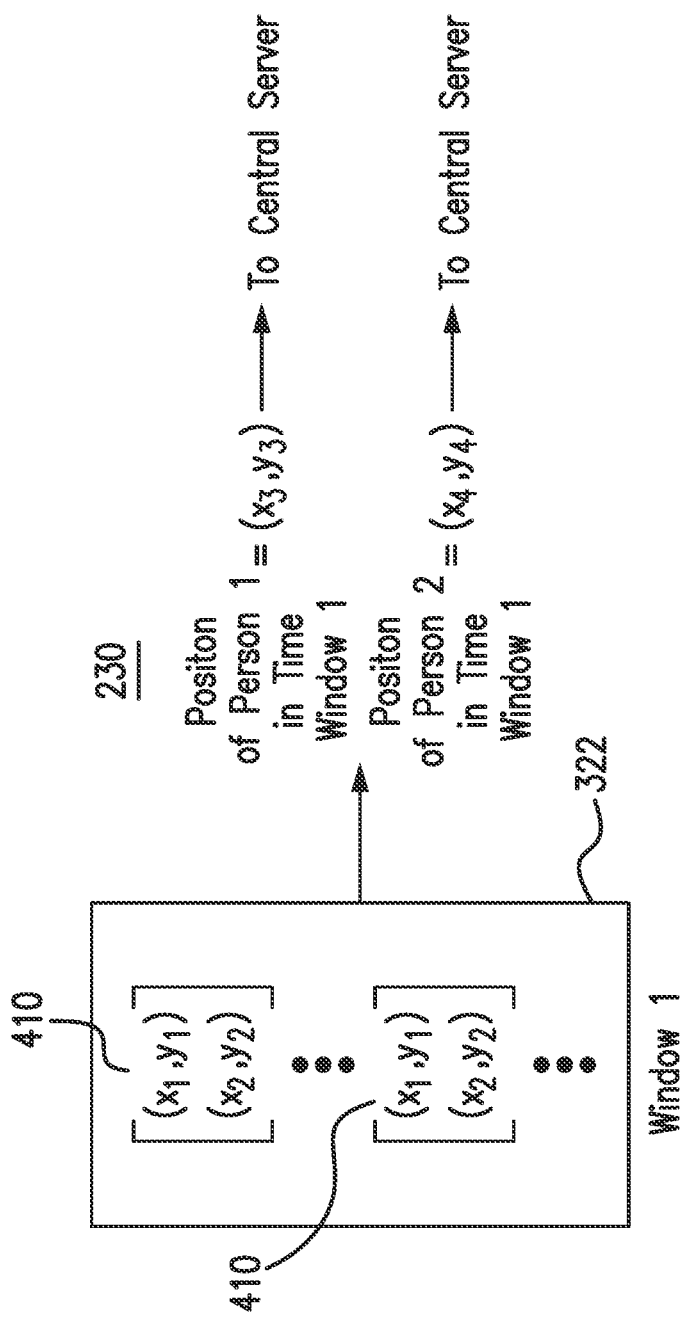

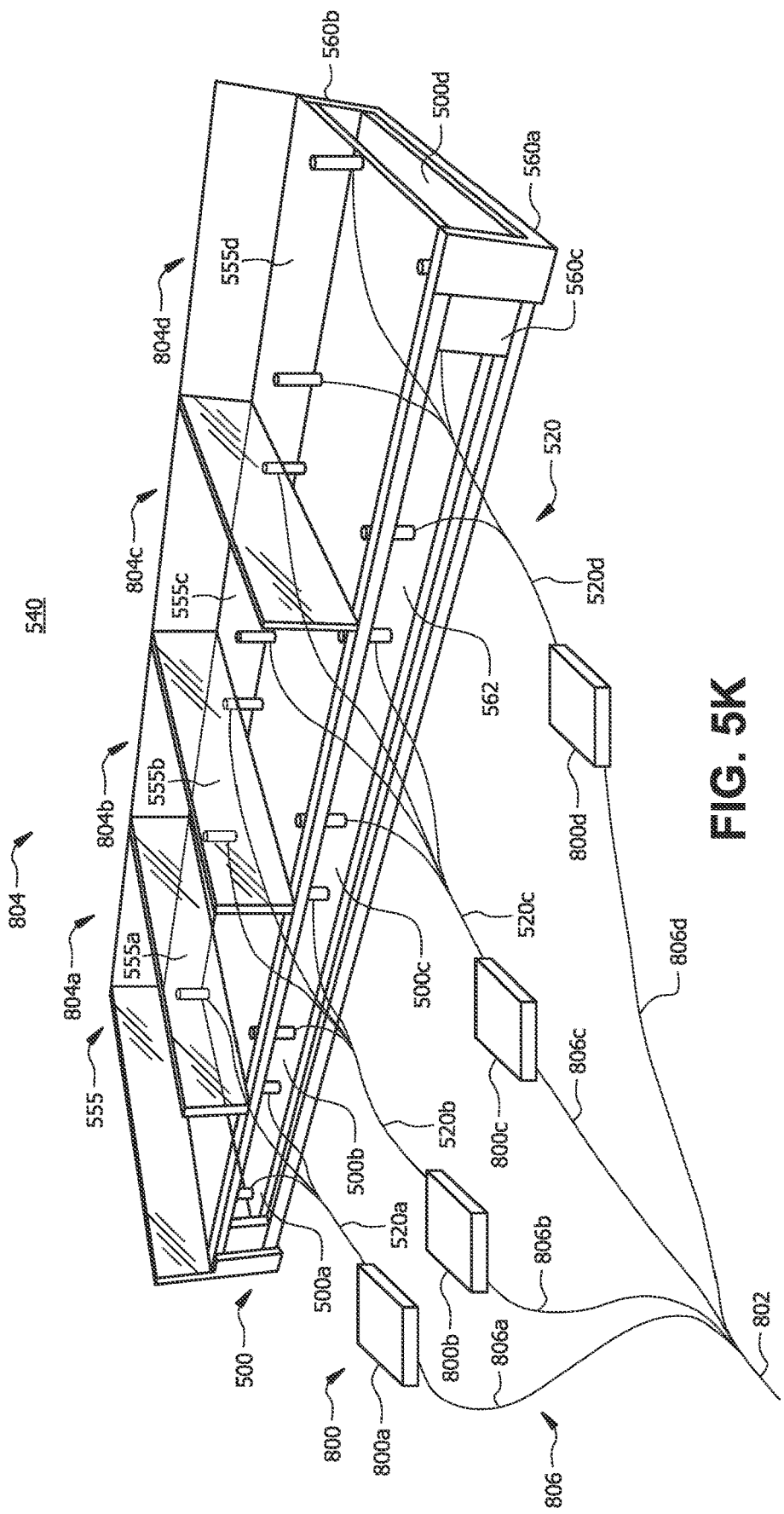

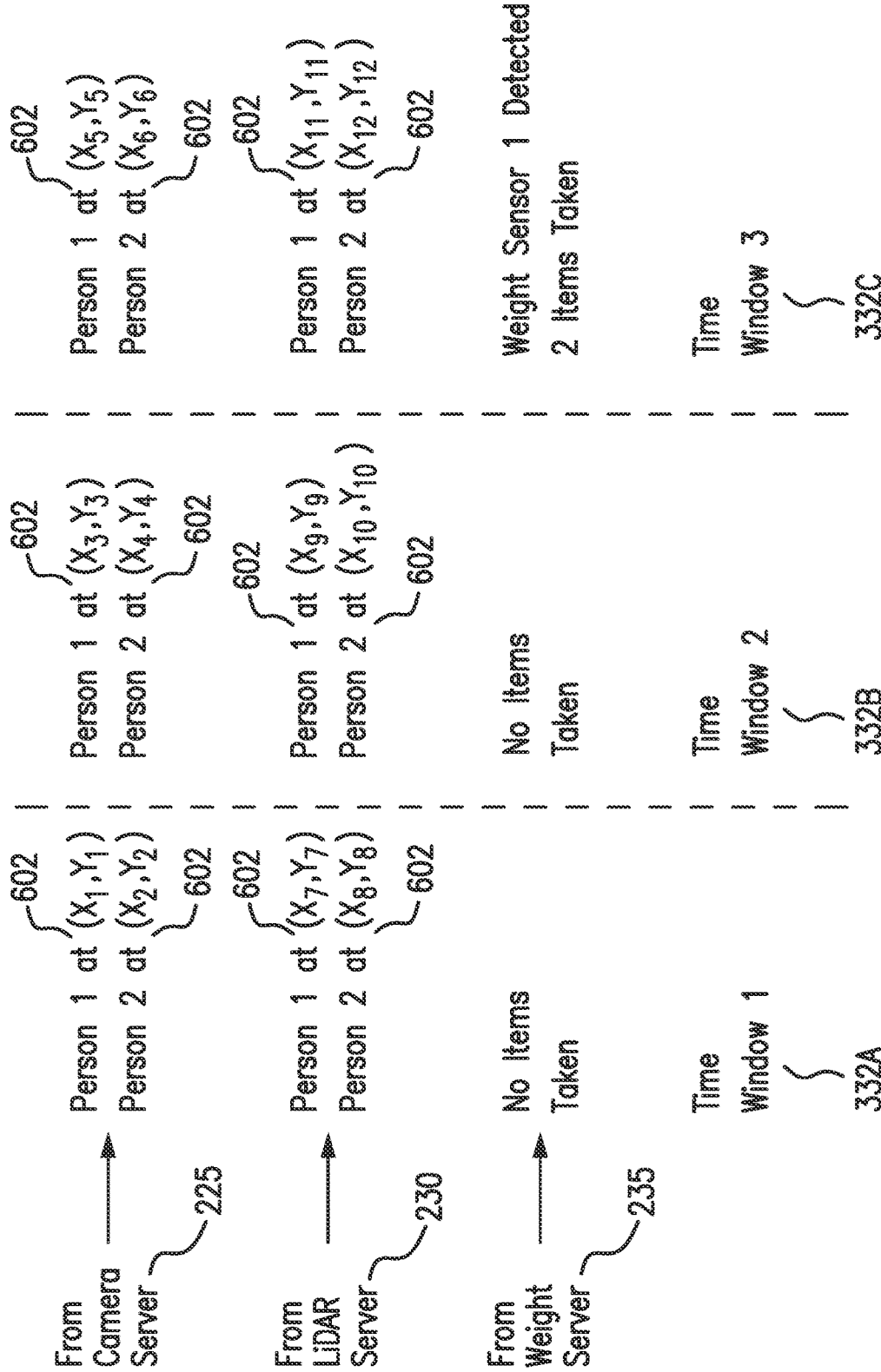

SYSTEM AND METHOD FOR POSITION TRACKING USING EDGE COMPUTING

CROSS-REFERENCE TO RELATED APPLICATIONS

This application is a continuation-in-part of:

U.S. patent application Ser. No. 16/663,633 filed Oct. 25, 2019, by Sailesh Bharathwaaj Krishnamurthy et al., and entitled "SCALABLE POSITION TRACKING SYSTEM FOR TRACKING POSITION IN LARGE SPACES";

U.S. patent application Ser. No. 16/663,415 filed Oct. 25, 2019, by Caleb Austin Boulio et al., and entitled "SENSOR ARRAY FOR SCALABLE POSITION TRACKING SYSTEM";

U.S. patent application Ser. No. 17/018,146 filed Sep. 11, 2020, by Caleb Austin Boulio et al., and entitled "SENSOR ARRAY FOR SCALABLE POSITION TRACKING SYSTEM", which is a divisional of U.S. patent application Ser. No. 16/663,415 filed Oct. 25, 2019, by Caleb Austin Boulio et al., and entitled "SENSOR ARRAY FOR SCALABLE POSITION TRACKING SYSTEM";

U.S. patent application Ser. No. 16/991,947 filed Aug. 12, 2020, by Deepanjan Paul et al., entitled "CUSTOM RACK FOR SCALABLE POSITION TRACKING SYSTEM", which is a continuation of U.S. patent application Ser. No. 16/663,669 filed Oct. 25, 2019, by Deepanjan Paul et al., and entitled "CUSTOM RACK FOR SCALABLE POSITION TRACKING SYSTEM", now U.S. Pat. No. 10,783,762 issued Sep. 22, 2020;

U.S. patent application Ser. No. 16/941,787 filed Jul. 29, 2020, by Sailesh Bharathwaaj Krishnamurthy et al., entitled "TRACKING POSITIONS USING A SCALABLE POSITION TRACKING SYSTEM", which is a continuation of U.S. patent application Ser. No. 16/663,432 filed Oct. 25, 2019, by Sailesh Bharathwaaj Krishnamurthy et al., and entitled "TRACKING POSITIONS USING A SCALABLE POSITION TRACKING SYSTEM", now U.S. Pat. No. 10,769,450 issued Sep. 8, 2020;

U.S. patent application Ser. No. 16/941,825 filed Jul. 29, 2020, by Sailesh Bharathwaaj Krishnamurthy et al., entitled "TRACKING POSITIONS USING A SCALABLE POSITION TRACKING SYSTEM", which is a divisional of U.S. patent application Ser. No. 16/663,432 filed Oct. 25, 2019, by Sailesh Bharathwaaj Krishnamurthy et al., and entitled "TRACKING POSITIONS USING A SCALABLE POSITION TRACKING SYSTEM", now U.S. Pat. No. 10,769,450 issued Sep. 8, 2020;

U.S. patent application Ser. No. 16/663,710 filed Oct. 25, 2019, by Sailesh Bharathwaaj Krishnamurthy et al., and entitled "TOPVIEW OBJECT TRACKING USING A SENSOR ARRAY";

U.S. patent application Ser. No. 16/663,766 filed Oct. 25, 2019, by Sailesh Bharathwaaj Krishnamurthy et al., and entitled "DETECTING SHELF INTERACTIONS USING A SENSOR ARRAY";

U.S. patent application Ser. No. 16/663,451 filed Oct. 25, 2019, by Sarath Vakacharla et al., and entitled "TOPVIEW ITEM TRACKING USING A SENSOR ARRAY";

U.S. patent application Ser. No. 16/663,794 filed Oct. 25, 2019, by Shahmeer Ali Mirza et al., and entitled "DETECTING AND IDENTIFYING MISPLACED ITEMS USING A SENSOR ARRAY";

U.S. patent application Ser. No. 16/663,822 filed Oct. 25, 2019, by Shahmeer Ali Mirza et al., and entitled "SENSOR MAPPING TO A GLOBAL COORDINATE SYSTEM";

U.S. patent application Ser. No. 16/941,415 filed Jul. 28, 2020, by Shahmeer Ali Mirza et al., and entitled "SENSOR MAPPING TO A GLOBAL COORDINATE SYSTEM USING A MARKER GRID", which is a continuation of U.S. patent application Ser. No. 16/794,057 filed Feb. 18, 2020, by Shahmeer Ali Mirza et al., and entitled "SENSOR MAPPING TO A GLOBAL COORDINATE SYSTEM USING A MARKER GRID", now U.S. Pat. No. 10,769,451 issued Sep. 8, 2020, which is a continuation of U.S. patent application Ser. No. 16/663,472 filed Oct. 25, 2019, by Shahmeer Ali Mirza et al., and entitled "SENSOR MAPPING TO A GLOBAL COORDINATE SYSTEM USING A MARKER GRID", now U.S. Pat. No. 10,614,318 issued Apr. 7, 2020;

U.S. patent application Ser. No. 16/663,856 filed Oct. 25, 2019, by Shahmeer Ali Mirza et al., and entitled "SHELF POSITION CALIBRATION IN A GLOBAL COORDINATE SYSTEM USING A SENSOR ARRAY";

U.S. patent application Ser. No. 16/664,160 filed Oct. 25, 2019, by Trong Nghia Nguyen et al., and entitled "CONTOUR-BASED DETECTION OF CLOSELY SPACED OBJECTS";

U.S. patent application Ser. No. 17/071,262 filed Oct. 15, 2020, by Shahmeer Ali Mirza et al., and entitled "ACTION DETECTION DURING IMAGE TRACKING", which is a continuation of U.S. patent application Ser. No. 16/857,990 filed Apr. 24, 2020, by Shahmeer Ali Mirza et al., and entitled "ACTION DETECTION DURING IMAGE TRACKING", which is a continuation of U.S. patent application Ser. No. 16/793,998 filed Feb. 18, 2020, by Shahmeer Ali Mirza et al., and entitled "ACTION DETECTION DURING IMAGE TRACKING", now U.S. Pat. No. 10,685,237 issued Jun. 16, 2020, which is a continuation of U.S. patent application Ser. No. 16/663,500 filed Oct. 25, 2019, by Shahmeer Ali Mirza et al., and entitled "ACTION DETECTION DURING IMAGE TRACKING", now U.S. Pat. No. 10,621,444 issued Apr. 14, 2020;

U.S. patent application Ser. No. 16/857,990 filed Apr. 24, 2020, by Shahmeer Ali Mirza et al., and entitled "ACTION DETECTION DURING IMAGE TRACKING", which is a continuation of U.S. patent application Ser. No. 16/793,998 filed Feb. 18, 2020, by Shahmeer Ali Mirza et al., and entitled "ACTION DETECTION DURING IMAGE TRACKING", now U.S. Pat. No. 10,685,237 issued Jun. 16, 2020, which is a continuation of U.S. patent application Ser. No. 16/663,500 filed Oct. 25, 2019, by Shahmeer Ali Mirza et al., and entitled "ACTION DETECTION DURING IMAGE TRACKING", now U.S. Pat. No. 10,621,444 issued Apr. 14, 2020;

U.S. patent application Ser. No. 16/664,219 filed Oct. 25, 2019, by Shahmeer Ali Mirza et al., and entitled "OBJECT RE-IDENTIFICATION DURING IMAGE TRACKING";

U.S. patent application Ser. No. 16/664,269 filed Oct. 25, 2019, by Madan Mohan Chinnam et al., and entitled "VECTOR-BASED OBJECT RE-IDENTIFICATION DURING IMAGE TRACKING";

U.S. patent application Ser. No. 16/664,332 filed Oct. 25, 2019, by Shahmeer Ali Mirza et al., and entitled "IMAGE-BASED ACTION DETECTION USING CONTOUR DILATION";

U.S. patent application Ser. No. 16/664,363 filed Oct. 25, 2019, by Shahmeer Ali Mirza et al., and entitled "DETERMINING CANDIDATE OBJECT IDENTITIES DURING IMAGE TRACKING";

U.S. patent application Ser. No. 16/664,391 filed Oct. 25, 2019, by Shahmeer Ali Mirza et al., and entitled "OBJECT ASSIGNMENT DURING IMAGE TRACKING";

U.S. patent application Ser. No. 16/664,426 filed Oct. 25, 2019, by Sailesh Bharathwaaj Krishnamurthy et al., and entitled "AUTO-EXCLUSION ZONE FOR CONTOUR-BASED OBJECT DETECTION";

U.S. patent application Ser. No. 16/884,434 filed May 27, 2020, by Shahmeer Ali Mirza et al., and entitled "MULTI-CAMERA IMAGE TRACKING ON A GLOBAL PLANE", which is a continuation of U.S. patent application Ser. No. 16/663,533 filed Oct. 25, 2019, by Shahmeer Ali Mirza et al., and entitled "MULTI-CAMERA IMAGE TRACKING ON A GLOBAL PLANE", now U.S. Pat. No. 10,789,720 issued Sep. 29, 2020;

U.S. patent application Ser. No. 16/663,901 filed Oct. 25, 2019, by Shahmeer Ali Mirza et al., and entitled "IDENTIFYING NON-UNIFORM WEIGHT OBJECTS USING A SENSOR ARRAY"; and U.S. patent application Ser. No. 16/663,948 filed Oct. 25, 2019, by Shahmeer Ali Mirza et al., and entitled "SENSOR MAPPING TO A GLOBAL COORDINATE SYSTEM USING HOMOGRAPHY", which are all incorporated herein by reference.

TECHNICAL FIELD

This disclosure relates generally to a system and method for position tracking using edge computing.

BACKGROUND

Position tracking systems are used to track the physical positions of people and/or objects. Position tracking people and objects within a space pose several technical challenges. Existing systems use various techniques for tracking people and objects within the space. For example, the existing systems use computationally intensive tracking techniques for tracking people and objects. These computationally intensive tracking techniques require a significant amount of time which means that these techniques are not compatible with real-time applications such as video streams. As such, the existing systems lack the ability to provide reliable and accurate tracking techniques compatible with real-time applications.

SUMMARY OF THE DISCLOSURE

Position tracking systems are used to track the physical positions of people and/or objects in a physical space (e.g., a store). These systems typically use a sensor (e.g., a camera) to detect the presence of a person and/or object and a computer to determine the physical position of the person and/or object based on signals from the sensor. In a store setting, other types of sensors can be installed to track the movement of inventory within the store. For example, weight sensors can be installed on racks and shelves to determine when items have been removed from those racks and shelves. By tracking both the positions of persons in a store and when items have been removed from shelves, it is possible for the computer to determine which user in the store removed the item and to charge that user for the item without needing to ring up the item at a register. In other words, the person can walk into the store, take items, and leave the store without stopping for the conventional check-out process.

For larger physical spaces (e.g., convenience stores and grocery stores), additional sensors can be installed throughout the space to track the position of people and/or objects as they move about the space. For example, additional cameras can be added to track positions in the larger space and additional weight sensors can be added to track additional items and shelves. There is a limit, however, to the number of sensors that can be added before the computing capabilities of the computer are reached. As a result, the computing power of the computer limits the coverage area of the tracking system.

One way to scale these systems to handle larger spaces is to add additional computers and to divide the sensors amongst these computers such that each computer processes signals from a subset of the sensors. However, dividing the sensors amongst multiple computers introduces synchronization issues. For example, the sensors may not communicate signals to their respective computers at the same time or simultaneously. As another example, sensors may have different latencies with their respective computers and thus, it may take more time for signals from one sensor to reach a computer than signals from another sensor. As a result, the sensors and computers become desynchronized with each other and it becomes more difficult for the computers to determine, in a cohesive way, the position of persons or objects in the space and when items were removed.

One embodiment of a system disclosed in the present application provides technical solutions to the technical problems discussed above by associating a different camera client to each camera, and migrating the camera clients closer to the cameras. With this method, edge computing can be implemented by the camera clients, and frames from videos captured by the cameras can be processed when they are received by the camera clients. The disclosed system provides several practical applications and technical advantages which include: 1) a process for edge processing of the frames of videos captured by the cameras as they are received by the camera clients by migrating the camera clients closer to the cameras which improves synchronizations of the frames; 2) a process for generating frames at the camera clients, which includes indexing color frames and depth frames associated with the frames with their corresponding labels, such as camera identifiers, timestamps, etc.; 3) a process for generating tracks at the camera clients, where the tracks include metadata detected in the depth frames, such as tracking identifications, historical detections (e.g., bounding areas, contours, segmentation masks), etc.; 4) utilizing a cluster of servers configured to store and maintain the frames and tracks using one or more of their corresponding labels; 5) enabling to query any frame using one or more of its corresponding labels; and 6) enabling to query any track using one or more of its corresponding labels.

As such, the disclosed system may improve the process of object tracking, and more specifically improve the process of object tracking in a large space. The disclosed system may be integrated into a practical application of reducing the computing costs of the tracking process by migrating the camera clients closer to the cameras. This, in turn, provides an additional practical application of increasing the accuracy of the object tracking process. By implementing the edge processing of the color frames and depth frames, the color frames and depth frames can be compressed before sending over to the cluster servers which provides another practical application of saving bandwidth of transmissions of the frames and tracks.

Furthermore, since the color frames and depth frames are processed at the edge camera clients and streamed over to the cluster servers, the camera clients do not need to wait for a certain number of frames to arrive to start a tracking process. Similarly, the camera server does not need to wait for a certain number of frames to arrive to start a windowing process. As such, the disclosed system provides another practical application of improving the speed of the tracking process. The camera server can routinely perform the windowing processes, and request to receive additional frames and tracks from that time window at any time for processing. In other words, the camera server can reference back in time and request frames and tracks with a particular timestamp (in a particular time window) for processing. With this approach, offline tracking algorithm testing can be leveraged where frames and tracks associated with different scenarios (different timestamps) can be used as a training dataset to further improve the tracking process. For example, frames and tracks from different timestamps can be pulled from the cluster servers to input to different versions of the tracking algorithm (and likewise to different tracking algorithms). As such, different versions of the tracking algorithm (and likewise different tracking algorithms) can further be tested using the training dataset. Furthermore, online or live tracking algorithm testing can be leveraged where one or more tracking algorithms can simultaneously process the same incoming frames and tracks. Thus, with this approach, the tracking process can be further optimized.

One embodiment of a system disclosed in the present application provides a technical solution to the technical problems discussed above by assigning a particular address number to each weight sensor and configuring each weight sensor to communicate its corresponding address number along with a signal indicative of a weight of an item to its corresponding weight board. With this method, the location of an event corresponding to an item being removed from or put on a weight sensor is identified based on the address number of that weight sensor.

As such, the disclosed system provides several practical applications and technical advantages which include: 1) a process for assigning a particular address number to each weight sensor, where a particular address number of a weight sensor indicates a location of the weight sensor within a store; 2) a process for configuring each weight sensor to communicate its corresponding address number along with a signal indicative of a weight of an item to its corresponding weight board; and 3) a process for utilizing a bus wire for connecting weight boards (associated with the weight sensors) to a port on a circuit board.

As such, the disclosed system may improve the item position tracking process and facilitate detecting a location where an item has been removed from or put on a weight sensor based on an address number of that weight sensor. The disclosed system may be integrated into a practical application of leveraging edge computing and thus producing more accurate weight information of items on the weight sensors because signals from the weight sensors are processed by the weight boards that are placed close to the weight sensors. The disclosed system may be integrated into an additional practical application of providing a more scalable solution for the item position tracking process by assigning each weight sensor with a particular address number because wires from the weight boards can be aggregated into a bus wire that connects to a port on a circuit board. Thus, the number of weight sensors can be adjusted without running out of ports on a circuit board, thereby obviating a need to use multiple circuit boards if the number of weight sensors becomes more than the number of ports on a circuit board. Furthermore, since each weight sensor is assigned a particular address number, and signals from the weight sensors are transmitted wirelessly, racks within the store can be moved around and re-arranged more flexibly. Once the racks are positioned according to the desired layout, the address numbers of the weight sensors are used to determine the new positions of the weight sensors.

Another way to further improve the item tracking system is by implementing an adaptive item counting algorithm when one or more items are removed from (or put on) a weight sensor. In some cases, the environmental changes, e.g., temperature changes, can affect an item counting process. For example, due to environmental changes, a weight sensor may exhibit a different (or unexpected) sensitivity compared to its default sensitivity, thus, a weight change corresponding to a quantity of an item being removed from (or put on) the weight sensor may not be the actual item quantity that was removed from (or put on) the weight sensor. In other words, the sensitivity of the weight sensor may shift from the default sensor sensitivity of the weight sensor beyond a threshold range such that an inaccurate item quantity is determined. The current item counting technologies are not configured to provide technical solutions to the above-mentioned technical problems. The system disclosed in the present application provides technical solutions to the technical problems discussed above by implementing an adaptive item counting algorithm that is configured to dynamically adapt the item counting process based on weight sensor sensitivity changes and learn from historical data records, i.e., items quantities detected in different temperatures. In other words, the disclosed system captures or detects weight sensor drifts (where the sensitivity of the weight sensor drifts beyond a threshold range from the default sensitivity) and dynamically corrects or adjusts the item counting process. With this method, more accurate results from the item counting process can be achieved even when the weight sensor sensitivity fluctuates, for example, due to environmental changes, e.g., temperature changes.

One embodiment of the disclosed system provides several practical applications and technical advantages which include: 1) a process for dynamically adapting the item counting process based on weight sensor sensitivity analysis; 2) a process for implementing a pattern recognition technique for cases where a non-integer amount of an item is detected, for example, such as an item count is calculated to be 2.5; and 3) validating (or updating) the result from the item counting process by analyzing an instantaneous (or current) weight sensor sensitivity and a default sensor sensitivity. As such, the disclosed system may improve the item counting process by implementing a pattern recognition technique and a validation step based on analyzing the instantaneous (or current) weight sensor sensitivity.

This disclosure contemplates an unconventional, distributed tracking system that can scale to handle larger spaces. The system uses an array of cameras, multiple camera clients, a camera server, weight sensors, a weight server, and a central server to determine which person in the space took an item and should be charged for the item. The camera clients each process frames of videos from a different subset of cameras of the array of cameras. Each camera client determines coordinates for people detected in the frames and then timestamps these coordinates based on when the frames were received by the camera client. The camera clients then communicate the coordinates and timestamps to a camera server that is responsible for coordinating the information from the camera clients. The camera server determines, based on the coordinates and timestamps from the camera clients, the positions of people in the space. The weight server processes signals from the weight sensors to determine when items were removed from shelves in the space. The central server uses the positions of people in the space from the camera server and the determinations from the weight server of when items were removed from shelves to determine which people in the space took which items and should therefore be charged.

Generally, the camera server protects against desynchronization by assigning the coordinates from the multiple camera clients to windows of time based on the timestamps. The camera server then processes the coordinates assigned to a particular time window to determine overall coordinates for people in the space during that time window. The duration of the time window can be set to be larger than the desynchronization that is expected to occur to mitigate the effects of desynchronization. For example, if the cameras and camera clients are expected to desynchronize by a few milliseconds, then the time window can be set to last 100 milliseconds to counteract the desynchronization. In this manner, the number of cameras and camera clients can be increased to scale the system to handle any suitable space.

This disclosure also contemplates an unconventional way of wiring cameras in the array of cameras to the camera clients. The cameras are arranged as a rectangular grid above the space. Each camera in the grid is wired to a particular camera client according to certain rules. For example, no two cameras that are directly adjacent to one another in the same row or column of the grid are wired to the same camera client. As another example, cameras that are arranged along a diagonal in the grid are wired to the same camera client. In this manner, a small area of the grid should include cameras that are wired to each and every camera client in the system. As a result, even if one camera client were to go offline (e.g., maintenance, error, or crash), there would still be enough coverage from the remaining camera clients to track the positions of people in the small area. Thus, this arrangement of the cameras improves the resiliency of the system.

This disclosure further contemplates an unconventional rack and shelf design that integrates weight sensors for tracking when items have been removed from the racks and shelves. Generally, the rack includes a base, a vertical panel, and a shelf. The base forms an enclosed space in which a printed circuit board is positioned, and the base includes a drawer that opens to provide access to the enclosed space and the circuit board. The vertical panel is attached to the base, and the shelf is attached to the vertical panel. Weight sensors are positioned within the shelf. The base, panel, and shelf each define a cavity. The cavity in the shelf and the cavity in the panel are at least partially aligned. Each weight sensor communicates signals to the printed circuit board through a wire that runs from that weight sensor, through the cavity of the shelf, the cavity of the panel, and the cavity of the base, to the circuit board.

Certain embodiments include an unconventional tracking system that includes separate components (e.g., camera clients, camera servers, weight servers, and a central server) that perform different functions to track the positions of people and/or objects in a space. By spreading the functionality of the system amongst these various components, the system is capable of processing signals from more sensors (e.g., cameras and weight sensors). Due to the increase in the number of sensors, the system can track people and/or objects in a larger space. As a result, the system can be scaled to handle larger spaces (e.g., by adding additional camera clients). Certain embodiments of the tracking system are described below.

With respect to FIGS. 3A-3T, according to an embodiment, a system includes an array of cameras, a first camera client, a second camera client, a camera server, a plurality of weight sensors, a weight server, and a central server. The array of cameras is positioned above a space. Each camera of the array of cameras captures a video of a portion of the space. The space contains a person. The first camera client receives a first plurality of frames of a first video from a first camera of the array of cameras. Each frame of the first plurality of frames shows the person within the space. For a first frame of the first plurality of frames, the first camera client determines a first bounding area around the person shown in the first frame and generates a first timestamp of when the first frame was received by the first camera client. For a second frame of the first plurality of frames, the first camera client determines a second bounding area around the person shown in the second frame and generates a second timestamp of when the second frame was received by the first camera client. The second camera client is separate from the first camera client. The second camera client receives a second plurality of frames of a second video from a second camera of the array of cameras. Each frame of the second plurality of frames shows the person within the space. For a third frame of the second plurality of frames, the second camera client determines a third bounding area around the person shown in the third frame and generates a third timestamp of when the third frame was received by the second camera client. For a fourth frame of the second plurality of frames, the second camera client determines a fourth bounding area around the person shown in the fourth frame and generates a fourth timestamp of when the fourth frame was received by the second camera client.

The camera server is separate from the first and second camera clients. The camera server determines that the first timestamp falls within a first time window and in response to determining that the first timestamp falls within the first time window, assigns coordinates defining the first bounding area to the first time window. The camera server also determines that the second timestamp falls within the first time window and in response to determining that the second timestamp falls within the first time window, assigns coordinates defining the second bounding area to the first time window. The camera server further determines that the third timestamp falls within the first time window and in response to determining that the third timestamp falls within the first time window, assigns coordinates defining the third bounding area to the first time window. The camera server determines that the fourth timestamp falls within a second time window that follows the first time window and in response to determining that the fourth timestamp falls within the second time window, assigns coordinates defining the fourth bounding area to the second time window.

The camera server also determines that coordinates assigned to the first time window should be processed and in response to determining that coordinates assigned to the first time window should be processed, the camera server calculates, based at least on the coordinates defining the first bounding area and the coordinates defining the second bounding area, a combined coordinate for the person during the first time window for the first video from the first camera and calculates, based at least on the coordinates defining the third bounding area, a combined coordinate for the person during the first time window for the second video from the second camera. The camera server also determines, based at least on the combined coordinate for the person during the first time window for the first video from the first camera and the combined coordinate for the person during the first time window for the second video from the second camera, a position of the person within the space during the first time window.

The plurality of weight sensors are positioned within the space. Each weight sensor of the plurality of weight sensors produces a signal indicative of a weight experienced by that weight sensor. The weight server is separate from the first and second camera clients and the camera server. The weight server determines, based at least on a signal produced by a first weight sensor of the plurality of weight sensors, that an item positioned above the first weight sensor was removed. The central server is separate from the first and second camera clients, the camera server, and the weight server. The central server determines, based at least on the position of the person within the space during the first time window, that the person removed the item. Based at least on the determination that the first person removed the item, the person is charged for the item when the person exits the space.

According to another embodiment, a system includes an array of cameras, a first camera client, a second camera client, a camera server, a plurality of weight sensors, a weight server, and a central server. The array of cameras is positioned above a space. Each camera of the array of cameras captures a video of a portion of the space. The space contains a person. The first camera client, for each frame of a first video received from a first camera of the array of cameras, determines a bounding area around the person shown in that frame of the first video and generates a timestamp of when that frame of the first video was received by the first camera client. The second camera client, for each frame of a second video received from a second camera of the array of cameras, determines a bounding area around the person shown in that frame of the second video and generates a timestamp of when that frame of the second video was received by the second camera client.

The camera server is separate from the first and second camera clients. The camera server, for each frame of the first video, assigns, based at least on the timestamp of when that frame was received by the first camera client, coordinates defining the bounding area around the person shown in that frame to one of a plurality of time windows. For each frame of the second plurality of frames, the camera server assigns, based at least on the timestamp of when that frame was received by the second camera client, coordinates defining the bounding area around the person shown in that frame to one of the plurality of time windows. For a first time window of the plurality of time windows, the camera server calculates, based at least on the coordinates that (1) define bounding areas around the person shown in the first plurality of frames and (2) are assigned to the first time window, a combined coordinate for the person during the first time window for the first video from the first camera and calculates, based at least on the coordinates that (1) define bounding areas around the person shown in the second plurality of frames and (2) are assigned to the first time window, a combined coordinate for the person during the first time window for the second video from the second camera. The camera server determines, based at least on the combined coordinate for the person during the first time window for the first video from the first camera and the combined coordinate for the person during the first time window for the second video from the second camera, a position of the person within the space during the first time window.

The plurality of weight sensors are positioned within the space. The weight server is separate from the first and second camera clients and the camera server. The weight server determines, based at least on a signal produced by a first weight sensor of the plurality of weight sensors, that an item positioned above the first weight sensor was removed. The central server is separate from the first and second camera clients, the camera server, and the weight server. The central server determines, based at least on the position of the person within the space during the first time window, that the person removed the item.

Certain embodiments of the tracking system perform an unconventional tracking process that allows for some desynchronization amongst the components of the system (e.g., camera clients and camera server). Generally, the system processes information according to time windows. These time windows may be set to be larger than the desynchronization that is expected to exist in the system. Information that is assigned to a time window is processed together. Thus, even if some desynchronization exists amongst that information, it is nevertheless processed together within the same time window. In this manner, the tracking system can handle an increased amount of desynchronization, especially desynchronization that occurs as a result of the system being scaled to include more components so that the system can handle a larger space. As a result, the system can scale to handle larger spaces while maintaining reliability and accuracy. Certain embodiments of the tracking process are described below.

According to an embodiment, a system includes an array of cameras, a first camera client, a second camera client, and a camera server. The array of cameras is positioned above a space. Each camera of the array of cameras captures a video of a portion of the space. The space contains a person. The first camera client receives a first plurality of frames of a first video from a first camera of the array of cameras. Each frame of the first plurality of frames shows the person within the space. For a first frame of the first plurality of frames, the first camera client determines a first bounding area around the person shown in the first frame and generates a first timestamp of when the first frame was received by the first camera client. For a second frame of the first plurality of frames, the first camera client determines a second bounding area around the person shown in the second frame and generates a second timestamp of when the second frame was received by the first camera client. For a third frame of the first plurality of frames, the first camera client determines a third bounding area around the person shown in the third frame and generates a third timestamp of when the third frame was received by the first camera client.

The second camera client receives a second plurality of frames of a second video from a second camera of the array of cameras. Each frame of the second plurality of frames shows the person within the space. For a fourth frame of the second plurality of frames, the second camera client determines a fourth bounding area around the person shown in the fourth frame and generates a fourth timestamp of when the fourth frame was received by the second camera client. For a fifth frame of the second plurality of frames, the second camera client determines a fifth bounding area around the person shown in the fifth frame and generates a fifth timestamp of when the fifth frame was received by the second camera client.

The camera server is separate from the first and second camera clients. The camera server determines that the first timestamp falls within a first time window and in response to determining that the first timestamp falls within the first time window, assigns coordinates defining the first bounding area to the first time window. The camera server also determines that the second timestamp falls within the first time window and in response to determining that the second timestamp falls within the first time window, assigns coordinates defining the second bounding area to the first time window. The camera server further determines that the third timestamp falls within a second time window that follows the first time window and in response to determining that the third timestamp falls within the second time window, assigns coordinates defining the third bounding area to the second time window. The camera server also determines that the fourth timestamp falls within the first time window and in response to determining that the fourth timestamp falls within the first time window, assigns coordinates defining the fourth bounding area to the first time window. The camera server further determines that the fifth timestamp falls within the second time window and in response to determining that the fifth timestamp falls within the second time window, assigns coordinates defining the fifth bounding area to the second time window.

The camera server also determines that coordinates assigned to the first time window should be processed and in response to determining that coordinates assigned to the first time window should be processed, the camera server calculates, based at least on the coordinates defining the first bounding area and the coordinates defining the second bounding area, a combined coordinate for the person during the first time window for the first video from the first camera and calculates, based at least on the coordinates defining the fourth bounding area, a combined coordinate for the person during the first time window for the second video from the second camera. After determining that coordinates assigned to the first time window should be processed, the camera server determines that coordinates assigned to the second time window should be processed and in response to determining that coordinates assigned to the second time window should be processed, the camera servers calculates, based at least on the coordinates defining the third bounding area, a combined coordinate for the person during the second time window for the first video from the first camera and calculates, based at least on the coordinates defining the fifth bounding area, a combined coordinate for the person during the second time window for the second video from the second camera.

According to another embodiment, a system includes an array of cameras, a first camera client, a second camera client, and a camera server. The array of cameras is positioned above a space. Each camera of the array of cameras captures a video of a portion of the space. The space contains a person. The first camera client receives a first plurality of frames of a first video from a first camera of the array of cameras. Each frame of the first plurality of frames shows the person within the space. For each frame of the first plurality of frames, the first camera client determines a bounding area around the person shown in that frame and generates a timestamp of when that frame was received by the first camera client. The second camera client receives a second plurality of frames of a second video from a second camera of the array of cameras. Each frame of the second plurality of frames shows the person within the space. For each frame of the second plurality of frames, the second camera client determines a bounding area around the person shown in that frame and generates a timestamp of when that frame was received by the second camera client.

The camera server is separate from the first and second camera clients. The camera server, for each frame of the first plurality of frames, assigns, based at least on the timestamp of when that frame was received by the first camera client, coordinates defining the bounding area around the person shown in that frame to one of a plurality of time windows and for each frame of the second plurality of frames, assigns, based at least on the timestamp of when that frame was received by the second camera client, coordinates defining the bounding area around the person shown in that frame to one of the plurality of time windows.

The camera server also determines that coordinates assigned to a first time window of the plurality of time windows should be processed and in response to determining that coordinates assigned to the first time window should be processed, calculates, based at least on the coordinates that (1) define bounding areas around the person shown in the first plurality of frames and (2) are assigned to the first time window, a combined coordinate for the person during the first time window for the first video from the first camera and calculates, based at least on the coordinates that (1) define bounding areas around the person shown in the second plurality of frames and (2) are assigned to the first time window, a combined coordinate for the person during the first time window for the second video from the second camera.

Certain embodiments include an unconventional arrangement of cameras and camera clients that improve the resiliency of the camera system. Generally, the cameras are arranged in a rectangular grid that provides coverage for a physical space, and each camera is communicatively coupled to one camera client. No camera is directly adjacent in the same row or column of the grid to another camera that is communicatively coupled to the same camera client. Cameras arranged along a diagonal of the grid are communicatively coupled to the same camera client. In this manner, even if one camera client in the system were to go offline, the grid still provides sufficient coverage for the physical space. As a result, the arrangement of the cameras improves the resiliency of the system. Certain embodiments of the camera arrangement are described below.

According to an embodiment, a system includes a first camera client, a second camera client, a third camera client, and an array of cameras. The second camera client is separate from the first camera client. The third camera client is separate from the first and second camera clients. The array of cameras is positioned above a space. The cameras in the array of cameras are arranged as a rectangular grid comprising a first row, a second row, a third row, a first column, a second column, and a third column. The array includes first, second, third, fourth, fifth, and sixth cameras.

The first camera is positioned in the first row and the first column of the grid. The first camera is communicatively coupled to the first camera client. The first camera communicates a video of a first portion of the space to the first camera client. The second camera is positioned in the first row and the second column of the grid such that the second camera is directly adjacent to the first camera in the grid. The second camera is communicatively coupled to the second camera client. The second camera communicates a video of a second portion of the space to the second camera client. The third camera is positioned in the first row and the third column of the grid such that the third camera is directly adjacent to the second camera in the grid. The third camera is communicatively coupled to the third camera client. The third camera communicates a video of a third portion of the space to the third camera client. The fourth camera is positioned in the second row and the first column of the grid such that the fourth camera is directly adjacent to the first camera in the grid. The fourth camera is communicatively coupled to the second camera client. The fourth camera communicates a video of a fourth portion of the space to the second camera client. The fifth camera is positioned in the second row and the second column of the grid such that the fifth camera is directly adjacent to the fourth camera and the second camera in the grid. The fifth camera is communicatively coupled to the third camera client. The fifth camera communicates a video of a fifth portion of the space to the third camera client. The sixth camera is positioned in the third row and the first column of the grid such that the sixth camera is directly adjacent to the fourth camera in the grid. The sixth camera is communicatively coupled to the third camera client. The sixth camera communicates a video of a sixth portion of the space to the third camera client.

According to another embodiment, a system includes a plurality of camera clients and an array of cameras. The plurality of camera clients includes a number of camera clients. The array of cameras is positioned above a space. Each camera in the array of cameras communicates a video of a portion of the space to only one camera client of the plurality of camera clients. The cameras in the array of cameras are arranged such that each camera client of the plurality of camera clients is communicatively coupled to at least one camera in an N×N portion of the array. N is the number of camera clients in the plurality of camera clients minus one.

With respect to FIGS. 3U-3Y, according to an embodiment, a system includes a first camera, a first camera client, and cluster servers. The first camera is configured to generate a first plurality of frames showing a portion of a space, where the space contains a person. The first camera client is operably coupled with the first camera and is configured to receive the first plurality of frames from the first camera. The first plurality of frames comprises a first plurality of color frames and a first plurality of depth frames. The first plurality of color frames corresponds to the visual colors of objects in the space. The first plurality of depth frames corresponds to distances of objects in the space from the first camera. The first camera client generates a timestamp when each corresponding color and depth frame is received by the first camera client. The first camera client labels the first plurality of color frames and the first plurality of depth frames with their corresponding timestamps and an identifier number of the first camera. The first camera client sends a first set of frames comprising the first plurality of color frames and the first plurality of depth frames labeled with one or more corresponding timestamps and the identifier number of the first camera to a first server from among a plurality of cluster servers.

For each depth frame from the first plurality of depth frames, the camera client detects a contour associated with the person in the depth frame. The camera client detects, based at least in part upon pixel coordinates of the contour, a bounding area around the person in the depth frame. The camera client determines, based at least in part upon the bounding area, coordinates of the person in the depth frame. The camera client associates, based at least in part upon the bounding area, a first tracking identification to the person, where the first tracking identification is linked to historical detections associated with the person. The historical detections associated with the person comprise at least one of a contour, a bounding area, a segmentation mask associated with the person.

The camera client generates a track comprising the first tracking identification linked to the historical detections associated with the person. The track is labeled with one or more corresponding timestamps, the identifier number of the first camera, the first tracking identification, and the historical detections associated with the person. The first camera client sends a first set of tracks comprising tracks generated from the first plurality of depth frames to a second server from among the plurality of cluster servers.

Each server from among the plurality of cluster servers is operably coupled to the first camera and the first camera client, and configured to store the first set of frames using one or more corresponding labels of the first set of frames comprising an identifier number of the first camera and a timestamp range. Each server from among the plurality of cluster servers is further configured to store the first set of tracks using one or more corresponding labels of the first set of tracks comprising the identifier number of the first camera, a timestamp range, the historical detections, and the first tracking identification.

Certain embodiments include an unconventional rack for holding items. The rack includes a base and panels for holding shelves and weight sensors. The weight sensors are wired to a circuit board located in a drawer in the base. The wires run from the weight sensors through cavities and spaces defined by the shelves, panels, and base. Certain embodiments of the rack are described below.

With respect to FIGS. 5A-5G, according to an embodiment, a system includes a circuit board and a rack. The rack includes a base, a panel, a shelf, a first weight sensor, a second weight sensor, a first wire, and a second wire. The base includes a bottom surface, a first side surface, a second side surface, a third side surface, a top surface, and a drawer. The first side surface is coupled to the bottom surface of the base. The first side surface of the base extends upwards from the bottom surface of the base. The second side surface is coupled to the bottom and first side surfaces of the base. The second side surface of the base extends upwards from the bottom surface of the base. The third side surface is coupled to the bottom and second side surfaces of the base. The third side surface of the base extends upwards from the bottom surface of the base. The top surface is coupled to the first, second, and third side surfaces of the base such that the bottom and top surfaces of the base and the first, second, and third side surfaces of the base define a space. The top surface of the base defines a first opening into the space. The drawer is positioned within the space. The circuit board is positioned within the drawer.

The panel is coupled to the base and extends upwards from the base. The panel defines a second opening that extends along a width of the panel. The shelf is coupled to the panel such that the shelf is positioned vertically higher than the base and such that the shelf extends away from the panel. The shelf includes a bottom surface, a front surface that extends upwards from the bottom surface of the shelf, and a back surface that extends upwards from the bottom surface of the shelf. The back surface of the shelf is coupled to the panel. The back surface of the shelf defines a third opening. A portion of the third opening aligns with a portion of the second opening.

The first weight sensor is coupled to the bottom surface of the shelf and positioned between the front surface of the shelf and the back surface of the shelf. The second weight sensor is coupled to the bottom surface of the shelf and positioned between the front surface of the shelf and the back surface of the shelf. The first wire is coupled to the first weight sensor and the circuit board. The first wire extends from the first weight sensor through the second and third openings and downwards into the space through the first opening. The second wire is coupled to the second weight sensor and the circuit board. The second wire extends from the second weight sensor through the second and third openings and downwards into the space through the first opening.

With respect to FIGS. 5K-5M, in one embodiment, a system comprises a circuit board and a rack. The rack includes a base, a panel, a shelf, a first weight board, a second weight board, a first weight sensor, a second weight sensor, and a bus wire. The base provides a space to position the circuit board. The panel is coupled to the base and extends upwards from the base. The shelf provides a first region to position the first weight sensor and a second region to position the second weight sensor.

The first weight board is operably coupled to the first weight sensor and configured to assign a first address number to the first weight sensor corresponding to the first region of the shelf where the first weight sensor is positioned. The second weight board is operably coupled to the second weight sensor and configured to assign a second address number to the second weight sensor corresponding to the second region of the shelf where the second weight sensor is positioned.

The bus wire is used for connecting the first weight board and the second weight board to the circuit board. A first wire is connected to the first weight board and extends from the first weight board outwards from the first region. A second wire is connected to the second weight board and extends from the second weight board outwards from the second region. The first wire and the second wire are aggregated to form the bus wire that connects to a port on the circuit board. The circuit board is configured to determine from which weight sensor a signal is originated based at least in part upon address numbers of the first weight sensor and the second weight sensor. If the circuit board receives a first signal comprising the first address number, the circuit board determines that the first signal is originated from the first weight sensor. If the circuit board receives a second signal comprising the second address number, the circuit board determines that the second signal is originated from the second weight sensor.

With respect to FIGS. 5N and 5O, in one embodiment, a system comprises a weight sensor that is configured to measure a weight of at least one of an item positioned on the weight sensor, and generate a first signal indicative of the weight of the at least one of the item.

The system also includes a weight server that is operably coupled with the weight sensor and includes a processor that is configured to detect a first event corresponding to a weight change on the weight sensor when a quantity of the item is removed from the weight sensor. The processor determines a weight decrease amount corresponding to the weight decrease on the weight sensor. The processor calculates a result from dividing the weight decrease amount over a unit weight of the item. The processor determines an item quantity value by identifying the closest integer to the result. The processor determines whether the result is within a first threshold range from the item quantity value. If it is determined that the result is within the first threshold range from the item quantity value, the processor determines that a quantity of the item with the amount of the item quantity value is removed from the weight sensor.

If it is determined that the result is not within the first threshold range from the item quantity value, the processor uses a pattern recognition technique to determine the item quantity. In this process, the processor compares a weight change pattern of the first signal with weight change patterns from a training dataset comprising a set of historically observed signals, where each signal in the training dataset is associated with a quantity of the item being removed from the weight sensor. The processor finds a particular signal from the training dataset whose weight change pattern matches the weight change pattern of the first signal. The processor determines that a quantity of the item associated with the particular signal is removed from the weight sensor.

Certain embodiments may include none, some, or all of the above technical advantages discussed above. One or more other technical advantages may be readily apparent to one skilled in the art from the figures, descriptions, and claims included herein.

BRIEF DESCRIPTION OF THE DRAWINGS

For a more complete understanding of the present disclosure, reference is now made to the following description, taken in conjunction with the accompanying drawings, in which:

FIGS. 4A-4D illustrate an example light detection and ranging subsystem and its operation in the tracking system;

FIGS. 5K-5M illustrate another example weight subsystem and its operation in the tracking system;

FIG. 5O illustrates an example flow chart of a method for validating a result from an item counting process;

FIGS. 6A-6C illustrate the operation of an example central server for use in conjunction with the tracking system;

DETAILED DESCRIPTION

Figure 1A:
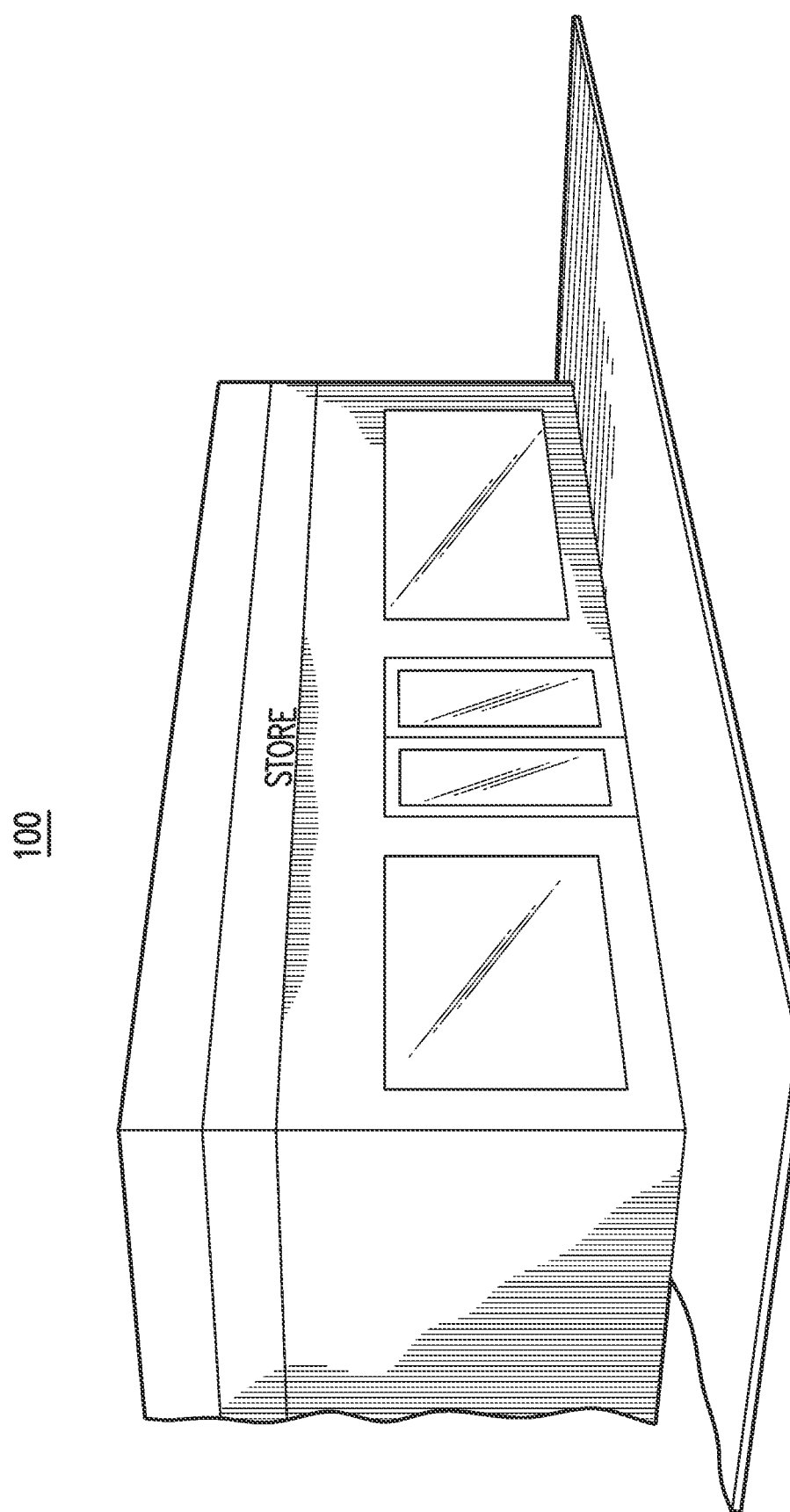
FIG. 1A-1C illustrates an example store that defines a physical space.

Embodiments of the present disclosure and its advantages are best understood by referring to FIGS. 1A through 21 of the drawings, like numerals being used for like and corresponding parts of the various drawings. Additional information is disclosed in U.S. patent application Ser. No. 16/663,633 entitled "Scalable Position Tracking System For Tracking Position In Large Spaces"; U.S. patent application Ser. No. 16/663,415 entitled "Sensor Array For Scalable Position Tracking System"; U.S. patent application Ser. No. 17/018,146 entitled "Sensor Array For Scalable Position Tracking System", which is a divisional of U.S. patent application Ser. No. 16/663,415 entitled "Sensor Array For Scalable Position Tracking System"; U.S. patent application Ser. No. 16/991,947 entitled "Custom Rack For Scalable Position Tracking System", which is a continuation of U.S. patent application Ser. No. 16/663,669 entitled "Custom Rack For Scalable Position Tracking System", now U.S. Pat. No. 10,783,762; U.S. patent application Ser. No. 16/941,787 entitled "Tracking Positions Using a Scalable Position Tracking System", which is a continuation of U.S. patent application Ser. No. 16/663,432 entitled "Tracking Positions Using A Scalable Position Tracking System", now U.S. Pat. No. 10,769,450; U.S. patent application Ser. No. 16/941,825 entitled "Tracking Positions Using A Scalable Position Tracking System", which is a divisional of U.S. patent application Ser. No. 16/663,432 entitled "Tracking Positions Using A Scalable Position Tracking System", now U.S. Pat. No. 10,769,450; U.S. patent application Ser. No. 16/663,710 entitled "Topview Object Tracking Using A Sensor Array"; U.S. patent application Ser. No. 16/663,766 entitled "Detecting Shelf Interactions Using A Sensor Array"; U.S. patent application Ser. No. 16/663,451 entitled "Topview Item Tracking Using A Sensor Array"; U.S. patent application Ser. No. 16/663,794 entitled "Detecting And Identifying Misplaced Items Using A Sensor Array"; U.S. patent application Ser. No. 16/663,822 entitled "Sensor Mapping To A Global Coordinate System"; U.S. patent application Ser. No. 16/941,415 entitled "Sensor Mapping To A Global Coordinate System Using A Marker Grid", which is a continuation of U.S. patent application Ser. No. 16/794,057 entitled "Sensor Mapping To A Global Coordinate System Using A Marker Grid", now U.S. Pat. No. 10,769,451, which is a continuation of U.S. patent application Ser. No. 16/663,472 entitled "Sensor Mapping To A Global Coordinate System Using A Marker Grid", now U.S. Pat. No. 10,614,318; U.S. patent application Ser. No. 16/663,856 entitled "Shelf Position Calibration In A Global Coordinate System Using A Sensor Array"; U.S. patent application Ser. No. 16/664,160 entitled "Contour-Based Detection Of Closely Spaced Objects"; U.S. patent application Ser. No. 17/071,262 entitled "Action Detection During Image Tracking", which is a continuation of U.S. patent application Ser. No. 16/857,990 entitled "Action Detection During Image Tracking", which is a continuation of U.S. patent application Ser. No. 16/793,998 entitled "Action Detection During Image Tracking" now U.S. Pat. No. 10,685,237, which is a continuation of U.S. patent application Ser. No. 16/663,500 entitled "Action Detection During Image Tracking" now U.S. Pat. No. 10,621,444; U.S. patent application Ser. No. 16/857,990 entitled "Action Detection During Image Tracking", which is a continuation of U.S. patent application Ser. No. 16/793,998 entitled "Action Detection During Image Tracking" now U.S. Pat. No. 10,685,237, which is a continuation of U.S. patent application Ser. No. 16/663,500 entitled "Action Detection During Image Tracking" now U.S. Pat. No. 10,621,444; U.S. patent application Ser. No. 16/664,219 entitled "Object Re-Identification During Image Tracking"; U.S. patent application Ser. No. 16/664,269 entitled "Vector-Based Object Re-Identification During Image Tracking"; U.S. patent application Ser. No. 16/664,332 entitled "Image-Based Action Detection Using Contour Dilation"; U.S. patent application Ser. No. 16/664,363 entitled "Determining Candidate Object Identities During Image Tracking"; U.S. patent application Ser. No. 16/664,391 entitled "Object Assignment During Image Tracking"; U.S. patent application Ser. No. 16/664,426 entitled "Auto-Exclusion Zone For Contour-Based Object Detection"; U.S. patent application Ser. No. 16/884,434 entitled "Multi-Camera Image Tracking On A Global Plane", which is a continuation of U.S. patent application Ser. No. 16/663,533 entitled "Multi-Camera Image Tracking On A Global Plane" now U.S. Pat. No. 10,789,720; U.S. patent application Ser. No. 16/663,901 entitled "Identifying Non-Uniform Weight Objects Using A Sensor Array"; U.S. patent application Ser. No. 16/663,948 entitled "Sensor Mapping To A Global Coordinate System Using Homography"; U.S. patent application Ser. No. 16/664,470 entitled, "Customer-Based Video Feed"; and U.S. patent application Ser. No. 16/663,710 entitled, "Topview Object Tracking Using a Sensor Array" which are all hereby incorporated by reference herein as if reproduced in their entirety.

Position tracking systems are used to track the physical positions of people and/or objects in a physical space (e.g., a store). These systems typically use a sensor (e.g., a camera) to detect the presence of a person and/or object and a computer to determine the physical position of the person and/or object based on signals from the sensor. In a store setting, other types of sensors can be installed to track the movement of inventory within the store. For example, weight sensors can be installed on racks and shelves to determine when items have been removed from those racks and shelves. By tracking both the positions of persons in a store and when items have been removed from shelves, it is possible for the computer to determine which user in the store removed the item and to charge that user for the item without needing to ring up the item at a register. In other words, the person can walk into the store, take items, and leave the store without stopping for the conventional checkout process.

For larger physical spaces (e.g., convenience stores and grocery stores), additional sensors can be installed throughout the space to track the position of people and/or objects as they move about the space. For example, additional cameras can be added to track positions in the larger space and additional weight sensors can be added to track additional items and shelves. There is a limit, however, to the number of sensors that can be added before the computing capabilities of the computer are reached. As a result, the computing power of the computer limits the coverage area of the tracking system.

One way to scale these systems to handle larger spaces is to add additional computers and to divide the sensors amongst these computers such that each computer processes signals from a subset of the sensors. However, dividing the sensors amongst multiple computers introduces synchronization issues. For example, the sensors may not communicate signals to their respective computers at the same time or simultaneously. As another example, sensors may have different latencies with their respective computers and thus, it may take more time for signals from one sensor to reach a computer than signals from another sensor. As a result, the sensors and computers become desynchronized with each other and it becomes more difficult for the computers to determine, in a cohesive way, the position of persons or objects in the space and when items were removed.

This disclosure contemplates an unconventional, distributed tracking system that can scale to handle larger spaces. The system uses an array of cameras, multiple camera clients, a camera server, weight sensors, a weight server, and a central server to determine which person in the space took an item and should be charged for the item. The camera clients each process frames of videos from a different subset of cameras of the array of cameras. Each camera client determines coordinates for people detected in the frames and then timestamps these coordinates based on when the frames were received by the camera client. The camera clients then communicate the coordinates and timestamps to a camera server that is responsible for coordinating the information from the camera clients. The camera server determines, based on the coordinates and timestamps from the camera clients, the positions of people in the space. The weight server processes signals from the weight sensors to determine when items were removed from shelves in the space. The central server uses the positions of people in the space from the camera server and the determinations from the weight server of when items were removed from shelves to determine which people in the space took which items and should therefore be charged. The system will be described in more detail using FIGS. 1A-7.

Generally, the camera server protects against desynchronization by assigning the coordinates from the multiple camera clients to windows of time based on the timestamps. The camera server then processes the coordinates assigned to a particular time window to determine overall coordinates for people in the space during that time window. The duration of the time window can be set to be larger than the desynchronization that is expected to occur to mitigate the effects of desynchronization. For example, if the cameras and camera clients are expected to desynchronize by a few milliseconds, then the time window can be set to last 100 milliseconds to counteract the desynchronization. In this manner, the number of cameras and camera clients can be increased to scale the system to handle any suitable space. The cameras, camera clients, and camera server will be described in more detail using FIGS. 1A-3Q.

This disclosure also contemplates an unconventional way of wiring cameras in the array of cameras to the camera clients. The cameras are arranged as a rectangular grid above the space. Each camera in the grid is wired to a particular camera client according to certain rules. For example, no two cameras that are directly adjacent to one another in the same row or column of the grid are wired to the same camera client. As another example, cameras that are arranged along a diagonal in the grid are wired to the same camera client. In this manner, a small area of the grid should include cameras that are wired to each and every camera client in the system. As a result, even if one camera client were to go offline (e.g., maintenance, error, or crash), there would still be enough coverage from the remaining camera clients to track the positions of people in the area. Thus, this arrangement of the cameras improves the resiliency of the system. The camera array will be described in more detail using FIGS. 3A-3E.

This disclosure also contemplates an unconventional configuration for processing frames of videos captured by cameras. Each camera is operably coupled with a different camera client. Each camera client is migrated to be positioned adjacent to its corresponding camera. Each camera communicates frames of videos to its corresponding camera client. The frames comprise color frames and depth frames. Generally, each camera client generates frames and tracks by processing the color frames and depth frames. The generated frames comprise the color frames and depth frames which are labeled with one or more of an identifier number of the camera and a timestamp when they arrived at the camera client. The generated tracks comprise metadata that is detected in the depth frames. The metadata comprises one or more of a tracking identification of a person detected in the depth frames and historical detections associated with the person (e.g., a bounding area, a contour, and a segmentation mask). The metadata indicates local detections of the person in the depth frames. These local detections are later used by the camera server to determine global detections of the person in the store. The camera client labels the tracks with one or more of the tracking identification, the historical detections, the identifier number of the camera, and timestamps when they arrived at the camera client. The camera client communicates the frames and tracks to cluster servers. The cluster servers store and maintain the frames and tracks using one or more of their corresponding labels such that each frame is retrievable using one or more of its corresponding labels, and each track is retrievable using one or more of its corresponding labels. This configuration including the cameras, camera clients, and cluster servers is described in more detail using FIGS. 3U-3Y.

This disclosure further contemplates an unconventional rack and shelf design that integrates weight sensors for tracking when items have been removed from the racks and shelves. Generally, the rack includes a base, a vertical panel, and a shelf. The base forms an enclosed space in which a printed circuit board is positioned, and the base includes a drawer that opens to provide access to the enclosed space and the circuit board. The vertical panel is attached to the base, and the shelf is attached to the vertical panel. Weight sensors are positioned within the shelf. The base, panel, and shelf each define a cavity. The cavity in the shelf and the cavity in the panel are at least partially aligned. Each weight sensor communicates signals to the printed circuit board through a wire that runs from that weight sensor, through the cavity of the shelf, the cavity of the panel, and the cavity of the base, to the circuit board. The rack and shelf design will be described in more detail using FIGS. 5A-5K.

This disclosure further contemplates unconventional weight sensors, weight boards, and circuit boards configuration. In this configuration, each weight sensor in a rack is communicatively coupled to a separate weight board that receives signals from its corresponding weight sensor and processes those signals, e.g., digitizes the signals. The weight boards are communicatively coupled with a circuit board that aggregates the processed signals. Wires extending from the weight boards are aggregated into a bus wire that connects to a port on the circuit board. Each weight sensor is assigned a particular address number corresponding to its location within the store, such as a shelf number and a region/zone number. Each weight sensor is configured to send its address number (along with a signal indicative of a weight of an item) to its corresponding weight board, which is then forwarded to the circuit board. As such, the location of a weight sensor can be identified from the address number of that weight sensor. Therefore, the item position tracking becomes easier and more accurate when an item is removed from or put on a weight sensor because when an item is removed from a weight sensor, the location where the item was removed can be determined using the address number of the weight sensor. Furthermore, in each rack, signals from a plurality of weight boards are aggregated in a circuit board. The circuit board communicates the aggregated signals to the cluster servers. In one embodiment, the aggregated signals may be converted into a transferable format that is compatible with a communication protocol of the cluster servers. As an example, the aggregated signals may be in a user datagram protocol (UDP) format, and the cluster servers may accept data in a transmission control protocol (TCP) format. As such, in this example, the circuit board communicates the aggregated signals to a UDP/TCP bridge module to convert the UDP-formatted aggregated signals to TCP-format. The UDP/TCP bridge module then communicates the TCP-formatted aggregated signals to the cluster servers. The UDP\TCP bridge module may communicate the TCP-formatted aggregated signals to the cluster server, for example, via a wireless communication, such as WiFi, etc. This configuration including weight sensors, weight boards, and circuit boards will be described in more detail using FIGS. 5K-5M.

This disclosure further contemplates unconventional adaptive item counting and validation algorithms. The adaptive item counting algorithm is programmed to determine that a quantity of an item is removed from or put on a weight sensor based at least in part upon weight changes detected by the weight sensor and a pattern recognition technique. The result from the adaptive item counting algorithm is validated by the validation algorithm that is programmed to validate (or update) the result based at least in part upon an instantaneous sensor sensitivity and a default sensor sensitivity of the weight sensor. The adaptive item counting and validation algorithms are described in FIGS. 5N and 5O.

The system may also include a light detection and ranging (LiDAR) subsystem that will be described in more detail using FIGS. 4A-4D. The system also includes a central server that ties together the camera subsystem, weight subsystem, and LiDAR subsystem. The central server will be described in more detail using FIGS. 6A-6C.

In one embodiment, the tracking system is configured to determine pixel regions from images generated by each sensor which should be excluded during object tracking. These pixel regions, or "auto-exclusion zones," may be updated regularly (e.g., during times when there are no people moving through a space). The auto-exclusion zones may be used to generate a map of the physical portions of the space that are excluded during tracking. This configuration is described in more detail using FIGS. 8 through 10.

In one embodiment, the tracking system is configured to distinguish between closely spaced people in a space. For instance, when two people are standing, or otherwise located, near each other, it may be difficult or impossible for previous systems to distinguish between these people, particularly based on top-view images. In this embodiment, the system identifies contours at multiple depths in top-view depth images in order to individually detect closely spaced objects. This configuration is described in more detail using FIGS. 11 and 12.

In one embodiment, the tracking system is configured to track people both locally (e.g., by tracking pixel positions in images received from each sensor) and globally (e.g., by tracking physical positions on a global plane corresponding to the physical coordinates in the space). Person tracking may be more reliable when performed both locally and globally. For example, if a person is "lost" locally (e.g., if a sensor fails to capture a frame and a person is not detected by the sensor), the person may still be tracked globally based on an image from a nearby sensor, an estimated local position of the person determined using a local tracking algorithm, and/or an estimated global position determined using a global tracking algorithm. This configuration is described in more detail using FIGS. 13A-C through 15.

In one embodiment, the tracking system is configured to maintain a record, which is referred to in this disclosure as a "candidate list," of possible person identities, or identifiers (i.e., the usernames, account numbers, etc. of the people being tracked), during tracking. A candidate list is generated and updated during tracking to establish the possible identities of each tracked person. Generally, for each possible identity or identifier of a tracked person, the candidate list also includes a probability that the identity, or identifier, is believed to be correct. The candidate list is updated following interactions (e.g., collisions) between people and in response to other uncertainty events (e.g., a loss of sensor data, imaging errors, intentional trickery, etc.). This configuration is described in more detail using FIGS. 16 and 17.

In one embodiment, the tracking system is configured to employ a specially structured approach for object re-identification when the identity of a tracked person becomes uncertain or unknown (e.g., based on the candidate lists described above). For example, rather than relying heavily on resource-expensive machine learning-based approaches to re-identify people, "lower-cost" descriptors related to observable characteristics (e.g., height, color, width, volume, etc.) of people are used first for person re-identification. "Higher-cost" descriptors (e.g., determined using artificial neural network models) are used when the lower-cost descriptors cannot provide reliable results. For instance, in some cases, a person may first be re-identified based on his/her height, hair color, and/or shoe color. However, if these descriptors are not sufficient for reliably re-identifying the person (e.g., because other people being tracked have similar characteristics), rogressively higher-level approaches may be used (e.g., involving artificial neural networks that are trained to recognize people) which may be more effective at person identification but which generally involve the use of more processing resources. These configurations are described in more detail using FIGS. 18 through 21.

I. System Overview

FIGS. 1A-1D show the tracking system installed in an example store space. As discussed above, the tracking system may be installed in a store space so that shoppers need not engage in the conventional checkout process. Although the example of a store space is used in this disclosure, this disclosure contemplates that the tracking system may be installed and used in any type of physical space (e.g., a warehouse, a storage center, an amusement park, an airport, an office building, etc.). Generally, the tracking system (or components thereof) is used to track the positions of people and/or objects within these spaces for any suitable purpose. For example, at an airport, the tracking system can track the positions of travelers and employees for security purposes. As another example, at an amusement park, the tracking system can track the positions of park guests to gauge the popularity of attractions. As yet another example, at an office building, the tracking system can track the positions of employees and staff to monitor their productivity levels.

FIG. 1A shows an example store 100. Store 100 is a physical space in which shoppers can purchase items for sale. As seen in FIG. 1A, store 100 is a physical building that includes an entryway through which shoppers can enter and exit store 100. A tracking system may be installed in store 100 so that shoppers need not engage in the conventional checkout process to purchase items from store 100. This disclosure contemplates that store 100 may be any suitable physical space. For example, store 100 may be a convenience store or a grocery store. This disclosure also contemplates that store 100 may not be a physical building, but a physical space or environment in which shoppers may shop. For example, store 100 may be a grab and go pantry at an airport, a kiosk in an office building, an outdoor market at a park, etc.

Figure 1B:
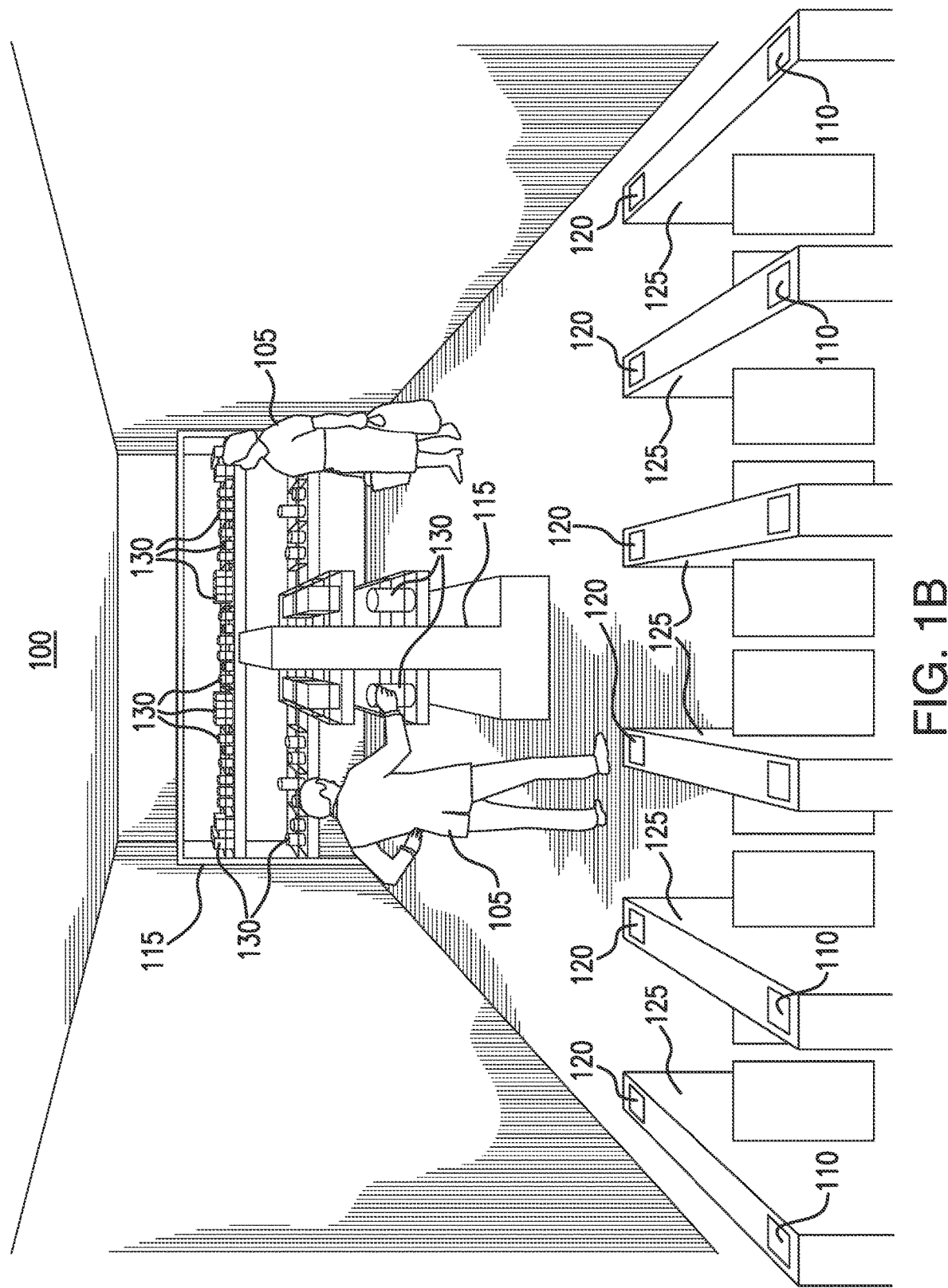

FIG. 1B shows portions of the interior of store 100. As seen in FIG. 1B, store 100 contains shoppers 105, racks 115, and gates 125. Shoppers 105 may have entered store 100 through one of gates 125, which allow entry and exit from store 100. Gates 125 prevent shoppers 105 from entering and/or exiting the store unless gates 125 are opened.

Gates 125 may include scanners 110 and 120. Scanners 110 and 120 may include a QR code scanner, a barcode scanner, or any other suitable type of scanner that can receive an electronic code embedded with information, such as information that uniquely identifies a shopper 105. Shoppers 105 may scan a personal device (e.g., a smartphone) on scanners 110 to enter store 100. When a shopper 105 scans a personal device on scanners 110, the personal device may provide scanners 110 an electronic code that uniquely identifies the shopper 105. When the shopper 105 is identified and/or authenticated, gate 125 that includes scanner 110 opens to allow the shopper 105 into store 100. Each shopper 105 may have registered an account with store 100 to receive an identification code for the personal device.

After entering store 100, shoppers 105 may move around the interior of store 100. As the shoppers 105 move throughout the space, shoppers 105 may shop for items 130 by removing items 130 from racks 115. As seen in FIG. 1B, store 100 includes racks 115 that hold items 130. When shopper 105 wishes to purchase a particular item 130, shopper 105 can remove that item 130 from rack 115. Shoppers 105 can remove multiple items 130 from store 100 to purchase those items 130.

When shopper 105 has completed shopping for items 130, shopper 105 approaches gates 125. In certain embodiments, gates 125 will automatically open so that shopper 105 can leave store 100. In other embodiments, shopper 105 scans a personal device on scanners 120 before gates 125 will open to allow shopper 105 to exit store 100. When shopper 105 scans a personal device on scanner 120, the personal device may provide an electronic code that uniquely identifies shopper 105 to indicate that shopper 105 is leaving store 100. When shopper 105 leaves store 100, an account of shopper 105 is charged for the items 130 that shopper 105 removed from store 100.

Figure 1C:
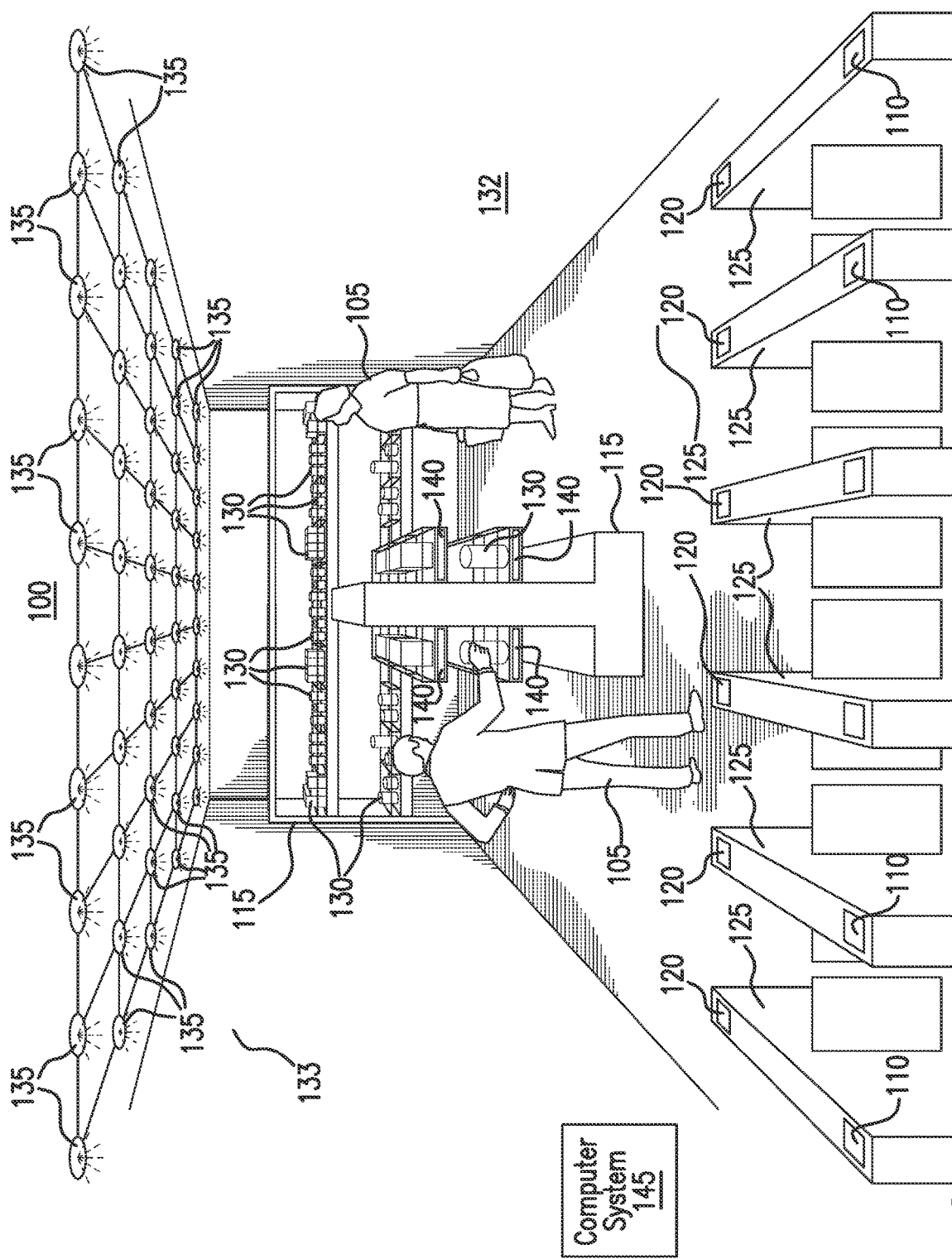

FIG. 1C shows the interior of store 100 along with a tracking system 132 that allows shopper 105 to simply leave store 100 with items 130 without engaging in a conventional checkout process. As seen in FIG. 1C, the tracking system 132 includes an array of sensors 135 positioned on the ceiling of store 100. The array of sensors 135 may provide coverage for the interior space of store 100. Sensors 135 are arranged in a grid pattern across the ceiling of store 100, as explained in further detail with respect to FIGS. 3A-3E. Sensors 135 may be used to track the positions of shoppers 105 within the space of store 100. This disclosure contemplates sensors 135 being any suitable sensors (e.g., cameras, light detection and range sensors, millimeter wave sensors, etc.).

The tracking system 132 also includes weight sensors 140 positioned on the racks 115. Weight sensors 140 can detect the weight of items 130 positioned on racks 115. When an item 130 is removed from the rack 115, the weight sensor 140 may detect a decrease in weight. The tracking system 132 may use that information to determine that a particular item 130 was removed from the rack 115.

The tracking system 132 includes a computer system 145. Computer system 145 may include multiple computers that operate together to determine which shopper 105 took which items 130 from racks 115. The components of computer system 145 and their operation will be described in more detail using FIGS. 2 through 7. Generally, computer system 145 uses information from sensors 135 and weight sensors 140 to determine which shopper 105 removed which items 130 from store 100. In this manner, the shopper 105 may be automatically charged for items 130 when the shopper 105 leaves store 100 through gates 125.

Figure 2A:
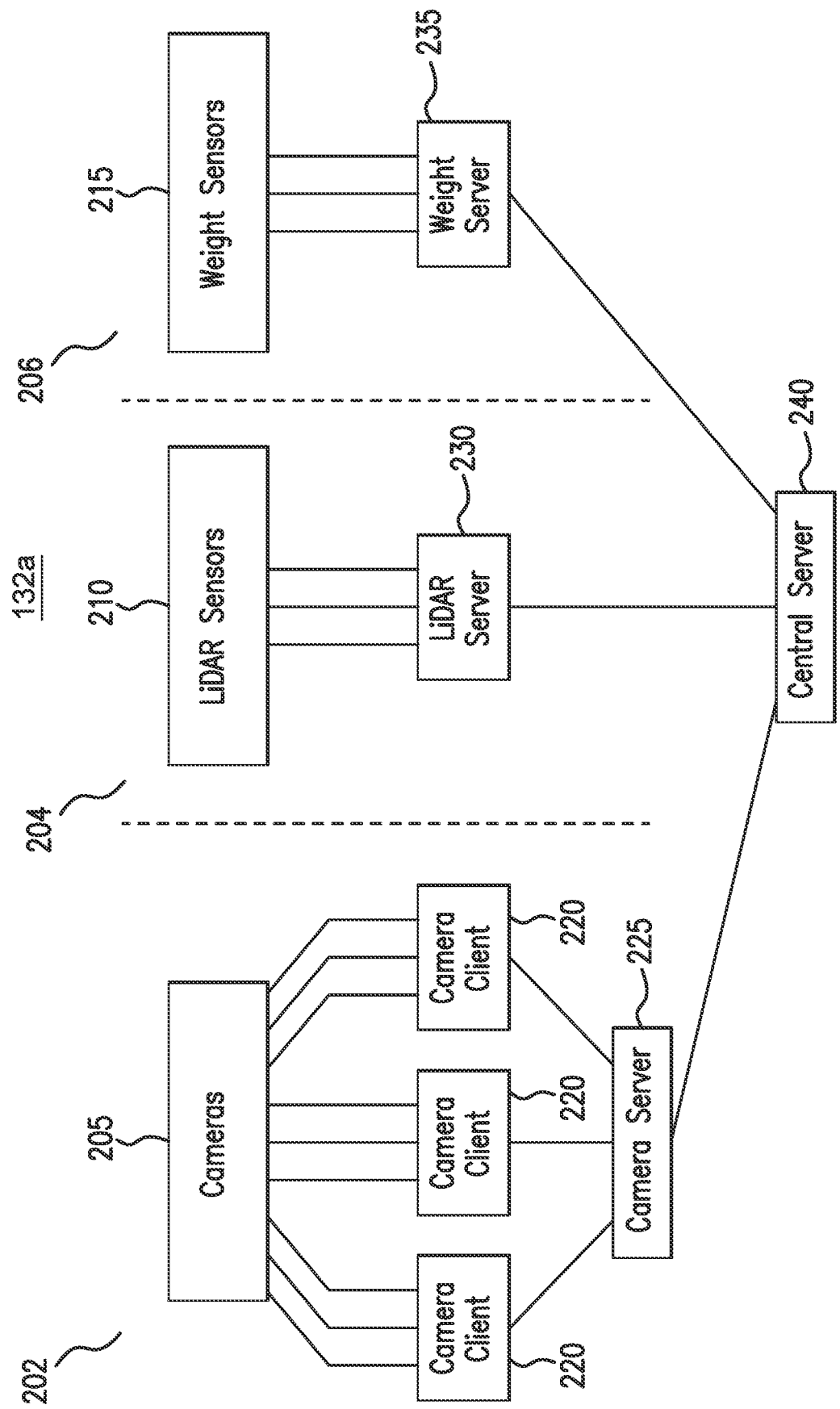
FIGS. 2A and 2B illustrate block diagrams of tracking system examples for use in the physical store.

FIG. 2A illustrates a block diagram of an example tracking system 132*a* for use in store 100. The example tracking system 132 may be an instance of tracking system 132 shown in FIG. 1C. As seen in FIG. 2A, the tracking system 132*a* includes a camera subsystem 202, a light detection and range (LiDAR) subsystem 204, and a weight subsystem 206. The tracking system 132*a* includes various sensors 135, such as cameras 205, light detection and range (LiDAR) sensors 210, and weight sensors 215. These sensors 135 are communicatively coupled to various computers of a computer system 145. For example, the camera subsystem 202 includes cameras 205 that are communicatively coupled to one or more camera clients 220. These camera clients 220 are communicatively coupled to a camera server 225. The LiDAR subsystem 204 includes LiDAR sensors 210 that are communicatively coupled to a LiDAR server 230. The weight subsystem 206 includes weight sensors 215 that are communicatively coupled to a weight server 235. The camera server 225, LiDAR server 230, and weight server 235 are communicatively coupled to a central server 240.

Generally, cameras 205 produce videos of portions of the interior of a space. These videos may include frames or images of shoppers 105 within the space. The camera clients 220 process the frames from the cameras 205 to detect shoppers 105 within the frames and to assign frame coordinates to those shoppers 105. The camera server 225 generally processes frame data from the camera clients 220 to determine the physical position of shoppers 105 within the space. LiDAR sensors 210 generally produce coordinates of shoppers 105 within a space. LiDAR server 230 processes these coordinates to determine the position of shoppers 105 within a space. Weight sensors 215 detect the weight of items 130 on racks 115 within the space. Weight server 235 processes these weights to determine when certain items 130 have been removed from the racks 115.

Central server 240 processes position information for shoppers 105 from camera server 225 and LiDAR server 230 and weight information from weight server 235 to determine which shopper 105 removed which items 130 from the racks 115. These shoppers 105 may then be charged for those items 130 when the shoppers 105 leave the space. The operation of these components will be described in more detail using FIGS. 3A through 6C.

In one embodiment, each of the components of tracking system 132a (e.g. camera clients 220, camera server 225, LiDAR server 230, weight server 235, and central server 240) is a distinct computing device separate from the other components of tracking system 132a. For example, each of these components may include its own processor, memory, and physical housing. In this manner, the components of tracking system 132a are distributed to provide additional computing power relative to a tracking system that includes only one computer.

Figure 2B:
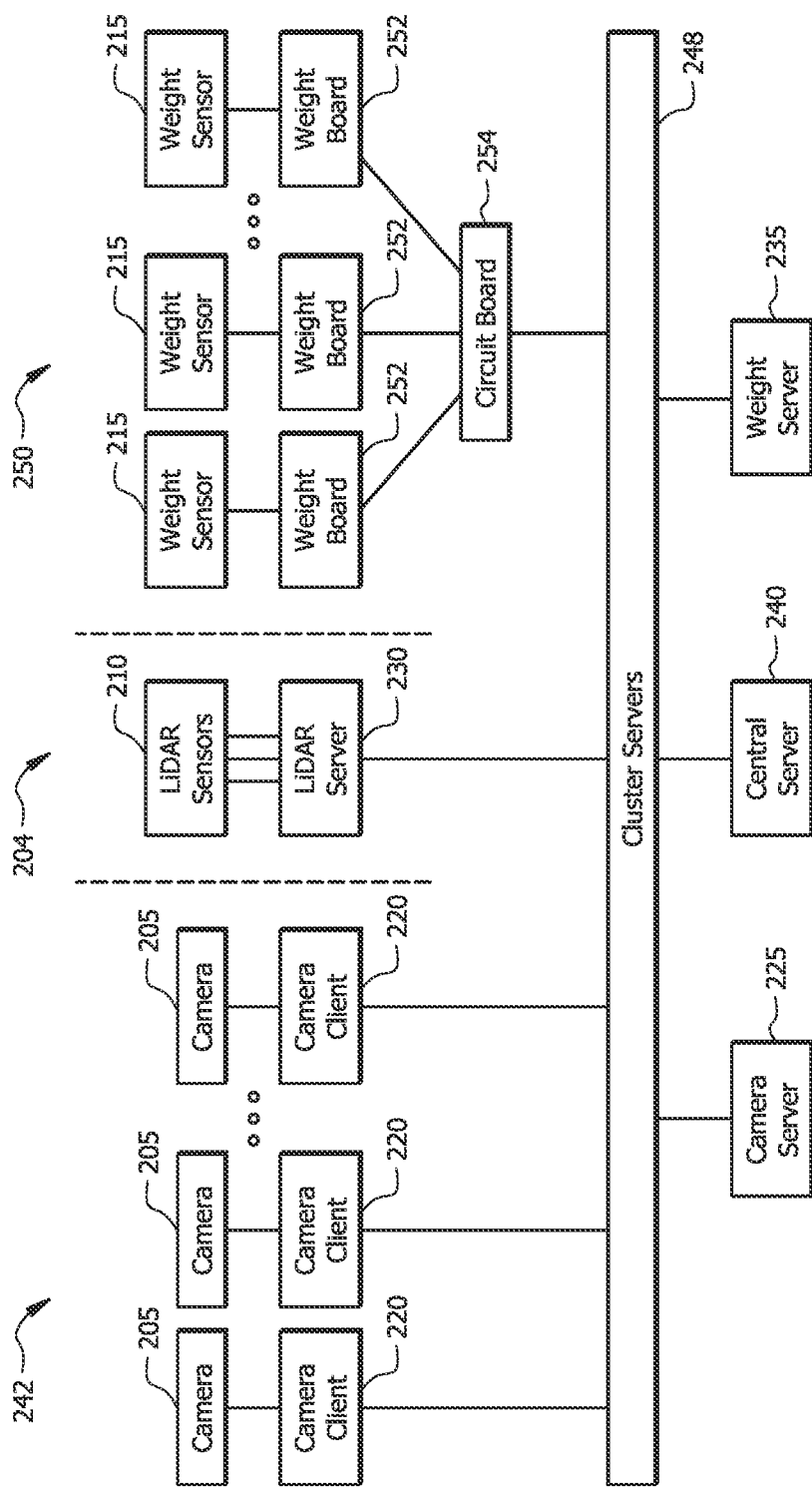

FIG. 2B illustrates a block diagram of an example tracking system 132b for use in the store 100. The example tracking system 132b may be an instance of the tracking system 132 shown in FIG. 1C. The example tracking system 132b may share one or more components with the tracking system 132a of FIG. 2A. As seen in FIG. 2B, the tracking system 132b includes a camera subsystem 242, LiDAR subsystem 204, weight subsystem 250, and cluster servers 248.

The camera subsystem 242 may include cameras 205 and camera clients 220, where each camera 205 is communicatively coupled with a separate camera client 220. The camera clients 220 are communicatively coupled with the cluster servers 248. The camera subsystem 242 is described in detail in FIGS. 3U-3Y.

The LiDAR subsystem 204 includes LiDAR sensors 210 that are communicatively coupled to the LiDAR server 230. The LiDAR server 230 is communicatively coupled with the cluster servers 248. The LiDAR subsystem 204 is described in detail in FIGS. 4A-4D.

The weight subsystem 250 may include weight sensors 215 and weight boards 252, where each weight sensor 215 is communicatively coupled with a separate weight board 252. The weight boards 252 are communicatively coupled with a circuit board 254 that is communicatively coupled with the cluster servers 248. The weight subsystem 250 is described in detail in FIGS. 5K-5M.

Figure 3A:
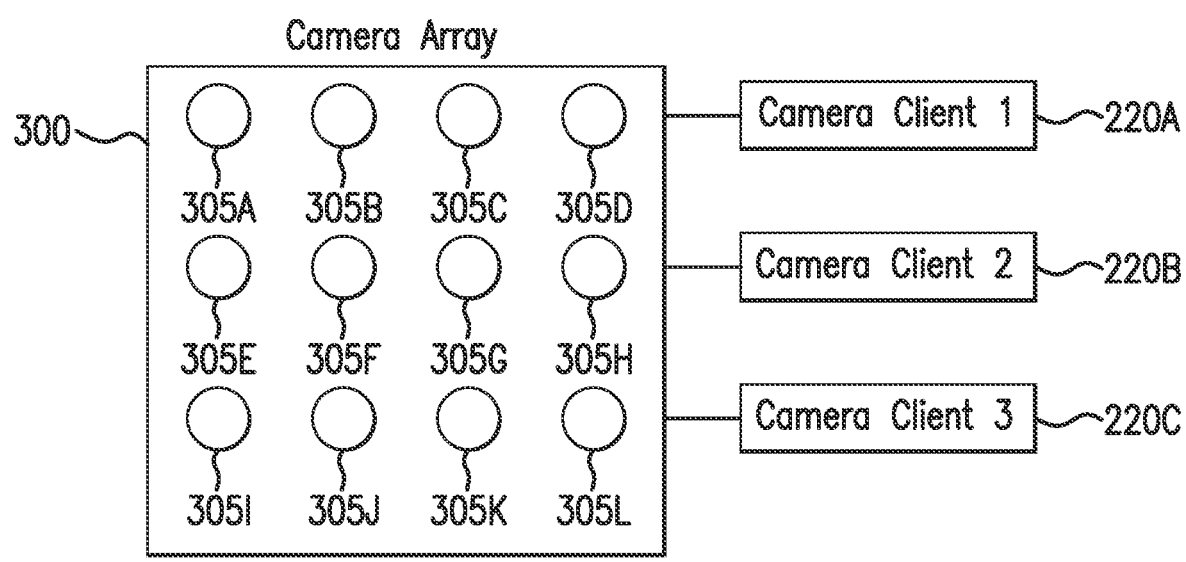
FIGS. 3A-3T illustrate an example camera subsystem and its operation in the tracking system.
Figure 3B:
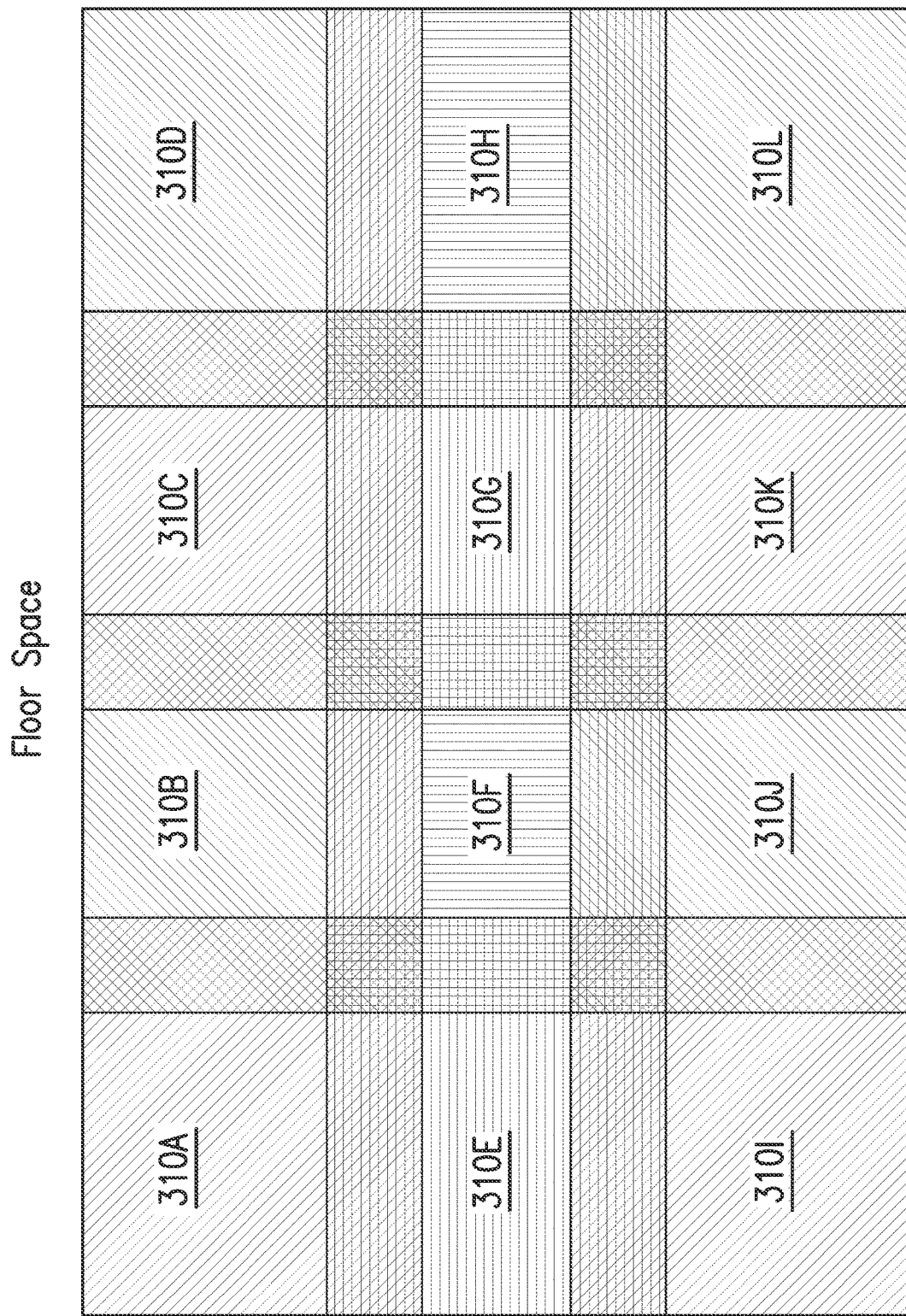
FIGS. 3U-3Y illustrate another example camera subsystem and its operation in the tracking system.
Figure 3C:
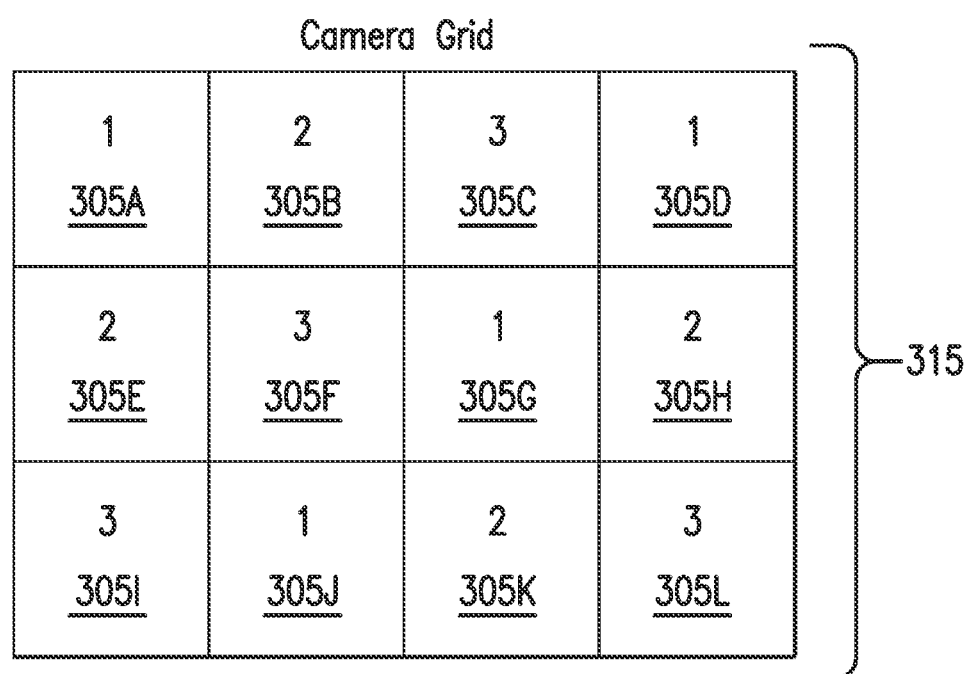
Figure 3D:
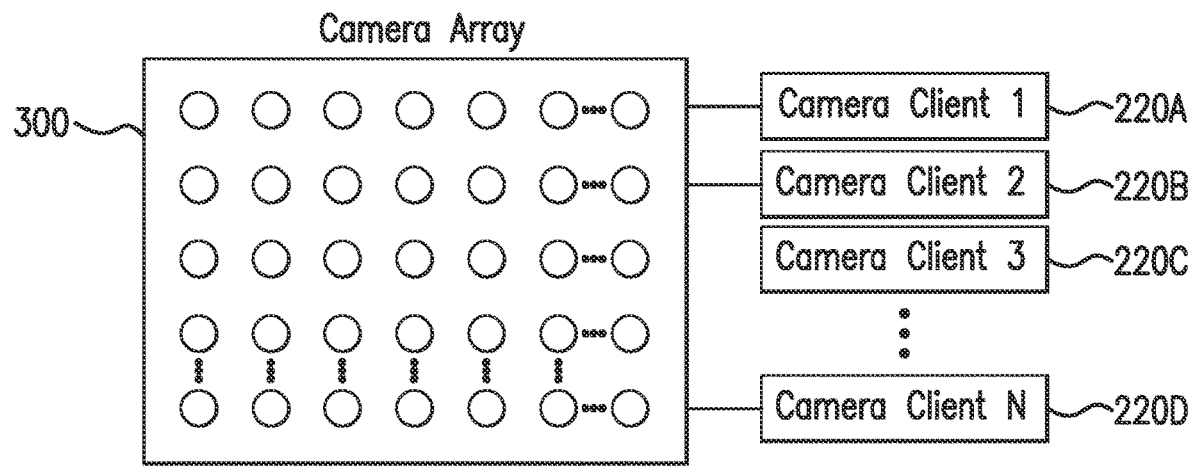
Figure 3E:
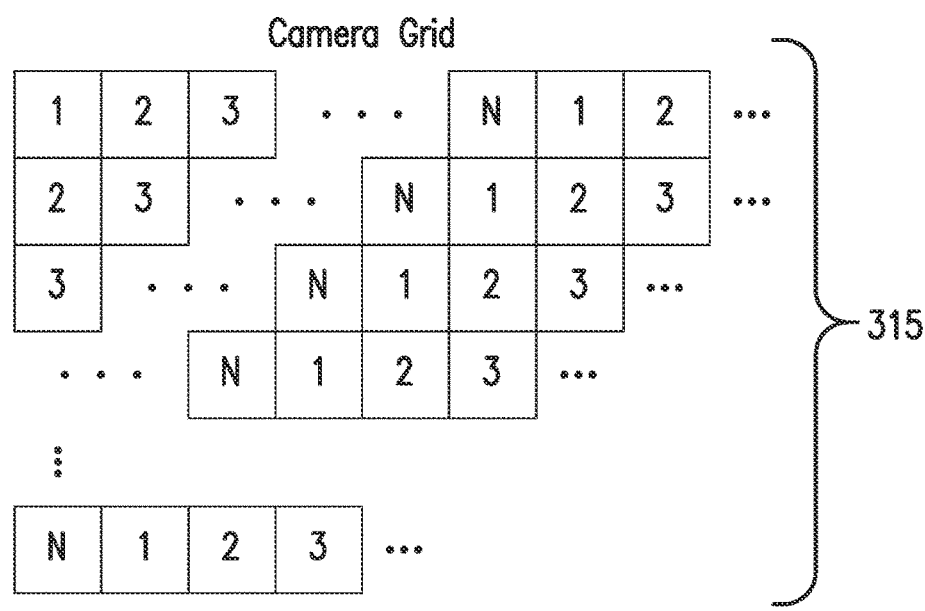
Figure 3F:
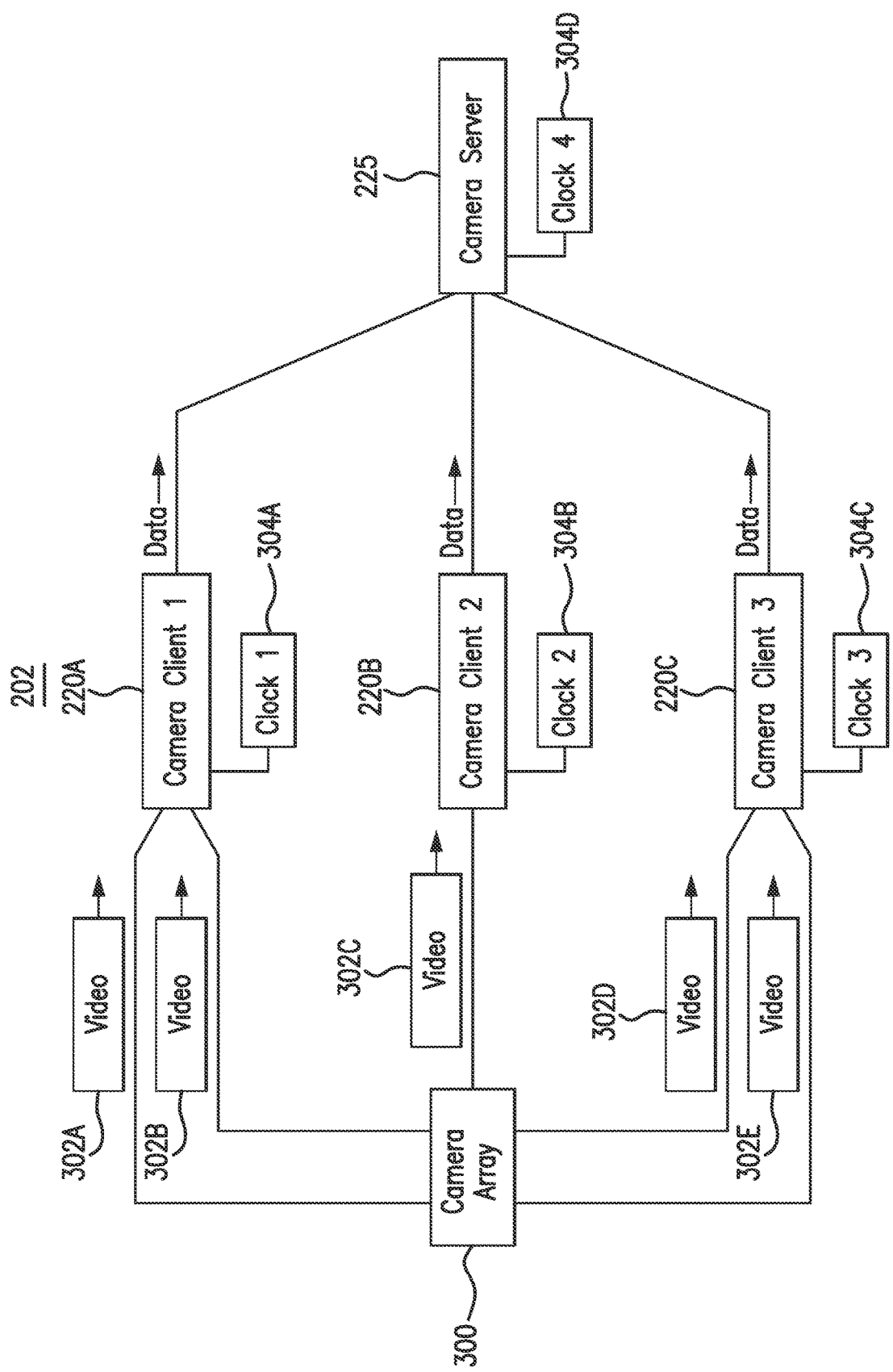
Figure 3G:
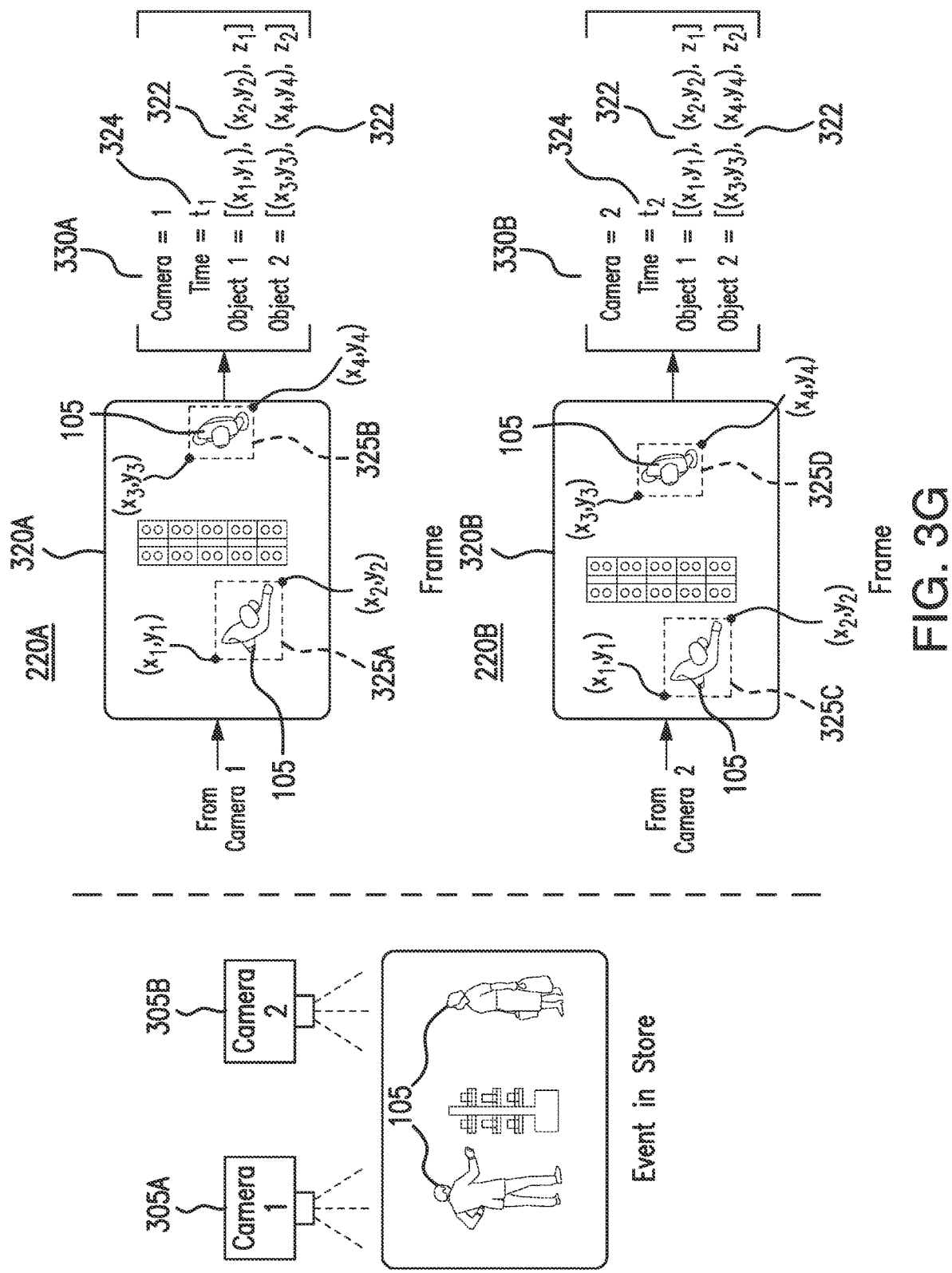
Figure 3I:
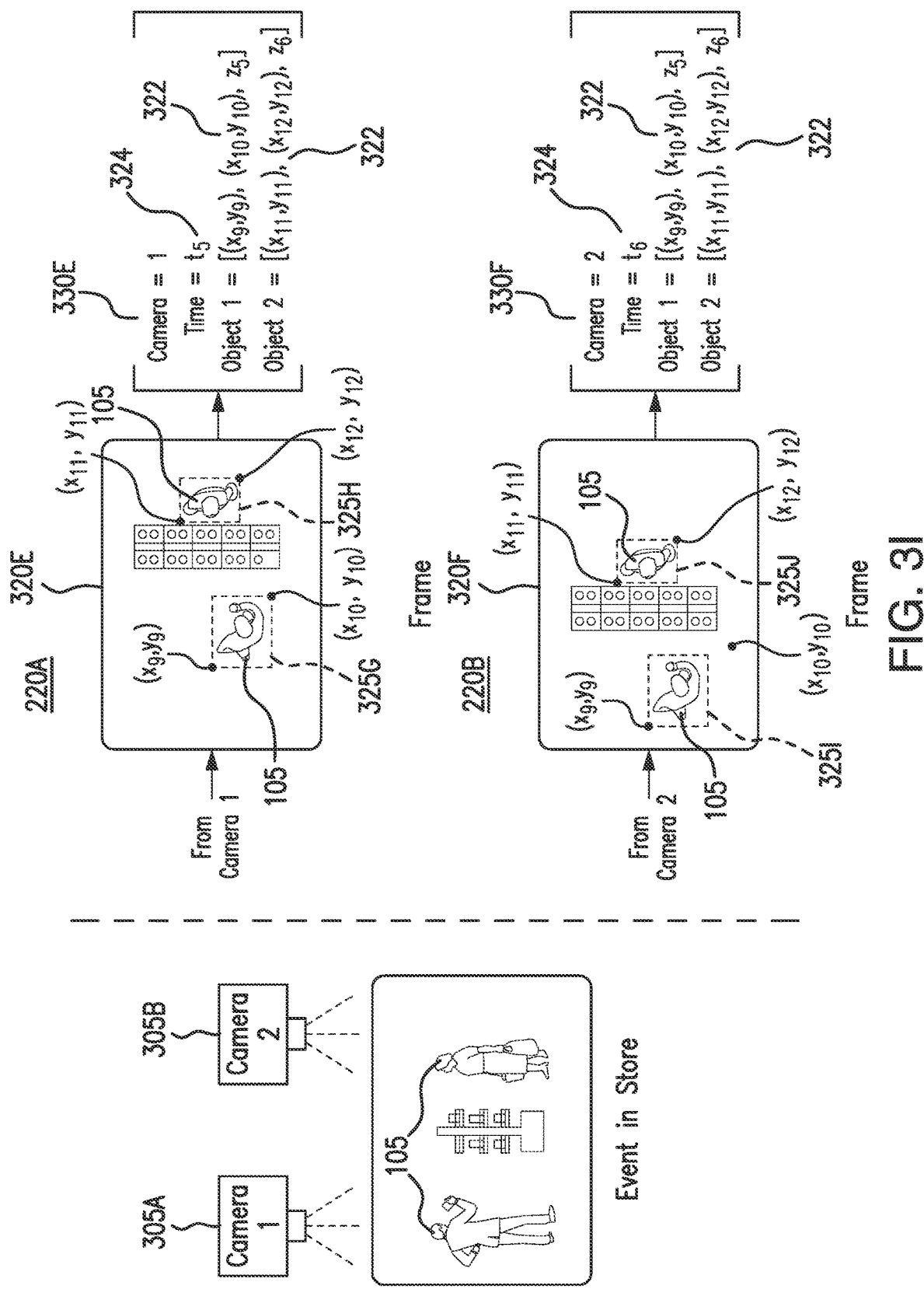
Figure 3J:
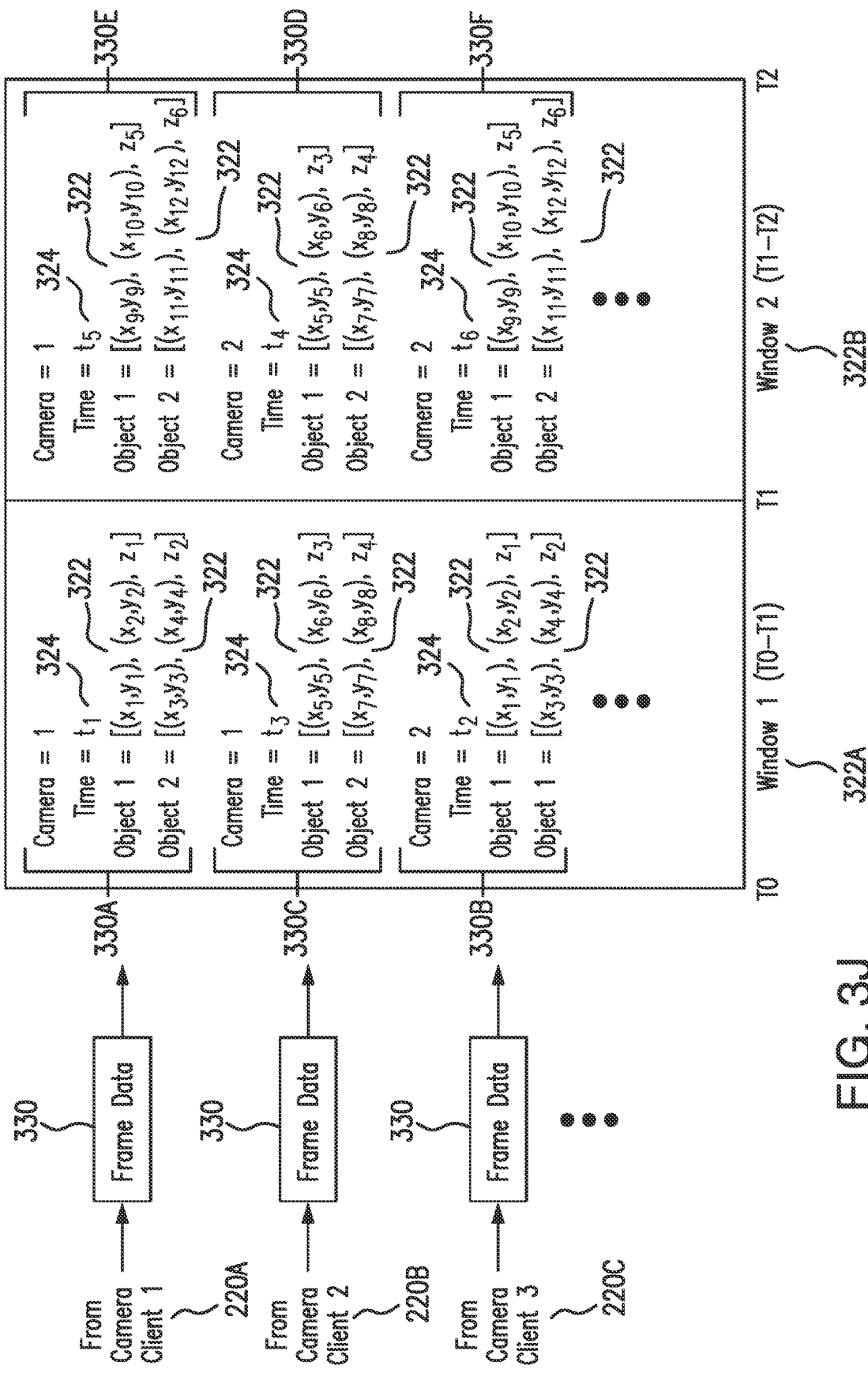
Figure 3K:
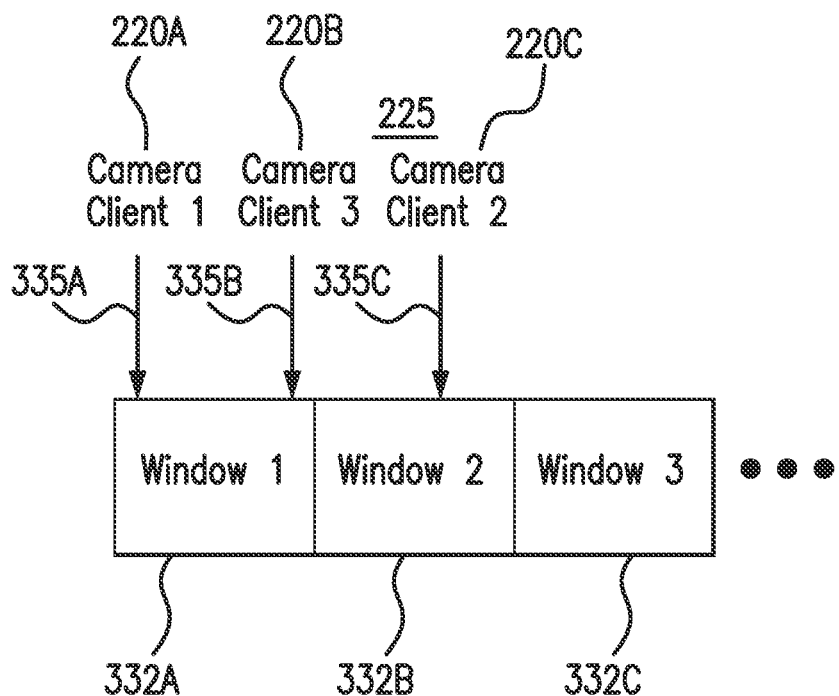
Figure 3L:
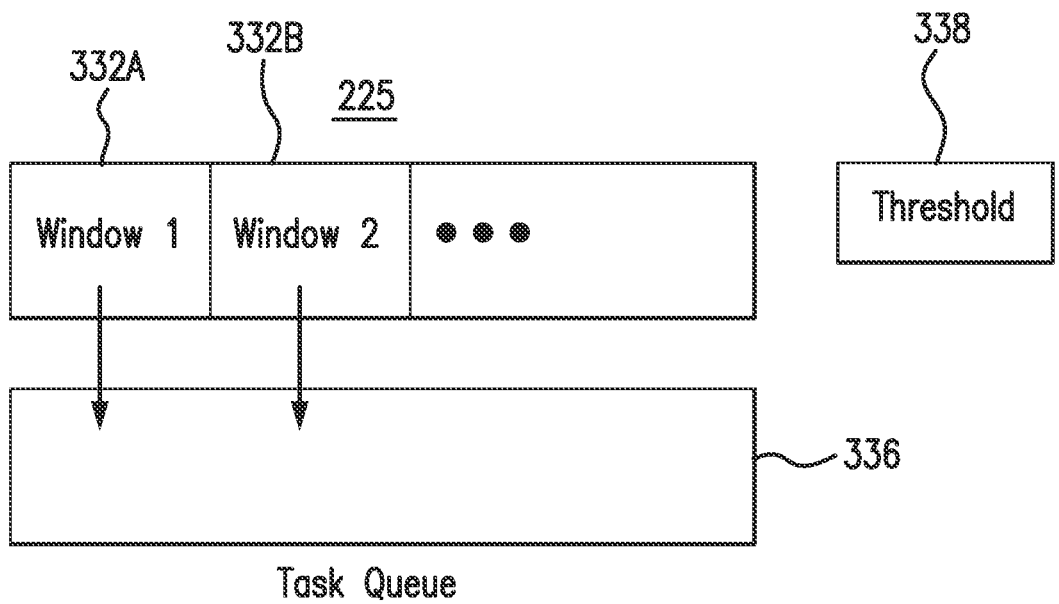
Figure 3M:
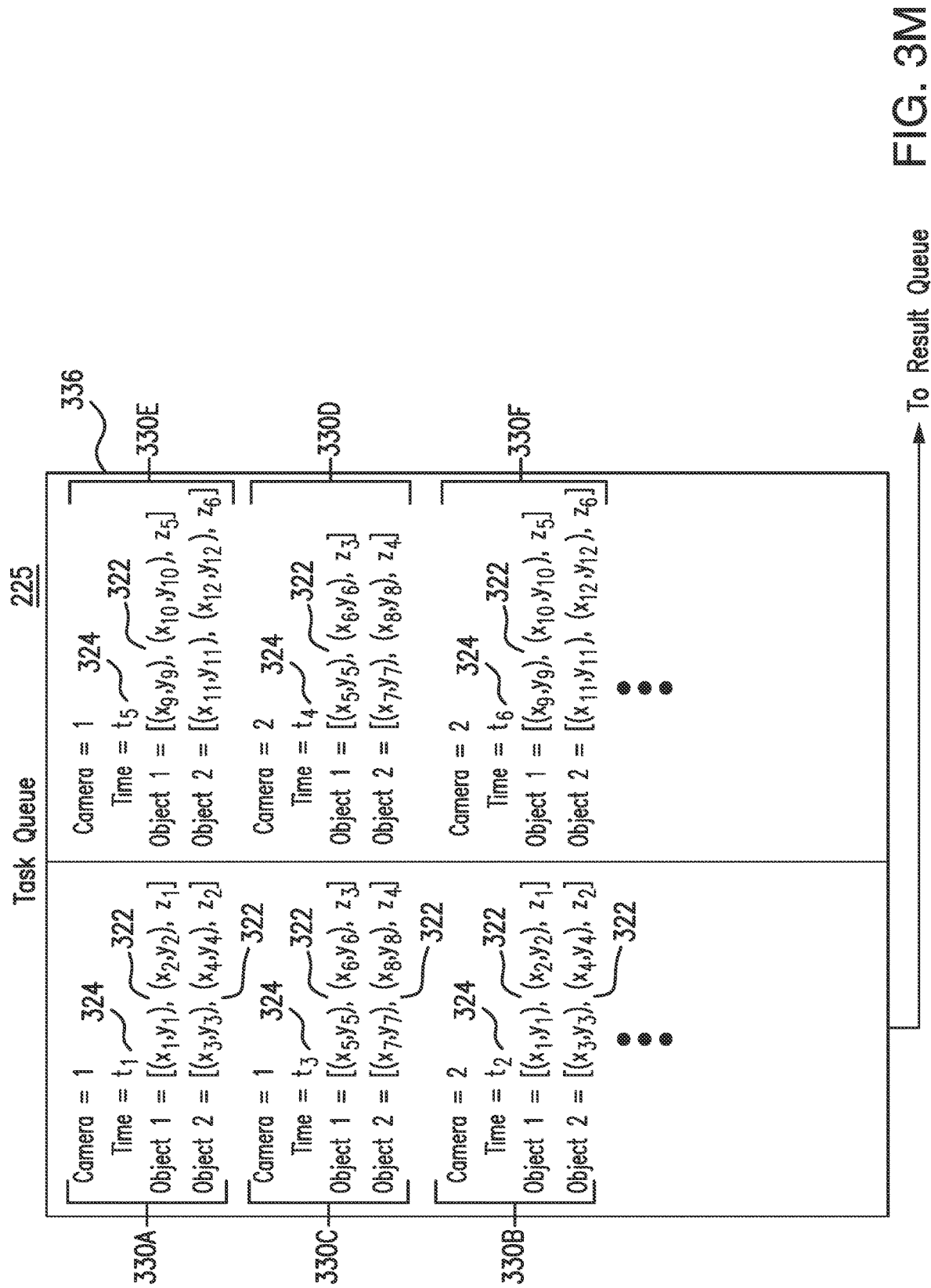
Figure 3N:
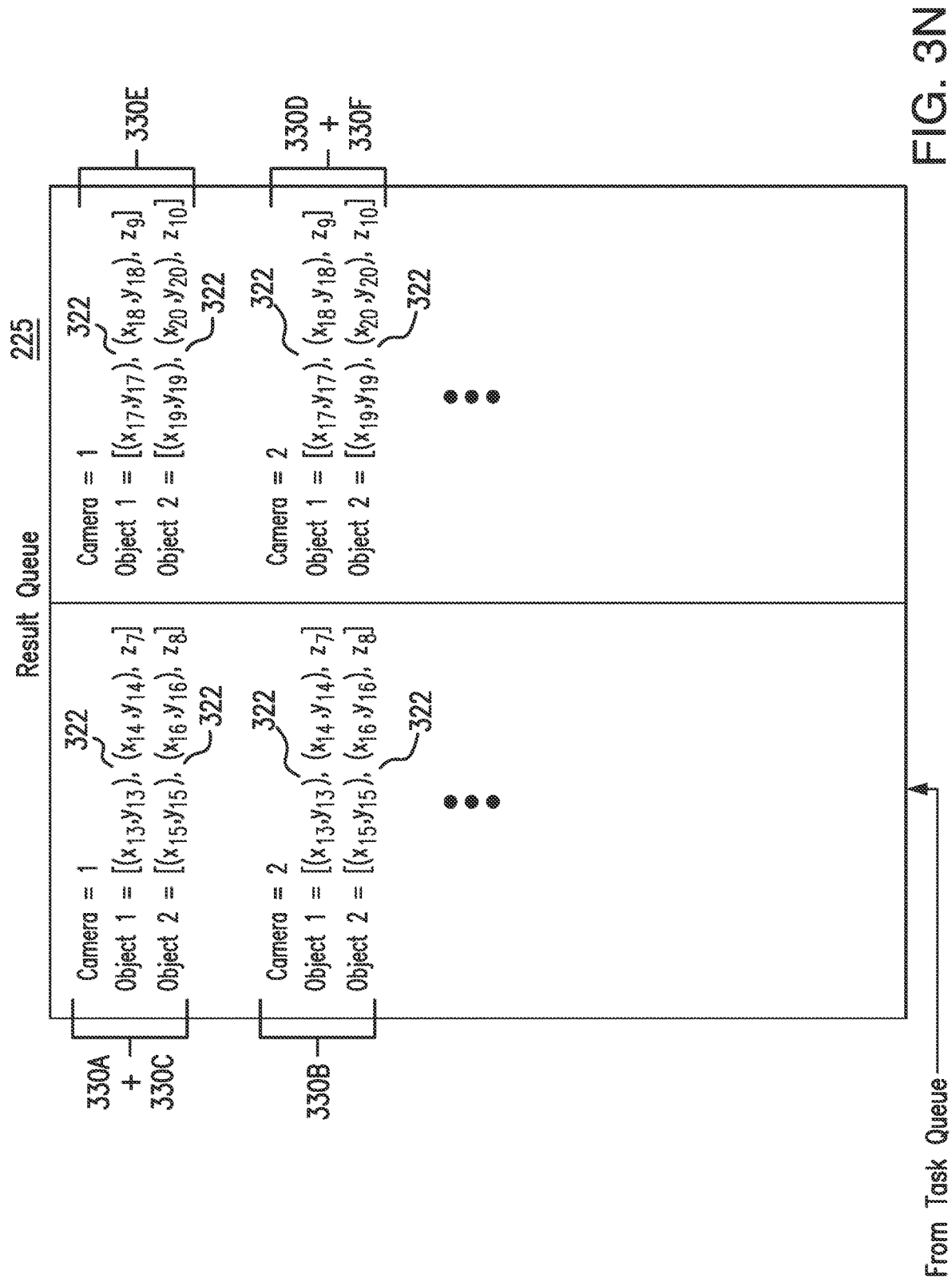
Figure 3O:
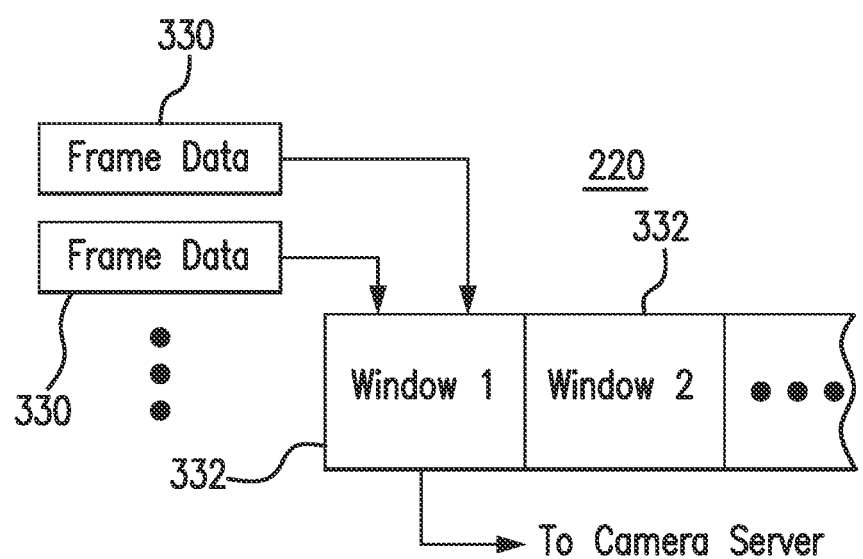
Figure 3P:
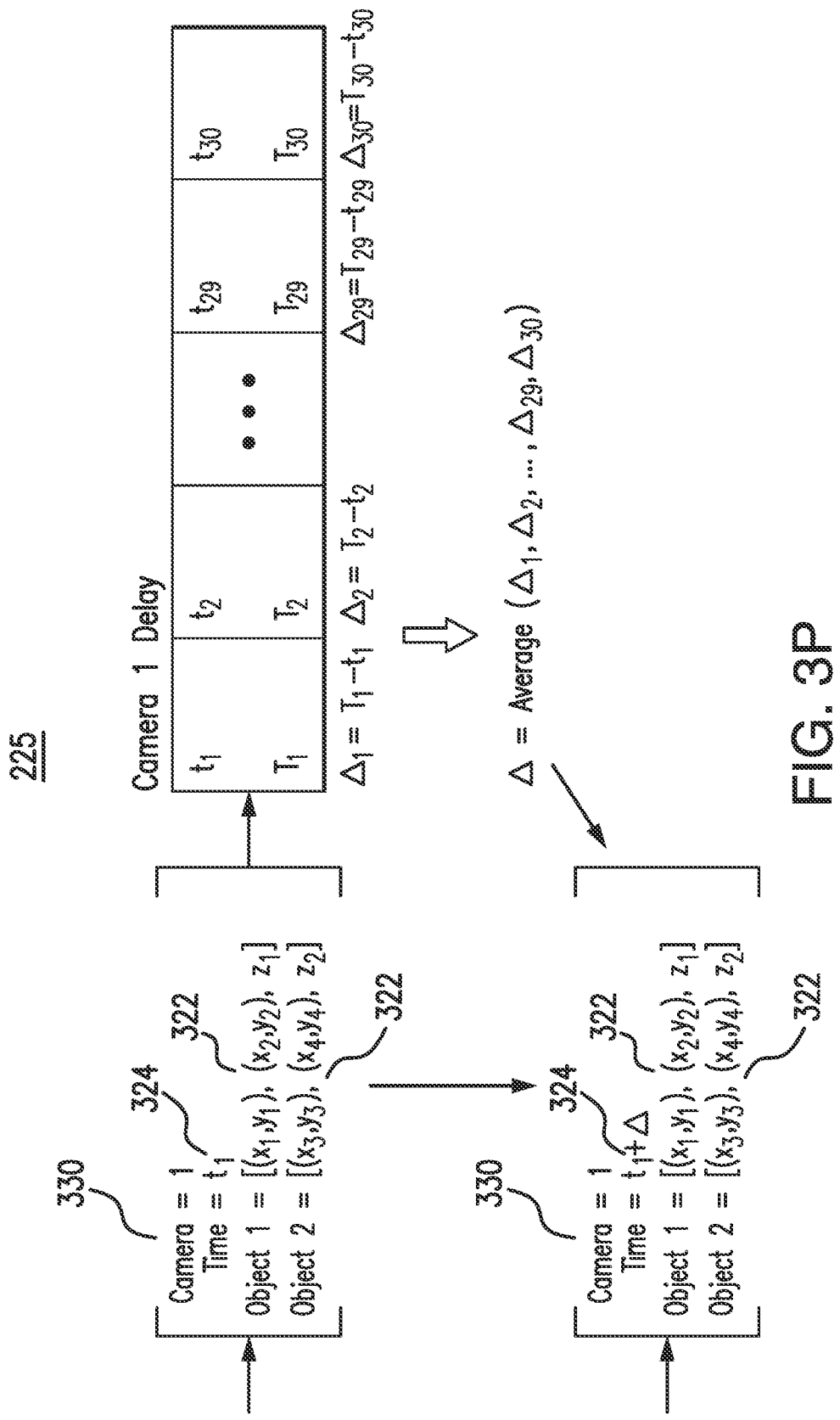
Figure 3Q:
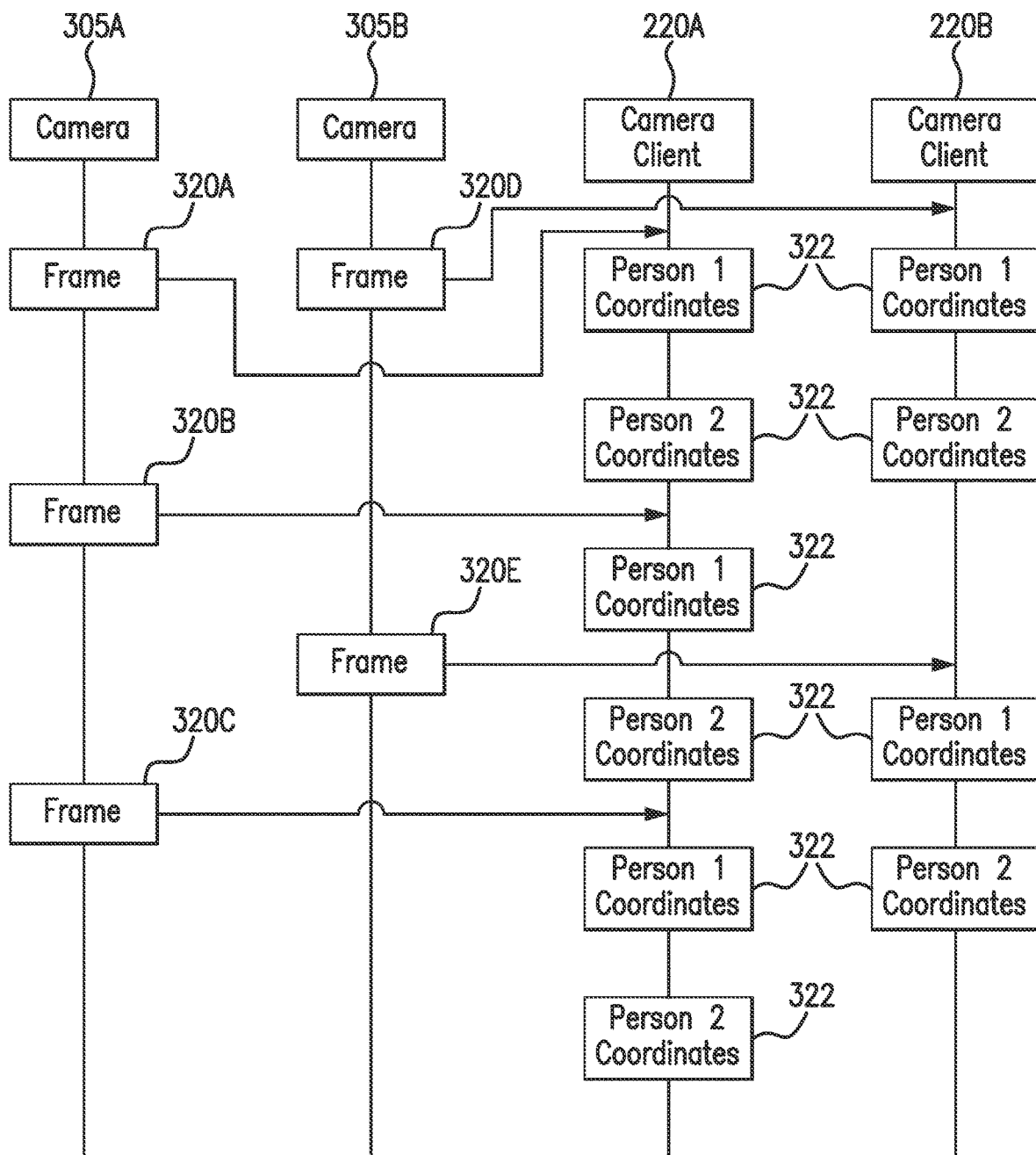
Figure 3R:
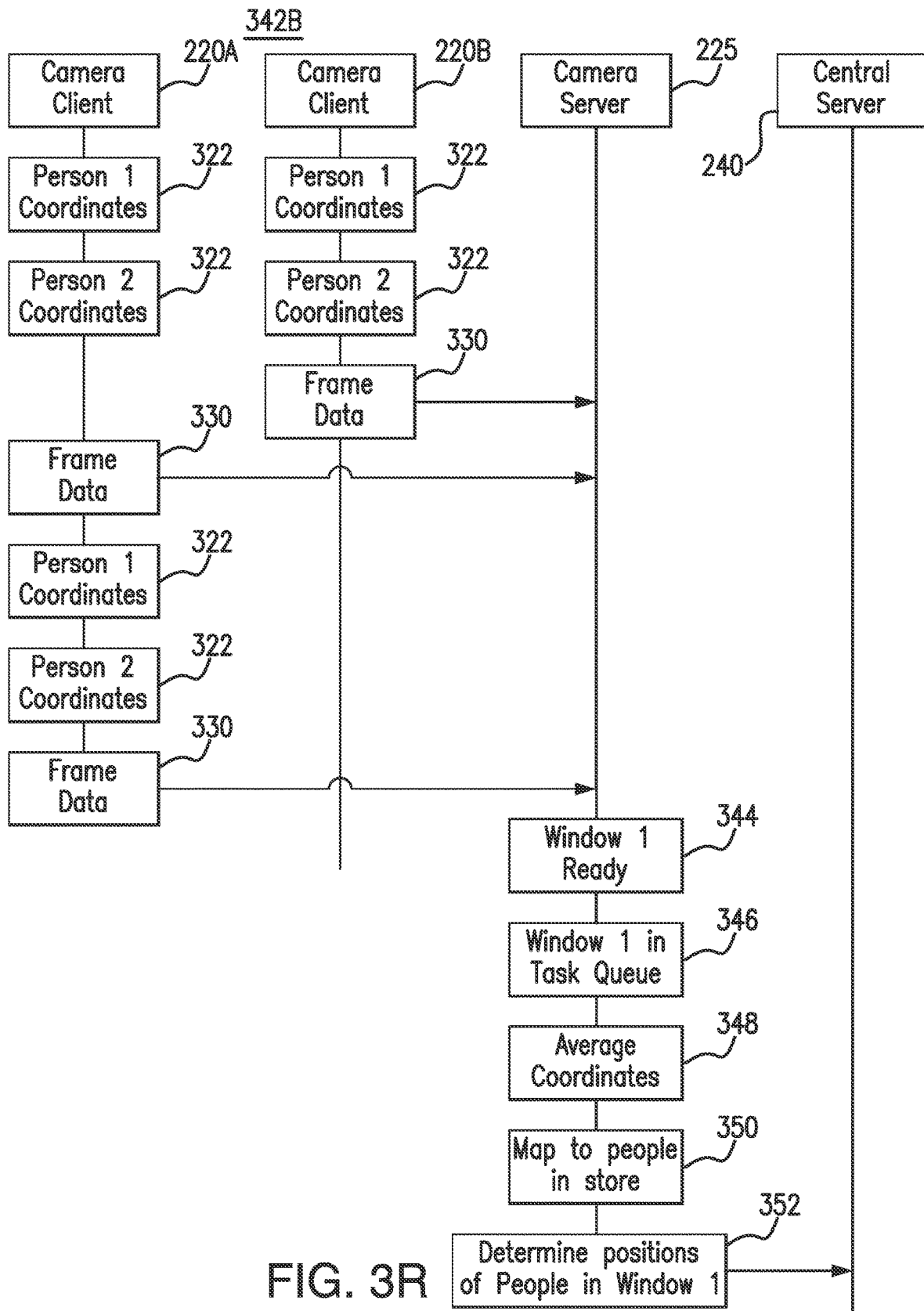
Figure 3S:
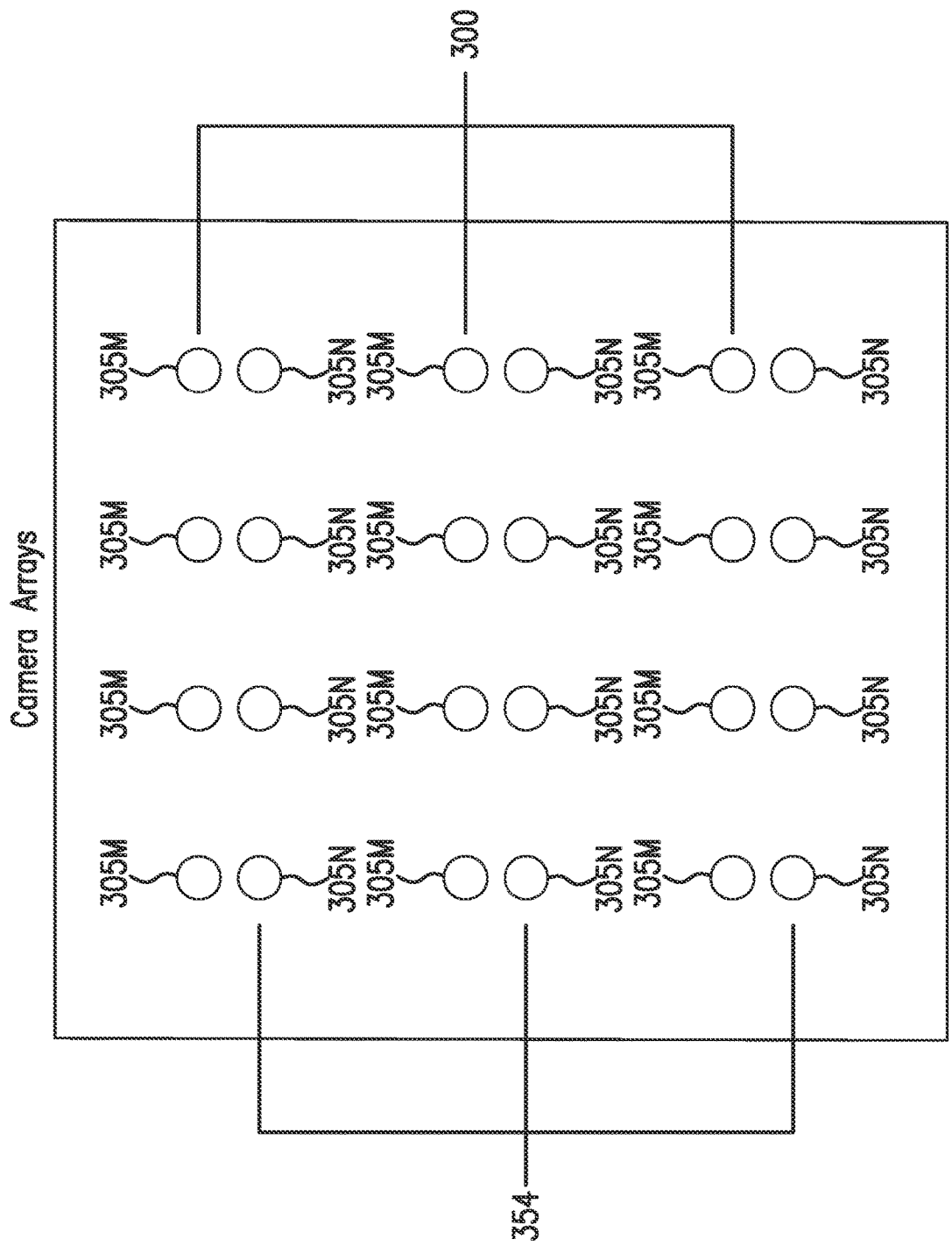
Figure 3T:
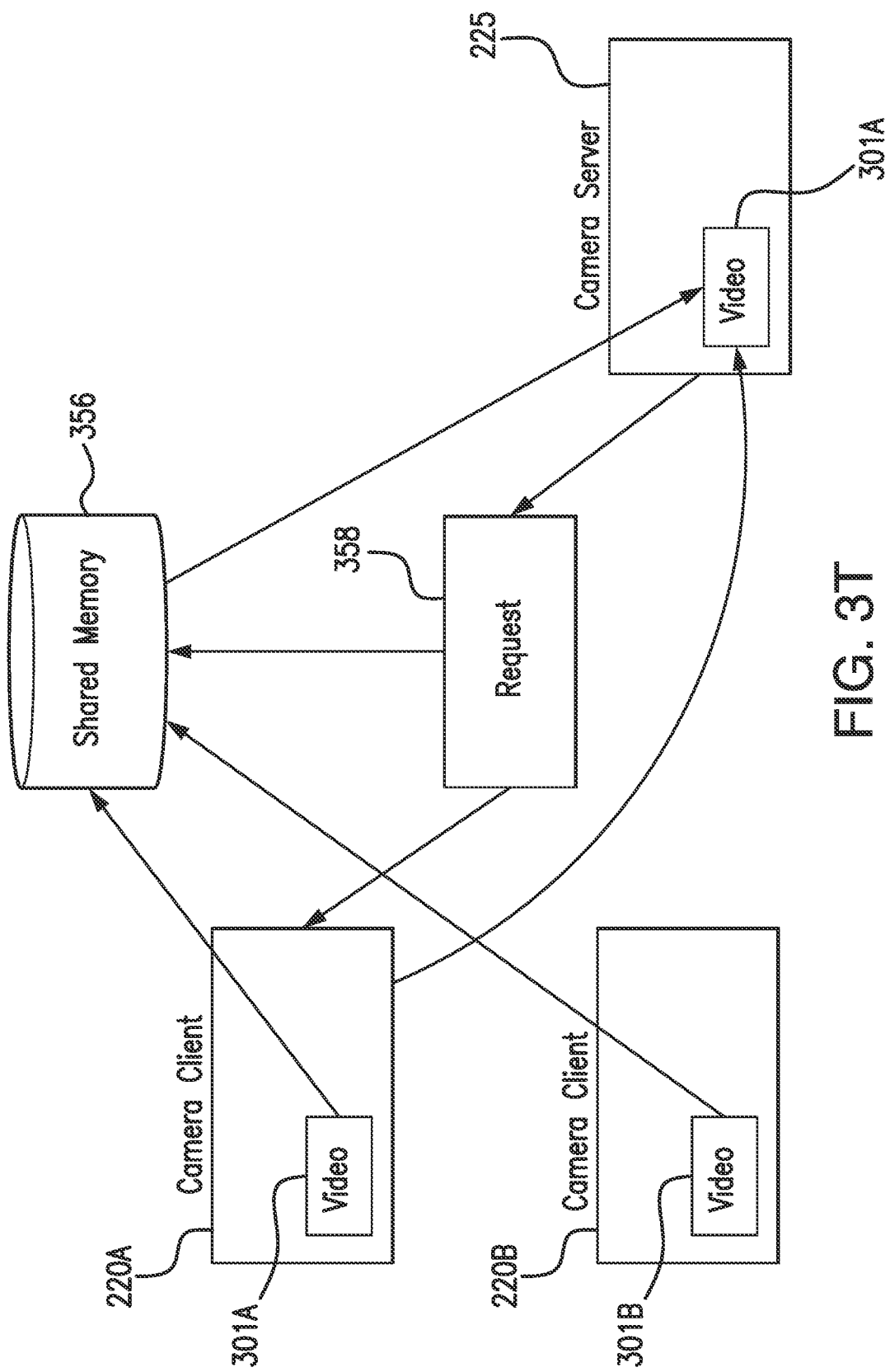
Figure 3U:
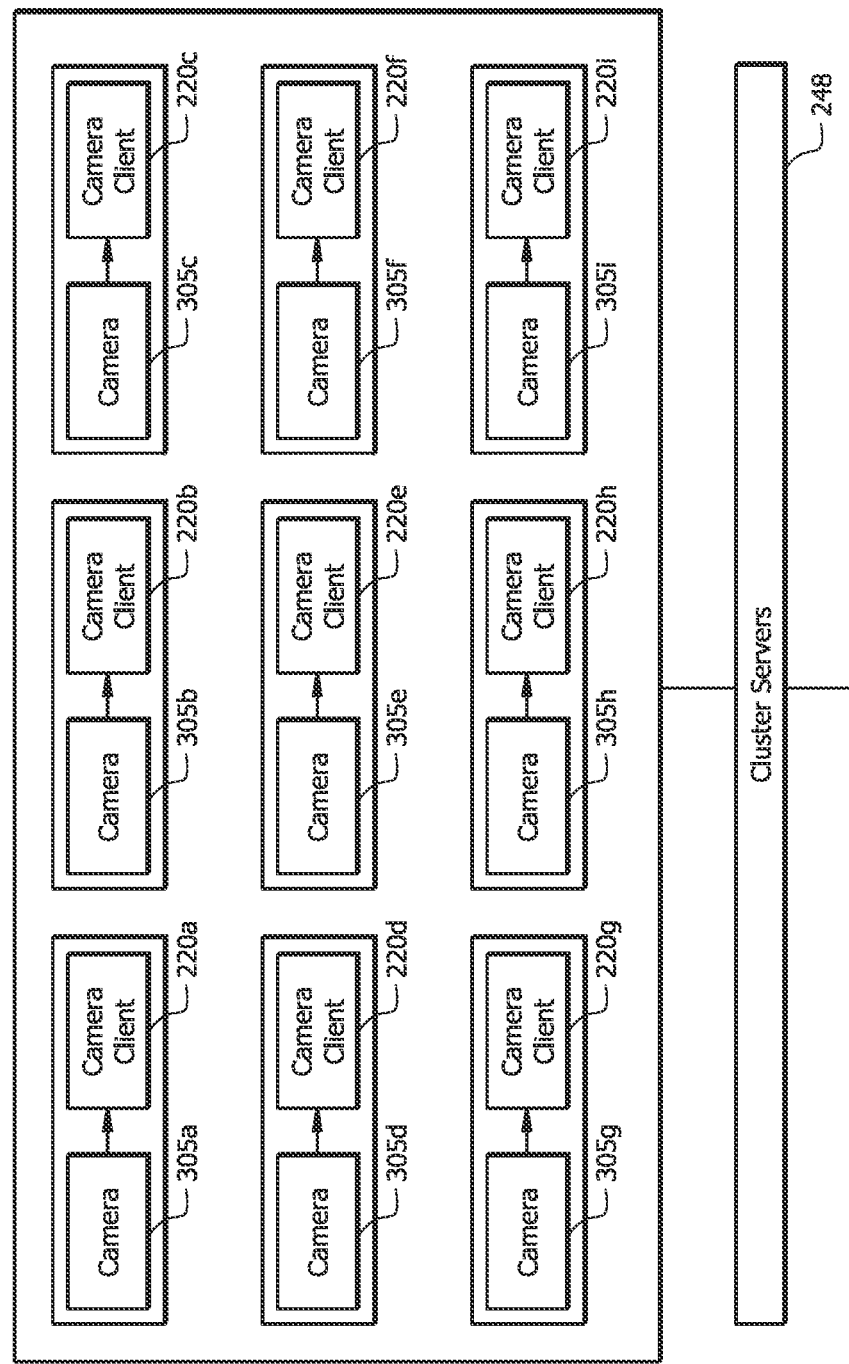
Figure 3V:
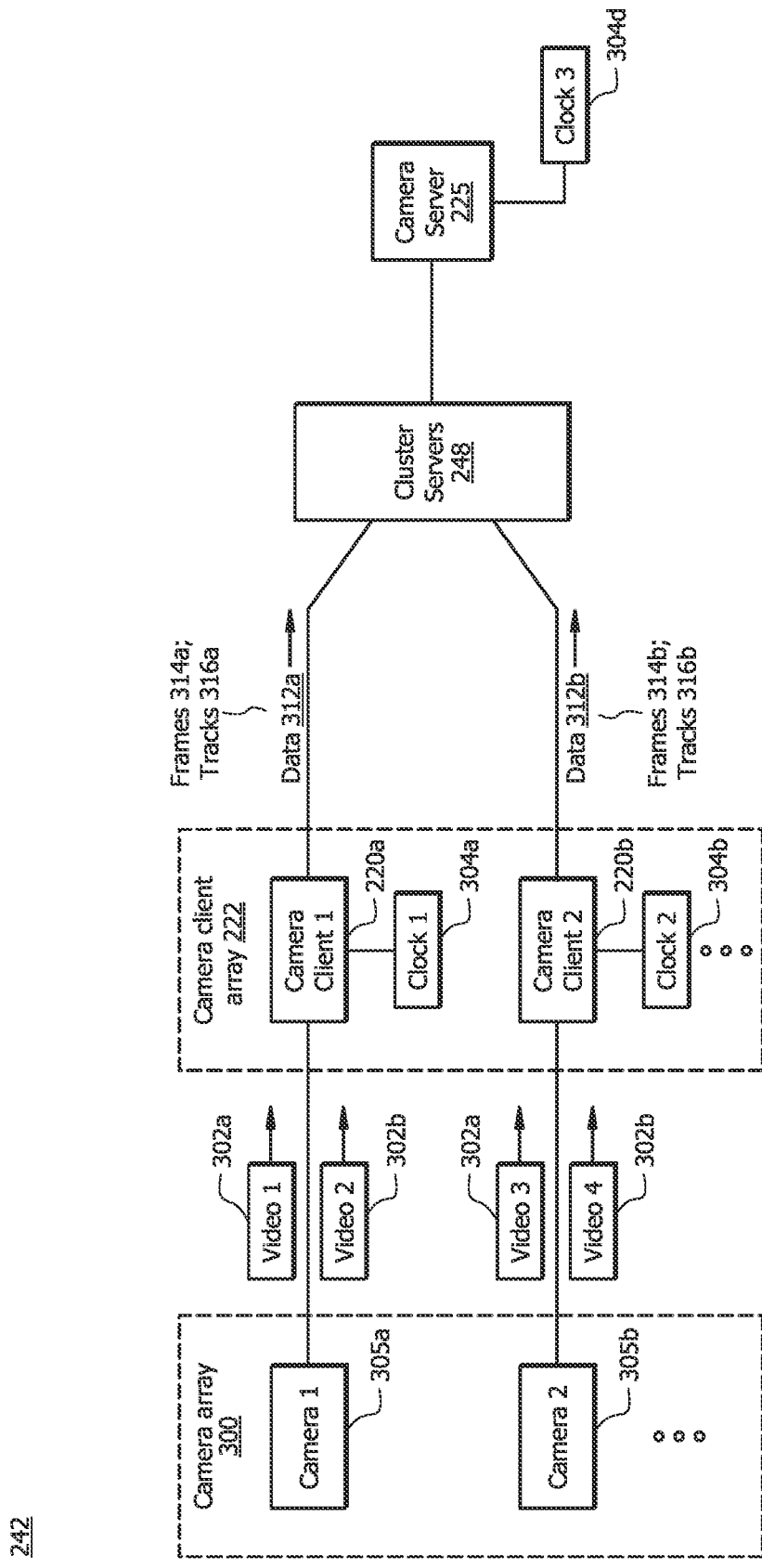
Figure 3W:
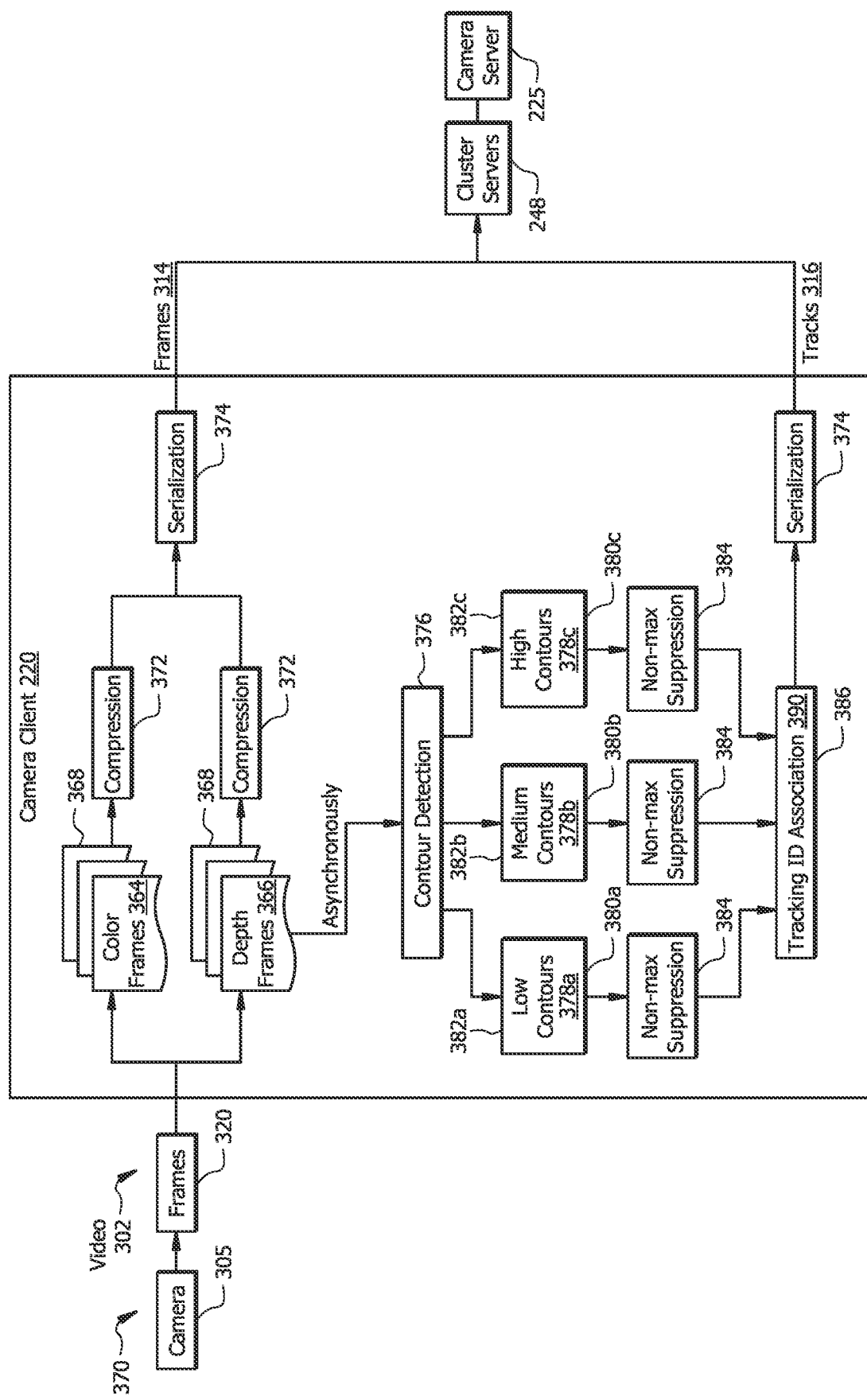

Details of the operations of the cluster servers 248 are described in corresponding descriptions of FIGS. 3U-3W. In brief, the cluster servers 248 may be implemented by a plurality of servers or computing devices, where each server is configured to store and maintain data based on one or more corresponding labels or indexes associated with that data. As such, each server from the cluster servers 248 is able to return data upon receiving a request to retrieve that data using one or more of its corresponding labels. In other words, data stored in the cluster servers 248 is retrievable or query-searchable using one or more of its corresponding labels. Each server from the cluster servers 248 is also configured to provide streaming a particular set of data (e.g., frames) upon receiving a request to stream the particular set of data (e.g., frames).

In the illustrated tracking system 132b, the cluster servers 248 are configured to receive data from the camera clients 220, LiDAR server 230, and circuit board 254; and publish or transmit data to a computing device that is subscribed to the cluster servers 248, such as the camera server 225, weight server 235, and central server 240. For example, the camera clients 220 may send a first set of data (e.g., frames 314) to a first server from the cluster servers 248; and a second set of data (e.g., tracks 316) to a second server from the cluster servers 248. See corresponding descriptions of FIGS. 3V and 3W for explanations of frames 314 and tracks 316. In brief, frames 314 include color frames 364 and depth frames 366 which are labeled with their corresponding timestamps and an identifier number of a camera 305 they were captured from. Tracks 316 include metadata associated with the depth frames 366. The tracks 316 include historical detection of people detected in the depth frames 366 (e.g., bounding areas, contours, segmentation masks, etc.), tracking identifications 386 of people detected in the depth frames 366, timestamps of depth frames 366, among others.

For example, the camera server 225 may subscribe to the cluster servers 248 and send a request to the first server from the cluster servers 248 to transmit the first set of data (e.g., frames 314) for processing. Similarly, the camera server 225 may send a request to the second server from the cluster servers 248 to transmit the second set of data (e.g., tracks 316) for processing. In another example, the circuit board 254 may send a third set of data (e.g., weight information of items) to a third server from the cluster servers 248. For example, the weight server 235 may subscribe to the cluster servers 248 and send a request to the third server from the cluster servers 248 to transmit the third set of data for processing.

In one embodiment, data coming from the circuit board 254 may be converted into a transferrable format that is compatible with a communication protocol of the cluster servers 248. For example, the incoming data from the circuit board 254 may be in a user datagram protocol (UDP) format. In order to forward data coming from the circuit board 254 to the cluster servers 248, it may be converted into a transferrable format that is compatible with the cluster servers 248, such as a transmission control protocol (TCP) format. As such, a UDP/TCP bridge module (not shown) that bridges the UDP communication protocol and the TCP communication protocol may be used to convert incoming UDP-formatted data into TCP-formatted data. In one embodiment, the circuit board 565 may transmit data to the UDP/TCP bridge module through a wireless communication, such as WiFi or any other method of wireless communication. The UDP/TCP bridge module forwards the data coming from the circuit board 254 in the TCP format to the cluster servers 248. In a particular example, cluster servers 248 may be implemented in a Kafka cluster framework where one or servers in the Kafka cluster framework are configured to store, maintain, and stream data.

II. Camera Subsystem

FIGS. 3A-3R show an example camera subsystem 202 and its operation in the tracking system 132. As discussed above, the camera subsystem 202 includes cameras 205, camera clients 220, and a camera server 225. Generally, the cameras 205 capture video of a space and send the videos to the camera clients 220 for processing. These videos are a sequence of frames or images of the space. The camera clients 220 detect the presence of people (e.g., shoppers 105) in the frames and determine coordinates in the frames (may also be referred to as "frame coordinates") for those people. The camera server 225 analyzes the frame coordinates from each camera client 220 to determine physical positions of the people in the space.

1. Camera Array

FIG. 3A illustrates an example camera array 300. As shown in FIG. 3A, camera array 300 includes multiple cameras 305. Although this disclosure shows camera array 300 including twelve cameras 305, camera array 300 may include any suitable number of cameras 305. Generally, camera array 300 is positioned above a space so that cameras 305 can capture overhead videos of portions of the space. These videos may then be processed by other components of the camera subsystem 202 to determine the physical position of people (e.g., shoppers 105) within the space. In the example of FIG. 3A, camera array 300 includes cameras 305A, 305B, 305C, 305D, 305E, 305F, 305G, 305H, 305I, 305J, 305K, and 305L.

Generally, cameras 305 in camera array 300 are arranged to form a rectangular array. In the example of FIG. 3A, camera array 300 is a 3×4 array of cameras 305 (e.g., three rows and four columns of cameras 305). Camera array 300 may include any suitable number of cameras 305 arranged in an array of any suitable dimensions.

Each camera 305 of camera array 300 is communicatively coupled to a camera client 220. In the example of FIG. 3A, each camera 305 of camera array 300 is communicatively coupled to one of camera client 1 220A, camera client 2 220B, or camera client 3 220C. Each camera 305 communicates captured video to the camera client 220 to which the camera 305 is communicatively coupled. The cameras 305 are communicatively coupled to the camera clients 220 according to particular rules to improve the resiliency of the tracking system 132. Generally, the cameras 305 are communicatively coupled to the camera clients 220 so that even if one camera client 220 goes offline, the coverage of a physical space provided by the cameras 305 communicatively coupled to the remaining camera clients 220 is sufficient to allow the tracking system 132 to continue tracking the position of people within the space.

Cameras 305 are communicatively to camera clients 220 using any suitable medium. For example, cameras 305 may be hardwired to camera clients 220. As another example, cameras 305 may wirelessly couple to camera clients 220 using any suitable wireless protocol (e.g., WiFi). Cameras 305 communicate captured videos through the communication medium to the camera clients 220.

Cameras 305 may be any suitable devices for capturing videos of the space. For example, cameras 305 may be three-dimensional cameras that can capture two-dimensional video of the space (e.g., x-y plane) and also detect the heights of people and/or objects in the video (e.g., z plane). As another example, cameras 305 may be two-dimensional cameras that capture two-dimensional videos of the space. Camera array 300 may include a mixture of different types of cameras 305.

FIG. 3B illustrates the coverage provided by cameras 305 of a camera array 300. As seen in FIG. 3B, a floor space is covered by different fields of view 310. Each field of view 310 is provided by a camera 305 of camera array 300. For example, field of view 310A is provided by camera 305A. Field of view 310B is provided by camera 305B. Field of view 310C is provided by camera 305C, and so forth. Each field of view 310 is generally rectangular in shape and covers a portion of the floor space. Each camera 305 captures video of the portion of the floor space that is covered by that camera's 305 field of view 310. For example, camera 305A captures video of the portion of the floor space covered by field of view 310A. Camera 305B captures video of the portion of the floor space covered by field of view 310B. Camera 305C captures video of the portion of the floor space covered by field of 310C, and so forth.

Each field of view 310 is shaded differently than its neighbors to distinguish the fields of view 310. Fields of view 310A, 310C, 310I, and 310K are shaded using lines that slant downwards to the right. Fields of view 310B, 310D, 310J, and 310L are shaded using lines that slant upwards to the right. Fields of view 310E and 310G are shaded using horizontal lines, and fields of view 310F and 310H are shaded using vertical lines. The shading of each field of view 310 is meant to distinguish that field of view 310 from other, directly adjacent fields of view 310. The shading is not meant to indicate a particular characteristic of the field of view 310. In other words, even though certain fields of view 310 share the same shading, the similar shading does not indicate that these fields of view 310 share certain characteristics (e.g., size, coverage, duration, and/or shape). Fields of view 310 may share one or more of these characteristics irrespective of their individual shading.

As seen in FIG. 3B, each field of view 310 overlaps with other fields of view 310. For example, field of view 310A overlaps fields of view 310B, 310E, and 310F. As another example, field of view 310F overlaps with fields of view 310A, 310B, 310C, 310E, 310G, 310, 310J, and 310K. Like fields of view 310A and 310F, other fields of view 310 (e.g., fields of view 310B, 310C, 310D, 310E, 310G, 310H, 310I, 310J, 310K, and 310L) also overlap neighboring fields of view 310. The shading in the overlapping regions is a combination of the shadings in the individual fields of view that form the overlapping regions. For example, the overlapping region formed by fields of view 310A and 310B includes slanted lines running in opposite directions. As another example, the overlapping region formed by fields of view 310A, 310B, 310E, and 310F includes slanted lines running in opposite directions, horizontal lines, and vertical lines.

The overlapping fields of view 310 may be a result of the proximity of cameras 305 to each other in camera array 300. Generally, by overlapping fields of view 310, certain portions of the floor space can be captured by multiple cameras 305 of the camera array 300. As a result, even if certain cameras 305 go offline, there may still be sufficient coverage provided by the remaining cameras 305 for the tracking system 132 to operate. Additionally, the overlapping fields of view 310 may improve tracking the positions of people (e.g., shoppers 105) as they move about the space.

FIG. 3C illustrates an example camera grid 315. As seen in FIG. 3C, camera grid 315 includes a number of rows and a number of columns corresponding to the number of rows and columns in camera array 300. Each box of camera grid 315 represents a camera 305 of camera array 300. Camera grid 315 shows how the cameras 305 of camera array 300 are communicatively coupled to camera clients 220. Using the previous example of FIG. 3A, camera grid 315 shows that cameras 305A, 305D, 305G, and 305J are communicatively coupled to camera client 1 220A. Camera grid 315 also shows that cameras 305B, 305E, 305H, and 305K are communicatively coupled to camera client 2 220B. Camera grid 315 further shows that cameras 305C, 305F, 305I, and 305L are communicatively coupled to camera client 3 220C.

Camera grid 315 shows that cameras 305 are communicatively coupled to camera clients 220 according to particular rules. For example, a camera 305 that is communicatively coupled to a particular camera client 220 is not directly adjacent in the same row or the same column of camera grid 315 to another camera 305 that is communicatively coupled to the same camera client 220. As seen in FIG. 3C, for example, camera 305A is directly adjacent in the same row or the same column of camera grid 315 to cameras 305B and 305E. Camera 305A is communicatively coupled to camera client 1 220A while cameras 305B and 305E are communicatively coupled to camera client 2 220B. Camera 305F is directly adjacent in the same row or the same column of camera grid 315 to cameras 305B, 305E, 305G, and 305J. Camera 305F is communicatively to camera client 3 220C, while cameras 305B, 305E, 305G, and 305J are communicatively coupled to camera client 1 220A or camera client 2 220B.

As another example, a camera 305 that is communicatively coupled to a particular camera client 220 is diagonal in camera grid 315 to another camera 305 that is communicatively coupled to the same camera client 220. As seen in FIG. 3C, for example, cameras 305D, 305G, and 305J are diagonal to each other and are communicatively coupled to camera client 1 220A. Cameras 305C, 305F, and 305I are diagonal to each other and are all communicatively coupled to camera client 3 220C.

A consequence of arranging cameras 305 in this manner is that each camera client 220 is communicatively coupled to at least one camera 305 in a portion of camera grid 315. As seen in the example of FIG. 3C, each of camera client 1 220A, camera client 2 220B, and camera client 3 220C is communicatively coupled to at least one camera in any 2×2 portion of camera grid 315. As a result, even if one camera client 220 were to go offline, the other cameras in the 2×2 portion can still provide sufficient coverage of that 2×2 portion to allow the tracking system 132 to operate. Thus, the resiliency of the tracking system 132 is improved.

Although the previous example used a certain number of cameras 305 and a certain number of camera clients 220, the tracking system 132 may use any suitable number of cameras 305 and any suitable number of camera clients 220 to provide a desired level of overlap, scalability, and resiliency. FIG. 3D shows an example camera array 300 that includes additional cameras 305. The example of FIG. 3D also includes additional camera clients 220: camera client 1 220A through camera client N 220D. The cameras 305 in camera array 300 may be communicatively coupled to camera clients 220 according to the same rules or principles described in FIGS. 3A through 3C.

FIG. 3E shows how the cameras 305 may communicatively couple to the camera clients 220. As seen in FIG. 3E, camera grid 315 includes a number of rows and a number of columns. Across a row, the cameras 305 are communicatively coupled to the camera clients 220 in a sequential fashion. After a camera 305 is communicatively coupled to camera client N 220d, the sequence repeats until the end of the row is reached. Similarly, the cameras 305 in a column are sequentially coupled to camera clients 220. After a camera 305 is communicatively coupled to camera client N 220d, the pattern repeats.

As shown in FIGS. 3D and 3E, the tracking system 132 may be scaled to include any number of cameras 305 and any number of camera clients 220. Generally, a camera 305 that is communicatively coupled to a particular camera client 220 is not directly adjacent in the same row or the same column of camera grid 315 to another camera 305 that is communicatively coupled to the same camera client 220. Additionally, cameras 305 along a diagonal of camera grid 315 are communicatively coupled to the same camera client 220. Furthermore, each camera client 220 is communicatively coupled to at least one camera 305 in a portion of camera grid 315. The dimensions of the portion may depend upon the number of camera clients 220 in the tracking system 132. Generally, the dimensions of the portion are one less than the number of camera clients 220 in the tracking system 132. So, in the examples of FIGS. 3D and 3E, the dimensions of the portion are (N−1)×(N−1).

2. Initialization

FIG. 3F shows the initialization of the camera subsystem 202. As seen in FIG. 3F, the camera subsystem 202 includes a camera array 300, camera client 1 220A, camera client 2 220B, camera client 3 220C, and camera server 225. Camera subsystem 202, may include any suitable number of camera arrays 300, camera clients 220, and camera servers 225. Generally, during initialization, the cameras 305 of the camera array 300 start up and begin sending videos 302 to camera clients 220. Additionally, camera clients 220 and camera server 225 synchronize internal clocks 304. After the cameras 305 in camera array 300 have started up and after the internal clocks 304 are synchronized, camera clients 220 may begin processing videos 302 and communicating information to camera server 225 to perform the tracking operations of the camera subsystem 202.

During initialization, the cameras 305 of camera array 300 may power on and perform a startup sequence. For example, the components of the cameras 305 may boot up and/or warm-up. The cameras 305 may then begin capturing video footage and communicating videos 302 to their respective camera clients 220. The cameras 305 of camera array 300 may take different amounts of time to initialize. For example, certain cameras 305 may take a shorter or longer amount of time to initialize than other cameras 305 of camera array 300. Because the cameras 305 of camera array 300 do not wait for the other cameras 305 of camera array 300 to complete initialization before sending videos 302 to camera clients 220, the cameras 305 of camera array 300 may each begin sending videos 302 to camera clients 220 at different times. As a result, videos 302, and in particular, the frames of videos 302, may be desynchronized from the frames of other videos 302. In other words, the frames of these videos 302 are not being captured and sent by their respective cameras 305 simultaneously or at the same time. Consequentially, the frames of these videos 302 do not arrive at the camera clients 220 simultaneously or at the same time.

During initialization, camera clients 220 and camera server 225 power on and/or perform a bootup sequence. After booting up, camera clients 220 and camera server 225 synchronize their internal clocks 304. In the example of FIG. 3F, camera client 1 220A has an internal clock 1 304A. Camera client 2 220B has an internal clock 2 304B. Camera client 3 220C has an internal clock 3 304C. Camera server 225 has an internal clock 4 304D. Camera clients 220 and camera server 225 may synchronize their internal clocks 304 in any suitable manner. For example, camera clients 220 and camera server 225 may synchronize their internal clocks 304 using a synchronization protocol, such as the Network Time Protocol (NTP) or the Precision Time Protocol (PTP). Although a synchronization protocol may be used to synchronize the internal clocks 304 of camera clients 220 and camera server 225, this does not mean that these internal clocks 304 show exactly the same time or are perfectly synchronized with each other. As a result, there may still be a level of desynchronization amongst camera clients 220 and camera server 225.

Camera clients 220 may track the cameras 305 of camera array 300 that have completed initialization by tracking which cameras 305 have communicated videos 302 to camera clients 220. When camera clients 220 determine that each camera 305 of camera array 300 have begun sending videos 302 to camera clients 220, camera clients 220 may determine that camera array 300 has finished initialization. In response to that determination, camera clients 220 may begin processing the frames of the videos 302 and communicating information from those frames to camera server 225. Camera server 225 may then analyze the information from camera clients 220 to determine the physical position of people and/or objects within a space.

3. Camera Clients

FIGS. 3G-3I show the operation of camera clients 220 in the camera subsystem 202. Generally, camera clients 320 process videos 302 from cameras 305. Camera clients 320 may identify people or objects within the frames 320 of these videos 302 and determine coordinates 322 for these people or objects. Camera clients 320 may also generate timestamps 324 (e.g., by using internal clocks 304) that indicate when the camera clients 320 received particular frames 320. Camera clients 320 communicate these timestamps 324 and coordinates 322 to camera server 225 for further processing.

FIGS. 3G-3I show the operation of camera clients 210 as an event in a store 100 unfolds. During this event, for example, a first shopper 105 (e.g., a man) removes an item 130 from a shelf in the store 100 and a second shopper 105 (e.g., a woman) moves towards the shelf. Camera clients 320 analyze frames 320 of videos 302 to determine coordinates 322 for the man and the woman in the frames 320.

As seen in FIG. 3G, a man is standing near a shelf and a woman is standing further away from the shelf. Two cameras 305A and 305B are positioned above the space and capture video 302 of the man and the woman and the shelf. These cameras 305A and 305B send their videos 302 to two different camera clients 220A and 220B. Camera 305A sends video 305 to camera client 220A. Camera 305B sends video 305 to camera client 220B.

Camera client 220A receives video 305 from camera 305A, and specifically a frame 320A of that video 305. Camera client 220A processes the frame 320A. As seen in frame 320A, the man is standing near the shelf and the woman is standing further away from the shelf. Camera client 220A processes frame 320A to determine bounding areas 325A and 325B around the man and the woman. In the example of FIG. 3G, bounding areas 325A and 325B are rectangular areas that surround the man and the woman, respectively. Bounding areas 325A and 325B approximate the positions of the man and the woman in the frame. This disclosure contemplates camera clients 220 determining bounding areas 325 that are of any suitable shape and of any suitable size. For example, bounding areas 325 may be circular or may be irregularly shaped (e.g., so as to follow the contours of the shopper 105 in the frames 320).

Camera client 220A determines coordinates 322 that define the bounding areas 325A and 325B within frames 320A and 320B (also referred to as "frame coordinates"). In the example of FIG. 3G, camera client 228 determines coordinates 322 $(x_1, y_1)$ and $(x_2, y_2)$ for bounding area 325A and coordinates 322 $(x_3, y_3)$ and $(x_4, y_4)$ for bounding area 325B. These coordinates 322 do not represent absolute coordinates in the physical space, but rather coordinates within the frame 320A. Camera clients 220 may determine any suitable number of coordinates 322 for bounding areas 325.

Camera client 220A then generates frame data 330A that contains information about frame 320A. As seen in FIG. 3G, frame data 330A includes an identifier for camera 305A (e.g., "camera=1"). Camera client 220A may also generate a timestamp 324 (e.g., using internal clock 304) that indicates when frame 320A was received by camera client 220A. In the example of FIG. 3G, that timestamp 324 is $t_1$. Frame data 320A also includes information about the people or objects within frame 320A. In the example of FIG. 3G, frame data 330A includes information for an object 1 and an object 2. Object 1 corresponds to the man and object 2 corresponds to the woman. Frame data 330A indicates the coordinates 322 for the man $(x_1, y_1)$ and $(x_2, y_2)$ along with a height of the man $z_1$. As discussed previously, cameras 305 may be three-dimensional cameras that can detect the height of objects and/or people. Cameras 305 may have provided the heights of the man and the woman to the camera clients 320. In the example of FIG. 3G, camera 305A may have detected the heights of the man and the woman to be $z_1$ and $z_2$, respectively. Frame data 330A also includes information for the woman including the coordinates 322 $(x_3, y_3)$ and $(x_4, y_4)$ and the height $z_2$. Camera client 220A may communicate frame data 330A to camera server 225 when frame data 330A is ready.

In a corresponding manner, camera client 220B may process video 302 from camera 305B. As seen in FIG. 3G, camera client 220B receives a frame 320B from camera 305B. Because camera 305B is at a different position than camera 305A, frame 320B will show a slightly different perspective of the event in the store 100 than frame 320A. Camera client 220B determines bounding areas 325C and 325D around the man and the woman, respectively. Camera client 220B determines frame coordinates 322 $(x_1, y_1)$ and $(x_2, y_2)$ for bounding area 325C, and frame coordinates 322 $(x_3, y_3)$ and $(x_4, y_4)$ for bounding area 325D. Camera client 220B also determines and generates a timestamp 324 $t_2$ (e.g., using internal clock 304) that indicates when camera client 220B received frame 320B. Camera client 220B then generates frame data 330B for frame 320B. Frame data 330B indicates that frame 320B was generated by camera 305B and was received by camera client 220B at $t_2$. Frame data 330B also indicates that a man and a woman were detected in frame 320B. The man corresponds to coordinates 322 $(x_1, y_1)$ and $(x_2, y_2)$ and has a height $z_1$. The woman corresponds to coordinates 322 $(x_3, y_3)$ and $(x_4, y_4)$ and has a height $z_2$. Camera client 220B communicates frame data 320B to camera server 225 when frame data 320B is ready.

The coordinates 322 generated by camera clients 220A and 220B for frame data 330A and 330B may be the coordinates within a particular frame 320 and not the coordinates within the physical space. Additionally, although the same subscripts have been used for the coordinates 322 in frame data 330A and 330B, this does not mean that these coordinates 322 are the same. Rather, because cameras 305A and 305B are in different positions, it is likely that the coordinates 322 in frame 330A are different from the coordinates 322 in frame data 330B. Camera clients 220A and 220B are determining the coordinates 322 of the bounding areas 325 within the frames 320 and not within the physical space. Camera clients 220A and 220B determine these local coordinates 322 independently of each other. The subscripts indicate a sequence of coordinates 322 generated by the individual camera clients 220. For example $(x_1, y_1)$ indicates the first coordinate 322 generated by camera client 220A and the first coordinate 322 generated by camera client 220B, which may be different values.

In FIG. 3H, the event in the store 100 has progressed. The man is still standing by the shelf and the woman has moved closer to the shelf. Camera clients 220A and 220B receive additional frames 320C and 320D from cameras 305A and 305B. Camera client 220A again determines bounding areas 325C and 325D for the man and the woman, respectively, and coordinates 322 for these bounding areas 325. Camera client 220A determines coordinates 322 $(x_5, y_5)$ and $(x_6, y_6)$ for bounding area 325C and coordinates 322 $(x_7, y_7)$ and $(x_8, $y_8$) for bounding area 325D. Camera client 220A also generates a timestamp 324 that indicates that frame 320C was received at time $t_3$. Camera client 220A generates frame data 330C, indicating that frame 320C was generated by camera 305A and received by camera client 220A at $t_3$. Frame data 330C also indicates that the man corresponds to coordinates 322 ($x_5$, $y_5$) and ($x_6$, $y_6$) and has a height at $z_3$ within frame 320C and that the woman corresponds to coordinates 322 ($x_7$, $y_7$) and ($x_8$, $y_8$) and has a height at $z_4$ within frame 320C.

Similarly, camera client 220B receives frame 320D from camera 305B. Camera client 220B determines bounding areas 325E and 325F for the man and the woman, respectively. Camera client 220B then determines coordinates 322 ($x_5$, $y_5$) and ($x_6$, $y_6$) for bounding area 325E and coordinates 322 ($x_7$, $y_7$) and ($x_8$, $y_8$) for bounding area 325F. Camera client 220B generates a timestamp 324 that indicates that frame 320D was received at time $t_4$. Camera client 220B generates frame data 330D that indicates frame 320D was generated by camera 305B and received by camera client 220B at $t_4$. Frame data 330D indicates that the man corresponds to coordinates 322 ($x_5$, $y_5$) and ($x_6$, $y_6$) and has a height of $z_3$ in frame 320D. Frame data 330D also indicates that the woman corresponds to coordinates 322 ($x_7$, $y_7$) and ($x_8$, $y_8$) and has a height of $z_4$ within frame 320D. Camera clients 220A and 220B communicate frame data 330C and 330D to camera sever 225 when frame data 330C and 330D are ready.

In FIG. 3, the event in the store 100 has further progressed and the man has removed an item 130 from the shelf Camera client 220A receives a frame 320E from camera 305A. Camera client 220A determines bounding areas 325G and 325H around the man and the woman, respectively. Camera client 220A determines coordinates 322 ($x_9$, $y_9$) and ($x_{10}$, $y_{10}$) for bounding area 325G and coordinates 322 ($x_{11}$, $y_{11}$) and ($x_{12}$, $y_{12}$) for bounding area 325H. Camera client 220A generates a timestamp 324 indicating when frame 320E was received by camera client 220A (e.g., by using internal clock 304). Camera client 220A generates frame data 330E that indicates that frame 320E was produced by camera 305A and received by camera client 220A at $t_5$. Frame data 330E indicates that the man corresponds to coordinates 322 ($x_9$, $y_9$) and ($x_{10}$, $y_{10}$) and has a height at $z_5$ within frame 320E. Frame data 330E also indicates that the woman corresponds to coordinates 322 ($x_{11}$, $y_{11}$) and ($y_{12}$, $y_{12}$) and has a height at $z_6$ in frame 320E.

Camera client 220B receives frame 320F from camera 305B. Camera client 220B determines bounding areas 325I and 325J around the man and the woman, respectively. Camera client 220BA determines coordinates 322 ($x_9$, $y_9$) and ($x_{10}$, $y_{10}$) for bounding area 325I and coordinates 322 ($x_{11}$, $y_{11}$) and ($x_{12}$, $y_{12}$) for bounding area 325J. Camera client 220B generates a timestamp 324 indicating when frame 320F was received by camera client 220B (e.g., by using internal clock 304). Camera client 220B then generates frame data 330F indicating that frame 320F was produced by camera 305B and received by camera client 220B at $t_6$. Frame data 330F indicates that the man corresponds to coordinates 322 ($x_9$, $y_9$) and ($x_{10}$, $y_{10}$) and has a height at $z_5$ in frame 320F. Frame data 330F also indicates that the woman corresponds to coordinates 322 ($x_{11}$, $y_{11}$) and ($x_{12}$, $y_{12}$) and has a height at $z_6$ in frame 320F. Camera clients 220A and 220B communicate frame data 330E and 330F to camera server 225 when ready.

4. Camera Server

FIGS. 3J-3P show the operation of camera server 225 in the camera subsystem 202. Generally, camera server 225 receives frame data 330 (e.g., 330A-330F) from the camera clients 220 in camera subsystem 202. Camera server 225 synchronizes and/or assigns the frame data 330 to particular time windows 332 based on timestamps 324 in the frame data 330. Camera server 225 then processes the information assigned to particular time windows to determine the physical positions of people and/or objects within the space during those time windows 332.

In FIG. 3J, camera server 225 receives frame data 330 from the camera clients 220 in camera subsystem 202. Camera server 225 assigns frame data 330 to time windows 332 depending on the timestamp 324 within frame data 330. Using the previous example, camera server 225 may determine that timestamps 324 $t_1$, $t_2$, and $t_3$ fall within a first time window 322A (e.g., between times T0 and T1) and that timestamps 324 $t_4$, $t_5$, and $t_6$ fall within a subsequent time window 332B (e.g., between times T1 and T2). As a result, camera server 225 assigns the frame data 330 for frames 320A, 320B, and 320C to time window 1 332A and the frame data 330 for frames 320D, 320E, and 320F to time window 2 332B.

By assigning frame data 330 to time windows 332, camera server 225 may account for desynchronization that occurs amongst the cameras 305, camera clients 220, and the camera server 225 in the camera subsystem 202. The duration of the time windows 332 can be set to be larger than the desynchronization that is expected to occur to mitigate the effects of desynchronization. For example, if the cameras 305 and camera clients 220 are expected to desynchronize by a few milliseconds, then the time window 332 can be set to last 100 milliseconds to counteract the desynchronization. In this manner, camera server 225 can mitigate the effects of desynchronization as the camera subsystem 202 is scaled to handle larger spaces by including more cameras 305 and camera clients 220. In the example of FIG. 3J, camera server 225 sets the duration of time window 1 332A to be between T0 and T1 and the duration of time window 2 332B to be between T1 and T2. Camera server 225 can set the duration of the time windows 332 to be any suitable amount to mitigate the effects of desynchronization. In certain embodiments, T0 may be the time when the cameras 305 in the camera subsystem 202 have finished initializing.

FIG. 3K shows an embodiment where camera server 225 uses cursors 335 to assign frame data 330 to time windows 332. Each cursor 335 may correspond to a particular camera client 220 in the camera subsystem 202. In the example of FIG. 3K, cursor 335A corresponds to camera client 1 220A, cursor 335B corresponds to camera client 3 220C, and cursor 335C corresponds to camera client 2 220B. Each cursor 335 points to a particular time window 332. When frame data 330 is received from a camera client 220, that frame data 330 is generally assigned to the time window 332 to which the cursor 335 for that camera client 220 points. For example, if frame data 330 is received from camera client 1 220A, then that frame data 330 is generally assigned to time window 1 332A, because cursor 335A is pointing to time window 1 332A.

Camera server 225 may determine whether to advance cursor 335A when frame data 330 is received from the camera client 220 corresponding to that cursor 335. If that frame data 330 has a timestamp 324 that belongs in a subsequent time window 332, then camera server 225 may advance the cursor 335 to that time window 332, thereby indicating that camera server 225 is not expecting to receive any more frame data 330 from that camera client 220 that belongs in a prior time window 332. In this manner, camera server 225 can quickly and efficiently assign frame data 330 to time windows 332 without checking every time window 332 when frame data 330 is received. For example, if camera client 2 220B is faster at sending information than camera client 1 220A and camera client 3 220C, then cursor 335C may advance far ahead of cursors 335A and 335B. When camera server 225 receives frame data 330 from camera client 2 220B, camera server 225 need not check every time window 332 beginning from time window 1 332A to determine to which time window 332 that frame data 330 should be assigned. Rather, camera server 225 can start at the time window 332 to which cursor 335C points. In other words, camera server 225 need not first check whether a timestamp 324 in the frame data 330 from camera client 2 220B indicates a time that falls within time window 1 332A and then whether that time falls within time window 2 332B. Instead, camera server 225 can first check whether that time falls within time window 3 332C and ignore checking whether that time falls within time window 1 332A and time window 2 332B. As a result, the frame data 330 is quickly and efficiently assigned to the correct time window 332.

FIG. 3L illustrates camera server 225 moving out for processing frame data 330 that has been assigned to particular time windows 332. Generally, camera server 225 may determine that the frame data 330 assigned to a particular time window 332 is ready for processing. In response to that determination, camera server 225 may move the frame data 330 from a particular time window 332 to a task queue 336. Information in the task queue 336 is then processed to determine the physical location of people or objects within a space during particular time windows 332.

Camera server 225 determines that frame data 330 assigned to a particular time window 332 is ready for processing in any suitable manner. For example, camera server 225 may determine that a particular time window 332 is ready for processing when that time window 332 has frame data 330 for frames 320 from a sufficient number of cameras 305. Camera server 225 may use a threshold 338 to make this determination. When a particular time window 332 has been assigned frame data 330 for frames 320 from a number of cameras 305 that exceeds threshold 338, camera server 225 may determine that that time window 332 is ready for processing and move the information for that time window 332 to the task queue 336. For example, assume threshold 338 indicates that frame data 330 for frames 320 from ten cameras 305 of an array 300 of twelve cameras 305 need to be received before a time window 332 is ready for processing. If time window 332 contains frame data 330 for frames 320 from only eight cameras 305, then camera server 225 determines that time window 332 is not ready for processing, and as a result, time window 332 waits to be assigned frame data 330 for frames 320 from additional cameras 305. When time window 332 has received frame data 330 for frames 320 from ten or more cameras 305, camera server 225 determines that time window 332 is ready for processing and moves frame data 330 in time window 332 to task queue 336.

Camera server 225 may also determine that a particular time window 332 is ready for processing when a subsequent time window 332 has received frame data 330 for frames 320 from a number of cameras 305 exceeding threshold 338. Using the previous example, even if time window 1 332A has been assigned frame data 330 for frames 320 from eight cameras, camera server 225 may nevertheless determine that time window 1 332A is ready for processing when time window 2 332B has been assigned frame data 330 for frames 320 from ten or more cameras 305 (e.g., from every camera 305 in camera array 300). In this scenario, camera server 225 may assume that no additional frame data 330 will be assigned to time window 1 332A because frame data 330 for frames 320 from a sufficient number of cameras 305 has been assigned to a subsequent time window 2 332B. In response, camera server 225 moves frame data 330 in time window 1 332A to task queue 336.

Camera server 225 may also determine that a particular time window 332 is ready for processing when that time window 332 has been awaiting processing for a certain period of time. For example, if an error or bug occurs in the system and frames 320 from a number of cameras 305 are not sent or are lost, then a time window 332 may not receive frame data 330 for frames 320 from enough cameras 305. As a result, processing for that time window 332 may stall or be delayed. Camera server 225 may use a timeout or age-out beyond which a time window 332 does not wait for processing. Thus, when the time window 332 has not been processed for a certain period of time exceeding the timeout or the age-out, camera server 225 may nevertheless send the frame data 330 in that time window 332 to the task queue 336. Using the previous example, assume the timeout is 200 milliseconds. If time window 1 332A has been stuck with frame data 330 from frames 320 from eight cameras 305 for over 200 milliseconds, camera server 225 may determine that time window 1 332A has waited long enough for additional frame data 330 and that time window 1 332A is ready for processing. In response, camera server 225 moves frame data 330 in time window 1 332A to task queue 336.

In certain embodiments, when a time window 332 times out or ages out, camera server 225 may adjust threshold 338 so that future time windows 332 are less likely to time out or age out. For example, camera server 225 may lower threshold 338 when a time window 332 times out or ages out. Likewise, camera server 225 may increase threshold 338 when a subsequent time window 332 does not time out or age out. Camera server 225 may adjust threshold 338 based on the number of cameras 305 that have sent information for a particular time window 332. For example, if a particular time window 332 times out or ages out when it has frame data 330 for frames 320 from eight cameras 305, and threshold 338 is ten cameras 305, camera server 225 may reduce threshold 338 to a value closer to eight cameras. As a result, that time window 332 may then have frame data 330 for frames 320 from a sufficient number of cameras 305 and be moved to task queue 336. When a subsequent time window 332 does not time out because it has received frame data 330 for frames 320 from nine cameras 305, camera server 225 may adjust threshold 338 towards nine cameras 305. In this manner, camera server 225 may dynamically adjust the threshold 338 to prevent bugs, errors, and/or latency from causing delays in the camera subsystem 202.

In certain embodiments, camera server 225 processes time windows 332 sequentially. In other words, camera server 225 does not process a subsequent time window 332 until a prior time window 332 is ready for processing. In the example of FIG. 3L, camera server 225 may not place time window 2 332B into the task queue 336 until time window 1 332A has been placed into the task queue 336. In this manner, the progression of events in a store 100 is evaluated sequentially (e.g., as the events unfold), which allows for proper tracking of the position of people in the store 100. If time windows 332 were not evaluated sequentially, then it may seem to the tracking system 132 that the event in the store 100 progressed in a different and incorrect order.

FIG. 3M illustrates a task queue 336 of camera server 225. As shown in FIG. 3M, the task queue 336 includes frame data 330 from two time windows 332. At the beginning of the task queue 336 is frame data 330 for frames 320A, 320B, and 320C. Following in the task queue 336 is frame data 330 for frames 320D, 320E, and 320F. Camera server 225 may process the entries in the task queue 336 in order. Thus, camera server 225 may first process the first entry of the task queue 336 and process the frame data 330 for frames 320A, 320B, and 320C. Camera server 225 processes an entry of a task queue 336 and then moves that entry to a result queue.

To process an entry of task queue 336, camera server 225 may combine or cluster the coordinates 322 of the same objects detected by the same cameras 320 to calculate combined coordinates 332 for that object. As a result of this processing, each time window 332 should include only one set of coordinates 322 per object per camera 305. After this processing, the combined coordinates 322 are placed into a result queue. FIG. 3N illustrates a result queue 340 of camera server 225. As seen in FIG. 3N, result queue 340 includes the combined coordinates 332 for two time windows 332.

As an example, camera server 225 first processes the first entry in the task queue 336, which includes frame data 330 for frames 320A, 320B, and 320C. Frames 320A and 320C are from the same camera 320A. As a result, camera server 225 may use the frame data 330A and 330C for frames 320A and 320C to calculate a combined coordinate 322 for the people or objects detected by camera 320A. As seen in FIG. 3N, camera server 225 has determined combined coordinates 322 ($x_{13}$, $y_{13}$), and ($x_{14}$, $y_{14}$) and a combined height $z_7$ for object 1 detected by camera 1 305A and combined coordinates 322 ($x_{15}$, $y_{15}$) and ($x_{16}$, $y_{16}$) and a combined height $z_8$ for object 2 detected by camera 1 305A. These combined coordinates 322 and combined heights are the combined coordinates 322 and combined heights for the man and the woman in the video frames 302 received by camera 305A during the first time window 332A. Likewise, camera server 225 may determine combined coordinates 322 and combined heights for the objects detected by camera 2 305B during the first time window 332A. For example, camera server 225 may use frame data 330B for frame 320B (and frame data 330 for any other frames 320 received by camera 2 305B during the first time window 332A) to determine combined coordinates 322 ($x_{13}$, $y_{13}$), and ($x_{14}$, $y_{14}$) and a combined height $z_7$ for object 1 detected by camera 2 305B and combined coordinates 322 ($x_{15}$, $y_{15}$) and ($x_{16}$, $y_{16}$) and a combined height $z_8$ for object 2 detected by camera 2 305B. Camera server 225 may determine combined coordinates 322 for each object detected by cameras 305 in the first time window 332A in this manner.

Camera server 225 then determines combined coordinates 322 for objects detected by the cameras 305 during the second time window 332B in a similar fashion. For example, camera server 225 may use frame data 330E for frame 320E (and frame data 330 for any other frames 320 received by camera 1 305A during the second time window 332B) to determine combined coordinates 322 ($x_{17}$, $y_{17}$), and ($x_{18}$, $y_{18}$) and a combined height $z_9$ for object 1 detected by camera 1 305A and combined coordinates 322 ($x_{19}$, $y_{19}$) and ($x_{20}$, $y_{20}$) and a combined height $z_{10}$ for object 2 detected by camera 1 305A. Camera server 225 may also use frame data 330D and 330F for frames 320D and 320F to determine combined coordinates 322 ($x_{17}$, $y_{17}$), and ($x_{18}$, $y_{18}$) and a combined height $z_9$ for object 1 detected by camera 2 305B and combined coordinates 322 ($x_{19}$, $y_{19}$) and ($x_{20}$, $y_{20}$) and a combined height $z_{10}$ for object 2 detected by camera 2 305B.

Camera server 225 calculates combined coordinates 322 and combined heights in any suitable manner. For example, camera server 225 may calculate combined coordinates 322 and combined heights by taking the average of the coordinates 322 and the heights of particular objects detected by the same camera 305 in a particular time window 332. Using the example in FIG. 3M, camera server 225 may calculate combined coordinates 322 ($x_{13}$, $y_{13}$) for camera 1 305A by taking the average of coordinates 322 ($x_1$, $y_1$) and ($x_5$, $y_5$) from frame data 330A and 330C. Similarly, camera server 225 may determine the combined coordinate 322 ($x_{14}$, $y_{14}$) for camera 1 305A by taking the average of coordinates 322 ($x_2$, $y_2$) and ($x_6$, $y_6$) from frame data 330A and 330C. Camera server 225 may determine combined height $z_7$ for camera 1 305A by taking the average of heights $z_1$ and $z_3$ from frame data 330A and 330C. Similarly, camera server 225 may determine combined coordinates 322 ($x_{17}$, $y_{17}$) for camera 2 305B by taking the average of coordinates 322 ($x_5$, $y_5$) and ($x_9$, $y_9$) from frame data 330D and 330F. Likewise, camera server 225 may determine combined coordinates 322 ($x_{18}$, $y_{18}$) for camera 2 305B by taking the average of coordinates 322 ($x_6$, $y_6$) and ($x_{10}$, $y_{10}$) from frame data 330D and 330F. Camera server 225 may determine combined height $z_9$ for camera 2 305B by taking the averages of heights $z_3$ and $z_5$ from frame data 330D and 330F. Camera server 225 takes these averages because these are the coordinates 322 and heights for the same object determined by the same camera 305 during the same time window 332.

Camera server 225 may follow a similar process to determine or to calculate the combined coordinates for object 2 detected by cameras 1 305A and 2 305B. Camera server 225 may calculate combined coordinates 322 ($x_{15}$, $y_{15}$) for camera 1 305A by taking the average of coordinates 322 ($x_3$, $y_3$) and ($x_7$, $y_7$) from frame data 330A and 330C. Similarly, camera server 225 may determine the combined coordinate 322 ($x_{16}$, $y_{16}$) for camera 1 305A by taking the average of coordinates 322 ($x_4$, $y_4$) and ($x_8$, $y_8$) from frame data 330A and 330C. Camera server 225 may determine combined height $z_8$ for camera 1 305A by taking the average of heights $z_2$ and $z_4$ from frame data 330A and 330C. Similarly, camera server 225 may determine combined coordinates 322 ($x_{19}$, $y_{19}$) for camera 2 305B by taking the average of coordinates 322 ($x_7$, $y_7$) and ($x_{11}$, $y_{11}$) from frame data 330D and 330F. Likewise, camera server 225 may determine combined coordinates 322 ($x_{20}$, $y_{20}$) for camera 2 305B by taking the average of coordinates 322 ($x_8$, $y_8$) and ($x_{12}$, $y_{12}$) from frame data 330D and 330F. Camera server 225 may determine combined height $z_{10}$ for camera 2 305B by taking the averages of heights $z_4$ and $z_6$ from frame data 330D and 330F.

Camera server 225 uses any other suitable calculation to calculate combined coordinates and combined heights. For example, camera server 225 may take a median of coordinates 322 and heights for objects detected by the same camera 305 during a time window 332. Camera server 225 may also use clustering processes to calculate the combined coordinates 322 and combined heights. For example, camera server 225 may use K-means clustering, Density-based spatial clustering of applications with noise (DBSCAN), k-medoids, gaussian mixture models, and hierarchical clustering to calculate combined coordinates 322 and combined heights.

After camera server 225 has calculated the combined coordinates 322 and combined heights, camera server 225 has determined the coordinates 322 for each object detected by each camera 305 during a time window 332. However, camera server 225 may perform additional processing to determine whether the object detected by different cameras 305 are the same object. Camera server 225 may use linking and homography to determine which objects detected by which cameras 305 are actually the same person or object in a space. Camera server 225 may then take the combined coordinates 322 for those objects from the different cameras 305 and employ homography to determine a physical location for that person or object in the physical space during a time window 332. Embodiments of this process are described in U.S. patent application Ser. No. 16/663,710 entitled, "Topview Object Tracking Using a Sensor Array", the contents of which are incorporated by reference herein in its entirety. In this manner, camera server 225 determines the physical locations of people and/or objects within the space during particular time windows 332.

In particular embodiments, camera clients 220 may also use the same time windows 332 as camera server 225 to communicate frame data 330 in batches to camera server 225. As seen in FIG. 3O, camera client 220 assigns frame date 330 to time windows 332 based on the timestamps 324 within that frame data 330. Camera client 220 may determine that a particular time window 332 is ready to be communicated to camera server 225 in a similar way as camera server 225 determines a time window 332 is ready for processing. When camera client 220 determines that a particular time window 332 is ready (e.g., when each camera 305 communicatively coupled to camera client 220 has communicated a frame in that time window 332), camera client 220 communicates the frame data 330 assigned to that time window 332 as a batch to the camera server 225. In this manner, camera server 225 may assign frame data 330 to time windows 332 even more quickly and more efficiently because camera server 225 receives the frame data 330 for a time window 332 as a batch from camera client 220.

In certain embodiments, even if camera server 225 and camera clients 220 are not synchronized, camera server 225 can account for desynchronization that occurs (e.g., by desynchronized internal clocks 302, by latency differences between camera clients 220 to camera server 225, by processing speed differences between camera clients 220, etc.) by adjusting the timestamps 324 in frame data 330. FIG. 3P shows camera server 225 adjusting timestamps 324. As discussed previously, frame data 330 includes a timestamp 324 generated by camera client 220 that indicates when camera client 220 received a frame 320. In the example of FIG. 3P, frame data 330 indicates that camera client 220 received frame 320 at time $t_1$. If the camera clients 220 and camera server 225 are not synchronized, then the timestamp 324 $t_1$ is relatively meaningless to camera server 225 because the camera server 225 cannot be assured that timestamps 324 from different camera clients 220 are accurate relative to each other. Thus, it is difficult, if not impossible, to precisely analyze frame data 330 from different and/or multiple camera clients 220.

Camera server 225 can adjust timestamps 324 for particular cameras 305 to account for desynchronization. Generally, camera server 225 determines a delay for each camera 305 by tracking the delay for prior frames 320 from that camera 305. Camera server 225 then adjusts timestamps 324 for frame data 330 for frames 320 from that camera 305 by the determined delay. In the example of FIG. 3P, camera server 225 determines a delay for camera 1 305A by determining, for each frame 320 ($x$) from camera 1, the difference in time (labeled $\Delta_x$) between the timestamp 324 indicated in frame data 330 for that frame 320 (labeled $t_x$) and the time camera server 225 received the frame data 330 (labeled $T_x$). Camera server 225 calculates an average delay (labeled $\Delta$) by averaging the differences in time ($\Delta_x$) for a prior number of frames 320. In the example of FIG. 3P, camera server 225 averages the differences in time for the previous thirty frames 320 to determine the average delay. Camera server then adds the average delay ($\Delta$) to the timestamp 324 for the frame data 330 to adjust the timestamp 324 to account for desynchronization. In this manner, camera server 225 and tracking system 132 can function properly even if camera clients 220 and camera server 225 are not synchronized (e.g., according to a clock synchronization protocol).

5. Example Method

FIGS. 3Q and 3R are flowcharts illustrating an example method 342 of operating the camera subsystem 202. In particular embodiments, various components of the camera subsystem 202 perform the steps of method 342. Generally, by performing method 342, the camera subsystem 202 determines the physical position of people or objects within a space.

As seen in FIG. 3Q, method 342A begins with cameras 305A and 305B generating and communicating frames 320A and 320D to camera clients 220A and 220B, respectively. Camera clients 220A and 220B then determine coordinates 322 for two people detected in frames 320A and 320B. These coordinates may define bounding areas 325 around these people.

Camera 305A then generates frame 320B and communicates frame 320B to camera client 220A. Camera client 220A generates coordinates 322 for two people shown in frame 320B. During that process, camera 305B generates frame 320E and communicates frame 320E to camera client 220B. Camera client 220B then determines coordinates 322 for two people detected in frame 320E. Camera 305A then generates frame 320C and communicates frame 320C to camera client 220A. Camera client 220A determines coordinates 322 for two people detected in frame 320C. Importantly, FIG. 3Q shows that frames from cameras 305A and 305B may not be generated and communicated simultaneously or synchronously. Additionally, coordinates for people detected in frames 320 may not be generated simultaneously or synchronously in camera clients 220A and 220B.

FIG. 3R shows method 342B which continues from method 342A of FIG. 3Q. As seen in FIG. 3R, camera client 220A generates frame data 330 from the coordinates 322 for the two people detected in frame 320A. Likewise, camera client 220B generates frame data 330 using the coordinates 322 for the two people detected in frame 320D. Camera clients 220A and 220B communicate the frame data 330 to camera server 225. Camera client 220A generates additional frame data 330 using the coordinates 322 for the two people detected in frame 320B. Camera client 220A then communicates that frame data 330 to camera server 225. Camera server 225 may assign the frame data 330 to a time window 332. Camera server 225 may determine that that time window 332 is ready for processing in step 344 and, in response, place the frame data 330 in that time window 332 into a task queue 336 in step 346. Camera server 225 may then combine or cluster the coordinates 322 in that time window 322 to determine combined coordinates 322 in step 348. For example, camera server 225 may average the coordinates 322 in that time window to determine combined coordinates 322 for the people detected by the different cameras 305 during that time window 332. Camera server 225 may then map the people detected by the different cameras 305 to people in the space in step 350. Camera server 225 may then determine the positions of the people during that time window 332 in step 352. Camera server 225 communicates these determined positions to central server 240.

Modifications, additions, or omissions may be made to method 342 depicted in FIGS. 3Q and 3R. Method 342 may include more, fewer, or other steps. For example, steps may be performed in parallel or in any suitable order. While discussed as particular components of camera subsystem 202 performing the steps, any suitable component of camera subsystem 202 may perform one or more steps of the method.

6. Other Features

In particular embodiments, the camera subsystem 202 may include a second camera array that operates in tandem with the first camera array 300 of the camera subsystem 202. FIG. 3S shows an embodiment that includes two camera arrays 300 and 354. Camera array 300 includes cameras 305M. Camera array 354 includes cameras 305N. Cameras 305N operate in the same way as cameras 305M and can be used to determine positions of objects and/or people in a space using the same techniques described using FIGS. 3A-3R.

Each camera 305N is positioned slightly offset from a camera 305M of camera array 300. In this manner, cameras 305M capture video that is similar to the video captured by cameras 305N. In certain embodiments, cameras 305M may use different versions of software or different versions of software may be used to process video from cameras 305M relative to cameras 305N. In this manner, newer software can be run for cameras 305N to test the effectiveness of that software. The testing of that software does not interrupt the operation of the camera subsystem 202 because cameras 305M may still be using the previous software, which also acts as a baseline for comparing against the operation of the new software running on cameras 305N. For example, the accuracy of the position tracking provided by the new software can be determined and compared against the accuracy provided by the old software. If the new software is less accurate than the old software, then the old software should continue to be used.

In certain embodiments, camera server 225 can retrieve video footage from camera clients 220 or a shared memory if the camera server 225 is unable to determine the positions of people based on the frame data 330 from the camera clients 220. FIG. 3T shows a camera server 225 retrieving videos 302 from camera clients 220 and/or shared memory 356. Generally, camera clients 220 store video received from cameras locally or in a shared memory 356. That video 302 is then made available to camera server 225 if camera server 225 cannot determine the positions of people based on frame data 330. Camera server 225 may analyze video 302 to determine the positions of people in the space. Camera server 225 may perform better and more accurate analysis of the raw video footage than camera clients 220, and thus, camera server 225 may generate more accurate frame data 330 than camera clients 220. In some embodiments, camera server 225 may have frame data 330 from one camera client 220 that conflicts or does not align with frame data 330 from another camera client 220. Camera server 225 can retrieve the raw video footage to determine which frame data 330 should be accepted and used.

In the example of FIG. 3T, camera client 220A stores video 302A locally or in shared memory 356. Camera client 220B stores video 302B locally or in shared memory 356. When camera server 225 is unable to determine the positions of people based on frame data 330, camera server 225 sends a request 358 to camera client 220A and/or shared memory 356. In response, camera client 220A and/or shared memory 356 send video 302A to camera server 225. Camera server 225 may then analyze the video 302A to determine the positions of people in the space.

FIG. 3U illustrates an embodiment of a block diagram of an example camera subsystem 242 from FIG. 2B. As seen in FIG. 3U, each camera 305 is operably coupled with a corresponding camera client 220. In the example of FIG. 3U, each of cameras 305a-305i is operably coupled with its corresponding camera client 220a-220i. Generally, cameras 305 and camera clients 220 are positioned above a space so that cameras 305 can capture overhead videos of portions of the space, and communicate those videos to their corresponding camera clients 220. Although in the illustrated example, the camera array 300 is shown with twelve cameras 305 operably coupled with a corresponding twelve camera clients 220, the camera subsystem 242 may include any number and combination of cameras 305 operably coupled with corresponding camera clients 220. Thus, camera subsystem 242 contemplates a one-to-one relationship between cameras 305 and camera clients 220, a one-to-many relationship between cameras 305 and camera clients 220, or a many-to-one relationship between cameras 305 and camera clients 220.

In one embodiment, in the camera subsystem 242, each camera client 220 may be positioned adjacent to its corresponding camera 305. With this method, the videos can be more easily synchronized due to less transmission time of the videos from cameras 305 to camera clients 220. Cameras 305 are communicatively coupled to their corresponding camera clients 220 using any suitable medium. For example, cameras 305 may be hardwired to camera clients 220. As another example, cameras 305 may wirelessly couple to camera clients 220 using any suitable wireless protocol (e.g., WiFi). Cameras 305 communicate captured videos through the communication medium to the camera clients 220.

The camera clients 220 are communicatively coupled to the cluster servers 248. The camera clients 220 are configured to process the videos (received from the cameras 305), generate, and communicate frames 314 and tracks 316 to the cluster servers 248. The operation of generating frames 314 and tracks 316 is described in the corresponding description of FIG. 3W. The cluster servers 248 store and maintain the frames 314 and tracks 316 using one or more labels or indexes associated with the frames and tracks 316. The cluster servers 248 store the frames 314 and tracks 316 such that they are retrievable using one or more of their corresponding labels. In one embodiment, the cluster servers 248 may store the frames 314 and tracks 316 separately from each other, for example, in different servers. In one embodiment, the cluster servers 248 may store the frames 314 and tracks 316 in the same server. The cluster servers 248 communicate a particular set of frames 314 to the camera server 225 upon receiving a request from the camera server 225 to send the particular set of frames 314 using one or more labels of the particular set of frames 314. Similarly, the cluster servers 248 communicate a particular set of tracks 316 to the camera server 225 upon receiving a request from the camera server 225 to send the particular set of tracks 316 using one or more labels of the particular set of tracks 316.

FIG. 3V illustrates an initialization of the camera subsystem 242. Generally, during the initialization, each camera 305 of the camera array 300 starts up and begins sending videos 302 to its corresponding camera client 220 from the camera client array 222. Additionally, camera clients 220 and camera server 225 synchronize internal clocks 304. After the cameras 305 in camera array 300 have started up and after the internal clocks 304 are synchronized, camera clients 220 may begin processing videos 302 and communicating data 312 to cluster servers 248 to store and maintain the received data 312. For example, data 312 may include frames 314. In another example, data 312 may include tracks 316. The cluster servers 248 may then forward the data 312 to the camera server 225 upon receiving a request to receive those data 312 to perform the tracking operations of the camera subsystem 202.

During the initialization, the camera clients 220 and the camera server 225 synchronize their internal clocks 30, similar to that described in FIG. 3F. The cameras 305 may power on and perform a startup sequence similar to that described in FIG. 3F. As seen in FIG. 3V, the first camera 305a sends videos 302a and 302b to the camera client 220a. Similarly, the second camera 305b sends videos 302c and 302d to the camera client 220b. Since in the illustrated embodiment, the camera clients 220 are migrated to be adjacent to the cameras 305, videos 302a-d travel a short distance to arrive at the camera clients 220. Thus, videos 302a-d are more easily synchronized to the actual time of capturing at the cameras 305. This reduces the synchronization complexity which, in turn, reduces the synchronization computation time, and provides a more seamless tracking process.

FIG. 3W illustrates an operational flow of generating frames 314 and tracks 316. In particular, FIG. 3W illustrates an operational flow of processing the frames 320 of videos 302 at the camera client 220, generating frames 314 from the color frames 364 and depth frames 366, communicating the frames 314 to a server (e.g., a first server) server from the cluster servers 248, generating tracks 316 from the depth frames 366, and communicating the tracks 316 to a server (e.g., a second server) from the cluster servers 248.

Figure 3X:
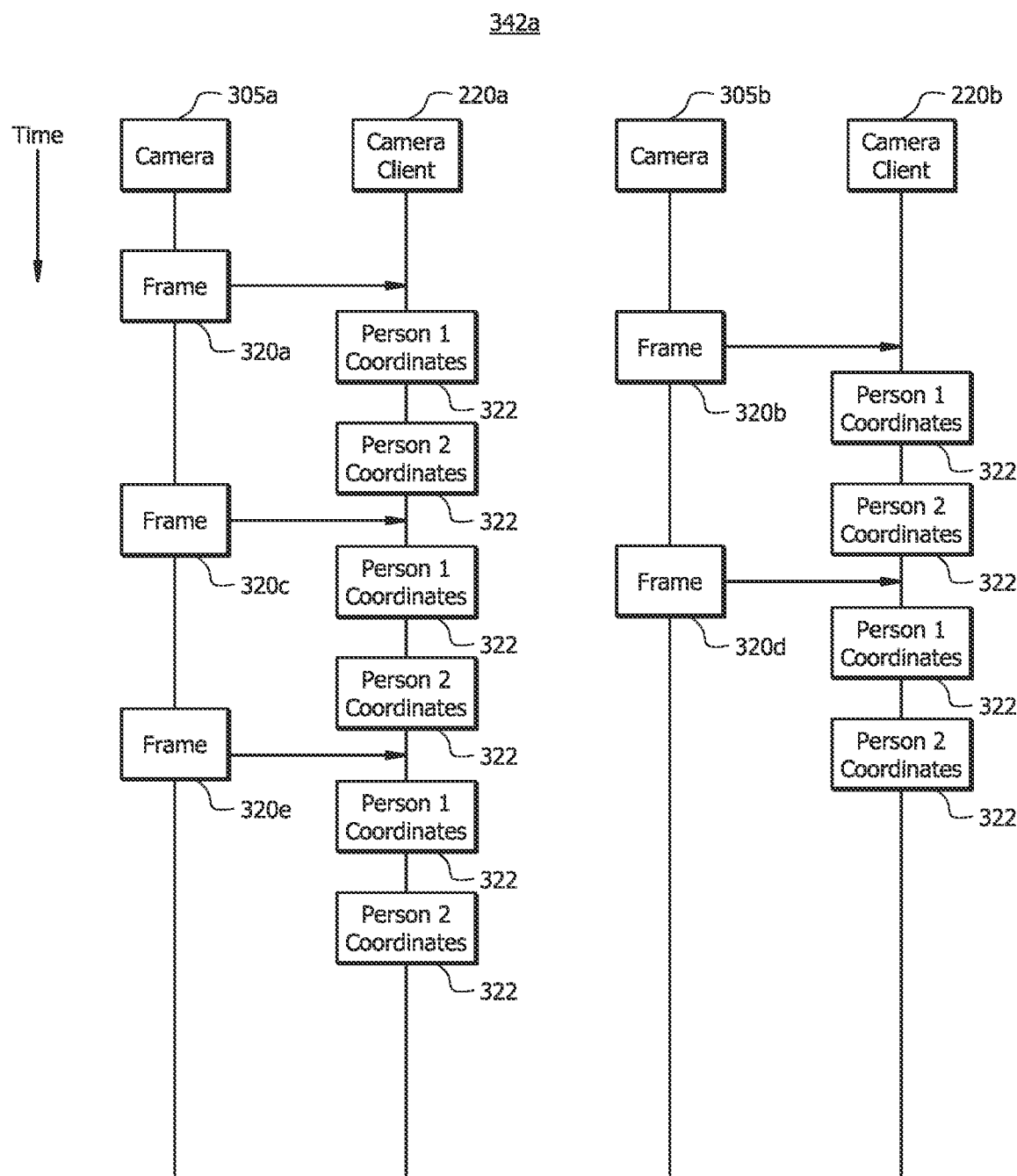

As seen in FIG. 3X, the operational flow begins when the camera 305 sends the frames 320 to the camera client 220 for processing. The camera 305 may routinely send a plurality of frames 320 to the camera client 220 according to the speed of the camera 305. For example, the camera 305 may send thirty Frames Per Second (FPS) or any other number of frames per second to the camera client 220. The frames 320 include color frames 364 and depth frames 366. Color frames 364 represent or correspond to visual colors of objects in the frames 320. Depth frames 366 represent or correspond to distances of objects in the frames 320 from the camera 305. For example, the depth frames 366 may represent three-dimensional point clouds corresponding to distances of objects in the frames 320 from the camera 305. The camera client 220 labels or indexes each corresponding color frame 364 and depth frame 366 with a timestamp 368 when they arrive at the camera client 220. The camera client 220 also labels or indexes the color frames 364 and depth frames 366 with a camera identifier 370 associated with the camera 305. The camera identifier 370 may be related to a position of the camera 305 in the store 100, for example, a region or a zone that is in the field-of-view of the camera 305. During the processing of color frames 364 and depth frames 366, the camera client 220 generates frames 314 and tracks 316.

Generating Frames 314

In one embodiment, for generating the frames 314, the camera client 220 may perform a compression step 372 on the color frames 364. Similarly, the camera client 220 may perform a compression step 372 on the depth frames 366. For example, the camera client 220 may individually compress each color frame 364 from the color frames 364. Similarly, the camera client 220 may individually compress each depth frame 366 from the depth frames 366. In other examples, the camera client 220 may compress any number of color frames 364 together. Similarly, the camera client 220 may compress any number of depth frames 366 together. In compressing the color frames 364, the camera client 220 may use any suitable compression technique. In one example, the camera client 220 may use a lossy compression where the size of the color frames 364 is reduced. In another example, the camera client 220 may use a lossless compression where the size of the color frames 364 remains the same. Similarly, in compressing the depth frames 366, the camera client 220 may use any compression technique, such as a lossy compression, a lossless compression, etc. In one embodiment, the camera client 220 may not compress one or more of the color frames 364 and depth frames 366.

The camera client 220 then performs a serialization step 374 on the color frames 364 and depth frames 366. In the serialization step 374, the color frames 364 and depth frames 366 are structured into a format that can be transmitted and reconstructed later. This allows for communicating the frames 314 between the camera client 220, the cluster servers 248, the camera server 225, and central server 240. In an example, the camera client 220 may serialize the color frames 364 and depth frames 366 using a Protocol Buffer (ProtoBuf) serialization technique. In this process, the color frames and depth frames may be structured or formatted into JavaScript Object Notation (JSON) dictionaries. In other examples, the camera client 220 may use any other serialization techniques.

After the serialization step 374, the camera client 220 sends the frames 314 to a first server of the cluster servers 248. The frames 314 include the color frames 364 and depth frames 366 labeled with their corresponding timestamps 368 and the camera identifier 370. With this method, each of the frames 314 can be referenced or queried using one or more of its corresponding labels, e.g., timestamps 368 and the camera identifier 370. Thus, the cluster servers 248 can communicate a particular set of frames 314 to the camera server 225 when the camera server 225 sends a request to the cluster servers 248 to communicate the particular set of frames 314 using one or more labels associated with the particular set of frames 314. In a particular example, the camera server 225 may send a request to the cluster servers 248 to send frames 314 from a first timestamp 368 to a second timestamp 368 (i.e., in a particular timestamp range) from the camera 305 with a particular identifier number 370. The camera server 225 may perform de-serialization to reconstruct the frames 314 for processing. The camera client 220 may routinely send the frames 314 to the first server from the cluster servers 248, for example, every second, every few seconds, or any other duration.

Generating Tracks 316

In one embodiment, the camera client 220 may asynchronously generate the tracks 316 with respect to generating the frames 314 discussed above. In this process, the camera client 220 performs a contour detection step 376 on each depth frame 366 and a tracking identification association step 390 for people detected in each depth frame 366. The contour detection step 376 and tracking identification association step 390 are described in detail in FIGS. 8-15. The corresponding description below includes a brief description of the contour detection step 376 and tracking identification association step 390. The contour detection step 376 begins when the camera client 220 detects one or more contours 378 associated with a person in a first depth frame 366

(assuming that the first depth frame 366 is showing the person). In one embodiment, the camera client 220 may detect a plurality of contours 378 associated with the person at different heights or depths corresponding to different distances from the camera 305. For example, the camera client 220 may clip the first depth frame 366 into different segments where each segment represents a different distance from the camera 305. In the illustrated example in FIG. 3W, the camera client 220 detects a contour 378a at a low depth 360a, a contour 378b at a medium depth 360b, and a contour 378c at a high depth 360c. In some embodiments, the camera client 220 may clip the depth frame 366 into any number of segments and detect any number of contours 378 associated with the person in the first depth frame 366. Each contour 378 is represented by pixel coordinates around the person. For each contour 378 associated with the person, the camera client 220 detects a bounding area 382 around the person in the first depth frame 366. The camera client 220 detects the bounding area 382 based on the pixel coordinates of the contour 378. See the corresponding descriptions of FIGS. 19-21 for further description of pixel coordinates of the contour 378.

In some embodiments, the camera client 220 generates a plurality of bounding areas 382 based on the pixel coordinates of each contour 378. For example, the camera client 220 generates the plurality of bounding areas 382 based on pixel coordinates of each contour 378 using a contour-based detection technique described in FIGS. 8-18. In the illustrated example in FIG. 3W, the camera client 220 may detect a plurality of bounding areas 382a for the contour 378a, a plurality of bounding areas 382b for the contour 378b, and a plurality of bounding areas 382c for the contour 378c. The camera client 220 then performs a non-maximum suppression 384 on each of the plurality for bounding areas 382a, 328b, and 382c to suppress one or more bounding areas 382 that are overlapped with other bounding areas 382 below a threshold area. See the corresponding description of the non-maximum suppression 384 in FIGS. 11 and 12.

In brief, for example, the camera client 220 calculates a score for each bounding area 382. The score, for example, may represent an extent to which that bounding area 382 is similar to or correspond to the other bounding areas 382. For example, in the cases of performing the non-maximum suppression 384 on the plurality of bounding areas 382a, assume that the camera client 220 is determining whether a first bounding area 382 from the plurality of bounding areas 382a is similar to a second bounding area 382 from the plurality of bounding areas 382a. In this process, 382 may use one or more metrics including: 1) an overlapping region between the first bounding area 382 and the second bounding area 382, 2) a ratio of intersection over union region between the first bounding area 382 and the second bounding area 382, and 3) a distance between the center of the first bounding area 382 and the center of the second bounding area 382. If the camera client 220 determines that 1) the overlapping region between the first bounding area 382 and the second bounding area 382 is above a threshold region, 2) the ratio of intersection over union region between the first bounding area 382 and the second bounding area 382 is above a threshold value, and 3) the distance between the center of the first bounding area 382 and the center of the second bounding area 382 is below a threshold distance, the camera client 220 determines that the second bounding area 382 is similar to or correspond to the first bounding area 382. The camera client 220 may use these metrics to calculate a score for each bounding area 382.

Thus, the camera client 220 may identify a subset of the bounding areas 382 with a score that is greater than a threshold value (e.g., 80%), and determine a region based on this identified subset. For example, the region may be the bounding area 382 with the highest score or a combined bounding areas 382 comprising regions shared by bounding areas 382 with a score that is above the threshold value. The camera client 220, based on the bounding areas 382, detects coordinates or pixel coordinates of the person in the first depth frame 366. The pixel coordinates of the person generally refer to the location of the person (i.e., row and column) in the depth frame 366. Likewise, the camera client 220 may perform the non-maximum suppression 384 on the plurality of bounding areas 382b associated with contours 378b, and the plurality of bounding areas 382c associated with contours 378c.

After performing the non-maximum suppression 384, the camera client 220 associates a first tracking identification 386 to the person in the tracking identification association step 390, where the first tracking identification 386 is linked to historical detections 388 associated with the person. The historical detections 388 associated with the person may include one or more of the bounding areas 382 detected at different depths 380, contours 378, segmentation masks, etc. The camera client 220 determines the first tracking identification 386 for the person that is the best match based on the historical detections 388 associated with the person. For example, the historical detections 388 associated with the person may include one or more of bounding areas 382, contours 378, and segmentation masks in previous depth frames 366 that show that person. The first tracking identification 386 may be referred to as a local tracking identification 386 associated with the person in the first depth frame 366. The first local tracking identification 386 may serve as a hint to the camera server 225 to determine a global tracking identification 386 for the person in the store 100. In other words, the camera server 225 may or may not use the first local tracking identification 386 to determine the global tracking identification 386 for the person.

The camera client 220 then performs a serialization step 372 on the identified bounding areas 382, historical detections 388, and the first tracking identification 386. For example, in the serialization step 372, the metadata describing the identified bounding areas 382, historical detections 388, and the first tracking identifications 386 are structured into a format that can be transmitted and reconstructed later. This process may be similar to that described above with respect to the serialization step 372 in generating the frames 314. The camera client 220 then sends the tracks 316 to a second server from the cluster servers 248.

In one embodiment, the frames 314 and tracks 316 may have a one-to-one correlation to each other. As such, if a track 316 generated from a particular depth frame 366 is empty (meaning no person was detected in that depth frame 366), the empty track 316 may be sent to the cluster servers 248 so that a record of the empty track 316 is recorded at the cluster servers 248.

The tracks 316 include metadata describing the historical detections 388 associated with the person and the tracking identifications 386. The tracks 316 are labeled with their corresponding timestamps 368, the camera identifier number 370, historical detections 388 (e.g., bounding areas 382, contours 378, segmentation masks, etc.), tracking identifications 386, among others. Thus, each of the tracks 316 can be referenced or queried using one or more of its corresponding labels.

Thus, the cluster servers 248 can communicate a particular set of tracks 316 to the camera server 225 when the camera server 225 sends a request to the cluster servers 248 to communicate the particular set of tracks 316 using one or more labels associated with the particular set of tracks 316. The camera server 225 may perform de-serialization to reconstruct the tracks 316 for processing. In a particular example, the camera server 225 may send a request to the cluster servers 248 to send tracks 316 from a first timestamp 368 to a second timestamp 368 (i.e., a timestamp range) from the camera 305 with a particular identifier number 370.

Similarly, the camera client 220 can determine a second tracking identification 386 for the person in a second depth frame 366 based on historical detections 388 associated with the person. The camera server 225 can determine the global tracking identification 386 associated with the person from the first and second tracking identifications 386. For example, the camera server 225 can determine the global tracking identification 386 for the person by comparing historical detections 388 (e.g., bounding areas 382) associated with those people in the first and second tracks 316. For example, if bounding areas 382 of a person in the first and second tracks 316 are similar or correspond to each other, the camera server 265 determines that the global tracking identification 386 for that person is the same as the first or second local tracking identification 386.

The camera server 236 determines that the bounding areas 382 of the person in the first and second tracks 316 are similar to each other using one or more metrics including: 1) an overlapping region between the bounding areas 382 in the first and second tracks 316, 2) a ratio of intersection over union region between the bounding areas 382 in the first and second tracks 316, and 3) a distance between the centers of the bounding areas 382 in the first and second tracks 316. If the camera client 220 determines that 1) the overlapping region bounding areas 382 is above a threshold region, 2) the ratio of intersection over union region between bounding areas 382 is above a threshold value, and 3) the distance between the centers of the bounding areas 382 is below a threshold distance, the camera client 220 determines that the bounding areas 382 associated with the person in the first and second tracks 316 are similar to each other. The camera server 225 then can determine a global position of the person in the store 100 using the coordinates of the historical detections 388 (e.g., bounding areas 382) associated with the person.

7. Example Method

Figure 3Y:
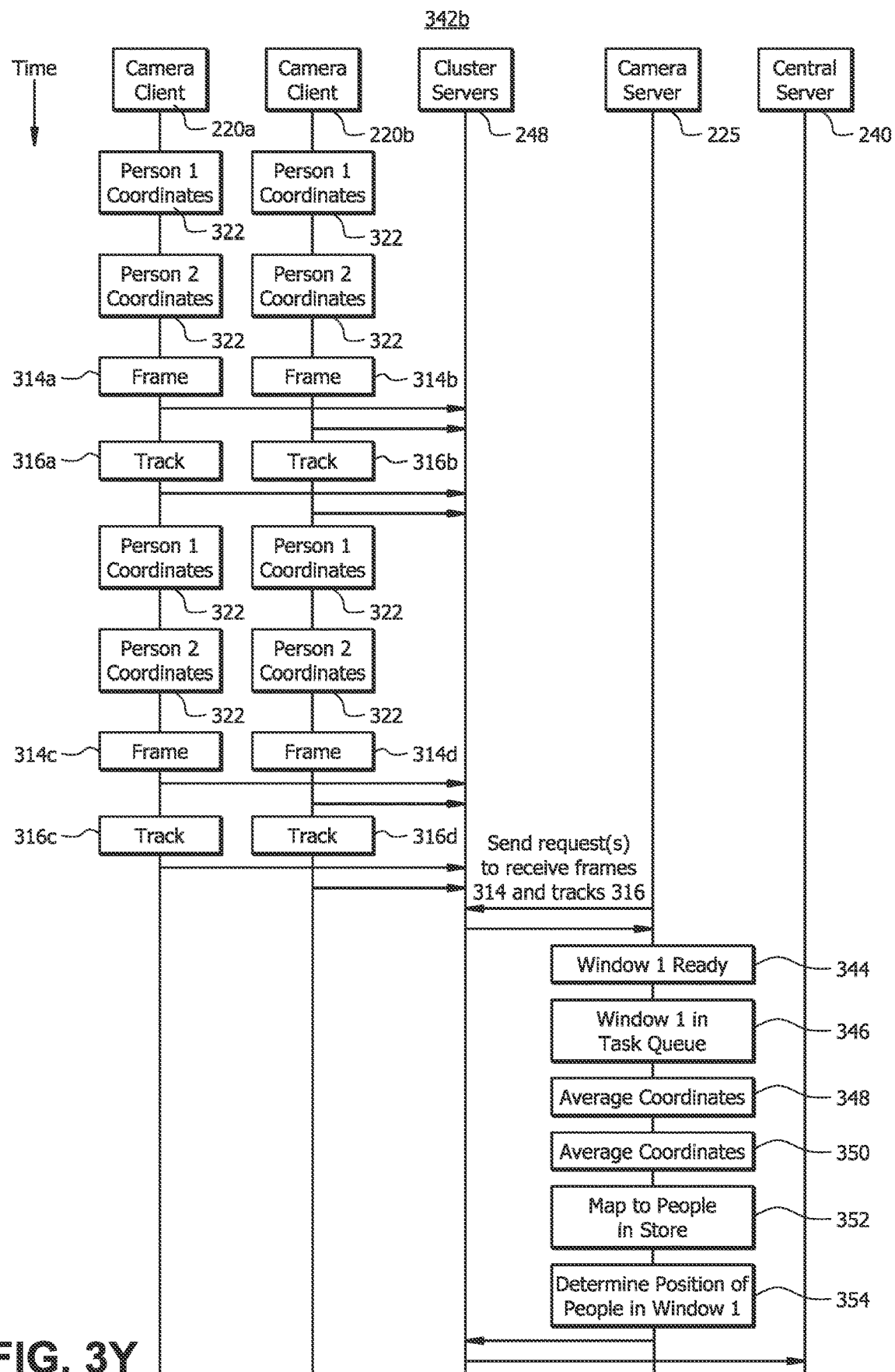

FIGS. 3X and 3Y illustrate flowcharts of an example method 342 of operating the camera subsystem 242. In particular embodiments, various components of the camera subsystem 242 perform the steps of method 342. Generally, by performing method 342, the camera subsystem 202 determines the physical positions of people or objects within a space. FIG. 3X illustrates a first portion of the method 342 (i.e., method 342a); and FIG. 3Y illustrates a second portion of the method 342 (i.e., method 342b).

As seen in FIG. 3X, method 342a begins with camera 305a generating and communicating frames 320a, 320c, 320e to camera client 220a, and camera 305b generating and communicating frames 320b and 320d to camera client 220b. The frames 320a, 320c, 320e may be generated and sequentially communicated to camera client 220a, and frames 320b and 320d may be generated and sequentially communicated to camera client 220b. The frames 320a-320e may include color frames 364 and depth frames 366 as described in FIG. 3W. From each of frames 320a, 320c, 320e, the camera client 220a detects coordinates 322 for two people shown in depth frames 366 related to the frames 320a, 320c, 320e. Similarly, camera client 220b detects coordinates 322 for two people shown depth frames 366 related to the frames 320b and 320d. These coordinates 322 may define bounding areas 382 around those people. As further seen in FIG. 3X, the frames 320a-320e from cameras 305a and 305b may not necessarily be generated and communicated simultaneously or synchronously. Additionally, coordinates 322 for people detected in frames 320a-320e may not necessarily be generated simultaneously or synchronously in camera clients 220a and 220b.

FIG. 3Y illustrates an example flowchart for the method 342b which continues from method 342a of FIG. 3X. As seen in FIG. 3Y, camera client 220a generates a frame 314a from color frame 364 and depth frame 366 associated with frame 320a, similar to that described in FIG. 3W. Camera client 220a communicates frame 314a to a server (e.g., a first server) from the cluster servers 248.

The camera client 220a also generates a track 316a from the depth frame 366 associated with frame 320a, similar to that described in FIG. 3W. Camera client 220a communicates track 316a to a server (e.g., a second server) from the cluster servers 248. Likewise, camera client 220b generates a frame 314b from color frame 364 and depth frame 366 associated with frame 320b, and a track 316b from the depth frame 366 associated with frame 320b, similar to that described in FIG. 3W. Camera client 220b communicates the frame 314b to a server (e.g., the first server) from the cluster servers 248. Asynchronously, camera client 220b communicates the track 316b to a server (e.g., the second server) from the cluster servers 248.

Camera client 220a generates additional frame 314c and track 316c from the color frame 364 and depth frame 366 associated with frame 320c, and communicates the frame 314c and track 316c to the first and second server from the cluster servers 248, respectively. Likewise, camera client 220b generates additional frame 314d and track 316d from the color frame 364 and depth frame 366 associated with frame 320d, and communicates the frame 314d and track 316d to the first and second server from the cluster servers 248, respectively.

Cluster servers 248 store and maintain the frames 314 such that each of the frames 314 is retrievable using one or more of its corresponding labels similar to that described in FIG. 3W. Similarly, the cluster servers 248 store and maintain the tracks 316 such that each of the tracks 316 is retrievable using one or more of its corresponding labels similar to that described in FIG. 3W.

Camera server 225 sends a request to the cluster servers 248 to receive the frames 314a-314d using one or more of their corresponding labels, e.g., a timestamp range 368, a camera identifier 370, etc., similar to that described in FIG. 3W. For example, the camera server 225 may send a request to the cluster servers 248 to receive frames 314 from cameras with particular camera identifiers 370 (e.g., cameras 305a and 305b) within a timestamp range 368.

Camera server 225 may also send a request to the cluster servers 248 to receive the tracks 316a-316d using one or more of their corresponding labels, e.g., a timestamp range 368, a camera identifier 370, historical detections 388 (e.g., bounding areas, contours, segmentation masks, etc.), tracking identifications 386, etc., similar to that described in FIG. 3W. For example, the camera server 225 may send a request to the cluster servers 248 to receive tracks 316 from cameras with particular camera identifiers 370 (e.g., cameras 305a and 305b) within a timestamp range 368.

As such, the camera server 225 may send separate requests to receive the frames 314a-314d and tracks 316a-316d. In one embodiment, the camera server 225 may send a request to receive 1) the frames 314a-314d using one or more of their corresponding labels associated with the frames 314a-314d and 2) the tracks 316a-316d using one or more of their corresponding labels associated with the tracks 316a-316d. When the camera server 225 receives the frames 314 and tracks 316, it may assign the frames 314 and tracks 316 to a first time window 332 similar to that described in FIGS. 3J-3P.

Since the frames 314 can be referenced using one or more of their corresponding labels, the camera server 225 can query the cluster servers 248 to return a particular frame 314 that was generated in the first time window 332 but was not received by the processing time of the first time window 332. Similarly, since the tracks 316 can be referenced using one or more of their corresponding labels, the camera server 225 can query the cluster servers 248 to return a particular track 316 that was generated in the first time window 332 but was not received by the processing time of the first time window 332. For example, assume that track 316d was not sent to the cluster servers 248 in time for processing the first time window 332, thus when the camera server 225 started processing the first time window 332, the track 316d was not available for processing at the camera server 225. However, since the track 316d was timestamped within the first time window 332, the camera server 225 can reference back in time and process the track 316d in the first time window 332. The same applies if any track 316 and/or frame 314 were/was not received at the cluster servers 248 in time for processing the first time window 332.

Camera server 225 may determine that the first time window 332 is ready for processing in step 344 and, in response, place the frames 314 and tracks 316 in the first time window 332 into a task queue 336 in step 346, similar to that described in FIG. 3R. Camera server 225 may then combine or cluster the coordinates 322 in the first time window 332 to determine combined coordinates 322 in step 348. For example, camera server 225 may average the coordinates 322 in the first time window 332 to determine combined coordinates 322 for the people detected by the different cameras 305 during the first time window 332. Camera server 225 may then map the people detected by the different cameras 305 to people in the space in step 350. Camera server 225 may then determine the positions of the people during the first time window 332 in step 352.

In one embodiment, a position of a person during the first time window 332 is determined based on point clouds representing a three-dimensional space. For example, the point clouds representing the three-dimensional space may be generated by at least one camera client 220 based on a coordinate 322 of the person detected in at least one depth frame 366. In another example, the point clouds representing the three-dimensional space may be generated by at least one radio detection and ranging (RADAR) sensor based on a coordinate 322 of the person detected by the RADAR sensor. In another example, the point clouds representing the three-dimensional space may be generated by at least one LiDAR sensor 210 based on a coordinate 322 of the person detected by the LiDAR sensor 210 (see FIG. 2B). Camera server 225 communicates the determined positions to the cluster servers 248.

Central server 240 may send a request to the cluster servers 248 to send the determined positions of the people during the first time window 332 in order to determine whether those people have picked up any item during the first time window 332. This process is described in more detail in corresponding descriptions of FIGS. 6A-6C.

Modifications, additions, or omissions may be made to method 342a-b depicted in FIGS. 3X and 3Y. Method 342a-b may include more, fewer, or other steps. For example, steps may be performed in parallel or in any suitable order. While discussed as particular components of camera subsystem 242 performing the steps, any suitable component of camera subsystem 242 may perform one or more steps of the method.

III. Light Detection and Ranging (LiDAR) Subsystem

Certain embodiments of tracking system 132 include a LiDAR subsystem 204. FIGS. 4A-4D show the LiDAR subsystem 204 and its operation within tracking system 132. Generally, LiDAR subsystem 204 uses LiDAR sensors and a LiDAR server to track the positions of people and/or objects within a physical space. LiDAR subsystem 204 may be used on its own or in conjunction with other subsystems (e.g., camera subsystem 202) to track the positions of people and/or objects in the space.

Figure 4A:
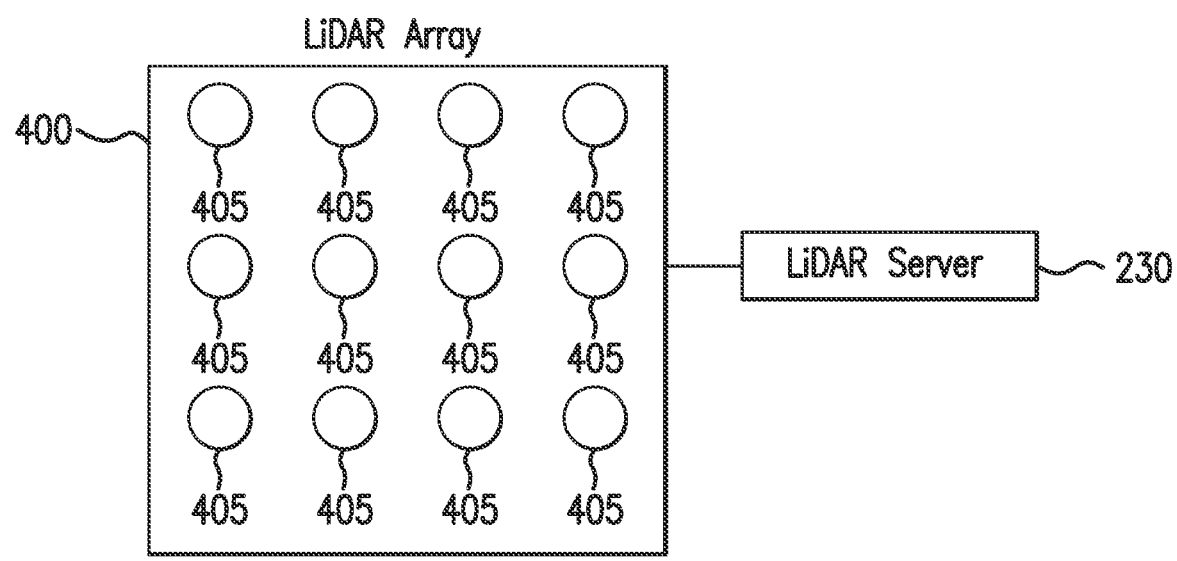

FIG. 4A shows an example LiDAR subsystem 204. As seen in FIG. 4A, LiDAR subsystem 204 includes a LiDAR array 400 and a LiDAR server 230. Generally, LiDAR sensors 405 in LiDAR array 400 detect the presence of people and/or objects within a space and determine coordinates for these people and/or objects. LiDAR server 230 processes these coordinates to determine the physical positions of the people and/or objects in the space.

LiDAR array 400 is an array of LiDAR sensors 405. LiDAR array 400 may be positioned above a physical space to detect the presence and positions of people and/or objects within the space. In the example of FIG. 4A, LiDAR array 400 is a 3×4 array of LiDAR sensors 405. LiDAR array 400 includes any suitable number of LiDAR sensors 405 arranged in an array of any suitable dimensions.

Each LiDAR sensor 405 detects the presence of people and/or objects within a portion of the physical space. Generally, LiDAR sensors 405 emit light pulses into the space. These light pulses are reflected back towards the LiDAR sensors 405 when the light pulses contact people and/or objects in the space. The LiDAR sensor 405 tracks characteristics of the reflected light pulses, such as the return times of the light pulses and the wavelength of the return light pulses, to detect the presence of people and/or objects within the physical space. LiDAR sensors 405 may also determine coordinates for the detected people and/or objects. LiDAR sensors 405 communicate the coordinates for the detected people and/or objects to LiDAR server 230.

LiDAR sensors 405 may be communicatively coupled to LiDAR server 230 in any suitable manner. For example, LiDAR sensors 405 may be hardwired to LiDAR server 230. As another example, LiDAR sensors 405 may wirelessly couple to LiDAR server 230 using any suitable wireless standard (e.g., WiFi). LiDAR sensors 405 communicate coordinates for detected people and/or objects through the communication medium to LiDAR server 230.

Figure 4B:
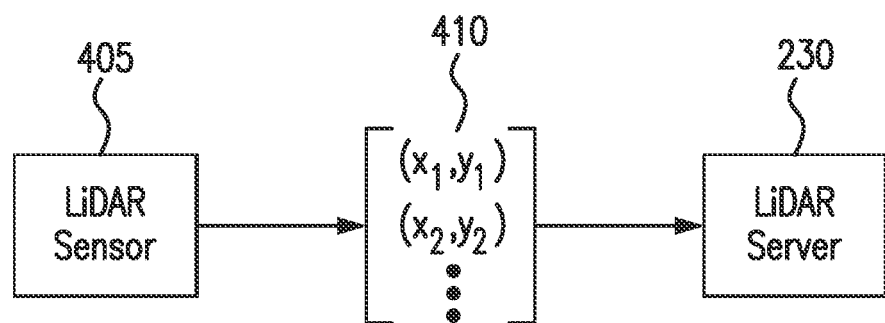

FIG. 4B shows a LiDAR sensor 405 communicating coordinates 410 to LiDAR server 230. Generally, LiDAR sensor 405 analyzes characteristics of reflected light pulses to determine the coordinates 410 of people and/or objects within the space. LiDAR sensor 405 communicates these coordinates 410 to LiDAR server 230 for further processing.

In the example of FIG. 4B, LiDAR sensor 405 detects coordinates 410 for at least two people and/or objects in the space. The coordinates 410 for these people and/or objects are $(x_1, y_1)$ and $(x_2, y_2)$. LiDAR sensor 405 communicates these coordinates 410 to LiDAR server 230 for further processing.

FIG. 4C illustrates the general operation of LiDAR server 230. As seen in FIG. 4C, LiDAR server 230 processes coordinates 410 received from the LiDAR sensors 405. LiDAR server 230 assigns coordinates 410 to time windows 332 in a similar manner as camera server 225 assigns frame data 330 to time windows 332. For example, LiDAR server 230 may assign coordinates 410 to particular time windows 332 based on the time that LiDAR server 230 received the coordinates 410 from LiDAR sensor 405.

LiDAR server 230 may process the coordinates 410 assigned to a time window 332 to determine the physical position of people and/or objects within the space. In the example of FIG. 4C, LiDAR server 230 receives coordinates 410 for two people from two different LiDAR sensors 405. One LiDAR sensor 405 provides coordinates 410 $(x_1, y_1)$ and $(x_2, y_2)$ for the two people, respectively. Another LiDAR sensor 405 provides coordinates 410 $(x_1, y_1)$ and $(x_2, y_2)$ for the same two people, respectively. As with camera client 220 and camera server 225, the subscripts on these coordinates 410 are not meant to indicate that these coordinates 410 have the same value, but, rather, that these are the first and second coordinates 410 provided by a particular LiDAR sensor 405.

LiDAR server 230 uses these coordinates 410 to determine the physical position of people within the space. As with the camera server 225, LiDAR server 230 may determine that the coordinates 410 provided by two different LiDAR sensors 405 correspond to the same person within the physical space. In response, LiDAR server 230 may take these coordinates 410 and use homography to determine a position of the person within the physical space in a particular time window 332. In the example of FIG. 4C, LiDAR server 230 uses coordinates 410 to determine the position of a first person during the time window 332 to be $(x_3, y_3)$. LiDAR server 230 also uses coordinates 410 to determine the physical position of a second person during the time window 332 to be $(x_4, y_4)$. LiDAR server 230 communicates these physical positions to central server 240 for further processing.

Figure 4D:
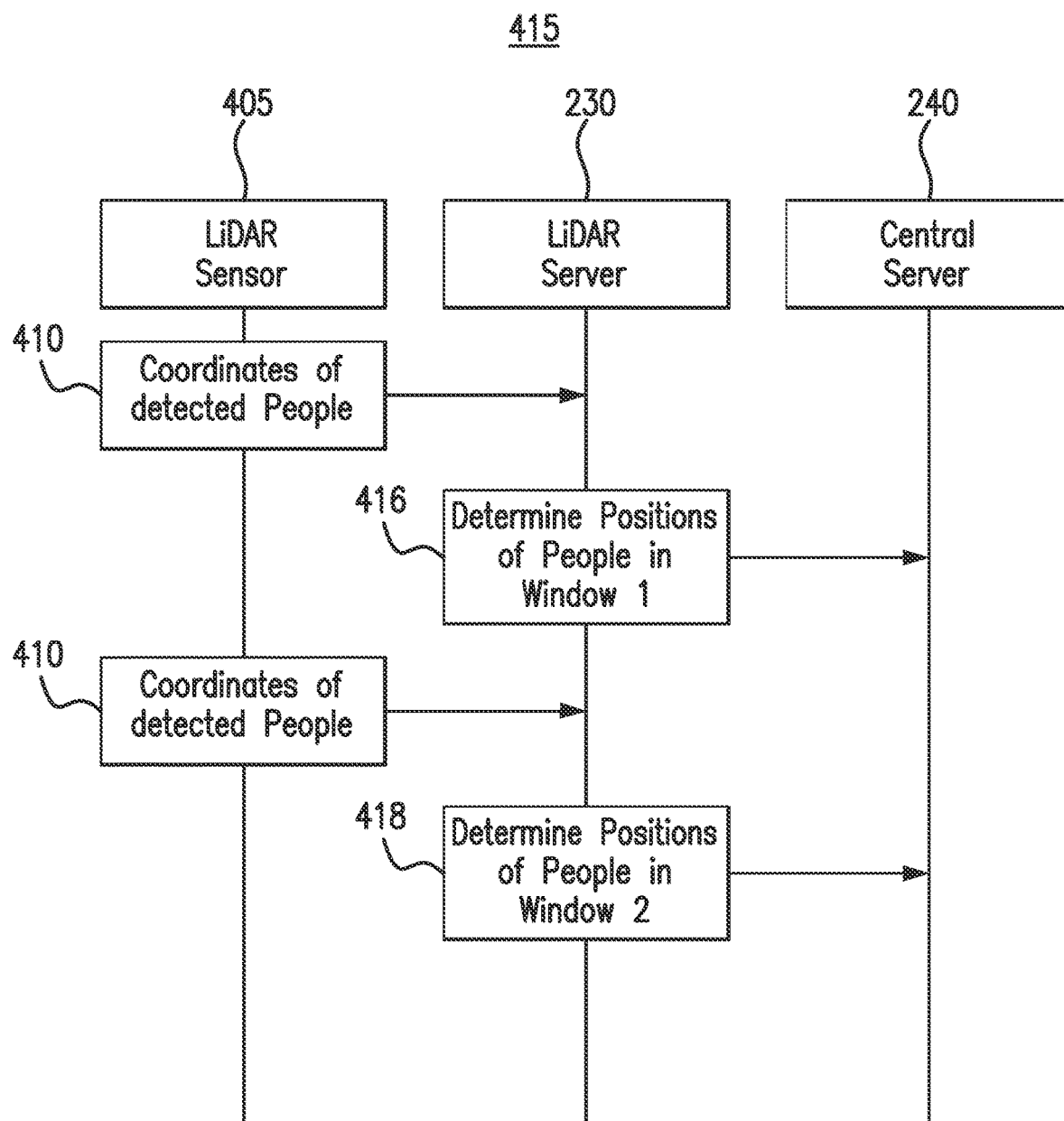

FIG. 4D shows a method 415 for the operation of the LiDAR subsystem 204 in the tracking system 132. Generally, LiDAR subsystem 204 performs method 415 to determine the positions of people and/or objects within a physical space.

LiDAR sensor 405 determines coordinates 410 of detected people and communicates these coordinates 410 to LiDAR server 230. LiDAR sensor 405 may determine these coordinates 410 by emitting a light pulse and analyzing characteristics of the light pulse when that light pulse is reflected back to LiDAR sensor 405. For example, LiDAR sensor 405 may analyze the return time of the reflected light pulse and/or the wavelength of the reflected light pulse to determine whether a person is present in the physical space and the coordinates 410 of that person.

LiDAR server 230 analyzes the coordinates 410 from LiDAR sensor 405 to determine the positions of people within the physical space during a first time window 332 in step 416. LiDAR server 230 then communicates these positions to central server 240. LiDAR sensor 405 may subsequently determine the coordinates 410 of detected people and communicate these coordinates 410 to LiDAR server 230. LiDAR server 230 may again determine the positions of these people in a subsequent time window 332 and communicate these positions to central server 240 in step 418.

As with the camera subsystems 202, central server 240 may use these positions to determine which person removed an item 130 from the space during the particular time window 332. The operation of central server 240 will be described in more detail using FIG. 6A through FIG. 6C.

Modifications, additions, or omissions may be made to method 415 depicted in FIG. 4D. Method 415 may include more, fewer, or other steps. For example, steps may be performed in parallel or in any suitable order. While discussed as components of LiDAR subsystem 204 performing the steps, any suitable component of tracking system 132, such as central server 240 for example, may perform one or more steps of the method.

IV. Weight Subsystem

Tracking system 132 includes a weight subsystem 206 that includes weight sensors 215 and weight server 235. Generally, weight sensors 215 detect the weights of items positioned above or near the weight sensors 215. The weight sensors 215 may be positioned on an unconventional rack 115 that holds items. Weight server 235 tracks the weights detected by weight sensors 215 to determine if and when items 130 are removed from the rack 115. The weight sensors 215, rack 115, and weight server 235 will be described in more detail using FIGS. 5A-5J.

Figure 5A:
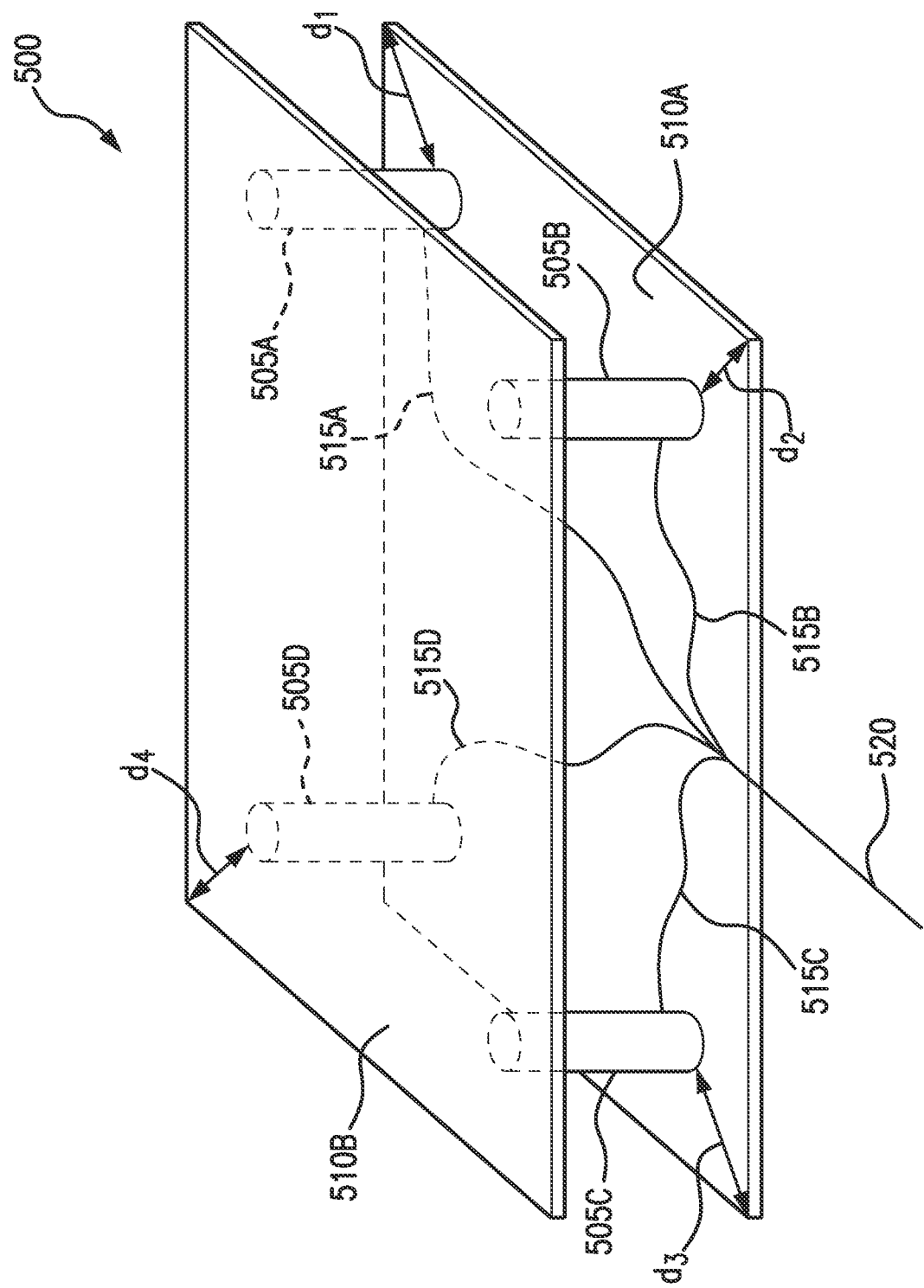
FIGS. 5A-5J illustrate an example weight subsystem and its operation in the tracking system.

FIG. 5A illustrates an example weight sensor 500 of weight subsystem 206. As seen in FIG. 5A, weight sensor 500 includes plates 510A and 510B, load cells 505A, 505B, 505C, and 505D, and wires 515A, 515B, 515C, 515D, and 520. Generally the components of weight sensor 500 are assembled so that weight sensor 500 can detect a weight of items 130 positioned above or near weight sensor 500.

Plates 510 form surfaces that distribute the weight of items 130 across the surfaces. Plates 510 may be made of any suitable material, such as, for example, metal and/or plastic. Items 130 may be positioned above or near plates 510 and the weight of these items 130 may be distributed across plates 510.

Load cells 505 are positioned between plates 510A and 510B. Load cells 505 produce electrical signals based on the weight experienced by the load cells 505. For example, load cells 505 may be transducers that converts an input mechanical force (e.g., weight, tension, compression, pressure, or torque) into an output electrical signal (e.g., current or voltage). As the input force increases, the output electrical signal may increase proportionally. Load cells 505 may be any suitable type of load cell (e.g., hydraulic, pneumatic, and strain gauge). Although load cells 1310 are illustrated as being cylindrical in shape, they may be any suitable size and shape that is appropriate for the particular implementation contemplated.

The signals from load cells 505 may be analyzed to determine an overall weight of items 130 positioned above or near weight sensor 500. Load cells 505 may be positioned such that the weight of items 130 positioned above or near weight sensor 500 is evenly distributed to each load cell 505. In the example of FIG. 5A, load cells 505 are positioned substantially equidistant from corners of plates 510A and 510B. For example, load cell 505A is positioned a distance d1 from a corner of plates 510A and 510B. Load cell 505B is positioned a distance d2 from a corner of plates 510A and 510B. Load cell 505C is positioned a distance d3 from a corner of plates 510A and 510B. Load cell 505D is positioned a distance d4 from a corner of plates 510A and 510B. Distances d1, d2, d3 and d4 may be substantially equal to each other. This disclosure contemplates distances differing by 5 to 10 millimeters and still being considered substantially equal to each other. By positioning load cells 505 substantially equal distances from corners of plates 510A and 510B, the weight of items positioned above or near weight sensor 500 is evenly distributed across the load cells 505. As a result, the total weight of items positioned above or near weight sensor 500 can be determined by summing the weights experienced by the individual load cells 505.

Load cells 505 communicate electric signals that indicate a weight experienced by the load cells 505. For example, the load cells 505 may produce an electric current that varies depending on the weight or force experienced by the load cells 505. Each load cell 505 is coupled to a wire 515 that carries the electric signal. In the example of FIG. 5A, load cell 505A is coupled to wire 515A; load cell 505B is coupled to wire 515B; load cell 505C is coupled to wire 515C; and load cell 505D is coupled to wire 515D. Wires 515 are grouped together to form wire 520 that extends away from weight sensor 500. Wire 520 carries the electric signals produced by load cells 505 to a circuit board that communicates the signals to weight server 235.

Figure 5B:
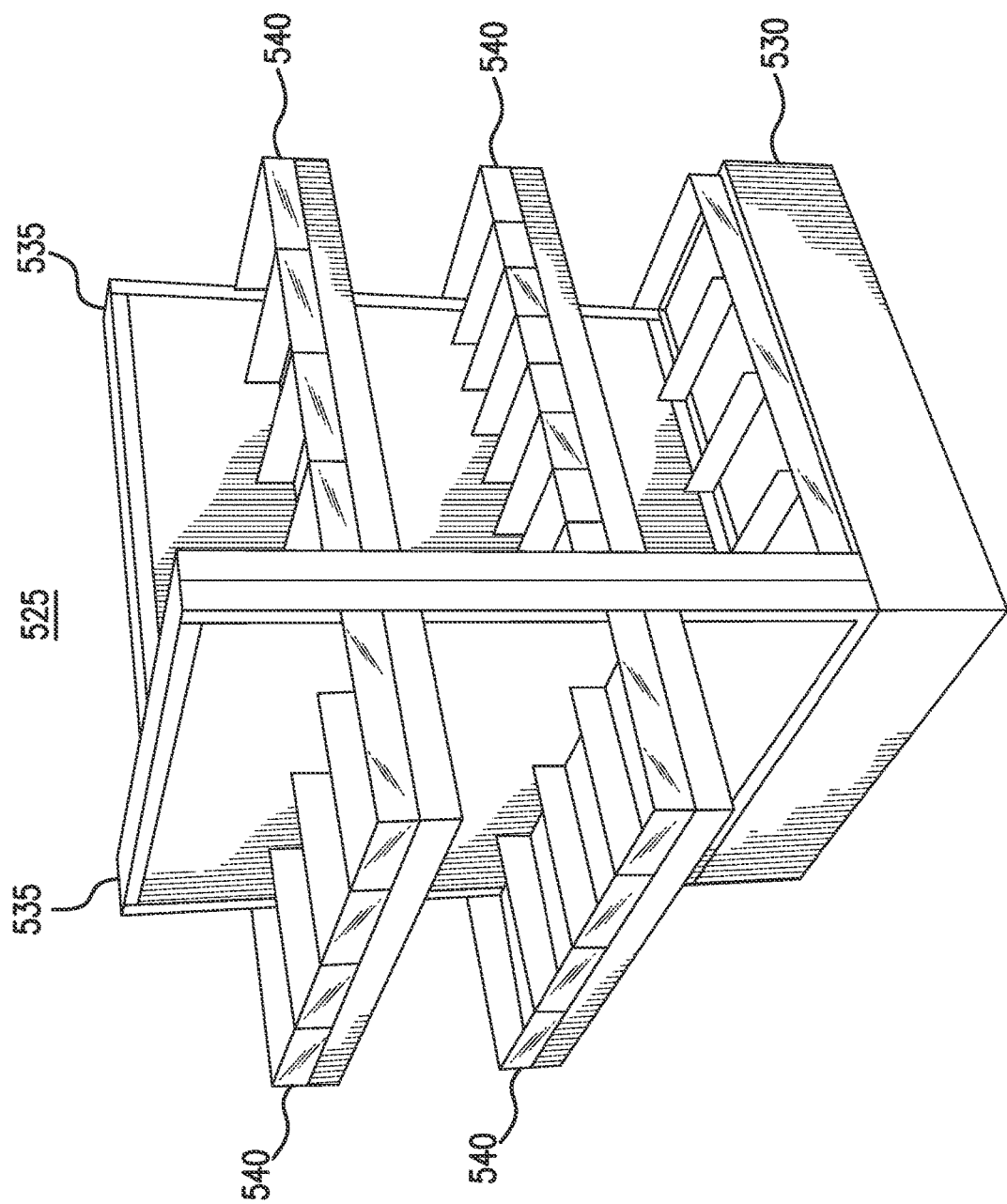

Weight sensor 500 may be disposed in an unconventional rack 115 designed to hold items. FIG. 5B shows an example rack 525. As seen in FIG. 5B, rack 525 includes a base 530, one or more panels 535, and one or more shelves 540. Generally, base 530 is at the bottom of rack 525 and forms a foundation for the other components of rack 525. Panels 535 extend vertically upwards from base 530. Shelves 540 couples to panels 535 and/or base 530. For example, two shelves 540 may couple to a panel 535 and extend away from panel 535. Generally, panels 535 and base 530 allow shelves 540 to hold the weight of items positioned on shelves 540. Weight sensors 500 may be disposed within shelves 540 to detect the weight of items positioned on shelf 540.

Figure 5C:
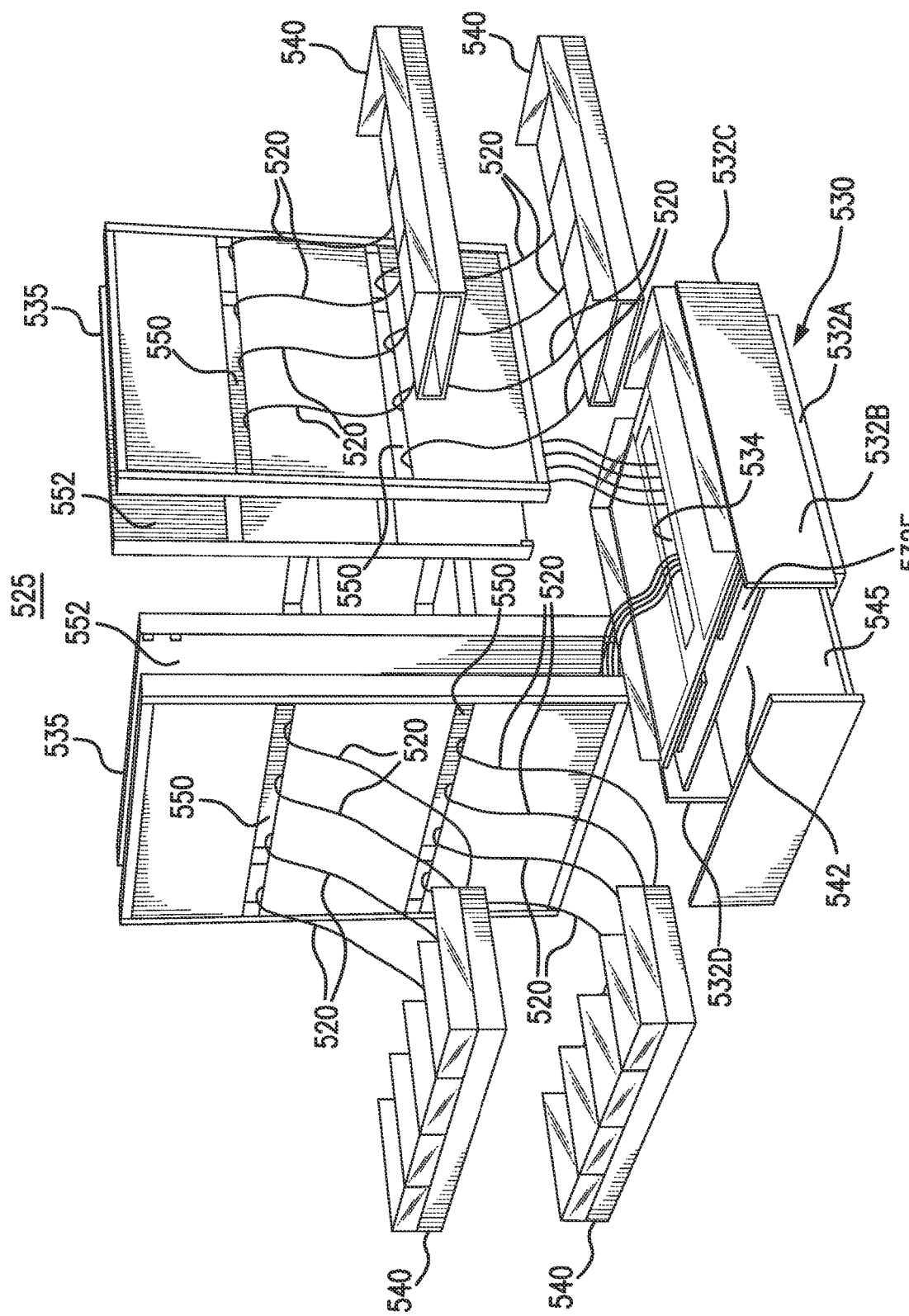

FIG. 5C shows an exploded view of rack 525. As seen in FIG. 5C, base 530 is formed using several surfaces 532. Surface 532A forms a bottom surface of base 530. Surfaces 532B and 532D form the sides of base 530. Surface 532C forms a back surface of base 530. Surface 532E forms a top surface of base 530. This disclosure contemplates base 530 being formed using any suitable materials such as, for example, wood, metal, glass, and/or plastic. Surface 532A may be coupled to surfaces 532B, 532C, and 532D. Surface 532B may be coupled to surfaces 532A, 532E, and 532C. Surface 532C may be coupled to surfaces 532A, 532B, 532D, and 532E. Surface 532D may be coupled to surfaces 532A, 532C, and 532E. Surface 532E may be coupled to surfaces 532B, 532C, and 532D. Surfaces 532B, 532C, and 532D extend upwards from surface 532A. Generally, surfaces 532A, 532B, 532C, 532D, and 532E form a box structure around a space 542. Base 530 includes a drawer 545 that can open to allow access into that space 542. Drawer 545 is positioned within the space 542. When drawer 545 is closed, base 530 may form an enclosure around the space 542. When drawer 545 is open, access to the space 542 may be provided through the open drawer 545. In certain embodiments, a door may be used to provide access to space 542 rather than drawer 545.

Surface 532E defines a cavity 534 that also allows access into the space 542. Generally, cavity 534 allows wires 520 from weight sensors 500 to extend into the space 542.

Panels 535 extend upwards from base 530. Panels 535 may be formed using any suitable materials, such as for example, wood, metal, and/or plastic. As seen in FIG. 5C, panels 535 define one or more cavities 550 that extend along the width of panels 535. Cavities 550 allow wires 520 from weight sensors 500 to extend into a space 552 defined by panels 535. Generally, space 552 is a hollow interior of panel 535. Wires 520 extend through cavity 550 and down space 552 towards cavity 534. In this manner, wires 520 may be run from weight sensors 500 down to space 542 in base 530. Each cavity 550 may correspond to a shelf 540 that couples to panel 535.

Each shelf 540 couples to panel 535 and/or base 530. Weight sensors 500 are disposed in the shelf 540. A shelf 540 may couple to panel 535 such that the wires 520 of the weight sensors 500 disposed in the shelf 540 can run from the weight sensors 500 through a cavity 550 into space 552. These wires 520 then run down space 552 and through cavity 534 into space 542.

Figure 5D:
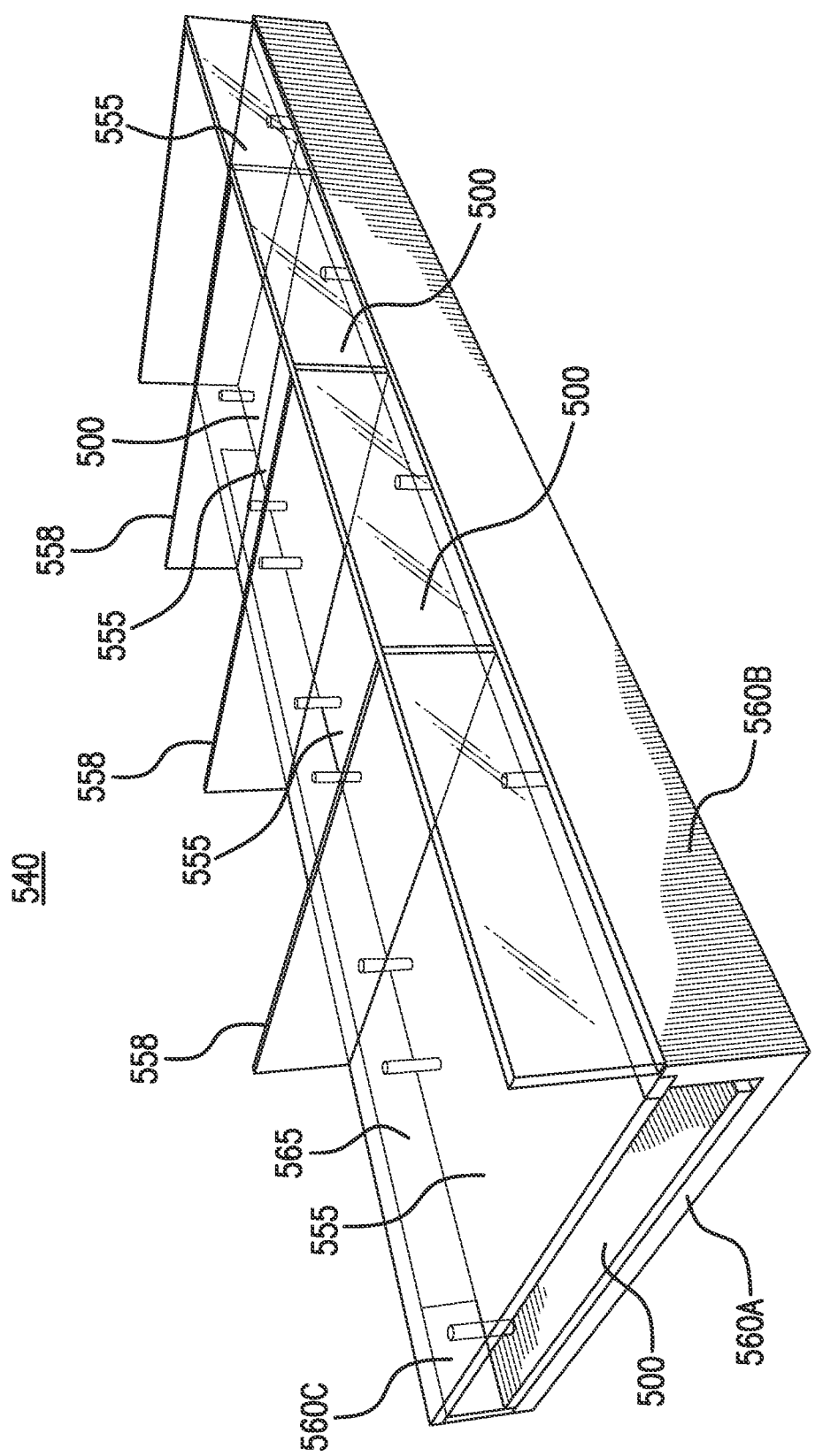
Figure 5E:
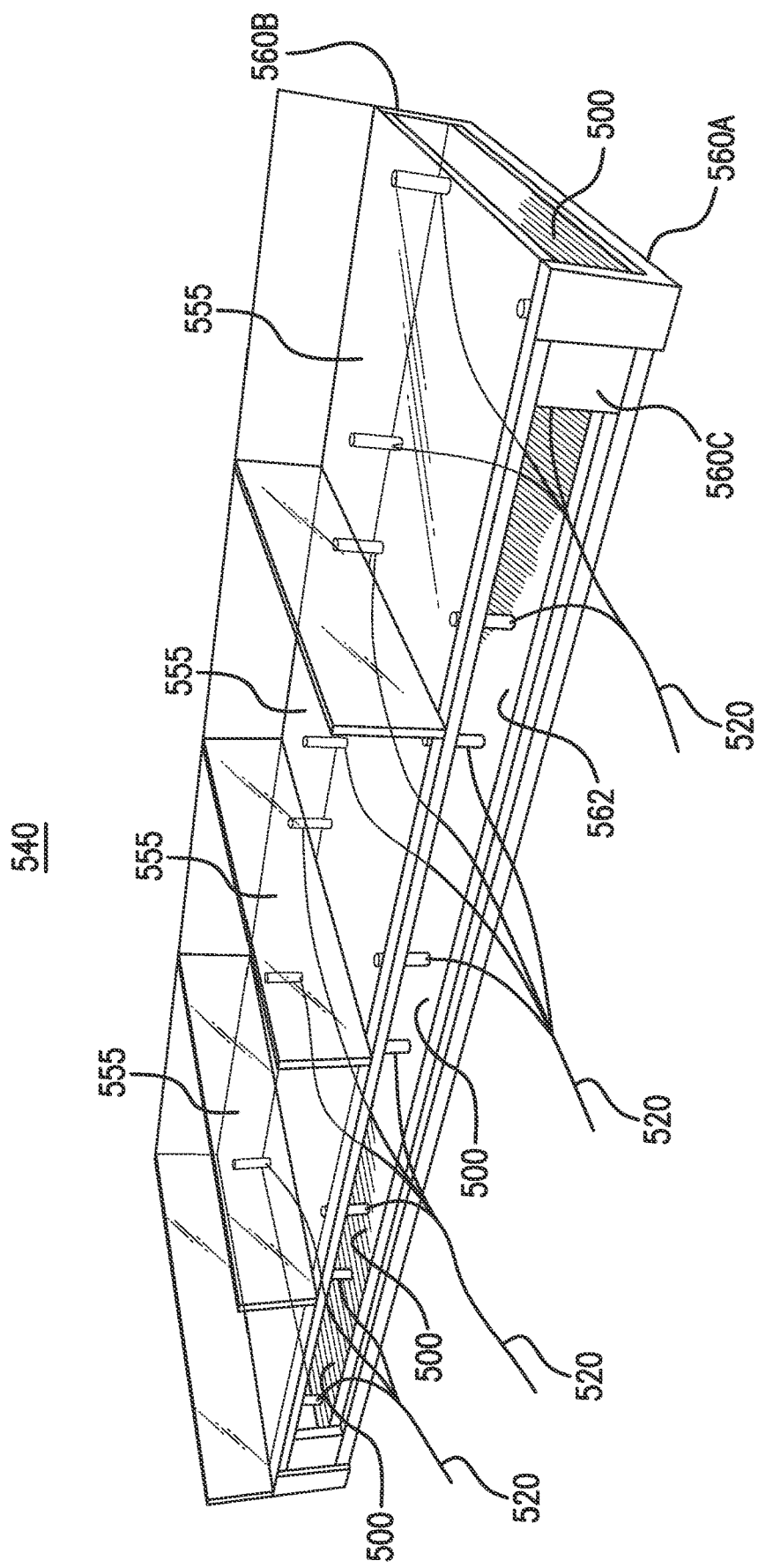

FIGS. 5D and 5E illustrate an example shelf 540. FIG. 5D shows a front view of shelf 540. As seen in FIG. 5D, shelf 540 includes a bottom surface 560A, a front surface 560B, and a back surface 560C. Bottom surface 560A is coupled to front surface 560B and back surface 560C. Front surface 560B and back surface 560C extend upwards from bottom surface 560A. Multiple weight sensors 500 are positioned on bottom surface 560A between front surface 560B and back surface 560C. Each weight sensor 500 is positioned to detect a weight of items 130 positioned within certain regions 555 of shelf 540. Each region 555 may be designated using dividers 558. Items placed within a particular region 555 will be detected and weighed by the weight sensor 500 for that region 555. This disclosure contemplates shelf 540 being made using any suitable material such as, for example, wood, metal, glass, and/or plastic. Wires 515 and 520 have not been illustrated in FIG. 5D so that the structure of shelf 540 can be shown clearly, but their omission from FIG. 5D should not be interpreted as their removal. This disclosure contemplates that wires 515 and 520 are present and connected to weight sensors 500 in the example of FIG. 5D.

FIG. 5E shows a back view of shelf 540. As seen in FIG. 5E, back surface 560C defines a cavity 562. Wires 520 of weight sensors 500 extend from the weight sensors 500 through cavity 562. Generally, back surface 560C of shelf 540 is coupled to panel 535 such that cavity 562 is at least partially aligned with cavity 550 in the panel 535. In this manner, wires 520 can run from weight sensors 500 through cavity 562 and through cavity 550.

In certain embodiments, weight sensor 500 is positioned in shelf 540 such that weight sensor 500 detects the weight of items positioned within a particular region 555 of shelf 540. As seen in the examples of FIGS. 5D and 5E, shelf 540 includes four regions 555 that are positioned above four weight sensors 500. Each weight sensor 500 detects the weight of items positioned within their corresponding regions 555. Due to the positioning of weight sensors 500, a weight sensor 500 may not be affected by the weight of items 130 positioned in regions 555 that do not correspond to that weight sensor 500.

Figure 5F:
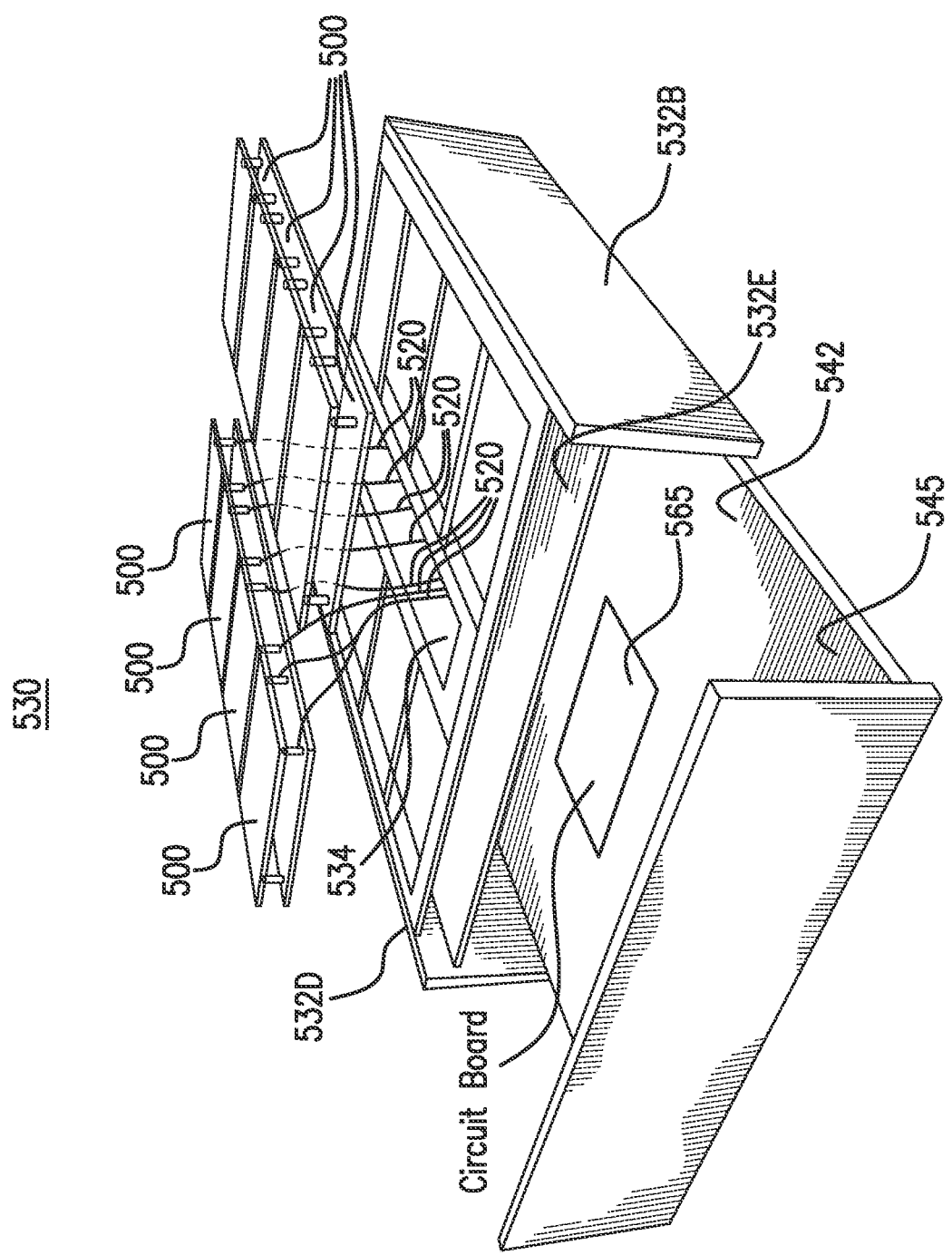

FIG. 5F shows an example base 530. As seen in FIG. 5F, base 530 may also accommodate weight sensors 500. For example, weight sensors 500 may be positioned on a top surface 532E of base 530. Wires 520 for these weight sensors 500 may run from the weight sensors 500 through cavity 534 into space 542. As a result, items may be positioned on base 530 and their weights may be detected by weight sensors 500.

A circuit board 565 is positioned in space 542. Circuit board 565 includes ports to which wires 520 from the weight sensors 500 of rack 525 connect. In other words, circuit board 565 connects to wires 520 from weight sensors 500 positioned on base 530 and on shelves 540. These wires 520 enter space 542 through cavity 534 and connect to circuit board 565. Circuit board 565 receives the electric signals produced by the load cells 505 of the weight sensors 500. Circuit board 565 then communicates signals to weight server 235 indicating the weights detected by the weight sensors 500. Drawer 545 may open to allow access to space 542 and to circuit board 565. For example, drawer 545 may be opened so that circuit board 565 may be serviced and/or repaired.

Figure 5G:
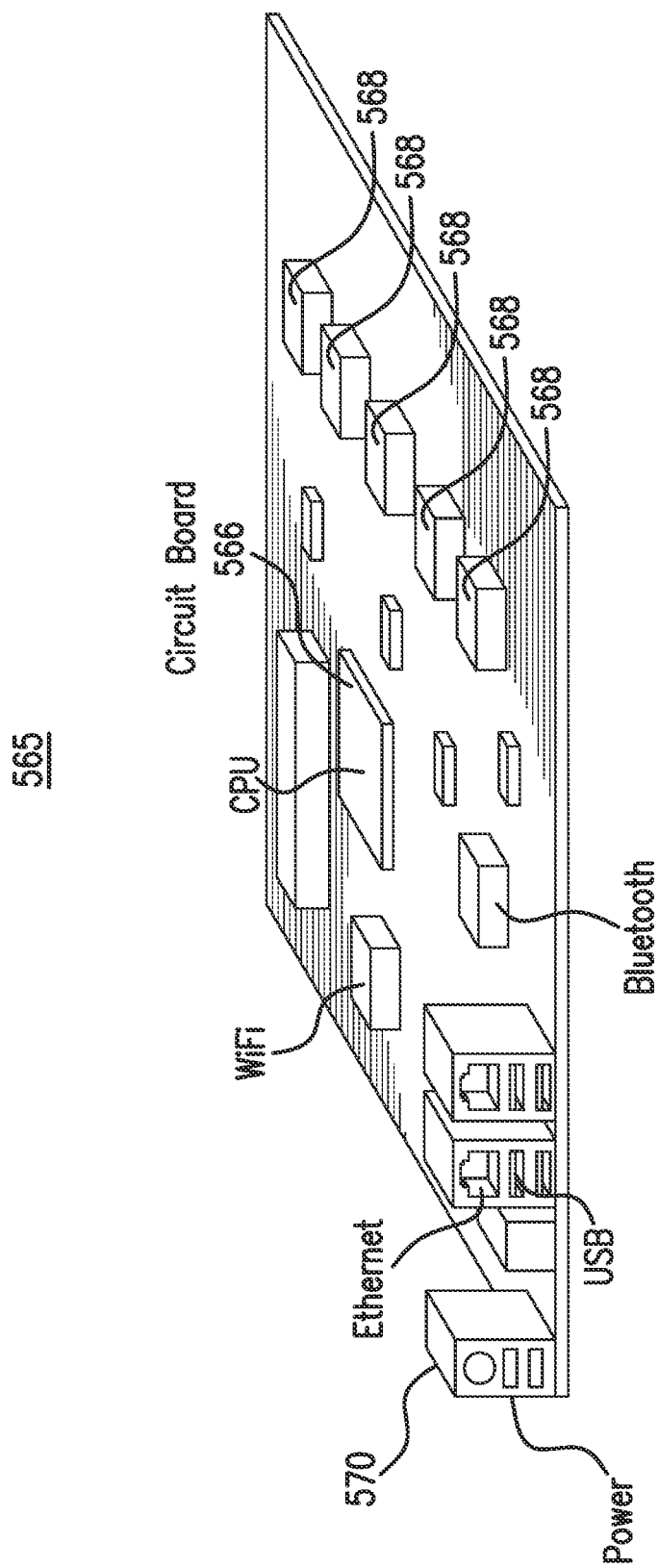

FIG. 5G shows an example circuit board 565. As seen in FIG. 5G, circuit board 565 includes a processor 566 and multiple ports 568. Generally, ports 568 couple to wires 520 from weight sensors 500. This disclosure contemplates circuit board 565 including any suitable number of ports 568 to connect to the wires 520 from the weight sensors 500 of rack 525. Processor 566 receives and processes the signals from ports 568.

Circuit board 565 may communicate signals to weight server 235 through any suitable medium. For example, circuit board 565 may communicate signals to weight server 230 through an ethernet connection, a wireless connection (e.g., WiFi), a universal serial bus connection, and/or a Bluetooth connection. Circuit board 565 can automatically select a connection through which to communicate signals to weight server 235. Circuit board 565 may choose the connection based on priority. For example, if the ethernet connection is active, circuit board 565 may select the ethernet connection for communicating with weight server 235. If the ethernet connection is down and the wireless connection is active, circuit board 565 may choose the wireless connection to communicate with weight server 235. If the ethernet connection and the wireless connection are down and the universal serial bus connection is active, circuit board 565 may select the universal serial bus connection to communicate with weight server 235. If the ethernet connection, the wireless connection, and the universal serial bus connection are down and the Bluetooth connection is active, circuit board 565 may select the Bluetooth connection to communicate with weight server 235. In this manner, circuit board 565 has improved resiliency because circuit board 565 may continue to communicate with weight server 235 even if certain communication connections go down.

Circuit board 565 may receive electrical power through various connections. For example, circuit board 565 may include a power port 570 that supplies electrical power to circuit board 565. An electrical cable that plugs into an electrical outlet may couple to power port 570 to supply electrical power to circuit board 565. Circuit board 565 may also receive electrical power through the ethernet connection and/or the universal serial bus connection.

Figure 5H:
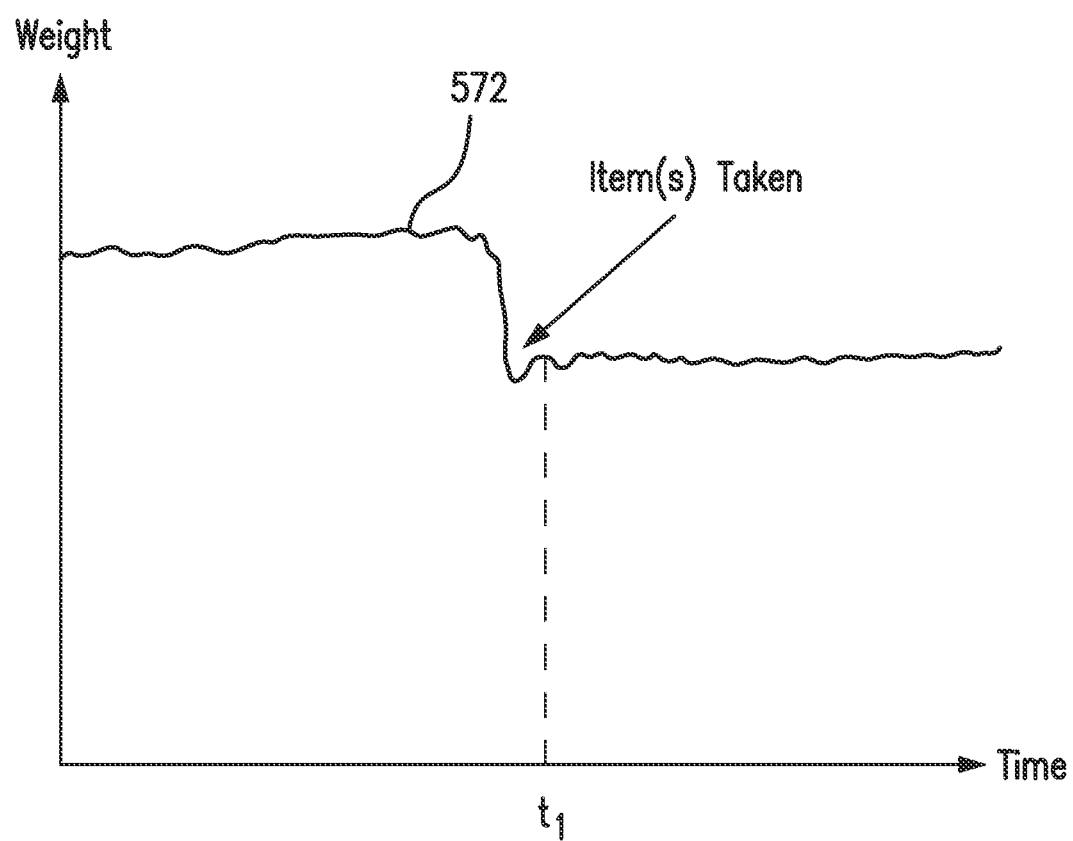

FIG. 5H shows a signal 572 produced by the weight sensor 500. As seen in FIG. 5H the signal 572 begins by indicating a certain weight detected by the weight sensors 500. Around time $t_1$ an item positioned above the weight sensor 500 is taken. As a result, the weight sensor 500 detects a drop in the weight and the signal 572 experiences a corresponding drop. Beyond time $t_1$, the signal 572 continues to hover around the lower weight because the item 130 was removed. This disclosure contemplates that the signal 572 may include noise introduced by the environment such that the signal 572 is not a perfectly straight or smooth signal.

Figure 5I:
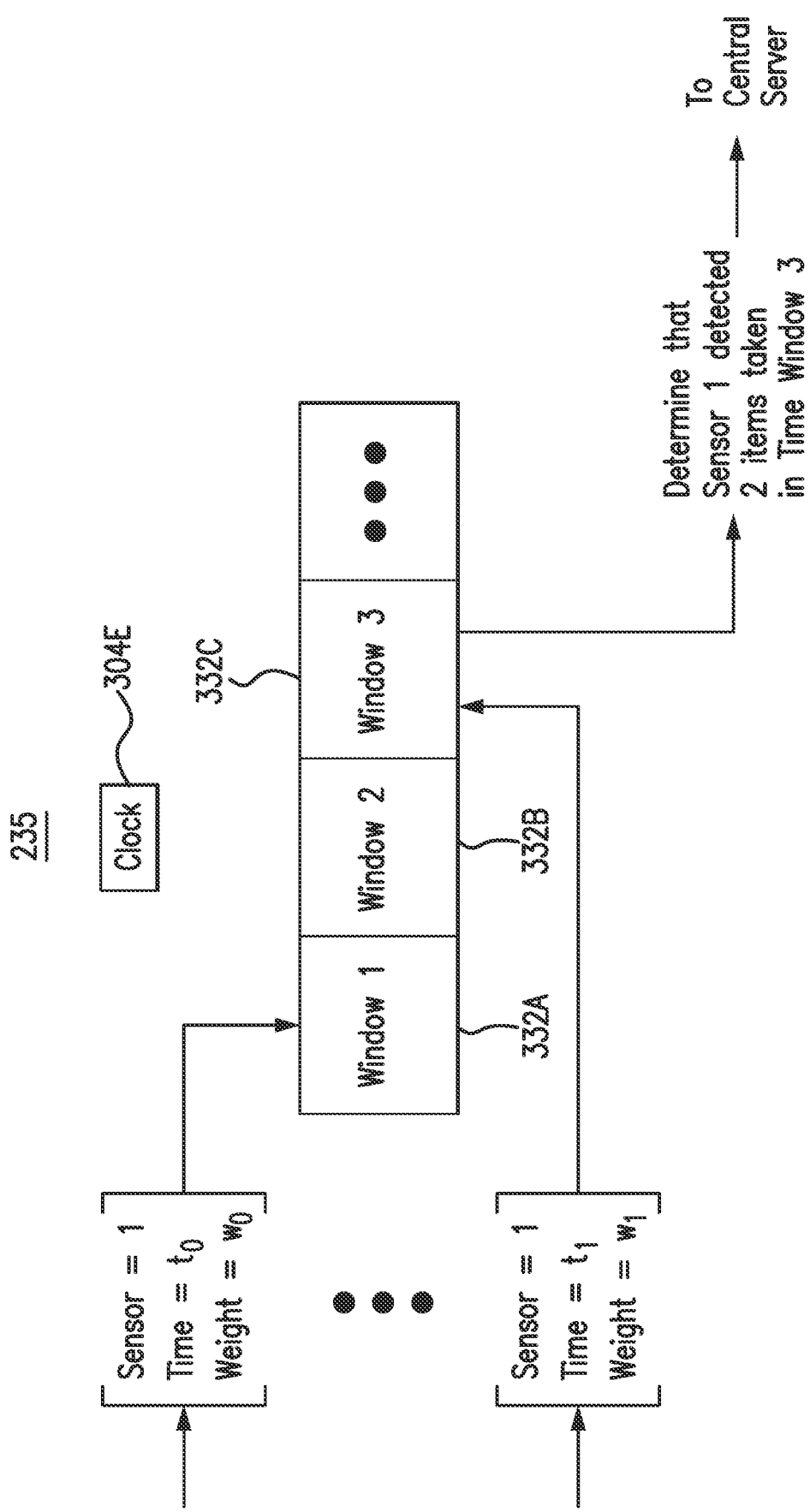

FIG. 5I shows an example operation of weight server 235. As seen in FIG. 5I, weight server 235 receives a signal 572 from a weight sensor 500 at time to indicating a weight $w_0$. Similar to camera server 225, weight server 235 may assign this information to a particular time window 332A based on the indicated time of $t_0$. Later, weight server 235 may receive a signal 572 from the weight sensor 500 indicating that at time $t_1$, a new weight $w_1$ is detected. Weight $w_1$ may be less than weight $w_0$, thereby indicating that an item 130 may have been removed. Weight server 235 assigns the information to a subsequent time window 332C based on the time indicated at $t_1$.

Weight server 235 may implement an internal clock 304E that is synchronized with the internal clocks 304 of other components of tracking system 132 (e.g., camera clients 220, camera server 225, and central server 240). Weight server 235 may synchronize the internal clock 304E using a clock synchronization protocol (e.g., Network Time Protocol and/or Precision Time Protocol). Weight server 235 may use clock 304E to determine the times at which signals 572 from weight sensors 500 were received and assign these signals 572 to their appropriate time windows 332.

In certain embodiments, time windows 332 in weight server 235 are aligned with time windows 332 in camera clients 220, camera server 225, and/or central server 240. For example, time window 332A in weight server 235 may have the same start time (T0) and end time (T1) as time window 332A in camera server 225 in the example of FIG. 3J. In this manner, information from different subsystems of tracking system 132 may be grouped according to the same time windows 332, which allows this information to be correlated to each other in time.

Similar to camera server 225, weight server 235 may process the information in the time windows 332 sequentially when the time windows 332 are ready for processing. Weight server 235 may process the information in each time window 332 to determine whether an item 130 was removed during that particular time window 332. In the example of FIG. 5I when weight server 235 processes the third time window 332C, weight server 235 may determine that sensor 1 500 detected that two items were taken during time window 3 332C; thereby, resulting in the weight drop from $w_0$ to $w_1$. Weight server 235 may make this determination by determining a difference between $w_0$ and $w_1$. Weight server 235 may also know (e.g., through a lookup table) the weight of an item 130 positioned above or near weight sensor 500. Weight server 235 may divide the difference between $w_0$ and $w_1$ to determine the number of items 130 removed. Weight server 235 may communicate this information to central server 240 for further processing. Central server 240 may use this information along with the tracked positions of people within the space to determine which person in the space removed the items 130.

Figure 5J:
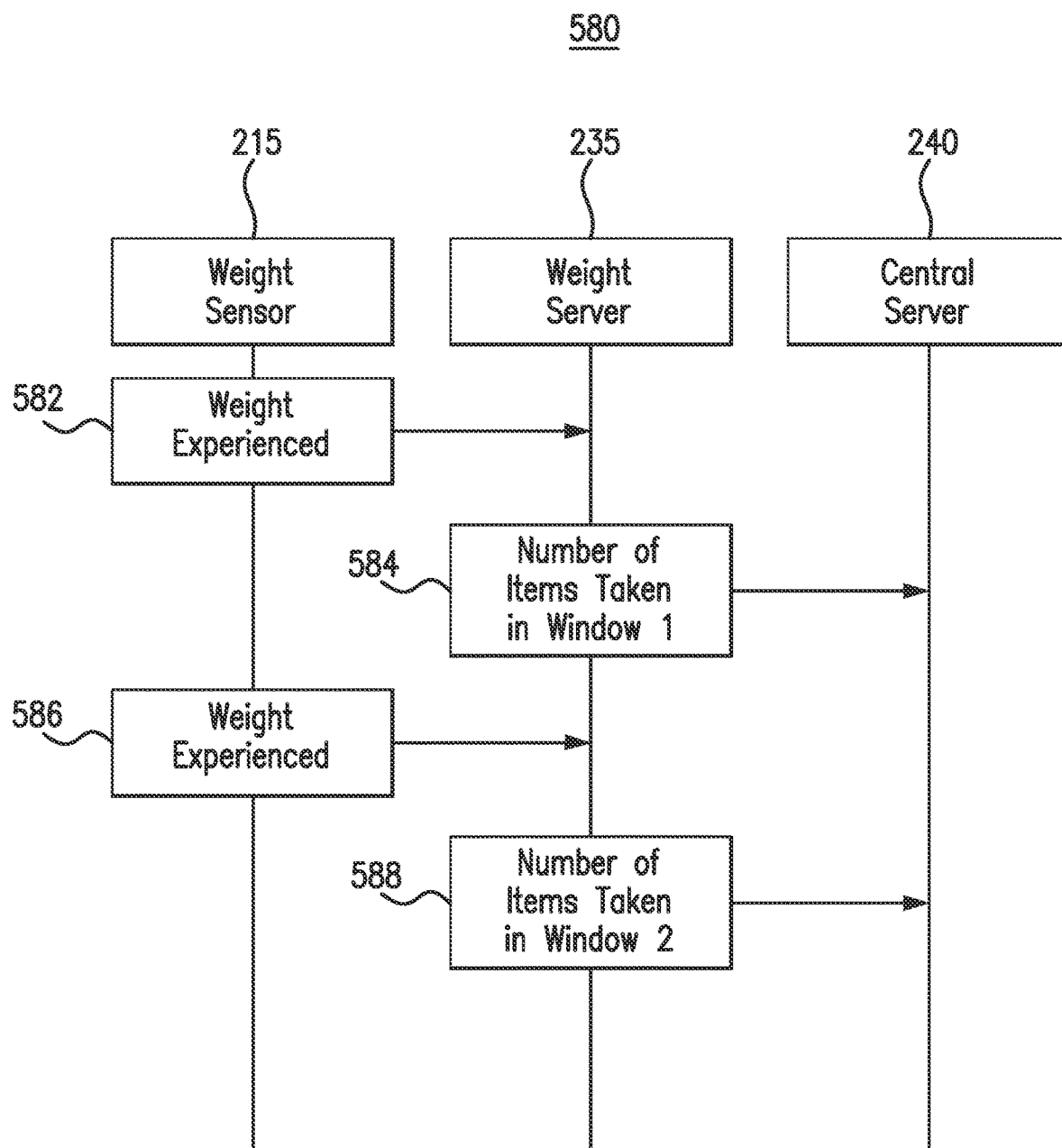

FIG. 5J shows an example method 580 for operating weight subsystem 206. Generally, various components of weight subsystem 206 perform method 580 to determine when certain items 130 were taken.

Weight sensor 215 detects the weight experienced 582 above or around weight sensor 215 and communicates the detected weight 582 through an electric signal 572 to weight server 235. Weight server 235 may analyze the signals 572 from weight sensor 215 to determine a number 584 of items 130 that were taken during a first time window 332. Weight server 235 may communicate the determination to central server 240. Weight sensor 215 may subsequently detect a weight 586 experienced by weight sensor 215 and communicate that weight 586 to weight server 235. Weight server 235 may analyze that weight 586 to determine a number 588 of items 130 that were taken during a second time window 332. Weight server 235 may communicate that determination to central server 240. Central server 240 may track whether items 130 were taken during particular time windows 332. And if so, central server 240 may determine which person in the space took those items 130.

Modifications, additions, or omissions may be made to method 580 depicted in FIG. 5J. Method 580 may include more, fewer, or other steps. For example, steps may be performed in parallel or in any suitable order. While discussed as various components of weight subsystem 206 performing the steps, any suitable component of tracking system 132, such as central server 240 for example, may perform one or more steps of the method.

FIG. 5K illustrates a rear view of a shelf 540, which may be similar to the shelf 540 illustrated in FIG. 5E. As seen in FIG. 5K, the shelf 540 includes rear surface 560c that defines cavity 562. Wires 520a-d of weight sensors 500a-d, respectively, extend from the weight sensors 500a-d through cavity 562. Weight sensors 500a-d are instances of weight sensor 500 of FIG. 5A.

Each weight sensor 500a-d is positioned in the shelf 540 such that each weight sensor 500a-d detects the weight of items positioned within a particular region 555a-d of shelf 540, respectively. For example, weight sensor 500a detects the weight of item(s) positioned within region 555a, weight sensor 500b detects the weight of item(s) positioned within region 555b, weight sensor 500c detects the weight of item(s) positioned within region 555c, and weight sensor 500d detects the weight of item(s) positioned within region 555d. Although shelf 540 is shown with four regions 555a-d, this disclosure contemplates any suitable number and combination of regions 555 and weight sensors 500 positioned in a shelf 540.

Each weight sensor 500 is assigned a particular address number 804 indicating the position of each weight sensor 500 within the store 100 (see FIG. 1). For example, an address number 804 of a weight sensor 500 may specify a number associated with a shelf 540 and a number associated with a zone/region 555. For instance, an address number 804 of a weight sensor 500 positioned in a first region 555 in a first shelf 540 may specify that the weight sensor 500 is positioned in shelf 1-region 1. In another instance, an address number 804 of a weight sensor 500 positioned in a second region 555 in a third shelf 540 may specify that the weight sensor 500 is positioned in shelf 3-region 2. In the illustrated example shelf 540 in FIG. 5K, weight sensor 500a is assigned an address number 804a which indicates that the weight sensor 500a is positioned in region 555a, weight sensor 500b is assigned an address number 804b which indicates that the weight sensor 500b is positioned in region 555b, weight sensor 500c is assigned an address number 804c which indicates that the weight sensor 500c is positioned in region 555c, and weight sensor 500d is assigned an address number 804d which indicates that the weight sensor 500d is positioned in region 555d.

Each weight sensor 500 is configured to transmit a signal that includes an address number 804 of that weight sensor 500 and sensor data indicating a weight of an item to its corresponding weight board 800 through wires 520. In the illustrated example shelf 540 in FIG. 5K, a weight sensor 500a is connected to a weight board 800a through wires 520a, weight sensor 500b is connected to a weight board 800b through wires 520b, weight sensor 500c is connected to a weight board 800c through wires 520c, and weight sensor 500d is connected to a weight board 800d through wires 520d.

Weight board 800 is generally a board that is configured to process signals generated from a weight sensor 500. Operations of the weight board 800 are described in detail in the corresponding description of FIG. 5L. In brief, the weight board 800 is configured to digitize a signal received from a weight sensor 500. The weight board 800 is also configured to assign an address number 804 to its corresponding weight sensor 500. In the illustrated example shelf 540 in FIG. 5K, weight board 800a is used to assign address number 804a to weight sensor 500a, weight board 800b is used to assign address number 804b to weight sensor 500b, weight board 800c is used to assign address number 804c to weight sensor 500c, and weight board 800d is used to assign address number 804d to weight sensor 500d.

As further seen in FIG. 5K, wires 806a-d extending from weight boards 800a-d are aggregated into a bus wire 802. Bus wire 802 connects to a port on the circuit board 565 with reference to FIG. 5M. Weight boards 800a-d communicate the processed signals (received from weight sensors 500a-d) through the bus wire 802 to the circuit board 565. Wires 806a-d may be aggregated into the bus wire 802 in any suitable manner, e.g., bundling wires together. Wires 806a-d may be aggregated into the bus wire 802 at any point before connecting to a port 568 of the circuit board 565.

Figure 5L:
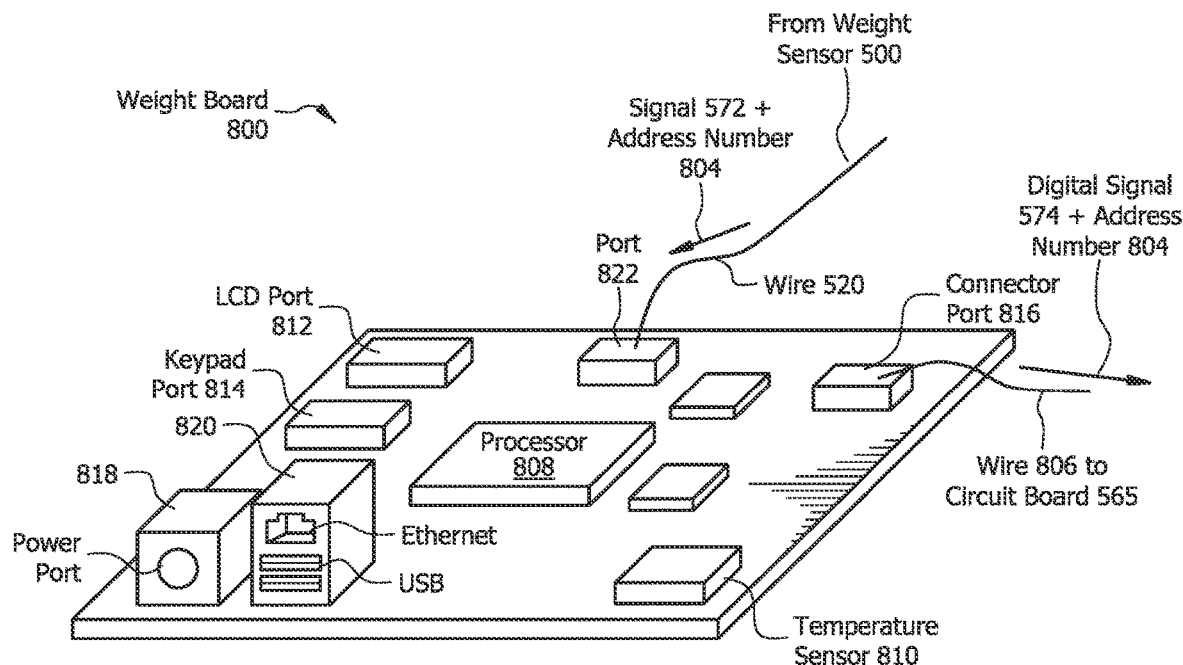

FIG. 5L illustrates an example weight board 800. In one embodiment, the weight board 800 may include a processor 808, a temperature sensor 810, a Liquid Crystal Display (LCD) port 812, a keypad port 814, a connector port 816, a power port 818, universal serial bus communication port 820, and port 822. In other embodiments, the weight board 800 may not have all of the components listed and/or may have other elements instead of, or in addition to, those listed above.

As seen in FIG. 5L, wire 520 extending from a weight sensor 500 is connected to the port 822 that is operably coupled with processor 808. Thus, a signal 572 and an address number 804 from the weight sensor 500 are transmitted to the processor 808 via the wire 520 and port 822. The processor 808 may be one of the processing units of the processor 705 described in FIG. 7.

Processor 808 may include any electronic circuitry, including, but not limited to microprocessors, application specific integrated circuits (ASIC), application specific instruction set processor (ASIP), and/or state machines. Processor 808 may be 8-bit, 16-bit, 32-bit, 64-bit or of any other suitable architecture. Processor 808 may include an arithmetic logic unit (ALU) for performing arithmetic and logic operations, processor registers that supply operands to the ALU and store the results of ALU operations, and a control unit that fetches instructions from memory and executes them by directing the coordinated operations of the ALU, registers and other components. Processor 808 may include other hardware that operates software to control and process information. Processor 808 executes software stored on memory to perform any of the functions described herein. Processor 808 controls the operation and administration of weight board 800 by processing information received from components of the weight board 800, such as the temperature sensor 810, LCD port 812, keypad port 814, connector port 816a power port 818, universal serial bus communication port 820, and port 822. Processor 808 may be a programmable logic device, a microcontroller, a microprocessor, any suitable processing device, or any suitable combination of the preceding. Processor 808 is not limited to a single processing device and may encompass multiple processing devices.

The processor 808 is configured to digitize the signal 572 received from the weight sensor 500. In one embodiment, the processor 808 may include or use any Analog-to-Digital Converter (ADC) module or circuitry to convert an analog signal 572 (e.g., voltage or current) representing a weight of an item to a digital signal 574. The digital signal 574 represents digitized sensor data of the weight sensor 500. The processor 808 may also timestamp when it receives the signal 574. The weight board 800 then transmits the signal 574 and the address number 804 to a circuit board 565 (see FIG. 5M) through the wire 806 extending from the connector port 816.

Temperature sensor 810 may be any temperature sensor module capable of capturing the temperature of its surroundings. The temperature sensor 810 is communicatively coupled with the processor 808. The temperature sensor 810 is used to register the temperature of the environment around the weight sensor 500 and report that information to the processor 808. The processor 808 uses the information received from the temperature sensor 810 to determine correlations between fluctuations in a weight sensor sensitivity of the weight sensor 500 and temperature changes. The weight sensor sensitivity of a weight sensor 500 may be determined by a ratio of an electrical signal change (e.g., a current or voltage change) over a weight change detected by that weight sensor 500.

In some cases, a temperature change can affect a weight sensor sensitivity of a weight sensor 500, such that it may convert an electrical signal change to a weight change that is not expected from the weight sensor 500 using a default sensor sensitivity of the weight sensor 500. The default sensor sensitivity of the weight sensor 500 is a ratio of an electrical signal change over a weight change that is expected from the weight sensor 500. For example, assume that under normal environmental conditions, e.g., temperature 20-22° C., the weight sensor 500 converts a 4 Volt (V) change to a 2 pounds (lb.) weight change. In other words, under normal environmental conditions, the default sensor sensitivity of the weight sensor 500 is 2 (V/lb.). However, due to environmental changes, e.g., temperature changes, the weight sensor 500 may convert the 4 V voltage change to a 4 lb. weight change.

In this exemplary case, the weight sensor sensitivity is 1 (V/lb.) which is shifted from the default sensor sensitivity of the weight sensor 500. Therefore, the temperature sensor 810 is used to keep track of temperature changes in order to detect such scenarios where a weight sensor sensitivity shifts from a default sensor sensitivity beyond a configurable threshold range. As such, the information received from the temperature sensor 810 is further used to provide a training dataset for an item counting algorithm to accurately count how many items are removed from or put on a weight sensor 500 at different temperatures. The item counting algorithm is described in detail in corresponding descriptions of FIGS. 5N and 5O.

As further seen in FIG. 5L, the weight board 800 also includes the LCD port 812. As described above with respect to FIG. 5K, each weight sensor 500 is assigned a particular address number 804. In one embodiment, an address number 804 of a weight sensor 500 can be configured and assigned to that weight sensor 500 from an LCD (not shown) that is connected to the LCD port 812. The LCD may serve as a user interface to show weight sensor information, such as analog signal 772, digital signal 574, address number 804, etc.

In one embodiment, the address number 804 of the weight sensor 500 may be inputted from a keypad (not shown) that is connected to the keypad port 814. For example, when assigning an address number 804 to a weight sensor 500, an operator can use the keypad to set the address number 804 to the weight sensor 500. In another example, the operator can assign an address number 804 to a weight sensor 500 from a touch screen LCD.

Weight board 800 may receive electrical power through various connections. For example, the weight board 800 may include the power port 818 that supplies electrical power to the weight board 800. An electrical cable that plugs into an electrical outlet may couple to the power port 818 to supply electrical power to the weight board 800. Weight board 800 may also receive electrical power using other methods, such as through the ethernet connection, the universal serial bus connection 820, etc.

In one embodiment, weight board 800 may include other components such as an amplifier module to amplify incoming signals 572 from the weight sensor 500, an oscillating component to set the speed of processor 808, a memory card port to store weight sensor information into a memory card, among other components.

By processing the incoming signals 572 in the weight board 800, the processing of the incoming signals 572 is performed closer to the weight sensor 500. As such, the incoming signals 572 are traveling a shorter distance, thus, they are less noisy. In other words, by processing the incoming signals 572 from the weight sensor 500 in the weight board 800, an edge computing is leveraged to produce more accurate results (i.e., more accurate weights of items on the weight sensors 500). Thus, the improved system described herein provides additional technical advantages and facilitates the practical application of providing accurate weight measurements.

Figure 5M:
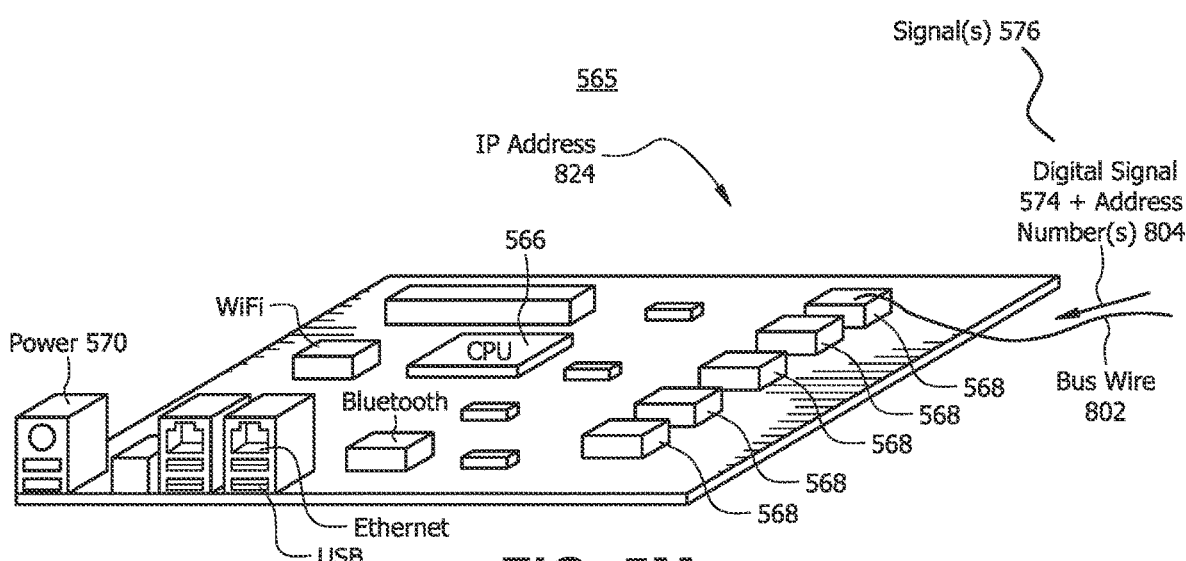

FIG. 5M illustrates an example circuit board 565. The illustrated example circuit board 565 in FIG. 5M may be similar to the example circuit board 565 of FIG. 5G. The example circuit board 565 in FIG. 5M corresponds to the circuit board 254 illustrated in FIG. 2B.

As described above with respect to FIG. 5K, the bus wire 802 includes the aggregated wires 806*a-d* extending from weight boards 800*a-d* to a port 568 on the circuit board 565. The bus wire 802 carries one or more signals 576 that include digital signal(s) 574 and address number(s) 804 of one or more weight sensors 500. From the one or more signals 576, the circuit board 565 determines from which weight board 800 (or which weight sensor 500) a signal 576 is sent based on the address numbers 804 of weight sensors 500. For example, with reference to FIG. 5K, if the circuit board 565 receives a first signal 576 that includes a first address number 804*a*, the circuit board 565 determines that the first signal 576 is sent from the first weight board 800 (or originated from the first weight sensor 500*a*).

In one embodiment, the circuit board 565 is configured to perform an error detection step on the signals 576. In performing the error detection step, when the circuit board 565 receives one or more signals 576, it determines whether each incoming signal 576 is valid. For example, the circuit board 565 determines that an incoming signal 576 is valid if the incoming signal 576 includes an address number 804 and a signal 574 that indicates weight information of item(s). If the incoming signal 576 does not include any of these portions, the circuit board 565 determines that the incoming signal 576 is not valid. If, however, the incoming signal 576 includes both of these portions, the circuit board 565 determines that the incoming signal 576 is valid.

Circuit board 565 is assigned an Internet Protocol (IP) address 824 which is used to identify the circuit board 565. For example, the circuit board 565 may be assigned the IP address 824 at the weight server 235 (see FIG. 2B). Throughout the store, each circuit board 565 is assigned a different IP address 824. As such, based on the IP addresses 824 of the circuit boards 565, the location and identity of each circuit board 565 may be determined.

Referring back to FIG. 2B, the circuit board 565 may transmit signals 576 to a server among the cluster servers 248 (e.g., via a UDP/TCP bridge module) through a wireless communication, such as WiFi.

Wirelessly communicating the signals 576 provides additional technical advantages and facilitates practical applications of reducing wiring complexity of the circuit boards 565 to the cluster servers 248. Furthermore, since each weight sensor 500 is assigned a particular address number 804 and signals 576 are transmitted wirelessly, racks within the store can be re-arranged more flexibly according to the desired layout of the store because the circuit boards 564 are not communicating data to the cluster servers 248 through wires. Once the racks are positioned according to the desired layout, the address numbers 804 of the weight sensors 500 are used to determine the new positions of the weight sensors 500.

The cluster servers 248 store and maintain the signals 576, and forward a particular set of signals 576 to the weight server 235 upon receiving a request from the weight server 235 to send the particular set of signals 576 from a particular time window (e.g., a timestamps range), a particular circuit board 565 (e.g., identified by an IP address 824), a particular address number 804, etc. The weight server 235 determines from which weight sensor 500 and at which timestamp a particular signal 576 is generated based on the address numbers 804 of the weight sensors 500 and a timestamp label of the particular signal 576. As such, the tracking system 132b can improve an item position detection and tracking system 132.

Figure 5N:
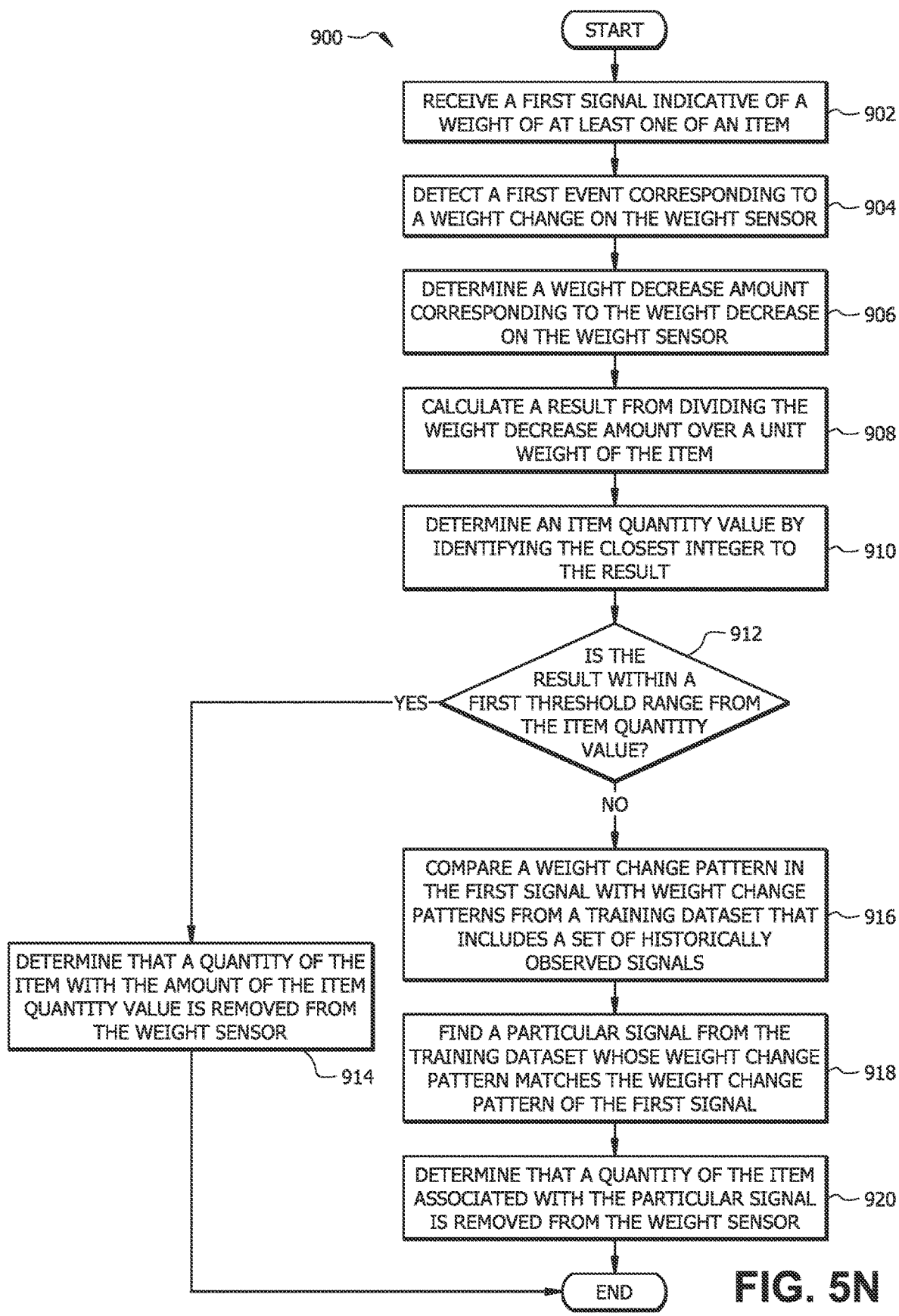
FIG. 5N illustrates an example flow chart of a method for an adaptive item counting algorithm based on sensor sensitivity analysis.
Figure 50:
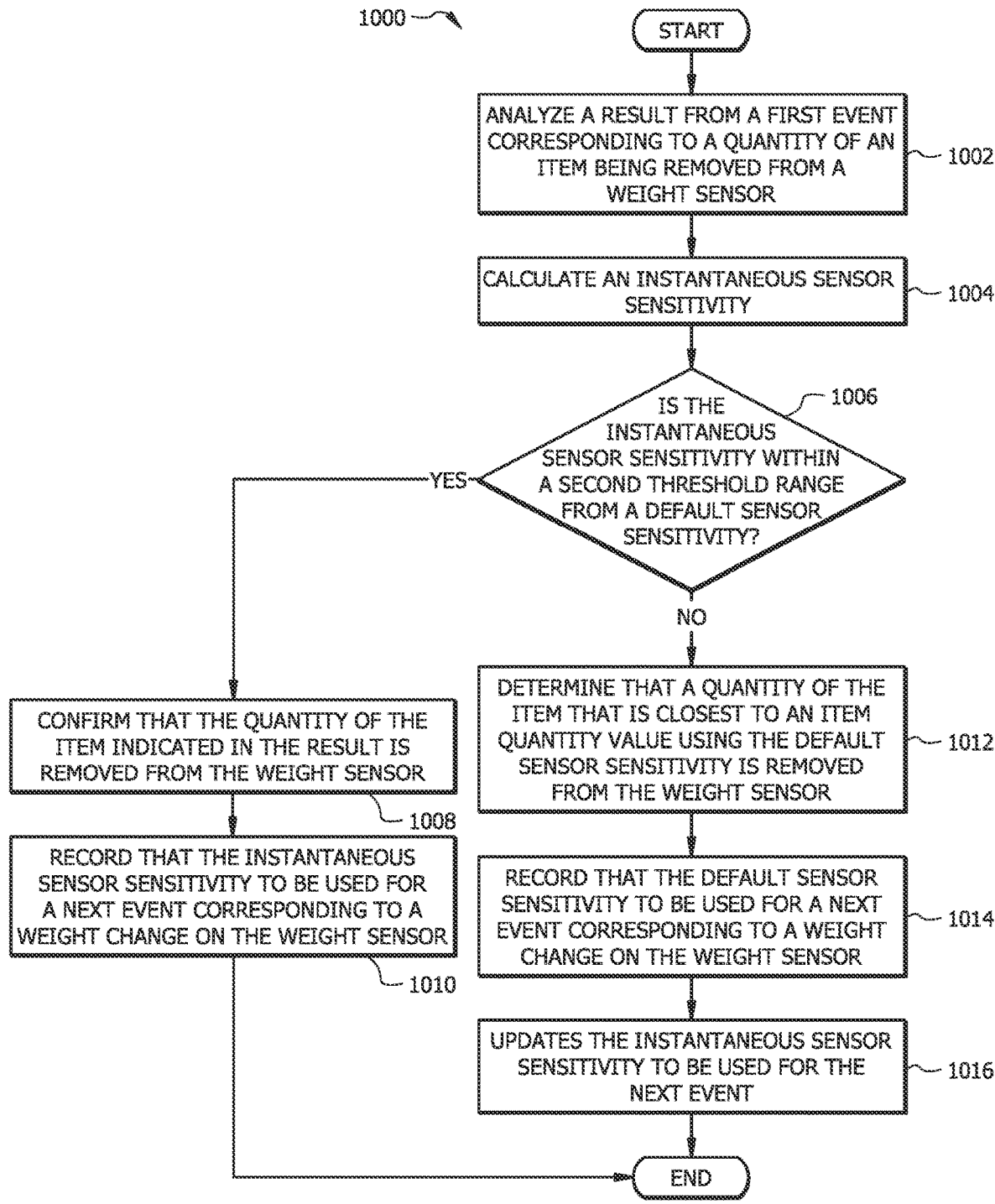

FIG. 5N illustrates an example flow chart of a method 900 for an adaptive item counting algorithm. Generally, various components of weight subsystems 206 or 250 (see FIGS. 2A and 2B) perform method 900 to determine an item quantity that is removed from or put on a weight sensor 500. In one embodiment, method 900 is implemented by processor 705 executing software instructions or code (see FIG. 7). Aspects of method 900 are explained above with respect to FIGS. 5A-5M, and additional aspects are given below. In one embodiment, method 900 may be implemented by a machine learning algorithm, such as Support Vector Machine (SVM), etc. In one embodiment, method 900 may be implemented by a plurality of neural network layers, convolutional neural network layers, and the like.

Method 900 beings at step 902 when the weight server 235 receives a first signal 574 indicative of a weight associated with at least one of an item 130 (see FIG. 1). In step 904, the weight server 235 detects a first event corresponding to a weight change on the weight sensor 500, when a quantity of the item 130 is removed from (or, alternatively, put on) the weight sensor 500 (see FIG. 5A).

In step 906, the weight server 235 determines a weight decrease amount corresponding to the weight decrease on the weight sensor 500. For example, the weight server 235 may determine the weight decrease amount by calculating a difference between an initial weight at the beginning of the first event and an end weight at the end of the first event. In a case where at least one of the item 130 is put on the weight sensor 500, the weight server 235 determines a weight increase amount corresponding to a weight increase on the weight sensor 500.

In step 908, the weight server 235 calculates a result from dividing the weight decrease amount (or, alternatively, weight increase amount) over a unit weight of the item 130. For example, the result may be calculated by equation (1) below:

$$\text{results} = \frac{\text{Weight}_{end} - \text{Weight}_{Initial}}{\text{Weight}_{unit}} \qquad \text{Equation (1)}$$

In step 910, the weight server 235 determines an item quantity value by identifying the closest integer to the result. In a first example, assume that two of the item 130 are removed from the weight sensor 500; the unit weight of the item 130 is 2 pounds; and the result is calculated as 4.2. As such, the result using the equation (1) will be 2.1. In this particular example, the closest integer to the result is 2.

In a second example, assume that two of the item 130 are removed from the weight sensor 500; the unit weight of the item 130 is 2 pounds; and the result is calculated as 4.6. As such, the result using the equation (1) will be 2.3. In this particular example, the closest integer to the result is 2.

In step 912, the weight server 235 determines whether the result is within a first threshold range from the item quantity value. The first threshold range may be, for example, 20% or any other percentage range. As such, the first threshold range from the result in the first and second examples given in step 910 may be calculated from 20% from the integer value 2, i.e., 1.8 to 2.2.

If it is determined that the result is within the first threshold range from the item quantity value, the method 900 proceeds to step 914 where the weight server 235 determines that a quantity of the item 130 with the amount of the item quantity value is removed from (or, alternatively, put on) the weight sensor 500. If, however, it is determined that the result is not within the first threshold range from the item quantity value, the method 900 proceeds to step 916.

Continuing the first example described in step 910, since the result is 2.1, the weight server 235 determines that the result is within the first threshold range, i.e., 1.8 to 2.2. Thus, the weight server 235 determines that two of the item 130 are removed from the weight sensor 500.

Continuing the second example described in step 910, since the result is 2.3, the weight sensor 235 determines that the result is not within the first threshold range, i.e., 1.8 to 2.2, and thus the method proceeds to perform steps 916-920. The steps 916-920 may be performed by a pattern recognition technique to determine the item quantity that was removed from (or, alternatively, put on) the weight sensor 500.

In step 916, the weight server 235 compares a weight change pattern in the first signal 572 with weight change patterns from a training dataset that includes a set of historically observed signals, where each signal of the training dataset is associated (or labeled) with a quantity of the item 130 being removed from (or, alternatively, put on) the weight sensor 500. In this process, the weight server 235 may use any pattern recognition technique, such a pattern recognition from images (e.g., plots of analog/digital signals), text (e.g., tables of analog/digital signal values), videos (e.g., streams of data feed of analog/digital signals), etc.

The training dataset may include any number of historically observed signals. For example, a first historically observed signal from the training dataset may show a weight decrease when two of the item 130 are removed from the weight sensor 500, and the first historically observed signal is labeled with two of the item being removed; a second historically observed signal from the training dataset may show a weight decrease when three of the item 130 are removed from the weight sensor 500, and the second historically observed signal is labeled with three of the item being removed; and a third historically observed signal from the training dataset may show a weight decrease when one of the item 130 is removed from the weight sensor 500, and the third historically observed signal is labeled with one of the item being removed. The training dataset may also include historically observed signals labeled when one or more items are put on a weight sensor 500.

In one embodiment, the historically observed signals from the training dataset may also be labeled with a temperature of the environment around the weight sensor 500 when those signals were recorded. As such, the weight change pattern in the first signal 572 is compared with a set of historically observed signals from the training dataset that are recorded within a temperature range (e.g., within 2° C.) from the current temperature surrounding the weight sensor 500 detected by the temperature sensor 810 (see FIG. 5L).

In step 918, the weight server 235 finds a particular signal from the training dataset whose weight change pattern matches the weight change pattern of the first signal 572. In step 920, the weight server 235 determines that a quantity of the item 130 associated with the particular signal (found in the training dataset) is removed from (or, alternatively, put on) the weight sensor 500.

Modifications, additions, or omissions may be made to method 900 depicted in FIG. 5N. Method 900 may include more, fewer, or other steps. For example, steps may be performed in parallel or in any suitable order. While discussed as particular components of weight subsystems 206 or 250 performing the steps, any suitable component of weight subsystems 206 or 250 may perform one or more steps of the method.

FIG. 5O illustrates an example flow chart of a method 1000 for validating a result from an item counting process, such as the method 900 of FIG. 5M. In one embodiment, method 1000 is implemented by processor 705 executing software instructions or code (see FIG. 7). In one embodiment, method 1000 may be implemented by any machine learning algorithm, such as SVM, etc. In one embodiment, method 1000 may be implemented by a plurality of neural network layers, convolutional neural network layers, and the like. In one embodiment, the method 1000 may be performed separately from method 900 of FIG. 5M. In another embodiment, the methods 900 and 1000 may be performed together. Similar to method 900 in FIG. 5M, method 1000 can be adapted for both cases when a quantity of an item 130 is removed from or put on a weight sensor 500.

Method 1000 begins at step 1002 when the weight server 235 analyzes a result from a first event corresponding to a quantity of an item 130 being removed from (or, alternatively, put on) a weight sensor 500. For example, method 1000 analyzes the result from either step 914 or step 920 of method 900 of FIG. 5M.

In step 1004, the weight server 235 calculates an instantaneous sensor sensitivity of the weight sensor 500. The instantaneous sensor sensitivity corresponds to a ratio of an electrical, i.e., voltage or current change over a weight change during the first event. For example, if the weight sensor 500 detects a weight change with an amount of 2 pounds (lb.), and converts the 2 pounds (lb.) to a voltage change with an amount of 4 Volt (V), the instantaneous sensor sensitivity of the weight sensor 500 is 2 V/lb.

In step 1006, the weight server 235 determines whether the instantaneous sensor sensitivity is within a second threshold range from a default sensor sensitivity of the weight sensor 500. The default sensor sensitivity of the weight sensor is a predetermined ratio of a voltage change over a weight change that is expected from the weight sensor 500. The second threshold range may be, for example, 20% or any other percentage range.

If it is determined that the instantaneous sensor sensitivity is within the second threshold range from the default sensor sensitivity, the method 1000 proceeds to perform steps 1008 and 1010. If, however, it is determined that the instantaneous sensor sensitivity is not within the second threshold range from the default sensor sensitivity, the method 1000 proceeds to perform steps 1012 and 1014. In other words, in step 1006, the weight server 235 determines whether the environmental changes, e.g., the temperature changes around the weight sensor 500 have affected the sensor sensitivity of the weight sensor 500 such that it detects an inaccurate voltage change, i.e., determines whether the instantaneous sensor sensitivity is shifted from the default sensor sensitivity beyond the second threshold range. For example, under normal environmental conditions, e.g. temperature between 20-22° C., it is expected that the weight sensor 500 to have the default sensor sensitivity, e.g., 2.5 V/lb.

In a first example, assume that the instantaneous sensor sensitivity is calculated to be 2 V/lb., the default sensor sensitivity is 2.1 V/lb., and the second threshold range is 20%. In this particular example, the weight server 235 determines that the instantaneous sensor sensitivity is within the second threshold range from the default sensor sensitivity. As such, the method 1000 proceeds to step 1008.

In a second example, assume that the instantaneous sensor sensitivity is calculated to be 2.5 V/lb., and the default sensor sensitivity is 2.1 V/lb., and the second threshold range is 20%. In this particular example, the weight server 235 determines that the instantaneous sensor sensitivity is not within the second threshold range from the default sensor sensitivity. As such, the method 1000 proceeds to step 1012.

In step 1008, the weight server 235 confirms that the quantity of the item 130 indicated in the result (e.g., determined by the method 900) is removed from (or, alternatively, put on) the weight sensor 500. In other words, the weight server 235 determines that at the time of the first event, environmental changes, e.g., temperature changes around the weight sensor 500 have not affected the sensor sensitivity of the weight sensor 500 such that the weight server 235 has detected an inaccurate item quantity.

In step 1010, the weight server 235 records that the instantaneous sensor sensitivity to be used for a next event corresponding to a weight change on the weight sensor 500. This is due to the determination that the instantaneous sensor sensitivity of the weight sensor 500 is not shifted from its default sensor sensitivity beyond the second threshold range, i.e., weight sensor 500 is not affected by the environmental changes.

In step 1012, the weight server 235 determines that a quantity of the item 130 that is closest to an item quantity value using the default sensor sensitivity is removed from (or, alternatively, put on) the weight sensor 500. In other words, the weight server 235 determines that at the time of first event, the environmental changes, e.g., temperature changes around the weight sensor 500 have affected the sensor sensitivity of the weight sensor 500 such that the weight server 235 has detected an inaccurate item quantity. As such, the weight server 235 updates the result by re-calculating the result using the default sensor sensitivity of the weight sensor 500.

For example, assume that the instantaneous sensor sensitivity is calculated to be 2.5 V/lb., and the default sensor sensitivity is 2.1 V/lb., the second threshold range is 20%, and the result calculated using the default sensor sensitivity is 2.3 V/lb. In this particular example, the closest integer to the result is 2. Thus, the weight server 235 determines that two of the item 130 are removed from (or, alternatively, put on) the weight sensor 500 during the first event.

In step 1014, the weight server 235 records that the default sensor sensitivity to be used for a next event corresponding to a weight change on the weight sensor 500. This is due to the determination that the instantaneous sensor sensitivity of the weight sensor 500 is shifted from its default sensor sensitivity beyond the second percentage range, i.e., weight sensor 500 is affected by the environmental changes.

In step 1016, the weight server 235 updates the instantaneous sensor sensitivity of the weight sensor 500 to be used for the next event. The weight server 235 updates the instantaneous sensor sensitivity based on the sensor sensitivity of the weight sensor 500 calculated during the first event. With this method, the weight server 235 keeps track of changes or shifts in the sensor sensitivity of the weight sensor 500. As such, in the next event, in step 1006, the weight server 235 compares the updated instantaneous sensor sensitivity with the default sensor sensitivity.

Modifications, additions, or omissions may be made to method 1000 depicted in FIG. 5O. Method 1000 may include more, fewer, or other steps. For example, steps may be performed in parallel or in any suitable order. While discussed as particular components of weight subsystems 206 or 250 performing the steps, any suitable component of weight subsystems 206 or 250 may perform one or more steps of the method.

V. Central Server

Figure 6B:
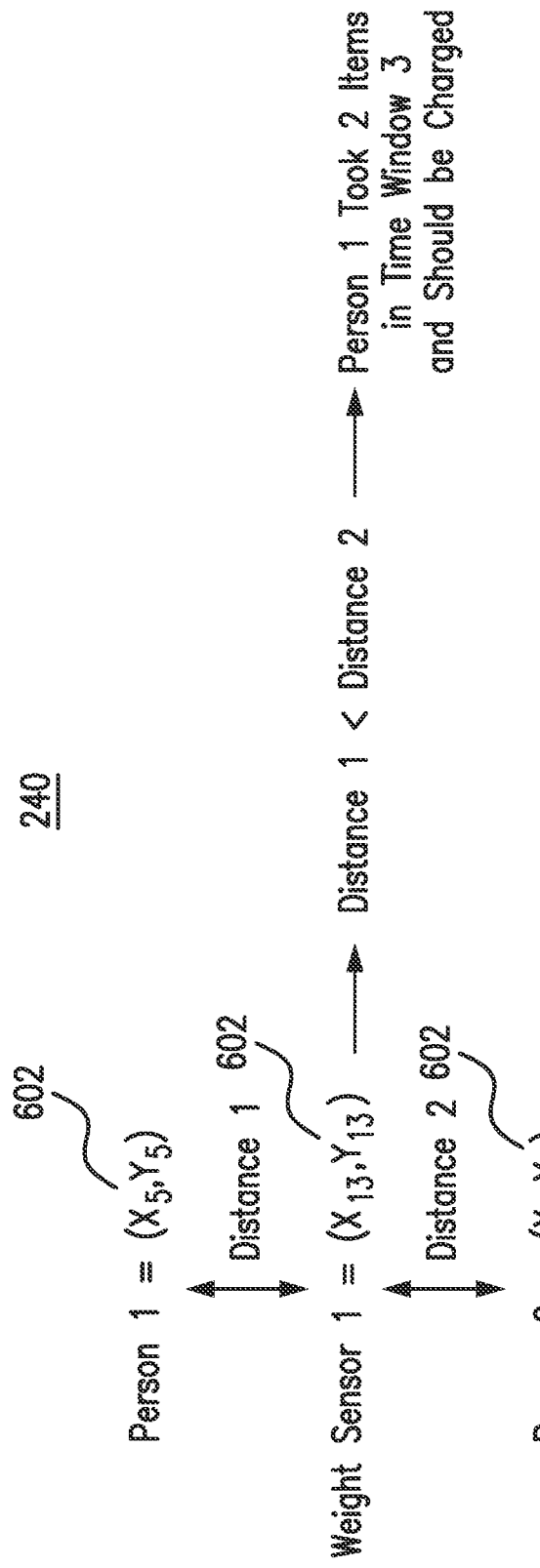
Figure 6C:
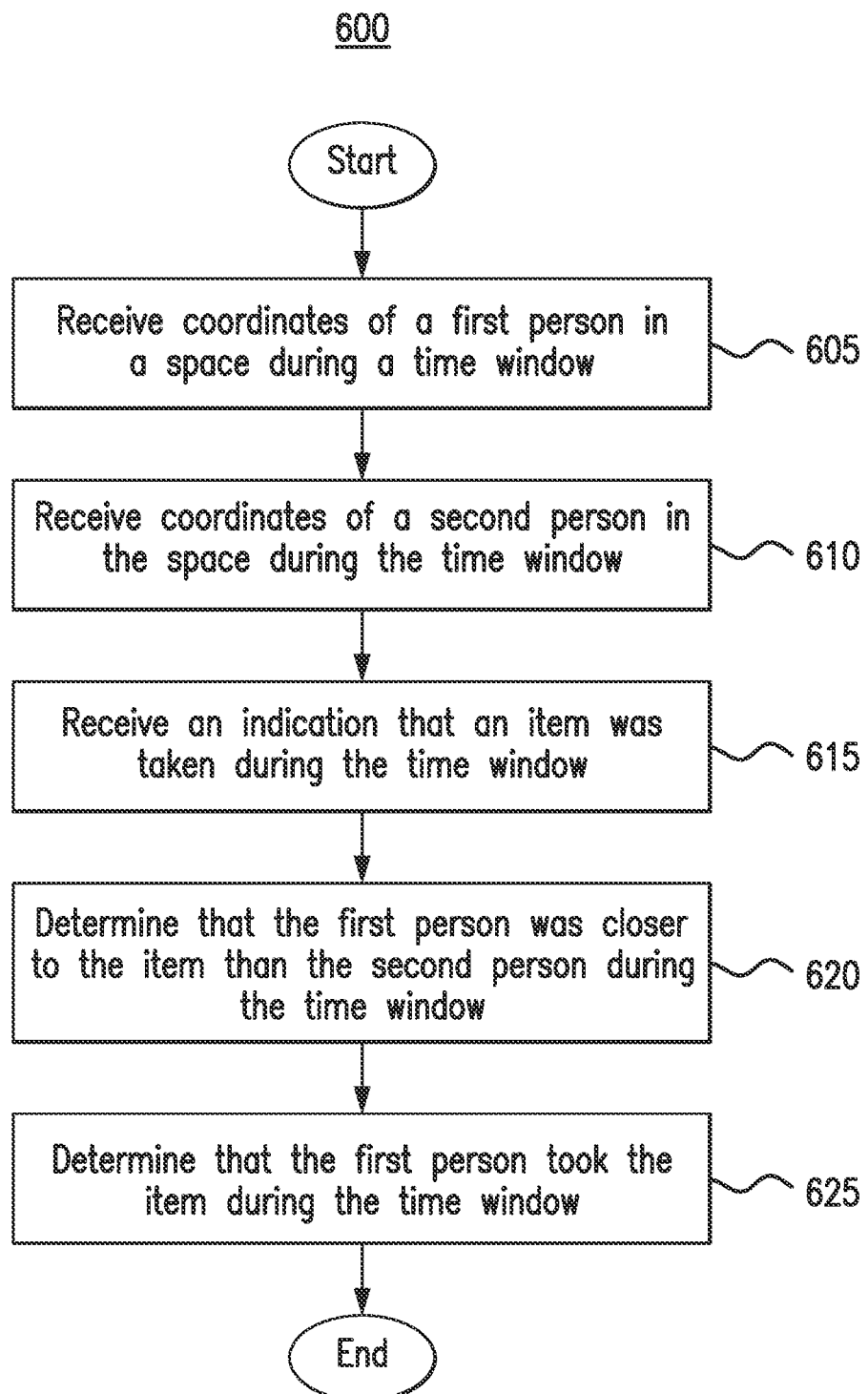

FIGS. 6A-6C show the operation of central server 240. Generally, central server 240 analyzes the information from the various subsystems (e.g., camera subsystem 202, LiDAR subsystem 204, weight subsystem 206, etc.) and determines which person in a space removed which items from the space. As discussed previously, these subsystems group information into time windows 332 that are aligned across the subsystems. By grouping information into aligned time windows 332, central server 240 can find relationships between information from disparate subsystems and glean additional information (e.g., which person removed which item 130). In some embodiments, central server 240 also charges people for items they removed from the space when those people exit store 100.

FIGS. 6A and 6B show an example operation of central server 240. As seen in FIG. 6A, central server 240 receives information from various servers during particular time windows. In the example of FIG. 6A, central server 240 receives the physical position of two people in the space from camera server 225 during a first time window 332A. This disclosure uses capital 'X' and capital 'Y' to denote the physical coordinates 602 of a person or object in the space and to distinguish the physical coordinates 602 of the person or object in the space determined by camera server 225 and LiDAR server 230 from the local coordinates determined by other components (e.g., coordinates 322 determined by camera clients 220 and coordinates 410 determined by LiDAR sensors 405).

According to the camera server 225, the first person is at a physical coordinate 602 $(X_1, Y_1)$, and the second person is at a physical coordinate 602 $(X_2, Y_2)$. Additionally, central server 240 receives from LiDAR server 230 the physical location of the two people. According to the LiDAR server 230, the first person is at coordinate 602 $(X_7, Y_7)$ and the second person is at coordinate 602 $(X_8, Y_8)$. Furthermore, central server 240 also receives information from weight server 235 during the first time window 332A. According to weight server 235, no items 130 were taken during the first time window 332A.

This disclosure contemplates central server 240 using any suitable process for analyzing the physical position of people from camera server 225 and LiDAR server 230. Although the coordinates 602 provided by camera server 225 and LiDAR server 230 may differ from each other, central server 240 may use any appropriate process for reconciling these differences. For example, central server 240 may use the coordinates 602 provided by camera server 225 if the coordinates 602 provided by LiDAR server 230 do not differ from the coordinates 602 provided by camera server 225 by an amount that exceeds a threshold. In this manner, the coordinates 602 provided by LiDAR sever 230 act as a check on the coordinates 602 provided by camera server 225.

During a second time window 332B, central server 240 receives from camera server 225 the physical coordinates 602 of the two people. According to camera server 225, during the second time window 332B, the first person was at coordinate 602 $(X_3, Y_3)$ and the second person was at coordinate 602 $(X_4, Y_4)$. During the second time window 332B, camera server 240 also receives the physical coordinates 602 of the two people from LiDAR server 230. According to the LiDAR server 230, the first person is at coordinate 602 $(X_9, Y_9)$ and the second person is at coordinate 602 $(X_{10}, Y_{10})$ during the second time window 332B. Additionally, central server 240 learns from weight server 235 that no items 130 were taken during the second time window 332B.

During a third time window 332C, camera server 240 receives the physical coordinates 602 of the two people from camera server 225. According to the camera server 225, the first person is at coordinate 602 $(X_5, Y_5)$ and the second person is at coordinate 602 $(X_6, Y_6)$. Central server 240 also receives the physical coordinates 602 of the two people from LiDAR server 230 during the third time window 332C. According to the LiDAR server 230, the first person is at coordinate 602 $(X_{11}, Y_{11})$ and the second person is at coordinate 602 $(X_{12}, Y_{12})$ during the third time window 332C. Additionally, central server 240 learns from weight server 235 that a particular weight sensor 500 detected that two items 130 were taken during the third time window 332C.

In response to learning that a weight sensor 500 detected that two items 130 were taken, central server 240 may undergo additional analysis to determine which person took those two items 130. Central server 240 performs any suitable process for determining which person took items 130. Several of these processes are disclosed in U.S. application Ser. No. 16/663,710 entitled, "Topview Object Tracking Using a Sensor Array", the contents of which are incorporated by reference herein.

FIG. 6B shows central server 240 performing an example analysis to determine which person took items 130. As seen in FIG. 6B, central server 240 first determines the physical coordinates 602 of the two people during the third time window 332C. Central server 240 determines that the first person was at coordinate 602 ($X_5$, $Y_5$) during the third time window 332C and the second person was at coordinate 602 ($X_6$, $Y_6$) during the third time window 332C. Central server 240 also determines the physical location of the weight sensor 500 that detected the items that were taken. In example of FIG. 6B, central server 240 determines that the weight sensor 500 is located at coordinate 602 ($X_{13}$, $Y_{13}$).

Central server 240 then determines the distance from each person to the weight sensor 500. Central server 240 determines that the first person is a distance 1 from the weight sensor 500 and that the second person is a distance 2 from the weight sensor 500. Central server 240 then determines which person was closer to the weight sensor 500. In the example of FIG. 4B, central server 240 determines that distance 1 is less than distance 2 and, thus, the first person was closer to the weight sensor 500 than the second person. As a result, central server 240 determines that the first person took the two items 130 during the third time window 332C and that the first person should be charged for these two items 130.

FIG. 6C illustrates an example method 600 for operating central server 240. In particular embodiments, central server 240 performs the steps of method 600 to determine which person in a space took an item 130.

Central server 240 begins by receiving coordinates 602 of a first person in a space during a time window 332 in step 605. In step 610, central server 240 receives the coordinates 602 of a second person in the space during the time window 332. Central server 240 receives an indication that an item 130 was taken during the time window 332 in step 615. In response to reeving that indication, central server 240 analyzes the information to determine which person took that item 130.

In step 620, central server 240 determines that the first person was closer to the item 130 than the second person during the time window 332. Central server 240 may make this determination based on determined distances between the people and a weight sensor 500 that detected the item 130 was removed. In step 625, central server 240 determines that the first person took the item 130 during the time window 332 in response to determining that the first person was closer to the item 130 than the second person. The first person may then be charged for the item 130 when the first person exits the store 100.

Modifications, additions, or omissions may be made to method 600 depicted in FIG. 6C. Method 600 may include more, fewer, or other steps. For example, steps may be performed in parallel or in any suitable order. While discussed as central server 240 performing the steps, any suitable component of tracking system 132 may perform one or more steps of the method.

VI. Hardware

Figure 7:
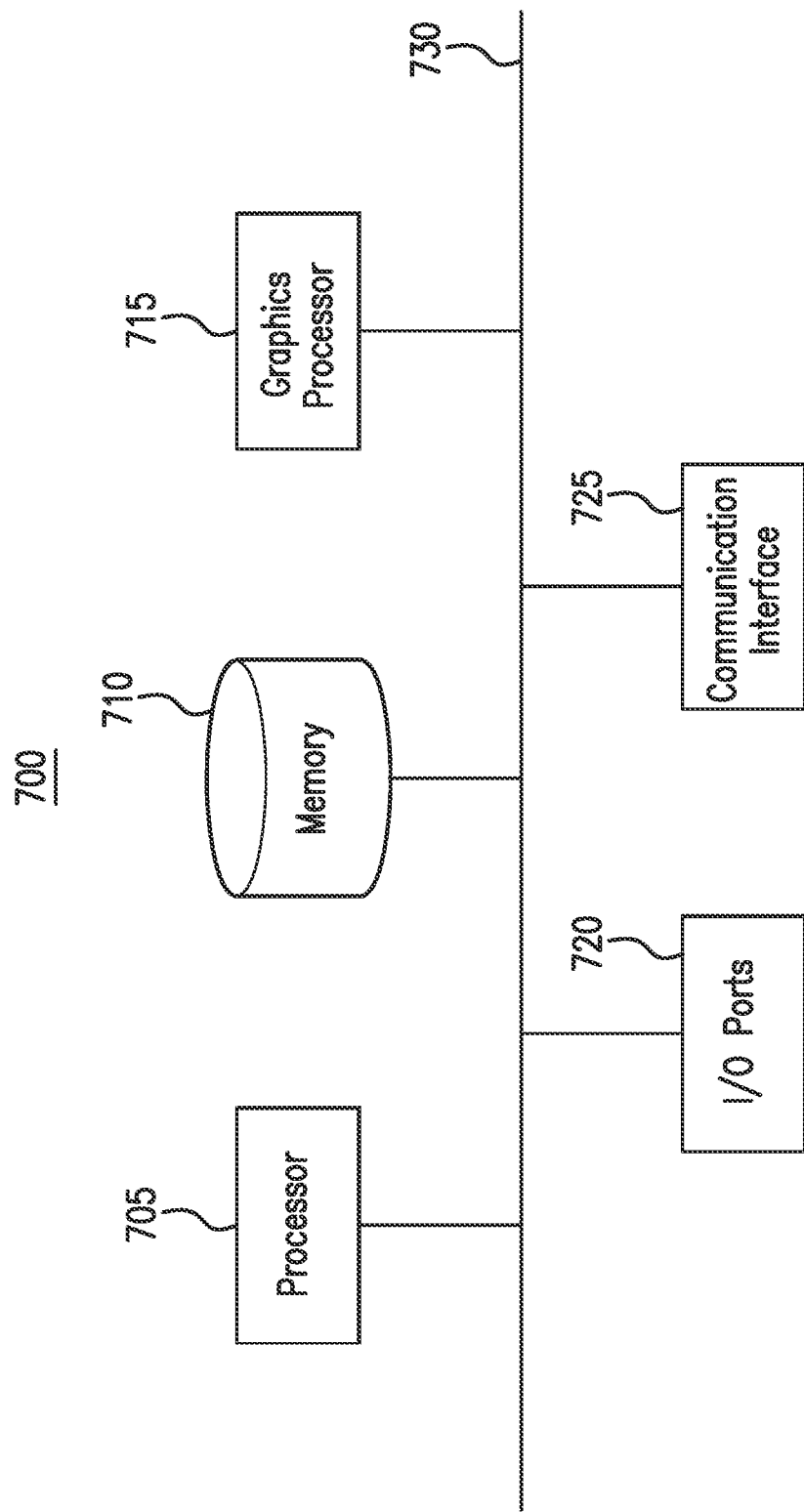
FIG. 7 illustrates an example computer.

FIG. 7 illustrates an example computer 700 used in tracking system 132. Generally, computer 700 can be used to implement components of tracking system 132. For example, computer 700 can be used to implement a camera client 220, a camera server 225, a LiDAR server 230, a weight server 235, and/or a central server 240. As seen in FIG. 7, computer 700 includes various hardware components, such as a processor 705, a memory 710, a graphics processor 715, input/output ports 720, a communication interface 725, and a bus 730. This disclosure contemplates the components of computer 700 being configured to perform any of the functions of camera client 220, camera server 225, LiDAR server 230, weight server 235, and/or central server 240 discussed herein. Circuit board 565 may also include certain components of computer 700.

Processor 705 is any electronic circuitry, including, but not limited to microprocessors, application specific integrated circuits (ASIC), application specific instruction set processor (ASIP), and/or state machines, that communicatively couples to memory 710 and controls the operation of computer 700. Processor 705 may be 8-bit, 16-bit, 32-bit, 64-bit or of any other suitable architecture. Processor 705 may include an arithmetic logic unit (ALU) for performing arithmetic and logic operations, processor registers that supply operands to the ALU and store the results of ALU operations, and a control unit that fetches instructions from memory and executes them by directing the coordinated operations of the ALU, registers and other components. Processor 705 may include other hardware that operates software to control and process information. Processor 705 executes software stored on memory to perform any of the functions described herein. Processor 705 controls the operation and administration of computer 700 by processing information received from memory 710 and/or other computers 700. Processor 705 may be a programmable logic device, a microcontroller, a microprocessor, any suitable processing device, or any suitable combination of the preceding. Processor 705 is not limited to a single processing device and may encompass multiple processing devices.

Memory 710 may store, either permanently or temporarily, data, operational software, or other information for processor 705. Memory 710 may include any one or a combination of volatile or non-volatile local or remote devices suitable for storing information. For example, memory 710 may include random access memory (RAM), read only memory (ROM), magnetic storage devices, optical storage devices, or any other suitable information storage device or a combination of these devices. The software represents any suitable set of instructions, logic, or code embodied in a computer-readable storage medium. For example, the software may be embodied in memory 710, a disk, a CD, or a flash drive. In particular embodiments, the software may include an application executable by processor 705 to perform one or more of the functions described herein.

Graphics processor 715 may be any electronic circuitry, including, but not limited to microprocessors, application specific integrated circuits (ASIC), application specific instruction set processor (ASIP), and/or state machines, that receives and analyzes video data. For example, graphics processor 715 may process video data to determine the proper signals to send to a display so that the display displays an appropriate image. Graphics processor 715 may also process video data to identify certain characteristics (e.g., people or objects) within the video. Graphics processor 715 may be a component of a video card that is installed in computer 700.

Input/output ports 720 allow peripheral devices to connect to computer 700. Ports 720 may be any suitable ports, such as, parallel ports, serial ports, optical ports, video ports, network ports, etc. Peripheral devices such as keyboards, mouses, joysticks, optical tracking devices, trackpads, touchpads, etc. can connect to computer 700 through ports 720. Input and output signals are communicated between computer 700 and the peripheral devices through ports 720.

Communication interface 725 includes any suitable hardware and/or software to communicate over a network. For example, communication interface 725 may include a mode, network card, ethernet port/controller, wireless radio/controller, cellular radio/controller, and/or universal serial bus port/controller. Computer 700 may use communication interface 725 to communicate with other devices over a communication network.

Bus 730 allows components of computer 700 to communicate with one another. Computer 700 may include a bus controller 730 that manages communication over bus 730.

As described above in the corresponding descriptions of FIGS. 3U-3Y, the present disclosure contemplates determining people detections including one or more of contours, bounding areas/boxes, and segmentation masks associated with people in frames. The corresponding description below includes a detailed explanation of how the people detections are determined and used in tracking those people throughout the store. In the present disclosure, bounding areas and bounding boxes are used interchangeably.

Auto-Exclusion Zones

Referring back to FIGS. 1A-1C, in order to track the movement of people in the space, the tracking system 132 should generally be able to distinguish between the people (i.e., the target objects) and other objects (i.e., non-target objects), such as the racks 115, displays, and any other non-human objects in the store 100. Otherwise, the tracking system 132 may waste memory and processing resources detecting and attempting to track these non-target objects. As described elsewhere in this disclosure (e.g., in FIGS. 13-16 and the corresponding description below), in some cases, people may be tracked may be performed by detecting one or more contours in a set of image frames (e.g., a video) and monitoring movements of the contour between frames. A contour is generally a curve associated with an edge of a representation of a person in an image. While the tracking system 132 may detect contours in order to track people, in some instances, it may be difficult to distinguish between contours that correspond to people (e.g., or other target objects) and contours associated with non-target objects, such as racks 115, signs, product displays, and the like.

Even if cameras 305 are calibrated at installation to account for the presence of non-target objects, in many cases, it may be challenging to reliably and efficiently recalibrate the cameras 305 to account for changes in positions of non-target objects that should not be tracked in the space. For example, if a rack 115, sign, product display, or other furniture or object in space is added, removed, or moved (e.g., all activities which may occur frequently and which may occur without warning and/or unintentionally), one or more of the cameras 305 may require recalibration or adjustment. Without this recalibration or adjustment, it is difficult or impossible to reliably track people in the space. Prior to this disclosure, there was a lack of tools for efficiently recalibrating and/or adjusting sensors, such as cameras 305, in a manner that would provide reliable tracking.

This disclosure encompasses the recognition not only of the previously unrecognized problems described above (e.g., with respect to tracking people in space, which may change over time) but also provides unique solutions to these problems. As described in this disclosure, during an initial time period before people are tracked, pixel regions from each camera 305 may be determined that should be excluded during subsequent tracking. For example, during the initial time period, the space may not include any people such that contours detected by each camera 305 correspond only to non-target objects in the space for which tracking is not desired. Thus, pixel regions, or "auto-exclusion zones," corresponding to portions of each image generated by cameras 305 that are not used for object detection and tracking (e.g., the pixel coordinates of contours that should not be tracked). For instance, the auto-exclusion zones may correspond to contours detected in images that are associated with non-target objects, contours that are spuriously detected at the edges of a sensor's field-of-view, and the like). Auto-exclusion zones can be determined automatically at any desired or appropriate time interval to improve the usability and performance of tracking system 132.

After the auto-exclusion zones are determined, the tracking system 132 may proceed to track people in the space. The auto-exclusion zones are used to limit the pixel regions used by each camera 305 for tracking people. For example, pixels corresponding to auto-exclusion zones may be ignored by the tracking system 132 during tracking. In some cases, a detected person (e.g., or other target object) may be near or partially overlapping with one or more auto-exclusion zones. In these cases, the tracking system 132 may determine, based on the extent to which a potential target object's position overlaps with the auto-exclusion zone, whether the target object will be tracked. This may reduce or eliminate false positive detection of non-target objects during person tracking in the space, while also improving the efficiency of tracking system 132 by reducing wasted processing resources that would otherwise be expended attempting to track non-target objects. In some embodiments, a map of the space may be generated that presents the physical regions that are excluded during tracking (i.e., a map that presents a representation of the auto-exclusion zone(s) in the physical coordinates of the space). Such a map, for example, may facilitate trouble-shooting of the tracking system by allowing an administrator to visually confirm that people can be tracked in appropriate portions of the space.

Figure 8:
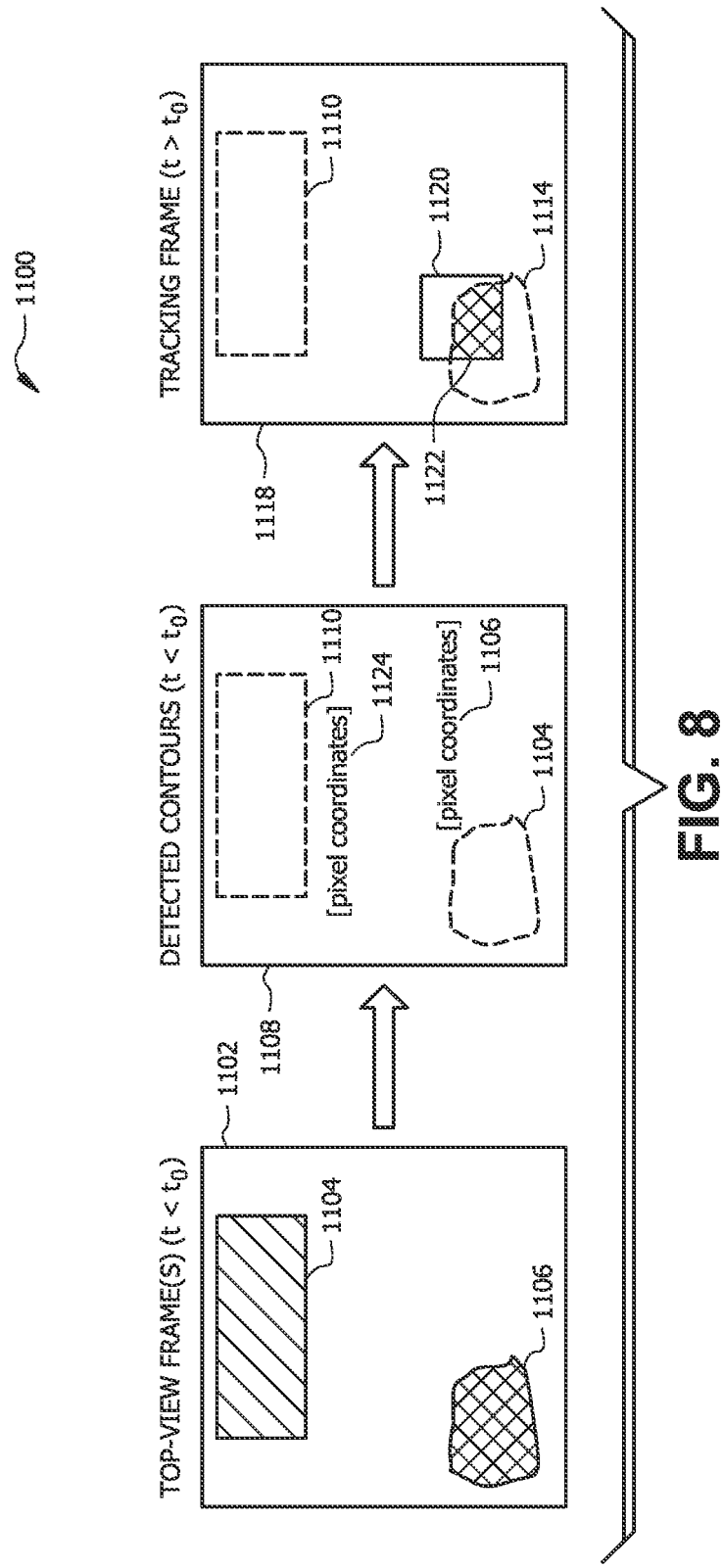
FIG. 8 illustrates a diagram of the determination and use of auto-exclusion zones by the tracking system.

FIG. 8 illustrates the determination of auto-exclusion zones 1110, 1114 and the subsequent use of these auto-exclusion zones 1110, 1114 for improved tracking of people (e.g., or other target objects) in the space. In general, during an initial time period ($t<t_0$), top-view image frames are received by the client(s) 220 and/or camera server 225 from cameras 305 and used to determine auto-exclusion zones 1110, 1114. For instance, the initial time period at $t<t_0$ may correspond to a time when no people are in the space. For example, if the space is open to the public during a portion of the day, the initial time period may be before the space is opened to the public. In some embodiments, the camera server 225 and/or client 220 may provide, for example, an alert or transmit a signal indicating that the space should be emptied of people (e.g., or other target objects to be tracked) in order for auto-exclusion zones 1110, 1114 to be identified. In some embodiments, a user may input a command (e.g., via any appropriate interface coupled to the camera server 225 and/or client(s) 220) to initiate the determination of auto-exclusion zones 1110, 1114 immediately or at one or more desired times in the future (e.g., based on a schedule).

An example top-view image frame 1102 used for determining auto-exclusion zones 1110, 1114 is shown in FIG. 8. Image frame 1102 includes a representation of a first object 1104 (e.g., a rack 115) and a representation of a second object 1106. For instance, the first object 1104 may be a rack 115, and the second object 1106 may be a product display or any other non-target object in the space. In some embodiments, the second object 1106 may not correspond to an actual object in the space but may instead be detected anomalously because of lighting in the space and/or a sensor error. Each camera 305 generally generates at least one frame 1102 during the initial time period, and these frame(s) 1102 is/are used to determine corresponding auto-exclusion zones 1110, 1114 for the camera 305. For instance, the camera client 220 may receive the top-view image 1102, and detect contours (i.e., the dashed lines around zones 1110, 1114) corresponding to the auto-exclusion zones 1110, 1114 as illustrated in view 1108. The contours of auto-exclusion zones 1110, 1114 generally correspond to curves that extend along a boundary (e.g., the edge) of objects 1104, 1106 in image 1102. The view 1108 generally corresponds to a presentation of image 1102 in which the detected contours corresponding to auto-exclusion zones 1110, 1114 are presented but the corresponding objects 1104, 1106, respectively, are not shown. For an image frame 1102 that includes color and depth data, contours for auto-exclusion zones 1110, 1114 may be determined at a given depth (e.g., a distance away from camera 305) based on the color data in the image 1102. For example, a steep gradient of a color value may correspond to an edge of an object and used to determine, or detect, a contour. For example, contours for the auto-exclusion zones 1110, 1114 may be determined using any suitable contour or edge detection method such as Canny edge detection, threshold-based detection, or the like.

The client 220 determines pixel coordinates 1112 and 1116 corresponding to the locations of the auto-exclusions zones 1110 and 1114, respectively. The pixel coordinates 1112, 1116 generally correspond to the locations (e.g., row and column numbers) in the image frame 1102 that should be excluded during tracking. In general, objects associated with the pixel coordinates 1112, 1116 are not tracked by the tracking system 132. Moreover, certain objects which are detected outside of the auto-exclusion zones 1110, 1114 may not be tracked under certain conditions. For instance, if the position of the object (e.g., the position associated with region 1120, discussed below with respect to view 1114) overlaps at least a threshold amount with an auto-exclusion zone 1110, 1114, the object may not be tracked. This prevents the tracking system 132 (i.e., or the local client 220 associated with a camera 305 or a subset of cameras 305) from attempting to unnecessarily track non-target objects. In some cases, auto-exclusion zones 1110, 1114 correspond to non-target (e.g., inanimate) objects in the field-of-view of a camera 305 (e.g., a rack 115, which is associated with contour 1110). However, auto-exclusion zones 1110, 1114 may also or alternatively correspond to other aberrant features or contours detected by a camera 305 (e.g., caused by sensor errors, inconsistent lighting, or the like).

Following the determination of pixel coordinates 1112, 1116 to exclude during tracking, objects may be tracked during a subsequent time period corresponding to $t > t_0$. An example image frame 1118 generated during tracking is shown in FIG. 8. In frame 1118, region 1120 is detected as possibly corresponding to what may or may not be a target object. For example, region 1120 may correspond to a pixel mask or bounding box generated based on a contour detected in frame 1102. For example, a pixel mask may be generated to fill in the area inside the contour or a bounding box may be generated to encompass the contour. For example, a pixel mask may include the pixel coordinates within the corresponding contour. For instance, the pixel coordinates 1112 of auto-exclusion zone 1110 may effectively correspond to a mask that overlays or "fills in" the auto-exclusion zone 1110. Following the detection of region 1120, the client 220 determines whether the region 1120 corresponds to a target object which should tracked or is sufficiently overlapping with auto-exclusion zone 1114 to consider region 1120 as being associated with a non-target object. For example, the client 220 may determine whether at least a threshold percentage of the pixel coordinates 1116 overlap with (e.g., are the same as) pixel coordinates of region 1120. The overlapping region 1122 of these pixel coordinates is illustrated in frame 1118. For example, the threshold percentage may be about 50% or more. In some embodiments, the threshold percentage may be as small as about 10%. In response to determining that at least the threshold percentage of pixel coordinates overlap, the client 220 generally does not determine a pixel position for tracking the object associated with region 1120. However, if overlap 1122 correspond to less than the threshold percentage, an object associated with region 1120 is tracked, as described further below (e.g., with respect to FIGS. 13-16).

As described above, cameras 305 may be arranged such that adjacent cameras 305 have overlapping fields-of-view. For instance, fields-of-view of adjacent cameras 305 may overlap by between about 10% to 30%. As such, the same object may be detected by two different cameras 305 and either included or excluded from tracking in the image frames received from each camera 305 based on the unique auto-exclusion zones determined for each camera 305. This may facilitate more reliable tracking than was previously possible, even when one camera 305 may have a large auto-exclusion zone (i.e., where a large proportion of pixel coordinates in image frames generated by the camera 305 are excluded from tracking). Accordingly, if one camera 305 malfunctions, adjacent cameras 305 may still provide adequate tracking in the space.

Figure 9:
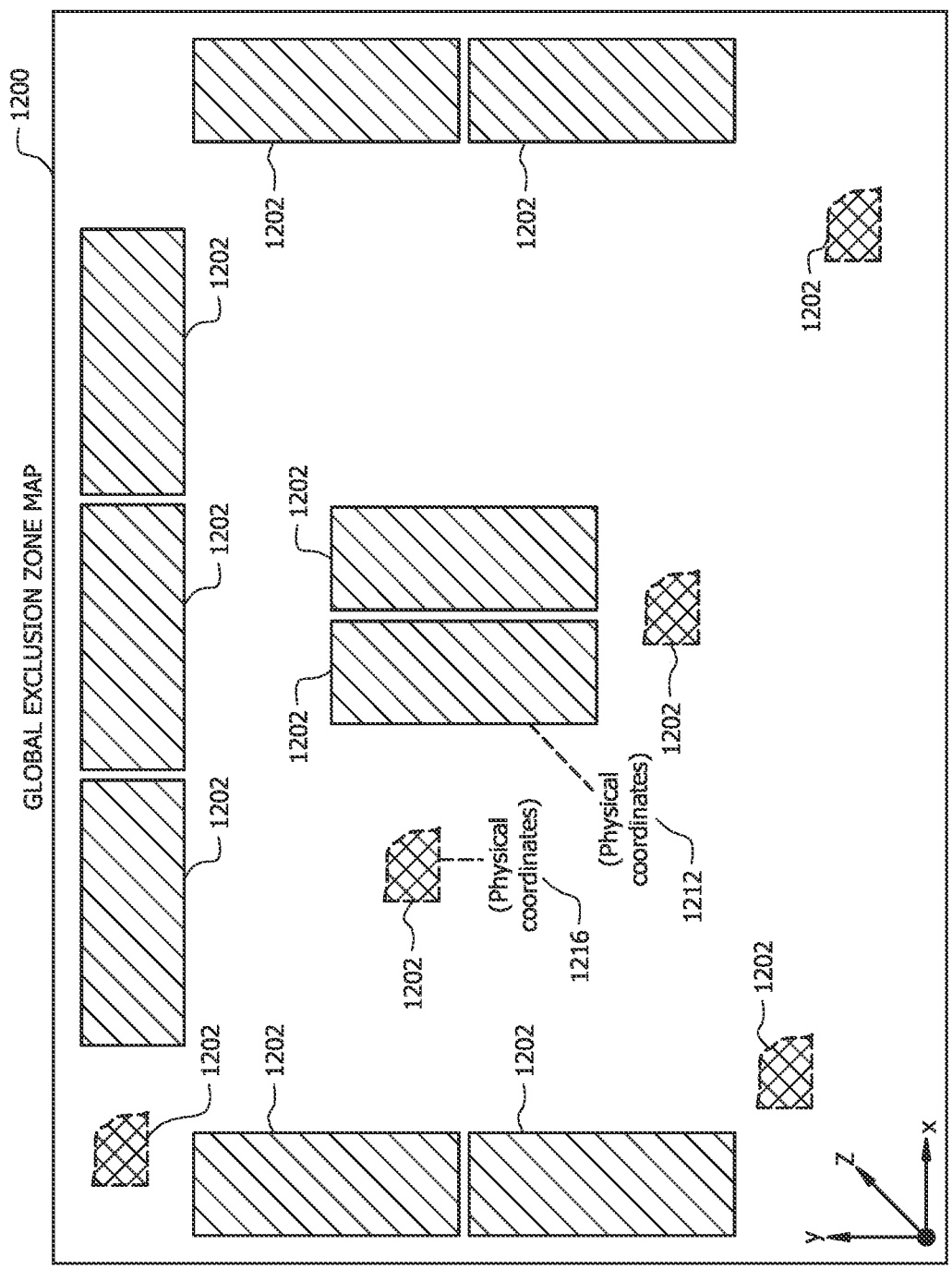
FIG. 9 illustrates an example auto-exclusion zone map generated by the tracking system.

If region 1120 corresponds to a target object (i.e., a person to track in the space), the tracking system 132 proceeds to track the region 1120. Example methods of tracking are described in greater detail below with respect to FIGS. 13-16. In some embodiments, the camera server 225 uses the pixel coordinates 1112, 1116 to determine corresponding physical coordinates (e.g., coordinates 1212, 1216 illustrated in FIG. 9, described below). For instance, the client 220 may determine pixel coordinates 1112, 1116 corresponding to the local auto-exclusion zones 1110, 1114 of a camera 305 and transmit these coordinates 1112, 1116 to the camera server 235. As shown in FIG. 9, the camera server 225 may use the pixel coordinates 1112, 1116 received from the camera 305 to determine corresponding physical coordinates 1210, 1216. For instance, a homography generated for each camera 305 (see FIGS. 3A-3T and the corresponding description above), which associates pixel coordinates (e.g., coordinates 1112, 1116) in an image generated by a given camera 305 to corresponding physical coordinates (e.g., coordinates 1212, 1216) in the space, may be employed to convert the excluded pixel coordinates 1112, 1116 (of FIG. 8) to excluded physical coordinates 1212, 1216 in the space. These excluded coordinates 1210, 1216 may be used along with other coordinates from other cameras 305 to generate the global auto-exclusion zone map 1200 of the space which is illustrated in FIG. 9. This map 1200, for example, may facilitate trouble-shooting of the tracking system 132 by facilitating quantification, identification, and/or verification of physical regions 1202 of space where objects may (and may not) be tracked. This may allow an administrator or other individual to visually confirm that objects can be tracked in appropriate portions of the space). If regions 1202 correspond to known high-traffic zones of the space, system maintenance may be appropriate (e.g., which may involve replacing, adjusting, and/or adding additional cameras 305).

Figure 10:
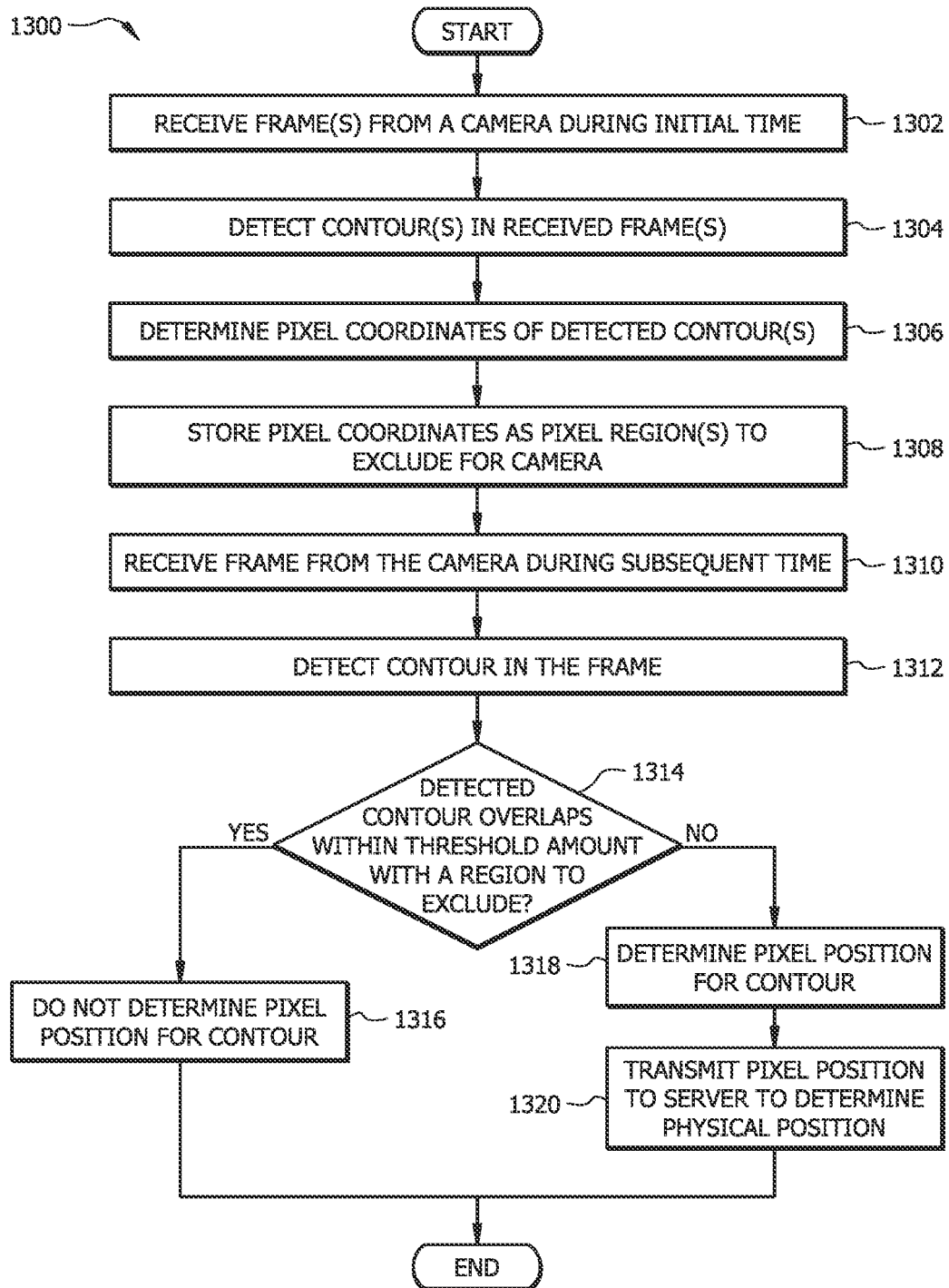
FIG. 10 illustrates a flowchart of an example method of generating and using auto-exclusion zones for object tracking using the tracking system.

FIG. 10 is a flowchart illustrating an example method 1300 for generating and using auto-exclusion zones (e.g., zones 1110, 1114 of FIG. 8). Method 1300 may begin at step 1302 where one or more image frames 1102 are received during an initial time period. As described above, the initial time period may correspond to an interval of time when no person is moving throughout the space, or when no person is within the field-of-view of one or more cameras 305 from which the image frame(s) 1102 is/are received. In a typical embodiment, one or more image frames 1102 are generally received from each camera 305 of the tracking system 132, such that local regions (e.g., auto-exclusion zones 1110, 1114) to exclude for each camera 305 may be determined. In some embodiments, a single image frame 1102 is received from each camera 305 to detect auto-exclusion zones 1110, 1114. However, in other embodiments, multiple image frames 1102 are received from each camera 305. Using multiple image frames 1102 to identify auto-exclusions zones 1110, 1114 for each camera 305 may improve the detection of any spurious contours or other aberrations that correspond to pixel coordinates (e.g., coordinates 1112, 1116 of FIG. 8) which should be ignored or excluded during tracking.

Figure 11:
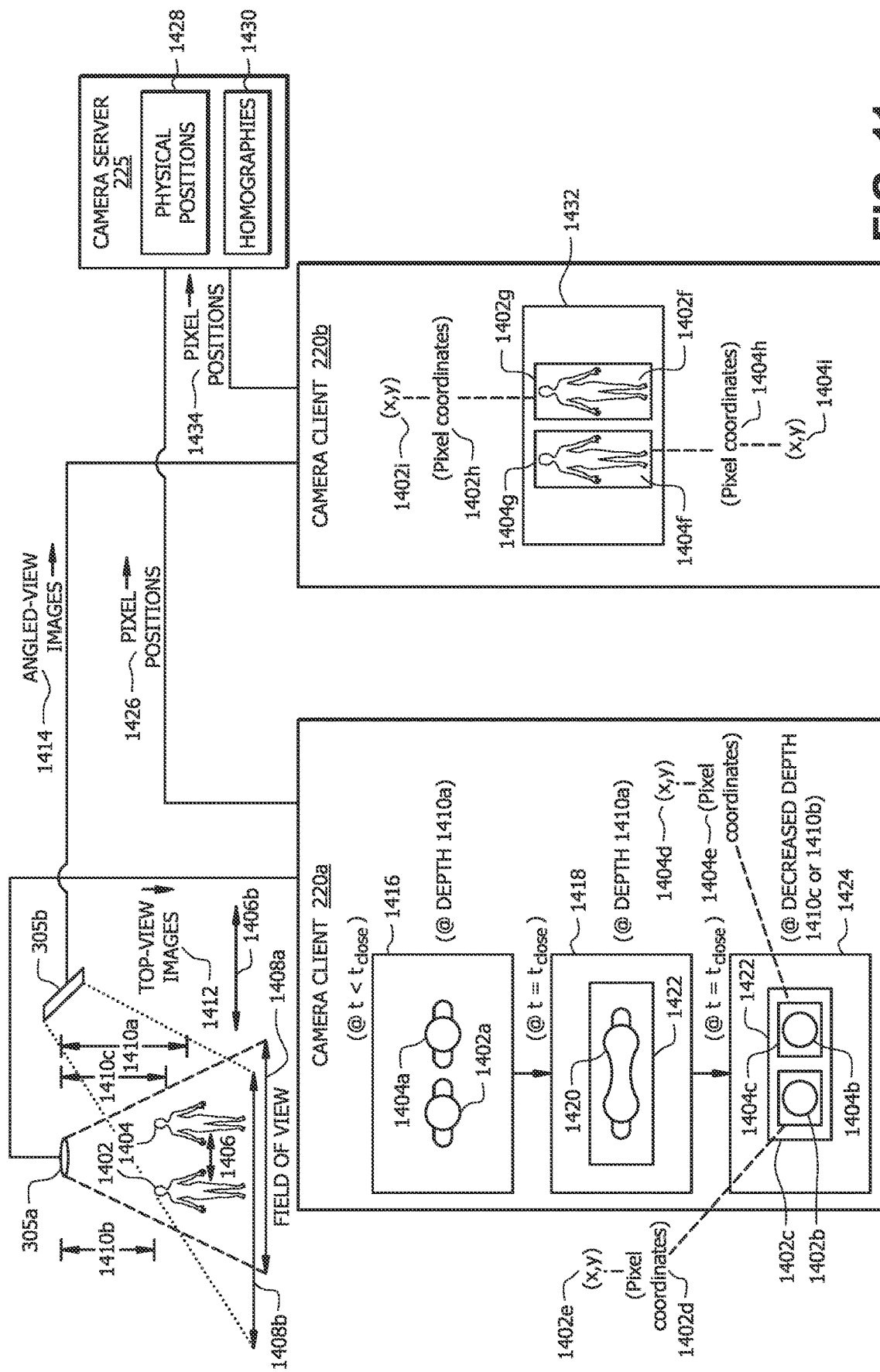
FIG. 11 illustrates a diagram of the detection of closely spaced objects using the tracking system.

At step 1304, contours (e.g., dashed contour lines corresponding to auto-exclusion zones 1110, 1114 of FIG. 8) are detected in the one or more image frames 1102 received at step 1302. Any appropriate contour detection algorithm may be used including but not limited to those based on Canny edge detection, threshold-based detection, and the like. In some embodiments, the unique contour detection approaches described in this disclosure may be used (e.g., to distinguish closely spaced contours in the field-of-view, as described below, for example, with respect to FIGS. 11 and 12). At step 1306, pixel coordinates (e.g., coordinates 1112, 1116 of FIG. 8) are determined for the detected contours (from step 1304). The coordinates may be determined, for example, based on a pixel mask that overlays the detected contours. A pixel mask may for example, correspond to pixels within the contours. In some embodiments, pixel coordinates correspond to the pixel coordinates within a bounding box determined for the contour (e.g., as illustrated in FIG. 11, described below). For instance, the bounding box may be a rectangular box with an area that encompasses the detected contour. At step 1308, the pixel coordinates are stored. For instance, the client 220 may store the pixel coordinates corresponding to auto-exclusion zones 1110, 1114 in memory (e.g., memory 710 of FIG. 7, described above). As described above, the pixel coordinates may also or alternatively be transmitted to the camera server 225 (e.g., to generate a map 1200 of the space, as illustrated in the example of FIG. 9).

At step 1310, the client 220 receives an image frame 1118 during a subsequent time during which tracking is performed (i.e., after the pixel coordinates corresponding to auto-exclusion zones are stored at step 1308). The frame is received from camera 305 and includes a representation of an object in the space. At step 1312, a contour is detected in the frame received at step 1310. For example, the contour may correspond to a curve along the edge of object represented in the frame 1102. The pixel coordinates determined at step 1306 may be excluded (or not used) during contour detection. For instance, image data may be ignored and/or removed (e.g., given a value of zero, or the color equivalent) at the pixel coordinates determined at step 1306, such that no contours are detected at these coordinates. In some cases, a contour may be detected outside of these coordinates. In some cases, a contour may be detected that is partially outside of these coordinates but overlaps partially with the coordinates (e.g., as illustrated in image 1118 of FIG. 8).

At step 1314, the client 220 generally determines whether the detected contour has a pixel position that sufficiently overlaps with pixel coordinates of the auto-exclusion zones 1110, 1114 determined at step 1306. If the coordinates sufficiently overlap, the contour or region 1120 (i.e., and the associated object) is not tracked in the frame. For instance, as described above, the client 220 may determine whether the detected contour or region 1120 overlaps at least a threshold percentage (e.g., of 50%) with a region associated with the pixel coordinates (e.g., see overlapping region 1122 of FIG. 8). If the criteria of step 1314 are satisfied, the client 220 generally, at step 1316, does not determine a pixel position for the contour detected at step 1312. As such, no pixel position is reported to the camera server 235, thereby reducing or eliminating the waste of processing resources associated with attempting to track an object when it is not a target object for which tracking is desired.

Otherwise, if the criteria of step 1314 are satisfied, the client 220 determines a pixel position for the contour or region 1120 at step 1318. Determining a pixel position from a contour may involve, for example, (i) determining a region 1120 (e.g., a pixel mask or bounding box) associated with the contour and (ii) determining a centroid or other characteristic position of the region as the pixel position. At step 1320, the determined pixel position is transmitted to the camera server 225 to facilitate global tracking, for example, using predetermined homographies, as described elsewhere in this disclosure (e.g., with respect to FIGS. 13-16). For example, the camera server 225 may receive the determined pixel position, access a homography associating pixel coordinates in images generated by the camera 305 from which the frame at step 1310 was received to physical coordinates in the space, and apply the homography to the pixel coordinates to generate corresponding physical coordinates for the tracked object associated with the contour detected at step 1312.

Modifications, additions, or omissions may be made to method 1300 depicted in FIG. 10. Method 1300 may include more, fewer, or other steps. For example, steps may be performed in parallel or in any suitable order. While at times discussed as tracking system 132, client(s) 220, camera server 235, or components of any of thereof performing steps, any suitable system or components of the system may perform one or more steps of the method.

Contour-Based Detection of Closely Spaced People

In some cases, two people are near each other, making it difficult or impossible to reliably detect and/or track each person (e.g., or other target object) using conventional tools. In some cases, the people may be initially detected and tracked using depth images at an approximate waist depth (i.e., a depth corresponding to the waist height of an average person being tracked). Tracking at an approximate waist depth may be more effective at capturing all people regardless of their height or mode of movement. For instance, by detecting and tacking people at an approximate waist depth, the tracking system 132 is highly likely to detect tall and short individuals and individuals who may be using alternative methods of movement (e.g., wheelchairs, and the like). However, if two people with a similar height are standing near each other, it may be difficult to distinguish between the two people in the top-view images at the approximate waist depth. Rather than detecting two separate people, the tracking system 132 may initially detect the people as a single larger object.

This disclosure encompasses the recognition that at a decreased depth (i.e., a depth nearer the heads of the people), the people may be more readily distinguished. This is because the people's heads are more likely to be imaged at the decreased depth, and their heads are smaller and less likely to be detected as a single merged region (or contour, as described in greater detail below). As another example, if two people enter the space standing close to one another (e.g., holding hands), they may appear to be a single larger object. Since the tracking system 132 may initially detect the two people as one person, it may be difficult to properly identify these people if these people separate while in the space. As yet another example, if two people who briefly stand close together are momentarily "lost" or detected as only a single, larger object, it may be difficult to correctly identify the people after they separate from one another.

As described elsewhere in this disclosure (e.g., with respect to FIGS. 8-10 and 13-16), people (e.g., the people in the example scenarios described above) may be tracked by detecting contours in top-view image frames generated by cameras 305 and tracking the positions of these contours. However, when two people are closely spaced, a single merged contour (see merged contour 1420 of FIG. 11 described below) may be detected in a top-view image of the people. This single contour generally cannot be used to track each person individually, resulting in considerable downstream errors during tracking. For example, even if two people separate after having been closely spaced, it may be difficult or impossible using previous tools to determine which person was which, and the identity of each person may be unknown after the two people separate. Prior to this disclosure, there was a lack of reliable tools for detecting people (e.g., and other target objects) under the example scenarios described above and under other similar circumstances.

The systems and methods described in this disclosure provide improvements to previous technology by facilitating the improved detection of closely spaced people. For example, the systems and methods described in this disclosure may facilitate the detection of individual people when contours associated with these people would otherwise be merged, resulting in the detection of a single person using conventional detection strategies. In some embodiments, improved contour detection is achieved by detecting contours at different depths (e.g., at least two depths) to identify separate contours at a second depth within a larger merged contour detected at a first depth used for tracking. For example, if two people are standing near each other such that contours are merged to form a single contour, separate contours associated with heads of the two closely spaced people may be detected at a depth associated with the persons' heads. In some embodiments, a unique statistical approach may be used to differentiate between the two people by selecting bounding regions for the detected contours with a low similarity value. In some embodiments, certain criteria are satisfied to ensure that the detected contours correspond to separate people, thereby providing more reliable person (e.g., or other target object) detection than was previously possible. For example, two contours detected at an approximate head depth may be required to be within a threshold size range in order for the contours to be used for subsequent tracking. In some embodiments, an artificial neural network may be employed to detect separate people that are closely spaced by analyzing top-view images at different depths.

FIG. 11 is a diagram illustrating the detection of two closely spaced people 1402, 1404 based on top-view depth images 1412 and angled-view images 1414 received from cameras 305a,b using the tracking system 132. In one embodiment, cameras 305a,b may each be one of cameras 305 of tracking system 132 described above with respect to FIG. 2B. In another embodiment, cameras 305a,b may each be one of cameras 305 of a separate virtual store system (e.g., layout cameras and/or rack cameras) as described in U.S. patent application Ser. No. 16/664,470 entitled, "Customer-Based Video Feed" which is incorporated by reference herein. In this embodiment, the cameras 305 of tracking system 132 may be mapped to the cameras 305 of the virtual store system using a homography. Moreover, this embodiment can retrieve identifiers and the relative position of each person from the cameras 305 of the virtual store system using the homography between tracking system 132 and the virtual store system. Generally, camera 305a is an overhead sensor configured to generate top-view depth images 1412 (e.g., color and/or depth images) of at least a portion of the space. Camera 305a may be mounted, for example, in a ceiling of the space. Camera 305a may generate image data corresponding to a plurality of depths which include but are not necessarily limited to the depths 1410a-c illustrated in FIG. 11. Depths 1410a-c are generally distances measured from the camera 305a. Each depth 1410a-c may be associated with a corresponding height (e.g., from the floor of the space in which people 1402, 1404 are detected and/or tracked). Camera 305a observes a field-of-view 1408a. Top-view images 1412 generated by camera 305a may be transmitted to the camera client 220a. The camera client 220a is communicatively coupled (e.g., via wired connection of wirelessly) to the camera 305a and the camera server 235. Camera server 225 is described above with respect to FIG. 2B.

In this example, camera 305b is an angled-view sensor, which is configured to generate angled-view images 1414 (e.g., color and/or depth images) of at least a portion of the space. Camera 305b has a field of view 1408b, which overlaps with at least a portion of the field-of-view 1408a of camera 305a. The angled-view images 1414 generated by the angled-view camera 305b are transmitted to camera client 220b. Camera client 220b may be a client 220 described above with respect to FIG. 2. In the example of FIG. 11, cameras 305a,b are coupled to different camera clients 220a,b. However, it should be understood that the same camera client 220 may be used for both cameras 305a,b (e.g., such that clients 220a,b are the same client 220). In some cases, the use of different camera clients 220a,b for cameras 305a,b may provide improved performance because image data may still be obtained for the area shared by fields-of-view 1408a,b even if one of the clients 220a,b were to fail.

In the example scenario illustrated in FIG. 11, people 1402, 1404 are located sufficiently close together such that conventional object detection tools fail to detect the individual people 1402, 1404 (e.g., such that people 1402, 1404 would not have been detected as separate objects). This situation may correspond, for example, to the distance 1406a between people 1402, 1404 being less than a threshold distance 1406b (e.g., of about 6 inches). The threshold distance 1406b can generally be any appropriate distance determined for the system 132. For example, the threshold distance 1406b may be determined based on several characteristics of the system 1400 and the people 1402, 1404 being detected. For example, the threshold distance 1406b may be based on one or more of the distance of the camera 305a from the people 1402, 1404, the size of the people 1402, 1404, the size of the field-of-view 1408a, the sensitivity of the camera 305a, and the like. Accordingly, the threshold distance 1406b may range from just over zero inches to over six inches depending on these and other characteristics of the tracking system 132. People 1402, 1404 may be any target object an individual may desire to detect and/or track based on data (i.e., top-view images 1412 and/or angled-view images 1414) from cameras 305a,b.

The camera client 220a detects contours in top-view images 1412 received from camera 305a. Typically, the camera client 220a detects contours at an initial depth 1410a. The initial depth 1410a may be associated with, for example, a predetermined height (e.g., from the ground) which has been established to detect and/or track people 1402, 1404 through the space. For example, for tracking humans, the initial depth 1410a may be associated with an average shoulder or waist height of people expected to be moving in the space (e.g., a depth which is likely to capture a representation for both tall and short people traversing the space). The camera client 220a may use the top-view images 1412 generated by camera 305a to identify the top-view image 1412 corresponding to when a first contour 1402a associated with the first person 1402 merges with a second contour 1404a associated with the second person 1404. View 1416 illustrates contours 1402a, 1404a at a time prior to when these contours 1402a, 1404a merge (i.e., prior to a time ($t_{close}$) when the first and second people 1402, 1404 are within the threshold distance 1406b of each other). View 1416 corresponds to a view of the contours detected in a top-view image 1412 received from camera 305a (e.g., with other objects in the image not shown).

A subsequent view 1418 corresponds to the image 1412 at or near $t_{close}$ when the people 1402, 1404 are closely spaced and the first and second contours 1402a, 1404a merge to form merged contour 1420. The camera client 220a may determine a region 1422 which corresponds to a "size" of the merged contour 1420 in image coordinates (e.g., a number of pixels associated with contour 1420). For example, region 1422 may correspond to a pixel mask or a bounding box determined for contour 1420. Example approaches to determining pixel masks and bounding boxes are described above with respect to step 1304 of FIG. 10. For example, region 1422 may be a bounding box determined for the contour 1420 using a non-maximum suppression object-detection algorithm. For instance, the camera client 220a may determine a plurality of bounding boxes associated with the contour 1420. For each bounding box, the client 220a may calculate a score. The score, for example, may represent an extent to which that bounding box is similar to the other bounding boxes. The camera client 220a may identify a subset of the bounding boxes with a score that is greater than a threshold value (e.g., 80% or more), and determine region 1422 based on this identified subset. For example, region 1422 may be the bounding box with the highest score or a bounding comprising regions shared by bounding boxes with a score that is above the threshold value.

In order to detect the individual people 1402 and 1404, the camera client 220a may access images 1412 at a decreased depth (i.e., at one or both of depths 1412b and 1412c) and use this data to detect separate contours 1402b, 1404b, illustrated in view 1424. In other words, the camera client 220a may analyze the images 1412 at a depth nearer the heads of people 1402, 1404 in the images 1412 in order to detect the separate people 1402, 1404. In some embodiments, the decreased depth may correspond to an average or predetermined head height of persons expected to be detected by the tracking system 132 in the space. In some cases, contours 1402b, 1404b may be detected at the decreased depth for both people 1402, 1404.

However, in other cases, the camera client 220a may not detect both heads at the decreased depth. For example, if a child and an adult are closely spaced, only the adult's head may be detected at the decreased depth (e.g., at depth 1410b). In this scenario, the camera client 220a may proceed to a slightly increased depth (e.g., to depth 1410c) to detect the head of the child. For instance, in such scenarios, the camera client 220a iteratively increases the depth from the decreased depth towards the initial depth 1410a in order to detect two distinct contours 1402b, 1404b (e.g., for both the adult and the child in the example described above). For instance, the depth may first be decreased to depth 1410b and then increased to depth 1410c if both contours 1402b and 1404b are not detected at depth 1410b. This iterative process is described in greater detail below with respect to method 1500 of FIG. 12.

As described elsewhere in this disclosure, in some cases, the tracking system 132 may maintain a record of features, or descriptors, associated with each tracked person (see, e.g., FIG. 19, described below). As such, the camera client 220a may access this record to determine unique depths that are associated with the people 1402, 1404, which are likely associated with merged contour 1420. For instance, depth 1410b may be associated with a known head height of person 1402, and depth 1412c may be associated with a known head height of person 1404.

Once contours 1402b and 1404b are detected, the camera client determines a region 1402c associated with pixel coordinates 1402d of contour 1402b and a region 1404c associated with pixel coordinates 1404d of contour 1404b. For example, as described above with respect to region 1422, regions 1402c and 1404c may correspond to pixel masks or bounding boxes generated based on the corresponding contours 1402b, 1404b, respectively. For example, pixel masks may be generated to "fill in" the area inside the contours 1402b, 1404b or bounding boxes may be generated which encompass the contours 1402b, 1404b. The pixel coordinates 1402d, 1404d generally correspond to the set of positions (e.g., rows and columns) of pixels within regions 1402c, 1404c.

In some embodiments, a unique approach is employed to more reliably distinguish between closely spaced people 1402 and 1404 and determine associated regions 1402c and 1404c. In these embodiments, the regions 1402c and 1404c are determined using a unique method referred to in this disclosure as "non-minimum suppression." Non-minimum suppression may involve, for example, determining bounding boxes associated with the contour 1402b, 1404b (e.g., using any appropriate object detection algorithm as appreciated by a person of skilled in the relevant art). For each bounding box, a score may be calculated. As described above with respect to non-maximum suppression, the score may represent an extent to which the bounding box is similar to the other bounding boxes. However, rather than identifying bounding boxes with high scores (e.g., as with non-maximum suppression), a subset of the bounding boxes is identified with scores that are less than a threshold value (e.g., of about 20%). This subset may be used to determine regions 1402c, 1404c. For example, regions 1402c, 1404c may include regions shared by each bounding box of the identified subsets. In other words, bounding boxes that are not below the minimum score are "suppressed" and not used to identify regions 1402b, 1404b.

Prior to assigning a position or identity to the contours 1402b, 1404b and/or the associated regions 1402c, 1404c, the camera client 220a may first check whether criteria are satisfied for distinguishing the region 1402c from region 1404c. The criteria are generally designed to ensure that the contours 1402b, 1404b (and/or the associated regions 1402c, 1404c) are appropriately sized, shaped, and positioned to be associated with the heads of the corresponding people 1402, 1404. These criteria may include one or more requirements. For example, one requirement may be that the regions 1402c, 1404c overlap by less than or equal to a threshold amount (e.g., of about 50%, e.g., of about 10%). Generally, the separate heads of different people 1402, 1404 should not overlap in a top-view image 1412. Another requirement may be that the regions 1402c, 1404c are within (e.g., bounded by, e.g., encompassed by) the merged-contour region 1422. This requirement, for example, ensures that the head contours 1402b, 1404b are appropriately positioned above the merged contour 1420 to correspond to heads of people 1402, 1404. If the contours 1402b, 1404b detected at the decreased depth are not within the merged contour 1420, then these contours 1402b, 1404b are likely not the associated with heads of the people 1402, 1404 associated with the merged contour 1420.

Generally, if the criteria are satisfied, the camera client 220a associates region 1402c with a first pixel position 1402e of person 1402 and associates region 1404c with a second pixel position 1404e of person 1404. Each of the first and second pixel positions 1402e, 1404e generally corresponds to a single pixel position (e.g., row and column) associated with the location of the corresponding contour 1402b, 1404b in the image 1412. The first and second pixel positions 1402e, 1404e are included in the pixel positions 1426 which may be transmitted to the camera server 225 to determine corresponding physical (e.g., global) positions 1428, for example, based on homographies 1430 (e.g., using a previously determined homography for camera 305a associating pixel coordinates in images 1412 generated by camera 305a to physical coordinates in the space).

As described above, camera 305b is positioned and configured to generate angled-view images 1414 of at least a portion of the field of-of-view 1408a of camera 305a. The camera client 220b receives the angled-view images 1414 from the second camera 305b. Because of its different (e.g., angled) view of people 1402, 1404 in the space, an angled-view image 1414 obtained at $t_{close}$ may be sufficient to distinguish between the people 1402, 1404. A view 1432 of contours 1402d, 1404d detected at $t_{close}$ shown in FIG. 11. The camera client 220b detects a contour 1402f corresponding to the first person 1402 and determines a corresponding region 1402g associated with pixel coordinates 1402h of contour 1402f. The camera client 220b detects a contour 1404f corresponding to the second person 1404 and determines a corresponding region 1404g associated with pixel coordinates 1404h of contour 1404f. Since contours 1402f, 1404f do not merge and regions 1402g, 1404g are sufficiently separated (e.g., they do not overlap and/or are at least a minimum pixel distance apart), the camera client 220b may associate region 1402g with a first pixel position 1402i of the first person 1402 and region 1404g with a second pixel position 1404i of the second person 1404. Each of the first and second pixel positions 1402i, 1404i generally corresponds to a single pixel position (e.g., row and column) associated with the location of the corresponding contour 1402f, 1404f in the image 1414. Pixel positions 1402i, 1404i may be included in pixel positions 1434 which may be transmitted to camera server 225 to determine physical positions 1428 of the people 1402, 1404 (e.g., using a previously determined homography for camera 305b associating pixel coordinates of images 1414 generated by camera 305b to physical coordinates in the space).

In an example operation of the tracking system 132 camera 305a is configured to generate top-view color-depth images of at least a portion of the space. When people 1402 and 1404 are within a threshold distance of each another, the camera client 220a identifies an image frame (e.g., associated with view 1418) corresponding to a time stamp (e.g., $t_{close}$) where contours 1402a, 1404a associated with the first and second person 1402, 1404, respectively, are merged and form contour 1420. In order to detect each person 1402 and 1404 in the identified image frame (e.g., associated with view 1418), the client 220a may first attempt to detect separate contours for each person 1402, 1404 at a first decreased depth 1410b. As described above, depth 1410b may be a predetermined height associated with an expected head height of people moving through the space. In some embodiments, depth 1410b may be a depth previously determined based on a measured height of person 1402 and/or a measured height of person 1404. For example, depth 1410b may be based on an average height of the two people 1402, 1404. As another example, depth 1410b may be a depth corresponding to a predetermined head height of person 1402 (as illustrated in the example of FIG. 11). If two contours 1402b, 1404b are detected at depth 1410b, these contours may be used to determine pixel positions 1402e, 1404e of people 1402 and 1404, as described above.

If only one contour 1402b is detected at depth 1410b (e.g., if only one person 1402, 1404 is tall enough to be detected at depth 1410b), the region associated with this contour 1402b may be used to determine the pixel position 1402e of the corresponding person, and the next person may be detected at an increased depth 1410c. Depth 1410c is generally greater than 1410b but less than depth 1410a. In the illustrative example of FIG. 11, depth 1410c corresponds to a predetermined head height of person 1404. If contour 1404b is detected for person 1404 at depth 1410c, a pixel position 1404e is determined based on pixel coordinates 1404d associated with the contour 1404b (e.g., following determination that the criteria described above are satisfied). If a contour 1404b is not detected at depth 1410c, the client 220a may attempt to detect contours at progressively increased depths until a contour is detected or a maximum depth (e.g., the initial depth 1410a) is reached. For example, the camera client 220a may continue to search for the contour 1404b at increased depths (i.e., depths between depth 1410c and the initial depth 1410a). If the maximum depth (e.g., depth 1410a) is reached without the contour 1404b being detected, the client 220a generally determines that the separate people 1402, 1404 cannot be detected.

Figure 12:
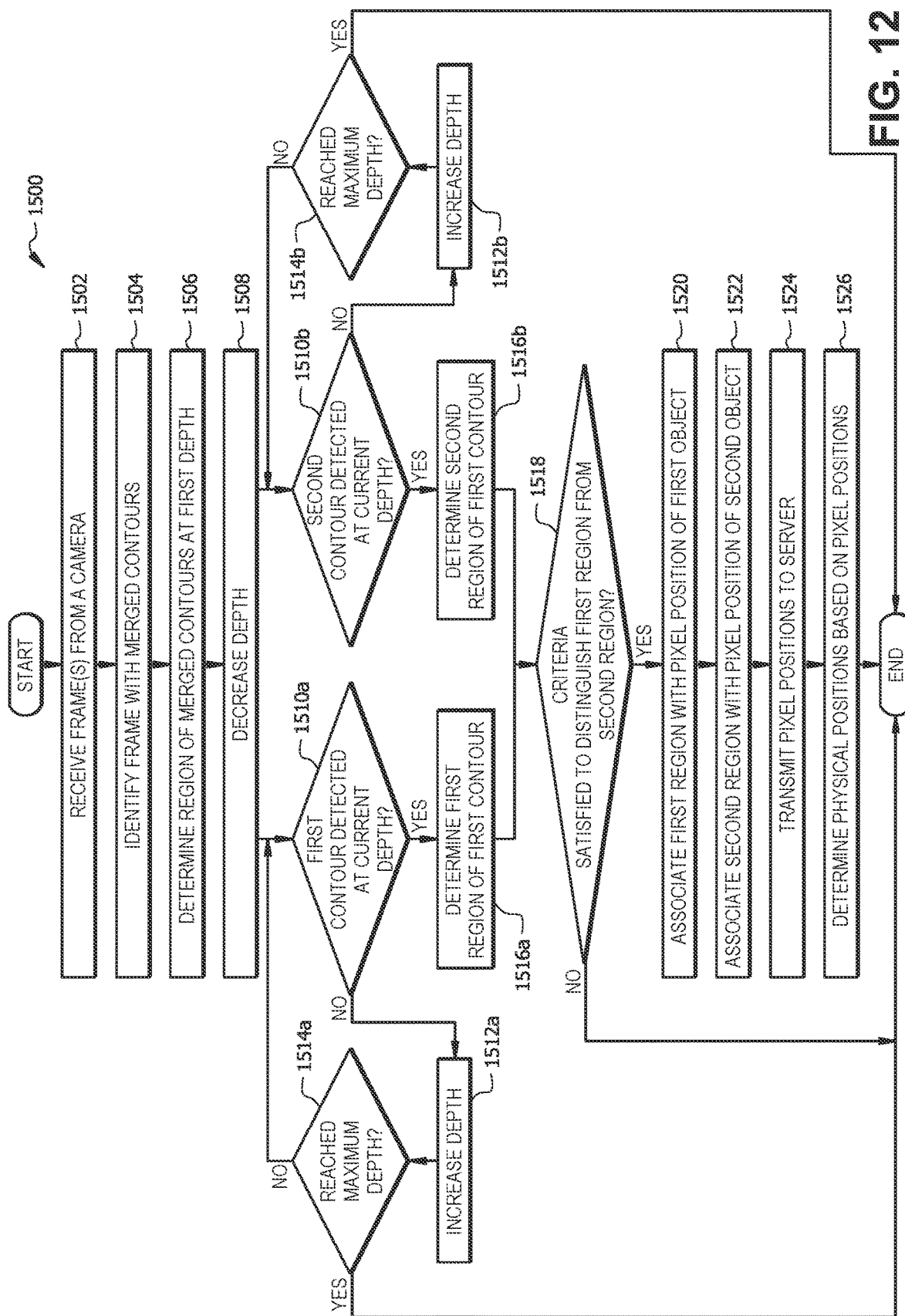
FIG. 12 illustrates a flowchart of an example method of detecting closely spaced objects using the tracking system.

FIG. 12 is a flowchart illustrating a method 1500 of operating tracking system 132 to detect closely spaced people 1402, 1404. Method 1500 may begin at step 1502 where the camera client 220a receives one or more frames of top-view depth images 1412 generated by camera 305a. At step 1504, the camera client 220a identifies a frame in which a first contour 1402a associated with the first person 1402 is merged with a second contour 1404a associated with the second person 1404. Generally, the merged first and second contours (i.e., merged contour 1420) is determined at the first depth 1412a in the depth images 1412 received at step 1502. The first depth 1412a may correspond to a waist or should depth of persons expected to be tracked in the space. The detection of merged contour 1420 corresponds to the first person 1402 being located in the space within a threshold distance 1406b from the second person 1404, as described above.

At step 1506, the camera client 220a determines a merged-contour region 1422. Region 1422 is associated with pixel coordinates of the merged contour 1420. For instance, region 1422 may correspond to coordinates of a pixel mask that overlays the detected contour. As another example, region 1422 may correspond to pixel coordinates of a bounding box determined for the contour (e.g., using any appropriate object detection algorithm). In some embodiments, a method involving non-maximum suppression is used to detect region 1422. In some embodiments, region 1422 is determined using an artificial neural network. For example, an artificial neural network may be trained to detect contours at various depths in top-view images generated by camera 305a.

At step 1508, the depth at which contours are detected in the identified image frame from step 1504 is decreased (e.g., to depth 1410b illustrated in FIG. 11). At step 1510a, the camera client 220a determines whether a first contour (e.g., contour 1402b) is detected at the current depth. If the contour 1402b is not detected, the camera client 220a proceeds, at step 1512a, to an increased depth (e.g., to depth 1410c). If the increased depth corresponds to having reached a maximum depth (e.g., to reaching the initial depth 1410a), the process ends because the first contour 1402b was not detected. If the maximum depth has not been reached, the camera client 220a returns to step 1510a and determines if the first contour 1402b is detected at the newly increased current depth. If the first contour 1402b is detected at step 1510a, the camera client 220a, at step 1516a, determines a first region 1402c associated with pixel coordinates 1402d of the detected contour 1402b. In some embodiments, region 1402c may be determined using a method of non-minimal suppression, as described above. In some embodiments, region 1402c may be determined using an artificial neural network.

The same or a similar approach-illustrated in steps 1410b, 1412b, 1414b, and 1416b—may be used to determine a second region 1404c associated with pixel coordinates 1404d of the contour 1404b. For example, at step 1510b, the camera client 220a determines whether a second contour 1404b is detected at the current depth. If the contour 1404b is not detected, the camera client 220a proceeds, at step 1512b, to an increased depth (e.g., to depth 1410c). If the increased depth corresponds to having reached a maximum depth (e.g., to reaching the initial depth 1410a), the process ends because the second contour 1404b was not detected. If the maximum depth has not been reached, the camera client 220a returns to step 1510b and determines if the second contour 1404b is detected at the newly increased current depth. If the second contour 1404b is detected at step 1410a, the camera client 220a, at step 1516a, determines a second region 1404c associated with pixel coordinates 1404d of the detected contour 1404b. In some embodiments, region 1404c may be determined using a method of non-minimal suppression or an artificial neural network, as described above.

At step 1518, the camera client 220a determines whether criteria are satisfied for distinguishing the first and second regions determined in steps 1516a and 1516b, respectively. For example, the criteria may include one or more requirements. For example, one requirement may be that the regions 1402c, 1404c overlap by less than or equal to a threshold amount (e.g., of about 10%). Another requirement may be that the regions 1402c, 1404c are within (e.g., bounded by, e.g., encompassed by) the merged-contour region 1422 (determined at step 1506). If the criteria are not satisfied, method 1500 generally ends.

Otherwise, if the criteria are satisfied at step 1518, the method 1500 proceeds to steps 1520 and 1522 where the camera client 220a associates the first region 1402b with a first pixel position 1402e of the first person 1402 (step 1520) and associates the second region 1404b with a first pixel position 1402e of the first person 1404 (step 1522). Associating the regions 1402c, 1404c to pixel positions 1402e, 1404e may correspond to storing in a memory pixel coordinates 1402d, 1404d of the regions 1402c, 1404c and/or an average pixel position corresponding to each of the regions 1402c, 1404c along with an object identifier for the people 1402, 1404.

At step 1524, the camera client 220a may transmit the first and second pixel positions (e.g., as pixel positions 1426) to the camera server 235. At step 1526, the camera server 225 may apply a homography (e.g., of homographies 1430) for the camera 305 to the pixel positions to determine corresponding physical (e.g., global) positions 1428 for the first and second people 1402, 1404. Examples of generating and using homographies 1430 are described in greater detail above with respect to FIGS. 3A-3T.

Modifications, additions, or omissions may be made to method 1500 depicted in FIG. 12. Method 1500 may include more, fewer, or other steps. For example, steps may be performed in parallel or in any suitable order. While at times discussed as system 1400, camera client 220a, camera server 235, or components of any of thereof performing steps, any suitable system or components of the system may perform one or more steps of the method.

Multi-Sensor Image Tracking on a Local and Global Planes

As described elsewhere in this disclosure (e.g., with respect to FIGS. 8-12), tracking people (e.g., or other target objects) in space using multiple cameras 305 presents several previously unrecognized challenges. This disclosure encompasses not only the recognition of these challenges but also unique solutions to these challenges. For instance, systems and methods are described in this disclosure that track people both locally (e.g., by tracking pixel positions in images received from each camera 305) and globally (e.g., by tracking physical positions on a global plane corresponding to the physical coordinates in the space). Person tracking may be more reliable when performed both locally and globally. For example, if a person is "lost" locally (e.g., if a camera 305 fails to capture a frame and a person is not detected by the camera 305), the person may still be tracked globally based on an image from a nearby camera 305 (e.g., the angled-view camera 305b described with respect to FIG. 11 above), an estimated local position of the person determined using a local tracking algorithm, and/or an estimated global position determined using a global tracking algorithm.

As another example, if people appear to merge (e.g., if detected contours merge into a single merged contour, as illustrated in view 1416 of FIG. 11 above) at one camera 305, an adjacent camera 305 may still provide a view in which the people are separate entities (e.g., as illustrated in view 1432 of FIG. 11 above). Thus, information from an adjacent camera 305 may be given priority for person tracking. In some embodiments, if a person tracked via a camera 305 is lost in the local view, estimated pixel positions may be determined using a tracking algorithm and reported to the camera server 225 for global tracking, at least until the tracking algorithm determines that the estimated positions are below a threshold confidence level.

Figure 13A:
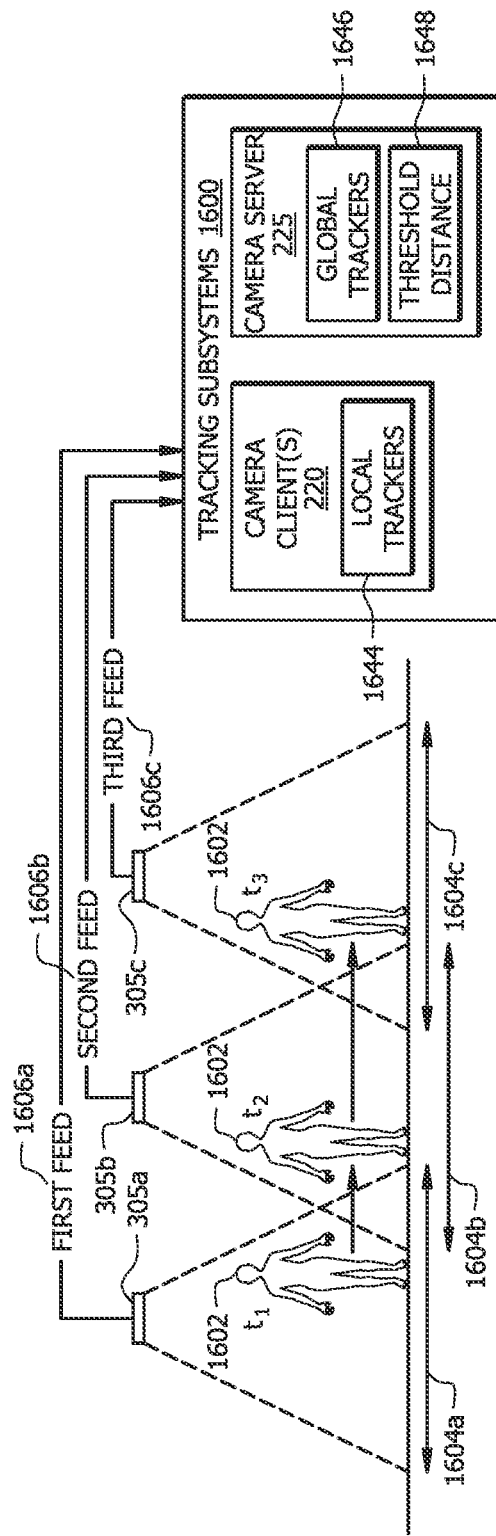
FIGS. 13A-C illustrate diagrams of the tracking of a person in local image frames and in the global plane of space 102 using the tracking system.
Figure 13B:
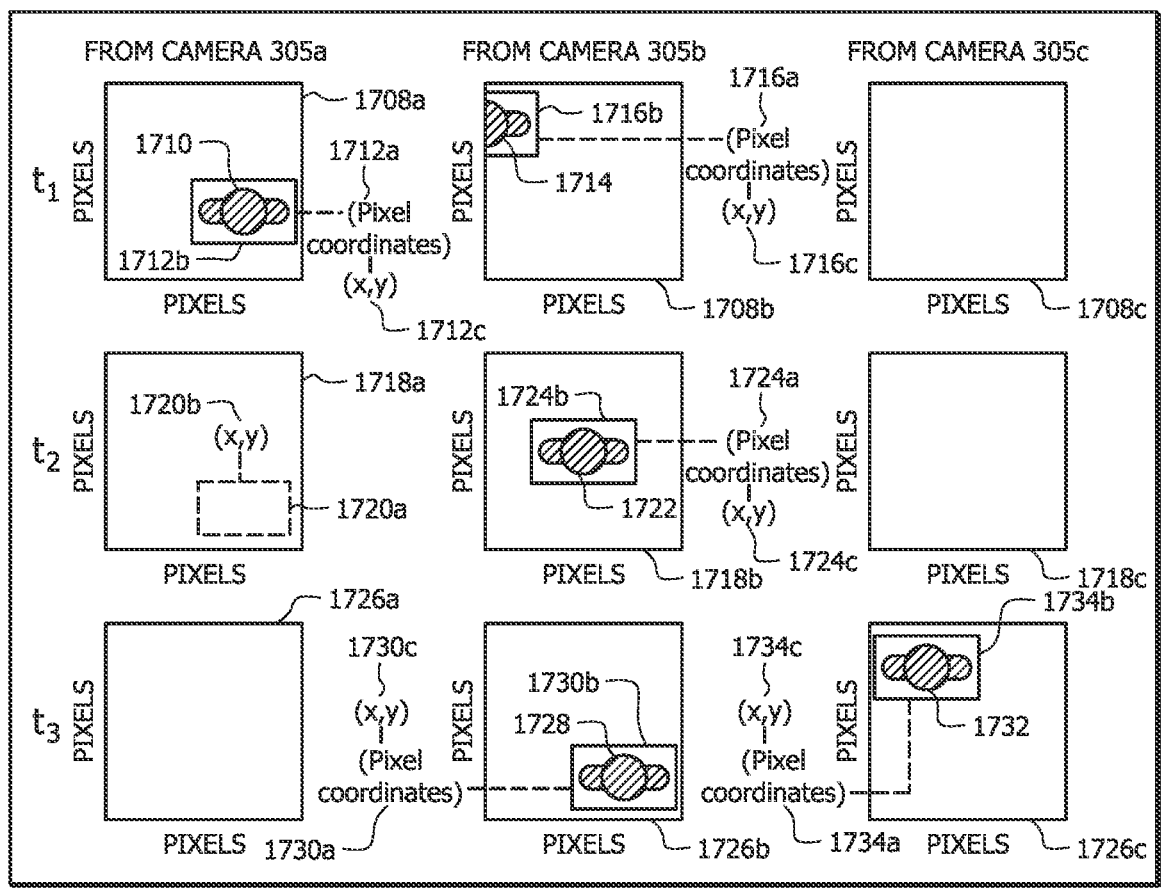
Figure 13C:
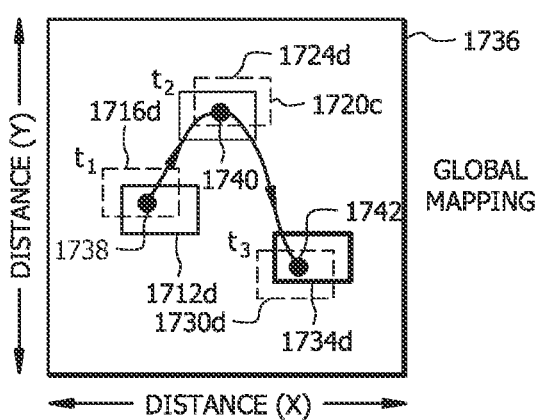

FIGS. 13A-13C illustrate the use of a tracking subsystem 1600 to track a person 1602 through the space. FIG. 13A illustrates a portion of the tracking system 132 of FIG. 1 when used to track the position of person 1602 based on image data generated by cameras 305a-c. The position of person 1602 is illustrated at three different time points: $t_1$, $t_2$, and $t_3$. Each of the cameras 305a-c is a camera 305 of FIG. 2, described above. Each camera 305a-c has a corresponding field-of-view 1604a-c, which corresponds to the portion of the space viewed by the camera 305a-c. As shown in FIG. 13A, each field-of-view 1604a-c overlaps with that of the adjacent camera(s) 305a-c. For example, the adjacent fields-of-view 1604a-c may overlap by between about 10% and 30%. Cameras 305a-c generally generate top-view images and transmit corresponding top-view image feeds 1606a-c to a tracking subsystem 1600.

The tracking subsystem 1600 includes the client(s) 220 and camera server 225 of FIG. 2. The tracking system 1600 generally receives top-view image feeds 1606a-c generated by cameras 305a-c, respectively, and uses the received images (see FIG. 13B) to track a physical (e.g., global) position of the person 1602 in the space (see FIG. 13C). Each camera 305a-c may be coupled to a corresponding camera client 220 of the tracking subsystem 1600. As such, the tracking subsystem 1600 may include local particle filter trackers 1644 for tracking pixel positions of person 1602 in images generated by cameras 305a-b, global particle filter trackers 1646 for tracking physical positions of person 1602 in the space.

FIG. 13B shows example top-view images 1708a-c, 1718a-c, and 1726a-c generated by each of the cameras 305a-c at times $t_1$, $t_2$, and $t_3$. Certain of the top-view images include representations of the person 1602 (i.e., if the person 1602 was in the field-of-view 1604a-c of the camera 305a-c at the time he image 1708a-c, 1718a-c, and 1726a-c was obtained). For example, at time $t_1$, images 1708a-c are generated by cameras 305a-c, respectively, and provided to the tracking subsystem 1600. The tracking subsystem 1600 detects a contour 1710 associated with person 1602 in image 1708a. For example, the contour 1710 may correspond to a curve outlining the border of a representation of the person 1602 in image 1708a (e.g., detected based on color (e.g., RGB) image data at a predefined depth in image 1708a, as described above with respect to FIG. 8). The tracking subsystem 1600 determines pixel coordinates 1712a, which are illustrated in this example by the bounding box 1712b in image 1708a. Pixel position 1712c is determined based on the coordinates 1712a. The pixel position 1712c generally refers to the location (i.e., row and column) of the person 1602 in the image 1708a. Since the object 1602 is also within the field-of-view 1604b of the second camera 305b at $t_1$ (see FIG. 13A), the tracking system also detects a contour 1714 in image 1708b and determines corresponding pixel coordinates 1716b (i.e., associated with bounding box 2416a) for the object 1602. Pixel position 1716c is determined based on the coordinates 1716a. The pixel position 1716c generally refers to the pixel location (i.e., row and column) of the person 1602 in the image 1708b. At time $t_1$, the object 1602 is not in the field-of-view 1604c of the third camera 305c (see FIG. 13A). Accordingly, the tracking subsystem 1600 does not determine pixel coordinates for the object 1602 based on the image 1708c received from the third camera 305c.

Turning now to FIG. 13C, the tracking subsystem 1600 (e.g., the camera server 225 of the tacking subsystem 1600) may determine a first global position 1738 based on the determined pixel positions 1712c and 1716c(e.g., corresponding to pixel coordinates 1712a, 1716a and bounding boxes 1712b, 1716b, described above). The first global position 1738 corresponds to the position of the person 1602 in the space, as determined by the tracking subsystem 1600. In other words, the tracking subsystem 1600 uses the pixel positions 1712c, 1716c determined via the two cameras 305a,b to determine a single physical position 1738 for the person 1602 in the space. For example, a first physical position 1712d may be determined from the pixel position 1712c associated with bounding box 1712b using a first homography associating pixel coordinates in the top-view images generated by the first camera 305a to physical coordinates in the space. A second physical position 1716d may similarly be determined using the pixel position 1716c associated with bounding box 1716b using a second homography associating pixel coordinates in the top-view images generated by the second camera 305b to physical coordinates in the space. In some cases, the tracking subsystem 1600 may compare the distance between first and second physical positions 1712d and 1716d to a threshold distance 1648 to determine whether the positions 1712d, 1716d correspond to the same person or different people (see, e.g., step 1920 of FIG. 16, described below). The first global position 1738 may be determined as an average of the first and second physical positions 1710d, 1714d. In some embodiments, the global position is determined by clustering the first and second physical positions 1710d, 1714d (e.g., using any appropriate clustering algorithm). The first global position 1738 may correspond to (x,y) coordinates of the position of the person 1602 in the space.

Returning to FIG. 13A, at time $t_2$, the object 1602 is within fields-of-view 1604a and 1604b corresponding to cameras 305a,b. As shown in FIG. 13B, a contour 1722 is detected in image 1718b and corresponding pixel coordinates 1724a, which are illustrated by bounding box 1724b, are determined. Pixel position 1724c is determined based on the coordinates 1724a. The pixel position 1724c generally refers to the location (i.e., row and column) of the person 1602 in the image 1718b. However, in this example, the tracking subsystem 1600 fails to detect, in image 1718a from camera 305a, a contour associated with object 1602. This may be because the object 1602 was at the edge of the field-of-view 1604a, because of a lost image frame from feed 1606a, because the position of the person 1602 in the field-of-view 1604a corresponds to an auto-exclusion zone for camera 305a (see FIGS. 8-10 and corresponding description above), or because of any other malfunction of camera 305a and/or the tracking subsystem 1600. In this case, the tracking subsystem 1600 may locally (e.g., at the particular client 220 which is coupled to camera 305a) estimate pixel coordinates 1720a and/or corresponding pixel position 1720b for object 1602. For example, a local particle filter tracker 1644 for object 1602 in images generated by camera 305a may be used to determine the estimated pixel position 1720b.

Figure 14A:
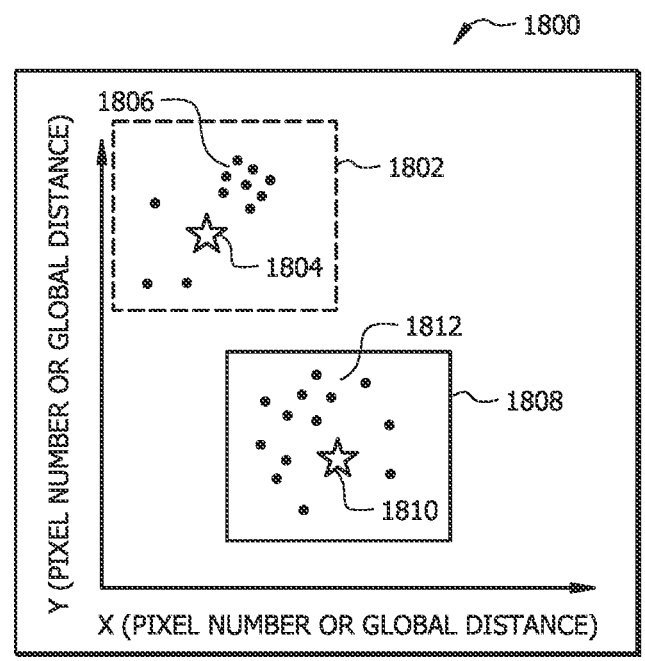
FIGS. 14A-B illustrate the implementation of a particle filter tracker by the tracking system.

FIGS. 14A,B illustrate the operation of an example particle filter tracker 1644, 1646 (e.g., for determining estimated pixel position 1720a). FIG. 14A illustrates a region 1800 in pixel coordinates or physical coordinates of space. For example, region 1800 may correspond to a pixel region in an image or to a region in physical space. In a first zone 1802, an object (e.g., person 1602) is detected at position 1804. The particle filter determines several estimated subsequent positions 1806 for the object. The estimated subsequent positions 1806 are illustrated as the dots or "particles" in FIG. 14A and are generally determined based on a history of previous positions of the object. Similarly, another zone 1808 shows a position 1810 for another object (or the same object at a different time) along with estimated subsequent positions 1812 of the "particles" for this object.

For the object at position 1804, the estimated subsequent positions 1806 are primarily clustered in a similar area above and to the right of position 1804, indicating that the particle filter tracker 1644, 1646 may provide a relatively good estimate of a subsequent position. Meanwhile, the estimated subsequent positions 1812 are relatively randomly distributed around position 1810 for the object, indicating that the particle filter tracker 1644, 1646 may provide a relatively poor estimate of a subsequent position. FIG. 15B shows a distribution plot 1850 of the particles illustrated in FIG. 15A, which may be used to quantify the quality of an estimated position based on a standard deviation value ($\sigma$).

Figure 14B:
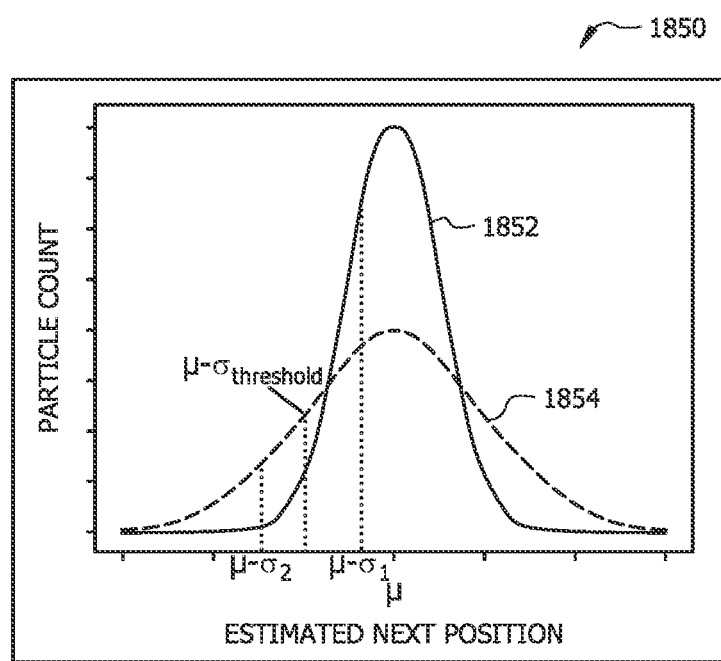

In FIG. 14B, curve 1852 corresponds to the position distribution of anticipated positions 1806, and curve 1854 corresponds to the position distribution of the anticipated positions 1812. Curve 1854 has to a relatively narrow distribution such that the anticipated positions 1806 are primarily near the mean position ($\rho$). For example, the narrow distribution corresponds to the particles primarily having a similar position, which in this case is above and to right of position 1804. In contrast, curve 1854 has a broader distribution, where the particles are more randomly distributed around the mean position ($\mu$). Accordingly, the standard deviation of curve 1852 ($\sigma_1$) is smaller than the standard deviation curve 1854 ($\Gamma_2$). Generally, a standard deviation (e.g., either $\sigma_1$ or $\sigma_2$) may be used as a measure of an extent to which an estimated pixel position generated by the particle filter tracker 1644, 1646 is likely to be correct. If the standard deviation is less than a threshold standard deviation ($\sigma_{threshold}$), as is the case with curve 1852 and $\sigma_1$, the estimated position generated by a particle filter tracker 1644, 1646 may be used for object tracking. Otherwise, the estimated position generally is not used for object tracking.

Referring again to FIG. 13C, the tracking subsystem 1600 (e.g., the camera server 225 of tracking subsystem 1600) may determine a second global position 1740 for the object 1602 in the space based on the estimated pixel position 1720b associated with estimated bounding box 1720a in frame 1718a and the pixel position 1724c associated with bounding box 1724b from frame 1718b. For example, a first physical position 1720c may be determined using a first homography associating pixel coordinates in the top-view images generated by the first camera 305a to physical coordinates in the space. A second physical position 1724d may be determined using a second homography associating pixel coordinates in the top-view images generated by the second camera 305b to physical coordinates in the space. The tracking subsystem 1600 (i.e., camera server 225 of the tracking subsystem 1600) may determine the second global position 1740 based on the first and second physical positions 1720c, 1724d, as described above with respect to time $t_1$. The second global position 1740 may correspond to (x,y) coordinates of the person 1602 in the space.

Turning back to FIG. 13A, at time $t_3$, the object 1602 is within the field-of-view 1604b of camera 305b and the field-of-view 1604c of camera 305c. Accordingly, these images 1726b,c may be used to track person 1602. FIG. 13B shows that a contour 1728 and corresponding pixel coordinates 1730a, pixel region 1730b, and pixel position 1730c are determined in frame 1726b from camera 305b, while a contour 1732 and corresponding pixel coordinates 1734a, pixel region 1734b, and pixel position 1734c are detected in frame 1726c from camera 305c. As shown in FIG. 13C and as described in greater detail above for times $t_1$ and $t_2$, the tracking subsystem 1600 may determine a third global position 1742 for the object 1602 in the space based on the pixel position 1730c associated with bounding box 1730b in frame 1726b and the pixel position 1734c associated with bounding box 1734b from frame 1726c. For example, a first physical position 1730d may be determined using a second homography associating pixel coordinates in the top-view images generated by the second camera 305b to physical coordinates in the space. A second physical position 1734d may be determined using a third homography associating pixel coordinates in the top-view images generated by the third camera 305c to physical coordinates in the space. The tracking subsystem 1600 may determine the global position 1742 based on the first and second physical positions 1730d, 1734d, as described above with respect to times $t_1$ and $t_2$.

Figure 15:
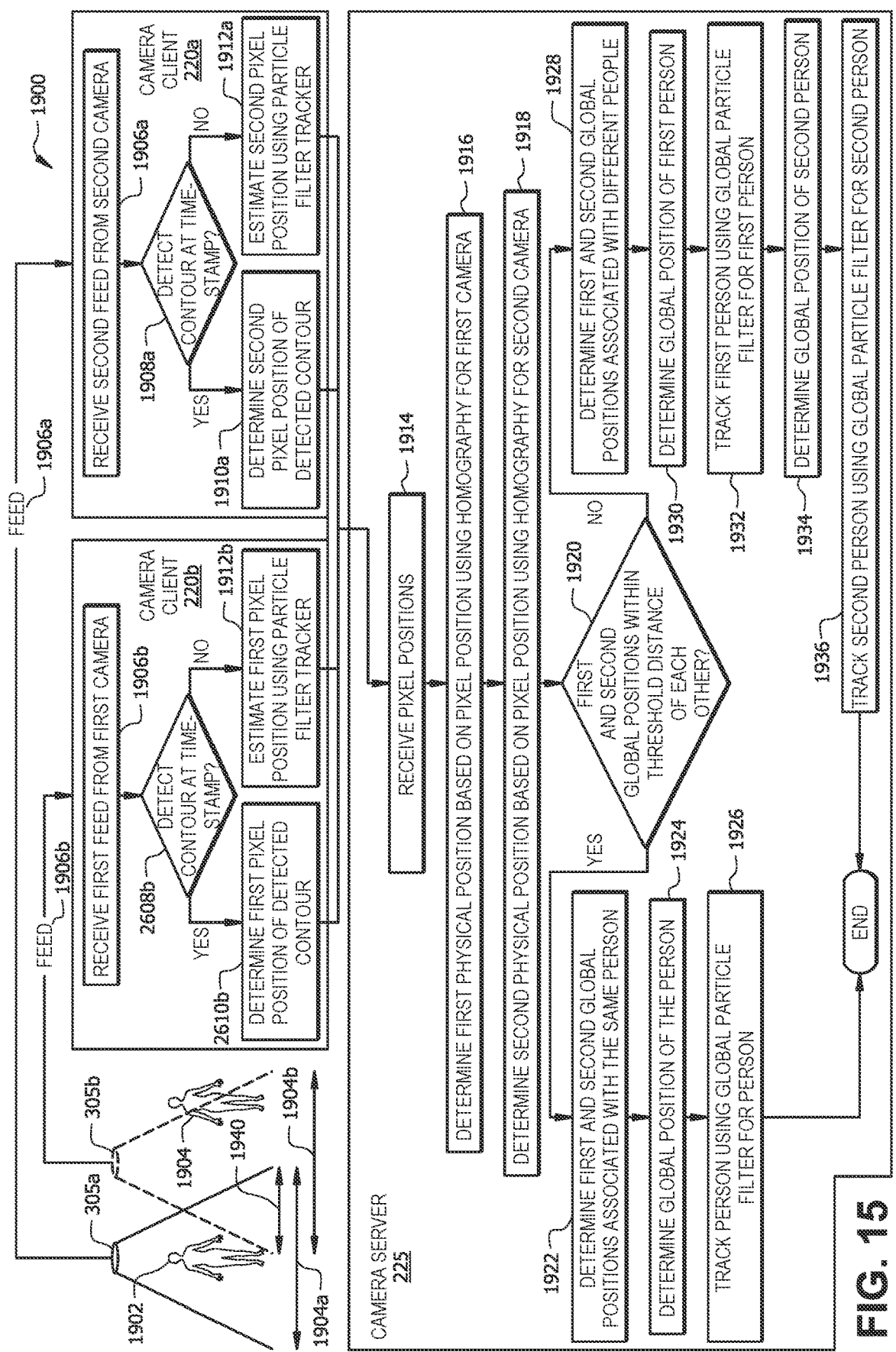
FIG. 15 illustrates a flow diagram of an example method of local and global object tracking using the tracking system.

FIG. 15 is a flow diagram illustrating the tracking of person 1602 in space the based on top-view images (e.g., images 1708a-c, 1718a0c, 1726a-c from feeds 1606a,b, generated by cameras 305a,b, described above). Field-of-view 1604a of camera 305a and field-of-view 1604b of cameras 305b generally overlap by a distance 1902. In one embodiment, distance 1902 may be about 10% to 30% of the fields-of-view 1604a,b. In this example, the tracking subsystem 1600 includes the first camera client 220a, the second camera client 220b, and the camera server 235. Each of the first and second camera clients 220a,b may be a client 220 described above with respect to FIG. 2. The first camera client 220a is coupled to the first camera 305a and configured to track, based on the first feed 1606a, a first pixel position 1312c of the person 1602. The second camera client 220b is coupled to the second camera 305b and configured to track, based on the second feed 1606b, a second pixel position 1716c of the same person 1602.

The camera server 225 generally receives pixel positions from clients 220a,b and tracks the global position of the person 1602 in the space. In some embodiments, the camera server 225 employs a global particle filter tracker 1646 to track a global physical position of the person 1602 and one or more other people 1904 in the space). Tracking people both locally (i.e., at the "pixel level" using clients 220a,b) and globally (i.e., based on physical positions in the space) improves tracking by reducing and/or eliminating noise and/or other tracking errors which may result from relying on either local tracking by the clients 220a,b or global tracking by the camera server 225 alone.

FIG. 15 illustrates a method 1900 implemented by camera clients 220a,b and camera server 235. Camera client 220a receives the first data feed 1606a from camera 305a at step 1106a. The feed may include top-view images (e.g., images 1708a-c, 1718a-c, 1726a-c of FIG. 13A). The images may be color images, depth images, or color-depth images. In an image from the feed 1606a (e.g., corresponding to a certain timestamp), the camera client 220a determines whether a contour is detected at step 1108a. If a contour is detected at the timestamp, the camera client 220a determines a first pixel position 1712c for the contour at step 1910a. For instance, the first pixel position 1712c may correspond to pixel coordinates associated with a bounding box 1712b determined for the contour (e.g., using any appropriate object detection algorithm). As another example, the camera client 220a may generate a pixel mask that overlays the detected contour and determine pixel coordinates of the pixel mask, as described above with respect to step 1304 of FIG. 10.

If a contour is not detected at step 1108a, a first particle filter tracker 1644 may be used to estimate a pixel position (e.g., estimated position 1720b), based on a history of previous positions of the contour 1710, at step 1912*a*. For example, the first particle filter tracker 1644 may generate a probability-weighted estimate of a subsequent first pixel position corresponding to the timestamp (e.g., as described above with respect to FIGS. 14A,B). Generally, if the confidence level (e.g., based on a standard deviation) of the estimated pixel position 1720*b* is below a threshold value (e.g., see FIG. 14B and related description above), no pixel position is determined for the timestamp by the camera client 220*a*, and no pixel position is reported to camera server 225 for the timestamp. This prevents the waste of processing resources which would otherwise be expended by the camera server 225 in processing unreliable pixel position data. As described below, the camera server 225 can often still track person 1602, even when no pixel position is provided for a given timestamp, using the global particle filter tracker 1646 (see steps 1926, 1932, and 1936 below).

The second camera client 220*b* receives the second data feed 1606*b* from camera 305*b* at step 1106*b*. The same or similar steps to those described above for camera client 220*a* are used to determine a second pixel position 1716*c* for a detected contour 1714 or estimate a pixel position based on a second particle filter tracker 1644. At step 1108*b*, the camera client 220*b* determines whether a contour 1714 is detected in an image from feed 1606*b* at a given timestamp. If a contour 1714 is detected at the timestamp, the camera client 220*b* determines a first pixel position 1716*c* for the contour 1714 at step 1910*b* (e.g., using any of the approaches described above with respect to step 1910*a*). If a contour 1714 is not detected, a second particle filter tracker 1644 may be used to estimate a pixel position at step 1912*b* (e.g., as described above with respect to step 1912*a*). If the confidence level of the estimated pixel position is below a threshold value (e.g., based on a standard deviation value for the tracker 1644), no pixel position is determined for the timestamp by the camera client 220*b*, and no pixel position is reported for the timestamp to the camera server 235.

While steps 1106*a,b*-1912*a,b* are described as being performed by camera client 220*a* and 220*b*, it should be understood that in some embodiments, a single camera client 220 may receive the first and second image feeds 1606*a,b* from cameras 305*a,b* and perform the steps described above. Using separate camera clients 220*a,b* for separate cameras 305*a,b* or sets of cameras 305 may provide redundancy in case of client 220 malfunctions (e.g., such that even if one camera client 220 fails, feeds from other sensors may be processed by other still-functioning clients 220).

At step 1914, the camera server 225 receives the pixel positions 1712*c*, 1716*c* determined by the camera clients 220*a,b*. At step 1916, the camera server 225 may determine a first physical position 1712*d* based on the first pixel position 1712*c* determined at step 1910*a* or estimated at step 1912*a* by the first camera client 220*a*. For example, the first physical position 1712*d* may be determined using a first homography associating pixel coordinates in the top-view images generated by the first camera 305*a* to physical coordinates in the space. At step 1918, the camera server 225 may determine a second physical position 1716*d* based on the second pixel position 1716*c* determined at step 1910*b* or estimated at step 1912*b* by the first camera client 220*b*. For instance, the second physical position 1716*d* may be determined using a second homography associating pixel coordinates in the top-view images generated by the second camera 305*b* to physical coordinates in the space.

At step 1920 the camera server 225 determines whether the first and second positions 1712*d*, 1716*d* (from steps 1916 and 1918) are within a threshold distance 1648 (e.g., of about six inches) of each other. In general, the threshold distance 1648 may be determined based on one or more characteristics of the system tracking system 132 and/or the person 1602 or another target object being tracked. For example, the threshold distance 1648 may be based on one or more of the distance of the cameras 305*a-b* from the object, the size of the object, the fields-of-view 1604*a-b*, the sensitivity of the cameras 305*a-b*, and the like. Accordingly, the threshold distance 1648 may range from just over zero inches to greater than six inches depending on these and other characteristics of the tracking system 132.

If the positions 1712*d*, 1716*d* are within the threshold distance 1648 of each other at step 1920, the camera server 225 determines that the positions 1712*d*, 1716*d* correspond to the same person 1602 at step 1922. In other words, the camera server 225 determines that the person detected by the first camera 305*a* is the same person detected by the second camera 305*b*. This may occur, at a given timestamp, because of the overlap 1940 between field-of-view 1604*a* and field-of-view 1604*b* of cameras 305*a* and 108*b*, as illustrated in FIG. 15.

At step 1924, the camera server 225 determines a global position 1738 (i.e., a physical position in the space) for the object based on the first and second physical positions from steps 1916 and 1918. For instance, the camera server 225 may calculate an average of the first and second physical positions 1712*d*, 1716*d*. In some embodiments, the global position 1738 is determined by clustering the first and second physical positions 1712*d*, 1716*d* (e.g., using any appropriate clustering algorithm). At step 1926, a global particle filter tracker 1646 is used to track the global (e.g., physical) position 1738 of the person 1602. An example of a particle filter tracker is described above with respect to FIGS. 14A,B. For instance, the global particle filter tracker 1646 may generate probability-weighted estimates of subsequent global positions at subsequent times. If a global position 1738 cannot be determined at a subsequent timestamp (e.g., because pixel positions are not available from the camera clients 220*a,b*), the particle filter tracker 1646 may be used to estimate the position.

If at step 1920 the first and second physical positions 1712*d*, 1716*d* are not within the threshold distance 1648 from each other, the camera server 225 generally determines that the positions correspond to different objects 1602, 1104 at step 1928. In other words, the camera server 225 may determine that the physical positions determined at steps 1916 and 1918 are sufficiently different, or far apart, for them to correspond to the first person 1602 and a different second person 1902 in the space.

At step 1930, the camera server 225 determines a global position for the first object 1602 based on the first physical position 1712*c* from step 1916. Generally, in the case of having only one physical position 1712*c* on which to base the global position, the global position is the first physical position 1712*c*. If other physical positions are associated with the first object (e.g., based on data from other cameras 305), the global position of the first person 1902 may be an average of the positions or determined based on the positions using any appropriate clustering algorithm, as described above. At step 1932, a global particle filter tracker 1646 may be used to track the first global position of the first person 1902, as is also described above.

At step 1934, the camera server 225 determines a global position for the second person 1904 based on the second physical position 1716*c* from step 1918. Generally, in the case of having only one physical position 1716*c* on which to base the global position, the global position is the second physical position 1716c. If other physical positions are associated with the second object (e.g., based on data from other cameras 305), the global position of the second person 1904 may be an average of the positions or determined based on the positions using any appropriate clustering algorithm. At step 1936, a global particle filter tracker 1646 is used to track the second global position of the second object, as described above.

Modifications, additions, or omissions may be made to the method 1900 described above with respect to FIG. 15. The method may include more, fewer, or other steps. For example, steps may be performed in parallel or in any suitable order. While at times discussed as a tracking subsystem 1600, camera clients 220a,b, camera server 235, or components of any thereof performing steps, any suitable system or components of the system may perform one or more steps of the method 1900.

Candidate Lists

When the tracking system 132 is tracking people in the space, it may be challenging to reliably identify people under certain circumstances such as when they pass into or near an auto-exclusion zone (see FIGS. 8-10 and corresponding description above), when they stand near another person (see FIGS. 11-12 and corresponding description above), and/or when one or more of the cameras 305, client(s) 220, and/or camera server 225 malfunction. For instance, after a first person becomes close to or even comes into contact with (e.g., "collides" with) a second person, it may difficult to determine which person is which (e.g., as described above with respect to FIG. 11). Conventional tracking systems may use physics-based tracking algorithms in an attempt to determine which person is which based on estimated trajectories of the people (e.g., estimated as though the people are marbles colliding and changing trajectories according to a conservation of momentum, or the like). However, identities of people may be more difficult to track reliably, because movements may be random. As described above, the tracking system 132 may employ particle filter tracking for improved tracking of people in the space (see e.g., FIGS. 13-16 and the corresponding description above). However, even with these advancements, the identities of people being tracked may be difficult to determine at certain times. This disclosure particularly encompasses the recognition that positions of people who are shopping in a store (i.e., moving about a space, selecting items, and picking up the items) are difficult or impossible to track using previously available technology because movement of these people is random and does not follow a readily defined pattern or model (e.g., such as the physics-based models of previous approaches). Accordingly, there is a lack of tools for reliably and efficiently tracking people (e.g., or other target objects).

This disclosure provides a solution to the problems of previous technology, including those described above, by maintaining a record, which is referred to in this disclosure as a "candidate list," of possible person identities, or identifiers (i.e., the usernames, account numbers, etc. of the people being tracked), during tracking. A candidate list is generated and updated during tracking to establish the possible identities of each tracked person. Generally, for each possible identity or identifier of a tracked person, the candidate list also includes a probability that the identity, or identifier, is believed to be correct. The candidate list is updated following interactions (e.g., collisions) between people and in response to other uncertainty events (e.g., a loss of sensor data, imaging errors, intentional trickery, etc.).

In some cases, the candidate list may be used to determine when a person should be re-identified (e.g., using methods described in greater detail below with respect to FIGS. 18-21). Generally, re-identification is appropriate when the candidate list of a tracked person indicates that the person's identity is not sufficiently well known (e.g., based on the probabilities stored in the candidate list being less than a threshold value). In some embodiments, the candidate list is used to determine when a person is likely to have exited the space (i.e., with at least a threshold confidence level), and an exit notification is only sent to the person after there is high confidence level that the person has exited (see, e.g., view 2030 of FIG. 16, described below). In general, processing resources may be conserved by only performing potentially complex person re-identification tasks when a candidate list indicates that a person's identity is no longer known according to pre-established criteria.

Figure 16:
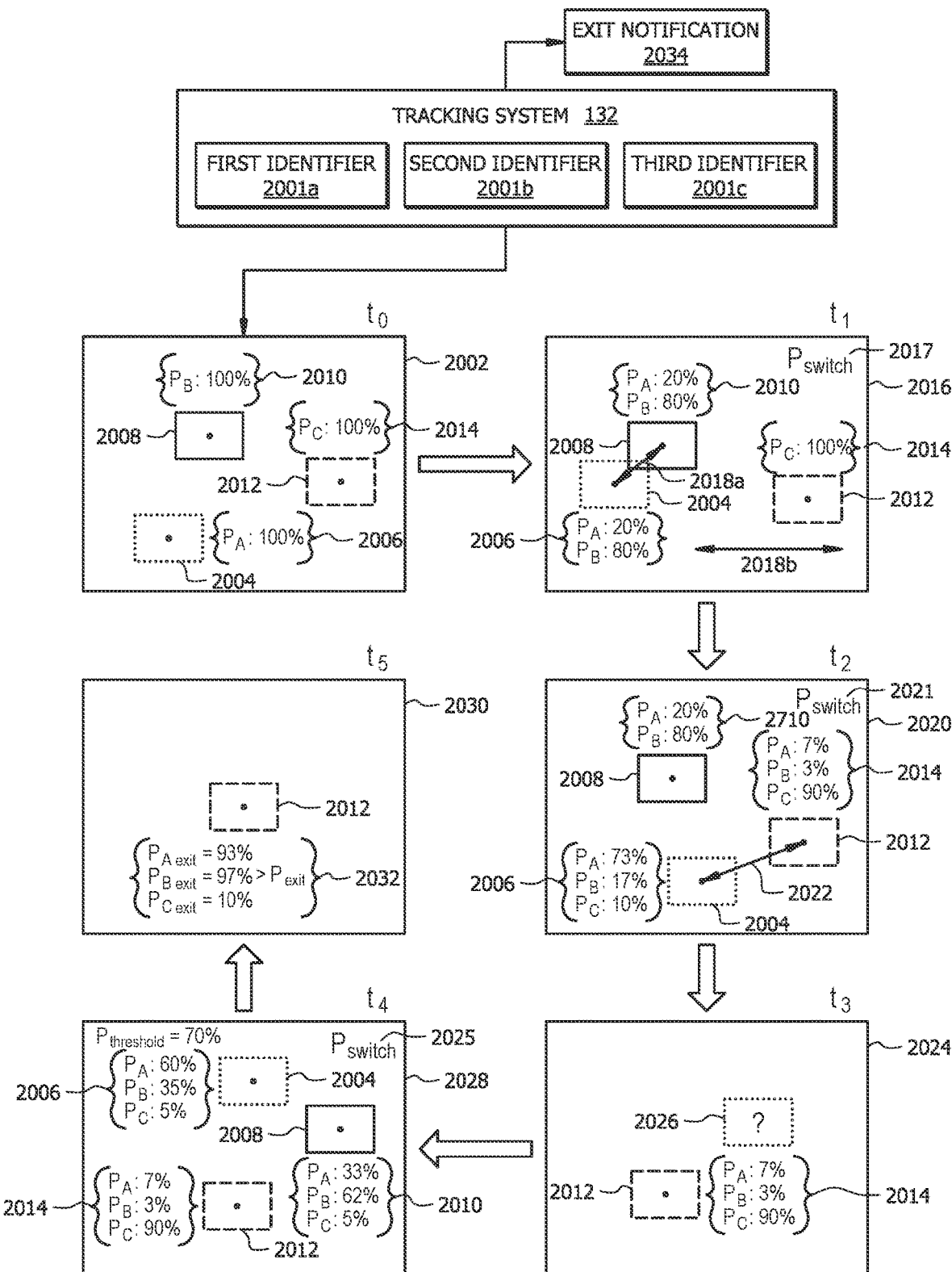
FIG. 16 illustrates a diagram of the use of candidate lists for object identification during object tracking by the tracking system.

FIG. 16 is a flow diagram illustrating how identifiers 2001a-c associated with tracked people (e.g., or any other target object) may be updated during tracking over a period of time from an initial time $t_0$ to a final time $t_5$ by tracking system 132. People may be tracked using tracking system 132 based on data from cameras 305, as described above. FIG. 16 depicts a plurality of views 2002, 2016, 2020, 2024, 2028, 2030 at different time points during tracking. In some embodiments, views 2002, 2016, 2020, 2024, 2028, 2030 correspond to a local frame view (e.g., as described above with respect to FIG. 11) from a camera 305 with coordinates in units of pixels (e.g., or any other appropriate unit for the data type generated by the camera 305). In other embodiments, views 2002, 2016, 2020, 2024, 2028, 2030 correspond to global views of the store 100 determined based on data from multiple cameras 305 with coordinates corresponding to physical positions in the space (e.g., as determined using the homographies described in greater detail above with respect to FIGS. 3A-3T). For clarity and conciseness, the example of FIG. 16 is described below in terms of global views of the store 100 (i.e., a view corresponding to the physical coordinates of the store 100).

The tracked object regions 2004, 2008, 2012 correspond to regions of the store 100 associated with the positions of corresponding people (e.g., or any other target object) moving through the store 100. For example, each tracked object region 2004, 2008, 2012 may correspond to a different person moving about in the store 100. Examples of determining the regions 2004, 2008, 2012 are described above, for example, with respect to FIGS. 10, 11, and 13. As one example, the tracked object regions 2004, 2008, 2012 may be bounding boxes identified for corresponding objects in the store 100. As another example, tracked object regions 2004, 2008, 2012 may correspond to pixel masks determined for contours associated with the corresponding objects in the store 100 (see, e.g., step 1304 of FIG. 10 for a more detailed description of the determination of a pixel mask). Generally, people may be tracked in the store 100 and regions 2004, 2008, 2012 may be determined using any appropriate tracking and identification method.

View 2002 at initial time to includes a first tracked object region 2004, a second tracked object region 2008, and a third tracked object region 2012. The view 2002 may correspond to a representation of the store 100 from a top view with only the tracked object regions 2004, 2008, 2012 shown (i.e., with other objects in the store 100 omitted). At time to, the identities of all of the people are generally known (e.g., because the people have recently entered the store 100 and/or because the people have not yet been near each other). The first tracked object region 2004 is associated with a first candidate list 2006, which includes a probability (P$_A$=100%) that the region 2004 (or the corresponding person being tracked) is associated with a first identifier 2001a. The second tracked object region 2008 is associated with a second candidate list 2010, which includes a probability (P$_B$=100%) that the region 2008 (or the corresponding person being tracked) is associated with a second identifier 2001b. The third tracked object region 2012 is associated with a third candidate list 2014, which includes a probability (P$_C$=100%) that the region 2012 (or the corresponding person being tracked) is associated with a third identifier 2001c. Accordingly, at time t$_1$, the candidate lists 2006, 2010, 2014 indicate that the identity of each of the tracked object regions 2004, 2008, 2012 is known with all probabilities having a value of one hundred percent.

View 2016 shows positions of the tracked objects 2004, 2008, 2012 at a first time t$_1$, which is after the initial time to. At time t$_1$, the tracking system detects an event which may cause the identities of the tracked object regions 2004, 2008 to be less certain. In this example, the tracking system 132 detects that the distance 2018a between the first object region 274 and the second object region 2008 is less than or equal to a threshold distance 2018b. Because the tracked object regions were near each other (i.e., within the threshold distance 2018b), there is a non-zero probability that the regions may be misidentified during subsequent times. The threshold distance 2018b may be any appropriate distance, as described above with respect to FIG. 11. For example, the tracking system 132 may determine that the first object region 2004 is within the threshold distance 2018b of the second object region 2008 by determining first coordinates of the first object region 2004, determining second coordinates of the second object region 2008, calculating a distance 2018a, and comparing distance 2018a to the threshold distance 2018b. In some embodiments, the first and second coordinates correspond to pixel coordinates in an image capturing the first and second people, and the distance 2018a corresponds to a number of pixels between these pixel coordinates. For example, as illustrated in view 2016 of FIG. 16, the distance 2018a may correspond to the pixel distance between centroids of the tracked object regions 2004, 2008. In other embodiments, the first and second coordinates correspond to physical, or global, coordinates in the store 100, and the distance 2018a corresponds to a physical distance (e.g., in units of length, such as inches). For example, physical coordinates may be determined using the homographies described in greater detail above with respect to FIGS. 3A-3T.

After detecting that the identities of regions 2004, 2008 are less certain (i.e., that the first object region 2004 is within the threshold distance 2018b of the second object region 2008), the tracking system 132 determines a probability 2017 that the first tracked object region 2004 switched identifiers 2001a-c with the second tracked object region 2008. For example, when two contours become close in an image, there is a chance that the identities of the contours may be incorrect during subsequent tracking (e.g., because the tracking system 132 may assign the wrong identifier 2001a-c to the contours between frames). The probability 2017 that the identifiers 2001a-c switched may be determined, for example, by accessing a predefined probability value (e.g., of 50%). In other cases, the probability 2017 may be based on the distance 2018a between the object regions 2004, 2008. For example, as the distance 2018 decreases, the probability 2017 that the identifiers 2001a-c switched may increase. In the example of FIG. 16, the determined probability 2017 is 20%, because the object regions 2004, 2008 are relatively far apart but there is some overlap between the regions 2004, 2008.

In some embodiments, the tracking system 132 may determine a relative orientation between the first object region 2004 and the second object region 2008, and the probability 2017 that the object regions 2004, 2008 switched identifiers 2001a-c may be based on this relative orientation. The relative orientation may correspond to an angle between a direction a person associated with the first region 2004 is facing and a direction a person associated with the second region 2008 is facing. For example, if the angle between the directions faced by people associated with first and second regions 2004, 2008 is near 180° (i.e., such that the people are facing in opposite directions), the probability 2017 that identifiers 2001a-c switched may be decreased because this case may correspond to one person accidentally backing into the other person.

Based on the determined probability 2017 that the tracked object regions 2004, 2008 switched identifiers 2001a-c (e.g., 20% in this example), the tracking system 132 updates the first candidate list 2006 for the first object region 2004. The updated first candidate list 2006 includes a probability (P$_A$=80%) that the first region 2004 is associated with the first identifier 2001a and a probability (P$_B$=20%) that the first region 2004 is associated with the second identifier 2001b. The second candidate list 2010 for the second object region 2008 is similarly updated based on the probability 2017 that the first object region 2004 switched identifiers 2001a-c with the second object region 2008. The updated second candidate list 2010 includes a probability (P$_A$=20%) that the second region 2008 is associated with the first identifier 2001a and a probability (P$_B$=80%) that the second region 2008 is associated with the second identifier 2001b.

View 2020 shows the object regions 2004, 2008, 2012 at a second time point t$_2$, which follows time t$_1$. At time t$_2$, a first person corresponding to the first tracked region 2004 stands close to a third person corresponding to the third tracked region 2012. In this example case, the tracking system 132 detects that the distance 112022 between the first object region 2004 and the third object region 2012 is less than or equal to the threshold distance 2018b (i.e., the same threshold distance 2018b described above with respect to view 2016). After detecting that the first object region 2004 is within the threshold distance 2018b of the third object region 2012, the tracking system 132 determines a probability 2021 that the first tracked object region 2004 switched identifiers 2001a-c with the third tracked object region 2012. As described above, the probability 2021 that the identifiers 2001a-c switched may be determined, for example, by accessing a predefined probability value (e.g., of 50%). In some cases, the probability 2021 may be based on the distance 112022 between the object regions 2004, 2012. For example, since the distance 112022 is greater than distance 2018a (from view 2016, described above), the probability 2021 that the identifiers 2001a-c switched may be greater at time t$_1$ than at time t$_2$. In the example of view 2020 of FIG. 16, the determined probability 2021 is 10% (which is smaller than the switching probability 2717 of 20% determined at time t$_1$).

Based on the determined probability 2021 that the tracked object regions 2004, 2012 switched identifiers 2001a-c (e.g., of 10% in this example), the tracking system 132 updates the first candidate list 2006 for the first object region 2004. The updated first candidate list 2006 includes a probability (P$_A$=73%) that the first object region 2004 is associated with the first identifier 2001a, a probability (P$_B$=17%) that the first object region 2004 is associated with the second identifier 2001b, and a probability ($P_C$=10%) that the first object region 2004 is associated with the third identifier 2001c. The third candidate list 2014 for the third object region 2012 is similarly updated based on the probability 2021 that the first object region 2004 switched identifiers 2001a-c with the third object region 2012. The updated third candidate list 2014 includes a probability ($P_A$=7%) that the third object region 2012 is associated with the first identifier 2001a, a probability ($P_B$=3%) that the third object region 2012 is associated with the second identifier 2001b, and a probability ($P_C$=90%) that the third object region 2012 is associated with the third identifier 2001c. Accordingly, even though the third object region 2012 never interacted with (e.g., came within the threshold distance 2018b of) the second object region 2008, there is still a non-zero probability ($P_B$=3%) that the third object region 2012 is associated with the second identifier 2001b, which was originally assigned (at time to) to the second object region 2008. In other words, the uncertainty in object identity that was detected at time $t_1$ is propagated to the third object region 2012 via the interaction with region 2004 at time $t_2$. This unique "propagation effect" facilitates improved object identification and can be used to narrow the search space (e.g., the number of possible identifiers 2001a-c that may be associated with a tracked object region 2004, 2008, 2012) when object re-identification is needed (as described in greater detail below and with respect to FIGS. 18-21).

View 2024 shows third object region 2012 and an unidentified object region 2026 at a third time point $t_3$, which follows time $t_2$. At time $t_3$, the first and second people associated with regions 2004, 2008 come into contact (e.g., or "collide") or are otherwise so close to one another that the tracking system 132 cannot distinguish between the people. For example, contours detected for determining the first object region 2004 and the second object region 2008 may have merged resulting in the single unidentified object region 2026. Accordingly, the position of object region 2026 may correspond to the position of one or both of object regions 2004 and 2008. At time $t_3$, the tracking system 132 may determine that the first and second object regions 2004, 2008 are no longer detected because a first contour associated with the first object region 2004 is merged with a second contour associated with the second object region 2008.

The tracking system 132 may wait until a subsequent time $t_4$ (shown in view 2028) when the first and second object regions 2004, 2008 are again detected before the candidate lists 2006, 2010 are updated. Time $t_4$ generally corresponds to a time when the first and second people associated with regions 2004, 2008 have separated from each other such that each person can be tracked in the store 100. Following a merging event such as is illustrated in view 2024, the probability 2025 that regions 2004 and 2008 have switched identifiers 2001a-c may be 50%. At time $t_4$, updated candidate list 2006 includes an updated probability ($P_A$=60%) that the first object region 2004 is associated with the first identifier 2001a, an updated probability ($P_B$=35%) that the first object region 2004 is associated with the second identifier 2001b, and an updated probability ($P_C$=5%) that the first object region 2004 is associated with the third identifier 2001c. Updated candidate list 2010 includes an updated probability ($P_A$=33%) that the second object region 2008 is associated with the first identifier 2001a, an updated probability ($P_B$=62%) that the second object region 2008 is associated with the second identifier 2001b, and an updated probability ($P_C$=5%) that the second object region 2008 is associated with the third identifier 2001c. Candidate list 2014 is unchanged.

Still referring to view 2028, the tracking system 132 may determine that a highest value probability of a candidate list is less than a threshold value (e.g., $P_{threshold}$=700). In response to determining that the highest probability of the first candidate list 2006 is less than the threshold value, the corresponding object region 2004 may be re-identified (e.g., using any method of re-identification described in this disclosure, for example, with respect to FIGS. 18-21). For instance, the first object region 2004 may be re-identified because the highest probability ($P_A$=60%) is less than the threshold probability ($P_{threshold}$=70%). The tracking system 132 may extract features, or descriptors, associated with observable characteristics of the first person (or corresponding contour) associated with the first object region 2004. The observable characteristics may be a height of the object (e.g., determined from depth data received from a sensor), a color associated with an area inside the contour (e.g., based on color image data from a camera 305), a width of the object, an aspect ratio (e.g., width/length) of the object, a volume of the object (e.g., based on depth data from camera 305), or the like. Examples of other descriptors are described in greater detail below with respect to FIG. 19. As described in greater detail below, a texture feature (e.g., determined using a local binary pattern histogram (LBPH) algorithm) may be calculated for the person. Alternatively or additionally, an artificial neural network may be used to associate the person with the correct identifier 2001a-c (e.g., as described in greater detail below with respect to FIG. 18-21).

Using the candidate lists 2006, 2010, 2014 may facilitate more efficient re-identification than was previously possible because, rather than checking all possible identifiers 2001a-c (e.g., and other identifiers of people in store 100 not illustrated in FIG. 16) for a region 2004, 2008, 2012 that has an uncertain identity, the tracking system 132 may identify a subset of all the other identifiers 2001a-c that are most likely to be associated with the unknown region 2004, 2008, 2012 and only compare descriptors of the unknown region 2004, 2008, 2012 to descriptors associated with the subset of identifiers 2001a-c. In other words, if the identity of a tracked person is not certain, the tracking system 132 may only check to see if the person is one of the few people indicated in the person's candidate list, rather than comparing the unknown person to all of the people in the store 100. For example, only identifiers 2001a-c associated with a non-zero probability, or a probability greater than a threshold value, in the candidate list 2006 are likely to be associated with the correct identifier 2001a-c of the first region 2004. In some embodiments, the subset may include identifiers 2001a-c from the first candidate list 2006 with probabilities that are greater than a threshold probability value (e.g., of 10%). Thus, the tracking system 132 may compare descriptors of the person associated with region 2004 to predetermined descriptors associated with the subset. As described in greater detail below with respect to FIGS. 18-29, the predetermined features (or descriptors) may be determined when a person enters the store 100 and associated with the known identifier 2001a-c of the person during the entrance time period (i.e., before any events may cause the identity of the person to be uncertain. In the example of FIG. 16, the object region 2008 may also be re-identified at or after time $t_4$ because the highest probability $P_B$=62% is less than the example threshold probability of 70%.

View 2030 corresponds to a time $t_5$ at which only the person associated with object region 2012 remains within the store 100. View 2030 illustrates how the candidate lists 2006, 2010, 2014 can be used to ensure that people only receive an exit notification 2034 when the tracking system 132 is certain the person has exited the store 100. In these embodiments, the tracking system 132 may be configured to transmit an exit notification 2034 to devices associated with these people when the probability that a person has exited the store 100 is greater than an exit threshold (e.g., $P_{exit}$=95% or greater).

An exit notification 2034 is generally sent to the device of a person and includes an acknowledgement that the tracking system 132 has determined that the person has exited the store 100. For example, if the store 100 is a store, the exit notification 2034 provides a confirmation to the person that the tracking system 132 knows the person has exited the store and is, thus, no longer shopping. This may provide assurance to the person that the tracking system 132 is operating properly and is no longer assigning items to the person or incorrectly charging the person for items that he/she did not intend to purchase.

As people exit the store 100, the tracking system 132 may maintain a record 2032 of exit probabilities to determine when an exit notification 2034 should be sent. In the example of FIG. 16, at time $t_5$ (shown in view 2030), the record 2032 includes an exit probability ($P_{A,exit}$=93%) that a first person associated with the first object region 2004 has exited the store 100. Since $P_{A,exit}$ is less than the example threshold exit probability of 95%, an exit notification 2034 would not be sent to the first person (e.g., to his/her device). Thus, even though the first object region 2004 is no longer detected in the store 100, an exit notification 2034 is not sent, because there is still a chance that the first person is still in the store 100 (i.e., because of identity uncertainties that are captured and recorded via the candidate lists 2006, 2010, 2014). This prevents a person from receiving an exit notification 2034 before he/she has exited the store 100. The record 2032 includes an exit probability ($P_{B,exit}$=97%) that the second person associated with the second object region 2008 has exited the store 100. Since $P_{B,exit}$ is greater than the threshold exit probability of 95%, an exit notification 2034 is sent to the second person (e.g., to his/her device). The record 2032 also includes an exit probability ($P_{C,exit}$=10%) that the third person associated with the third object region 2012 has exited the store 100. Since $P_{C,exit}$ is less than the threshold exit probability of 95%, an exit notification 2034 is not sent to the third person (e.g., to his/her device).

Figure 17:
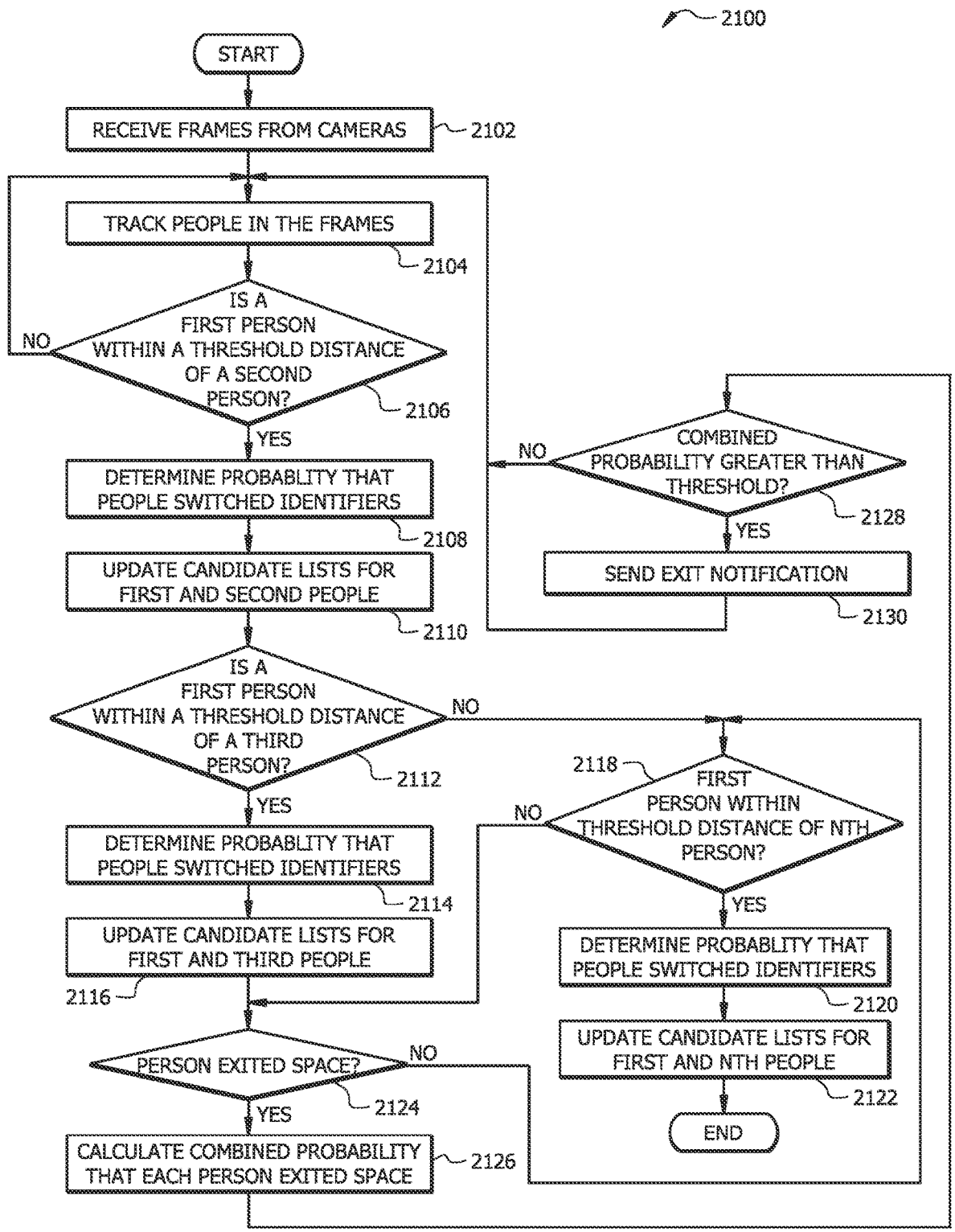
FIG. 17 illustrates a flowchart of an example method of maintaining candidate lists during object tracking by the tracking system.

FIG. 17 is a flowchart of a method 2100 for creating and/or maintaining candidate lists 2006, 2010, 2014 by tracking system 132. Method 2100 generally facilitates improved identification of tracked people (e.g., or other target objects) by maintaining candidate lists 2006, 2010, 2014 which, for a given tracked person, or corresponding tracked object region (e.g., region 2004, 2008, 2012), include possible identifiers 2001a-c for the object and a corresponding probability that each identifier 2001a-c is correct for the person. By maintaining candidate lists 2006, 2010, 2014 for tracked people, the people may be more effectively and efficiently identified during tracking. For example, costly person re-identification (e.g., in terms of system resources expended) may only be used when a candidate list indicates that a person's identity is sufficiently uncertain.

Method 2100 may begin at step 2102 where image frames are received from one or more cameras 305. At step 2104, the tracking system 132 uses the received frames to track objects in the store 100. In some embodiments, tracking is performed using one or more of the unique tools described in this disclosure (e.g., with respect to FIGS. 13-15). However, in general, any appropriate method of sensor-based object tracking may be employed.

At step 2106, the tracking system 132 determines whether a first person is within a threshold distance 2018b of a second person. This case may correspond to the conditions shown in view 2016 of FIG. 16, described above, where first object region 2004 is distance 2018a away from second object region 2008. As described above, the distance 2018a may correspond to a pixel distance measured in a frame or a physical distance in the store 100 (e.g., determined using a homography associating pixel coordinates to physical coordinates in the store 100). If the first and second people are not within the threshold distance 2018b of each other, the system 132 continues tracking objects in the store 100 (i.e., by returning to step 2104).

However, if the first and second people are within the threshold distance 2018b of each other, method 2100 proceeds to step 2108, where the probability 2017 that the first and second people switched identifiers 2001a-c is determined. As described above, the probability 2017 that the identifiers 2001a-c switched may be determined, for example, by accessing a predefined probability value (e.g., of 50%). In some embodiments, the probability 2017 is based on the distance 2018a between the people (or corresponding object regions 2004, 2008), as described above. In some embodiments, as described above, the tracking system 132 determines a relative orientation between the first person and the second person, and the probability 2017 that the people (or corresponding object regions 2004, 2008) switched identifiers 2001a-c is determined, at least in part, based on this relative orientation.

At step 2110, the candidate lists 2006, 2010 for the first and second people (or corresponding object regions 2004, 2008) are updated based on the probability 2017 determined at step 2108. For instance, as described above, the updated first candidate list 2006 may include a probability that the first object is associated with the first identifier 2001a and a probability that the first object is associated with the second identifier 2001b. The second candidate list 2010 for the second person is similarly updated based on the probability 2017 that the first object switched identifiers 2001a-c with the second object (determined at step 2108). The updated second candidate list 2010 may include a probability that the second person is associated with the first identifier 2001a and a probability that the second person is associated with the second identifier 2001b.

At step 2112, the tracking system 132 determines whether the first person (or corresponding region 2004) is within a threshold distance 2018b of a third object (or corresponding region 2012). This case may correspond, for example, to the conditions shown in view 2020 of FIG. 16, described above, where first object region 2004 is distance 112022 away from third object region 2012. As described above, the threshold distance 2018b may correspond to a pixel distance measured in a frame or a physical distance in the store 100 (e.g., determined using an appropriate homography associating pixel coordinates to physical coordinates in the store 100).

If the first and third people (or corresponding regions 2004 and 2012) are within the threshold distance 2018b of each other, method 2100 proceeds to step 2114, where the probability 2021 that the first and third people (or corresponding regions 2004 and 2012) switched identifiers 2001a-c is determined. As described above, this probability 2021 that the identifiers 2001a-c switched may be determined, for example, by accessing a predefined probability value (e.g., of 50%). The probability 2021 may also or alternatively be based on the distance 112022 between the objects 2727 and/or a relative orientation of the first and third people, as described above. At step 2116, the candidate lists 2006, 2010 for the first and third people (or corresponding regions 2004, 2012) are updated based on the probability 2021 determined at step 2108. For instance, as described above, the updated first candidate list 2006 may include a probability that the first person is associated with the first identifier 2001a, a probability that the first person is associated with the second identifier 2001b, and a probability that the first object is associated with the third identifier 2001c. The third candidate list 2014 for the third person is similarly updated based on the probability 2021 that the first person switched identifiers with the third person (i.e., determined at step 2114). The updated third candidate list 2014 may include, for example, a probability that the third object is associated with the first identifier 2001a, a probability that the third object is associated with the second identifier 2001b, and a probability that the third object is associated with the third identifier 2001c. Accordingly, if the steps of method 2100 proceed in the example order illustrated in FIG. 17, the candidate list 2014 of the third person includes a non-zero probability that the third object is associated with the second identifier 2001b, which was originally associated with the second person.

If, at step 2112, the first and third people (or corresponding regions 2004 and 2012) are not within the threshold distance 2018b of each other, the tracking system 132 generally continues tracking people in the store 100. For example, the tracking system 132 may proceed to step 2118 to determine whether the first person is within a threshold distance of an $n^{th}$ person (i.e., some other person in the store 100). At step 2120, the tracking system 132 determines the probability that the first and $n^{th}$ people switched identifiers 2001a-c, as described above, for example, with respect to steps 2108 and 2114. At step 2122, the candidate lists for the first and $n^{th}$ people are updated based on the probability determined at step 2120, as described above, for example, with respect to steps 2110 and 2116 before method 2100 ends. If, at step 2118, the first person is not within the threshold distance of the $n'$ person, the method 2100 proceeds to step 2124.

At step 2124, the tracking system 132 determines if a person has exited the store 100. For instance, as described above, the tracking system 132 may determine that a contour associated with a tracked person is no longer detected for at least a threshold time period (e.g., of about 30 seconds or more). The system 132 may additionally determine that a person exited the store 100 when a person is no longer detected and a last determined position of the person was at or near an exit position (e.g., near a door leading to a known exit from the store 100). If a person has not exited the store 100, the tracking system 132 continues to track people (e.g., by returning to step 2102).

If a person has exited the store 100, the tracking system 132 calculates or updates record 2032 of probabilities that the tracked objects have exited the store 100 at step 2126. As described above, each exit probability of record 2032 generally corresponds to a probability that a person associated with each identifier 2001a-c has exited the store 100. At step 2128, the tracking system 132 determines if a combined exit probability in the record 2032 is greater than a threshold value (e.g., of 95% or greater). If a combined exit probability is not greater than the threshold, the tracking system 132 continues to track objects (e.g., by continuing to step 2118).

If an exit probability from record 2032 is greater than the threshold, a corresponding exit notification 2034 may be sent to the person linked to the identifier 2001a-c associated with the probability at step 2130, as described above with respect to view 2030 of FIG. 16. This may prevent or reduce instances where an exit notification 2034 is sent prematurely while an object is still in the store 100. For example, it may be beneficial to delay sending an exit notification 2034 until there is a high certainty that the associated person is no longer in the store 100. In some cases, several tracked people must exit the store 100 before an exit probability in record 2032 for a given identifier 2001a-c is sufficiently large for an exit notification 2034 to be sent to the person (e.g., to a device associated with the person).

Modifications, additions, or omissions may be made to method 2100 depicted in FIG. 17. Method 2100 may include more, fewer, or other steps. For example, steps may be performed in parallel or in any suitable order. While at times discussed as tracking system 132 or components thereof performing steps, any suitable system or components of the system may perform one or more steps of the method 2100.

Person Re-Identification

As described above, in some cases, the identity of a tracked person can become unknown (e.g., when the people become closely spaced or "collide", or when the candidate list of a person indicates the person's identity is not known, as described above with respect to FIGS. 16-17), and the person may need to be re-identified. This disclosure contemplates a unique approach to efficiently and reliably re-identifying people by the tracking system 132. For example, rather than relying entirely on resource-expensive machine learning-based approaches to re-identify people, a more efficient and specially structured approach may be used where "lower-cost" descriptors related to observable characteristics (e.g., height, color, width, volume, etc.) of people are used first for person re-identification. "Higher-cost" descriptors (e.g., determined using artificial neural network models) are only used when the lower-cost methods cannot provide reliable results. For instance, in some embodiments, a person may first be re-identified based on his/her height, hair color, and/or shoe color. However, if these descriptors are not sufficient for reliably re-identifying the person (e.g., because other people being tracked have similar characteristics), progressively higher-level approaches may be used (e.g., involving artificial neural networks that are trained to recognize people) which may be more effective at person identification but which generally involve the use of more processing resources.

As an example, each person's height may be used initially for re-identification. However, if another person in the store 100 has a similar height, a height descriptor may not be sufficient for re-identifying the people (e.g., because it is not possible to distinguish between people with a similar heights based on height alone), and a higher-level approach may be used (e.g., using a texture operator or an artificial neural network to characterize the person). In some embodiments, if the other person with a similar height has never interacted with the person being re-identified (e.g., as recorded in each person's candidate list—see FIG. 16 and corresponding description above), height may still be an appropriate feature for re-identifying the person (e.g., because the other person with a similar height is not associated with a candidate identity of the person being re-identified).

Figure 18:
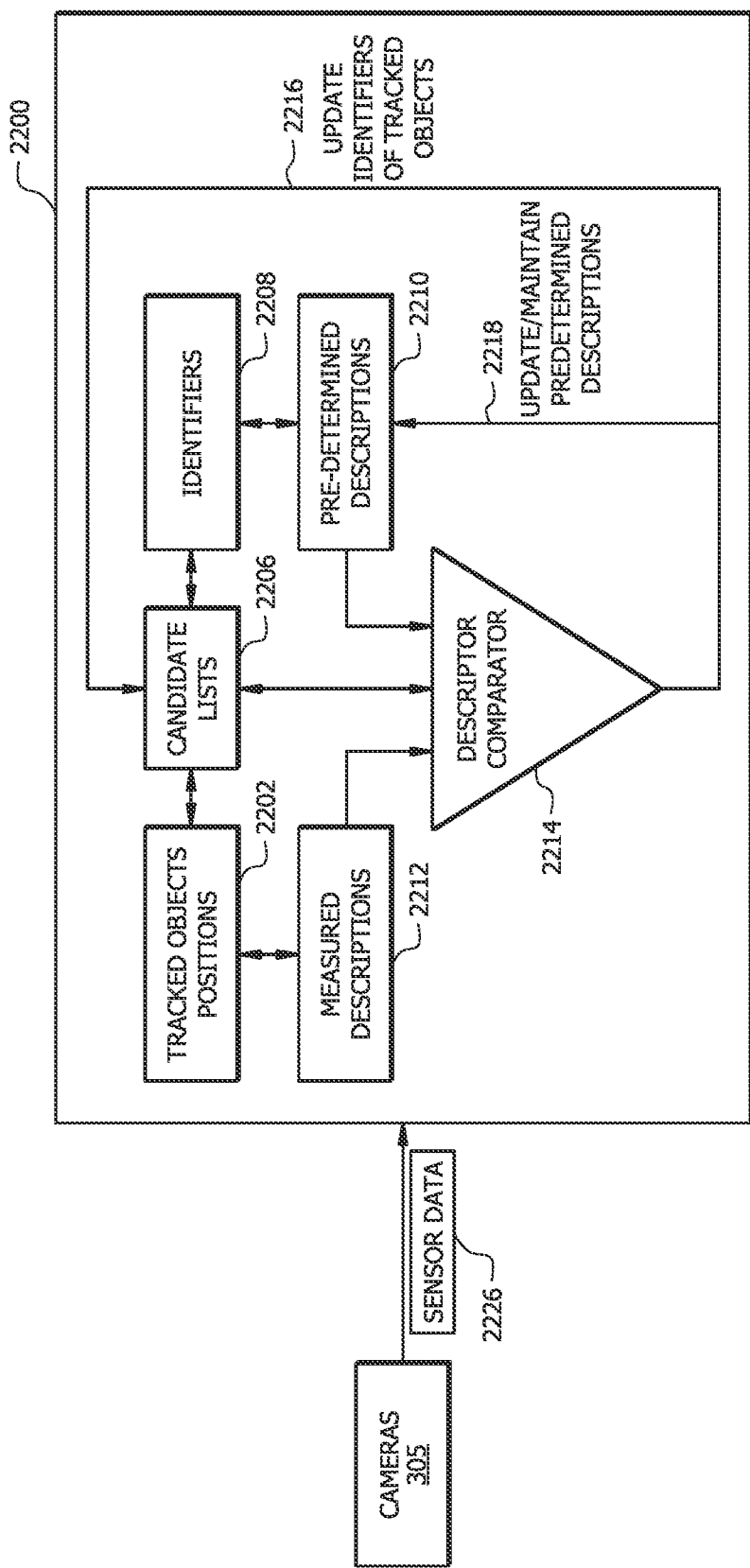
FIG. 18 illustrates a diagram of an example tracking subsystem for use in the tracking system.

FIG. 18 illustrates a tracking subsystem 2200 configured to track people (e.g., and/or other target objects) based on sensor data 2204 received from one or more cameras 305. In general, the tracking subsystem 2200 may include one or both of the camera server 225 and the camera client(s) 220 of FIG. 2, described above. Tracking subsystem 2200 may be implemented as described with respect to FIG. 7. Tracking subsystem 2200 may track object positions 11202, over a period of time using sensor data 2204 (e.g., top-view images) generated by at least one of cameras 305. Object positions 11202 may correspond to local pixel positions (e.g., pixel positions 1126,1134 of FIG. 11) determined at a single camera 305 and/or global positions corresponding to physical positions (e.g., positions 1128 of FIG. 11) in the store 100 (e.g., using the homographies described above with respect to FIGS. 3A-3T). In some cases, object positions 11202 may correspond to regions detected in an image, or in the store 100, that are associated with the location of a corresponding person (e.g., regions 2004, 2008, 2012 of FIG. 16, described above). People may be tracked and corresponding positions 11202 may be determined, for example, based on pixel coordinates of contours detected in top-view images generated by camera(s) 305. Examples of contour-based detection and tracking are described above, for example, with respect to FIGS. 13 and 16. However, in general, any appropriate method of sensor-based tracking may be used to determine positions 11202.

For each object position 11202, the subsystem 2200 maintains a corresponding candidate list 2206 (e.g., as described above with respect to FIG. 16). The candidate lists 2206 are generally used to maintain a record of the most likely identities of each person being tracked (i.e., associated with positions 11202). Each candidate list 2206 includes probabilities which are associated with identifiers 2208 of people that have entered the store 100. The identifiers 2208 may be any appropriate representation (e.g., an alphanumeric string, or the like) for identifying a person (e.g., a username, name, account number, or the like associated with the person being tracked). In some embodiments, the identifiers 2208 may be anonymized (e.g., using hashing or any other appropriate anonymization technique).

Each of the identifiers 2208 is associated with one or more predetermined descriptors 2210. The predetermined descriptors 2210 generally correspond to information about the tracked people that can be used to re-identify the people when necessary (e.g., based on the candidate lists 2206). The predetermined descriptors 2210 may include values associated with observable and/or calculated characteristics of the people associated with the identifiers 2208. For instance, the descriptors 2210 may include heights, hair colors, clothing colors, and the like. As described in greater detail below, the predetermined descriptors 2210 are generally determined by the tracking subsystem 2200 during an initial time period (e.g., when a person associated with a given tracked position 11202 enters the space) and are used to re-identify people associated with tracked positions 11202 when necessary (e.g., based on candidate lists 2206).

When re-identification is needed (or periodically during tracking) for a given person at position 11202, the tracking subsystem 2200 may determine measured descriptors 2212 for the person associated with the position 11202. FIG. 19 illustrates the determination of descriptors 2210, 2212 based on a top-view depth image 2302 received from a camera 305. A representation 2204a of a person corresponding to the tracked object position 11202 is observable in the image 2302. The tracking subsystem 2200 may detect a contour 2304b associated with the representation 2304a. The contour 2304b may correspond to a boundary of the representation 2304a (e.g., determined at a given depth in image 2302). Tracking subsystem 2200 generally determines descriptors 2210, 2212 based on the representation 2304a and/or the contour 2304b. In some cases, the representation 2304b appears within a predefined region-of-interest 2306 of the image 2302 in order for descriptors 2210, 2212 to be determined by the tracking subsystem 2200. This may facilitate more reliable descriptor 2210, 2212 determination, for example, because descriptors 2210, 2212 may be more reproducible and/or reliable when the person being imaged is located in the portion of the sensor's field-of-view that corresponds to this region-of-interest 2306. For example, descriptors 2210, 2212 may have more consistent values when the person is imaged within the region-of-interest 2306.

Descriptors 2210, 2212 determined in this manner may include, for example, observable descriptors 2308 and calculated descriptors 2310. For example, the observable descriptors 2308 may correspond to characteristics of the representation 2304a and/or contour 2304b which can be extracted from the image 2302 and which correspond to observable features of the person. Examples of observable descriptors 2308 include a height descriptor 2312 (e.g., a measure of the height in pixels or units of length) of the person based on representation 2304a and/or contour 2304b), a shape descriptor 2314 (e.g., width, length, aspect ratio, etc.) of the representation 2304a and/or contour 2304b, a volume descriptor 2316 of the representation 2304a and/or contour 2304b, a color descriptor 2318 of representation 2304a (e.g., a color of the person's hair, clothing, shoes, etc.), an attribute descriptor 2320 associated with the appearance of the representation 2304a and/or contour 2304b (e.g., an attribute such as "wearing a hat," "carrying a child," "pushing a stroller or cart,"), and the like.

In contrast to the observable descriptors 2308, the calculated descriptors 2310 generally include values (e.g., scalar or vector values) which are calculated using the representation 2304a and/or contour 2304b and which do not necessarily correspond to an observable characteristic of the person. For example, the calculated descriptors 2310 may include image-based descriptors 2322 and model-based descriptors 2324. Image-based descriptors 2322 may, for example, include any descriptor values (i.e., scalar and/or vector values) calculated from image 2302. For example, a texture operator such as a local binary pattern histogram (LBPH) algorithm may be used to calculate a vector associated with the representation 2304a. This vector may be stored as a predetermined descriptor 2210 and measured at subsequent times as a descriptor 2212 for re-identification. Since the output of a texture operator, such as the LBPH algorithm may be large (i.e., in terms of the amount of memory required to store the output), it may be beneficial to select a subset of the output that is most useful for distinguishing people. Accordingly, in some cases, the tracking subsystem 2200 may select a portion of the initial data vector to include in the descriptor 2210, 2212. For example, principal component analysis may be used to select and retain a portion of the initial data vector that is most useful for effective person re-identification.

In contrast to the image-based descriptors 2322, model-based descriptors 2324 are generally determined using a predefined model, such as an artificial neural network. For example, a model-based descriptor 2324 may be the output (e.g., a scalar value or vector) output by an artificial neural network trained to recognize people based on their corresponding representation 2304a and/or contour 2304b in top-view image 2302. For example, a Siamese neural network may be trained to associate representations 2304a and/or contours 2304b in top-view images 2302 with corresponding identifiers 2208 and subsequently employed for re-identification 2929.

Returning to FIG. 18, the descriptor comparator 2214 of the tracking subsystem 2200 may be used to compare the measured descriptor 2212 to corresponding predetermined descriptors 2210 in order to determine the correct identity of a person being tracked. For example, the measured descriptor 2212 may be compared to a corresponding predetermined descriptor 2210 in order to determine the correct identifier 2208 for the person at position 11202. For instance, if the measured descriptor 2212 is a height descriptor 2312, it may be compared to predetermined height descriptors 2210 for identifiers 2208, or a subset of the identifiers 2208 determined using the candidate list 2206. Comparing the descriptors 2210, 2212 may involve calculating a difference between scalar descriptor values (e.g., a difference in heights 2312, volumes 2318, etc.), determining whether a value of a measured descriptor 2212 is within a threshold range of the corresponding predetermined descriptor 2210 (e.g., determining if a color value 2318 of the measured descriptor 2212 is within a threshold range of the color value 2318 of the predetermined descriptor 2210), determining a cosine similarity value between vectors of the measured descriptor 2212 and the corresponding predetermined descriptor 2210 (e.g., determining a cosine similarity value between a measured vector calculated using a texture operator or neural network and a predetermined vector calculated in the same manner). In some embodiments, only a subset of the predetermined descriptors 2210 are compared to the measured descriptor 2212. The subset may be selected using the candidate list 2206 for the person at position 11202 that is being re-identified. For example, the person's candidate list 2206 may indicate that only a subset (e.g., two, three, or so) of a larger number of identifiers 2208 are likely to be associated with the tracked object position 11202 that requires re-identification.

When the correct identifier 2208 is determined by the descriptor comparator 2214, the comparator 2214 may update the candidate list 2206 for the person being re-identified at position 11202 (e.g., by sending update 2216). In some cases, a descriptor 2212 may be measured for an object that does not require re-identification (e.g., a person for which the candidate list 2206 indicates there is 100% probability that the person corresponds to a single identifier 2208). In these cases, measured identifiers 2212 may be used to update and/or maintain the predetermined descriptors 2210 for the person's known identifier 2208 (e.g., by sending update 2218). For instance, a predetermined descriptor 2210 may need to be updated if a person associated with the position 11202 has a change of appearance while moving through the store 100 (e.g., by adding or removing an article of clothing, by assuming a different posture, etc.).

Figure 20A:
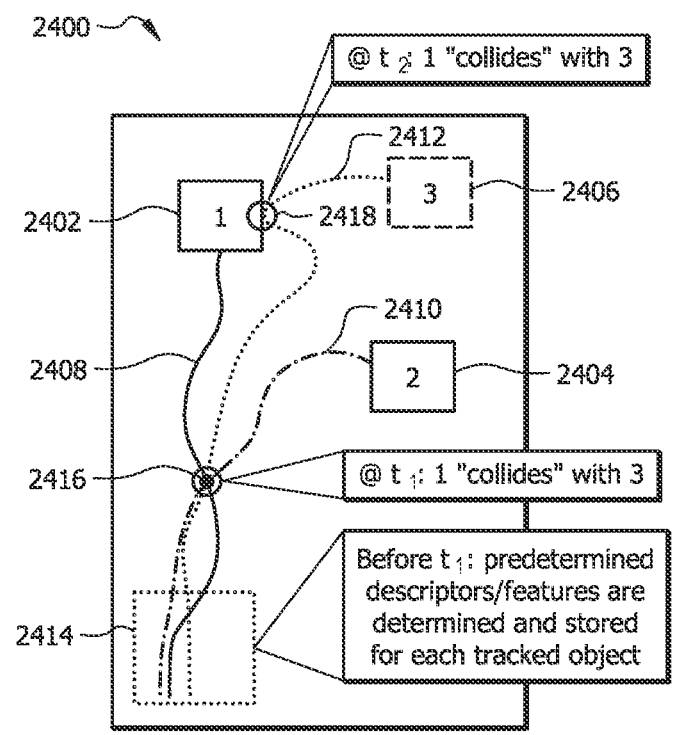
FIGS. 20A-C illustrate diagrams of the use of descriptors for re-identification during object tracking by the tracking system.

FIG. 20A illustrates positions over a period of time of tracked people 2402, 2404, 2406, during an example operation of tracking system 2200. The first person 2402 has a corresponding trajectory 2408 represented by the solid line in FIG. 20A. Trajectory 2408 corresponds to the history of positions of person 2402 in the store 100 during the period of time. Similarly, the second person 2404 has a corresponding trajectory 2410 represented by the dashed-dotted line in FIG. 20A. Trajectory 2410 corresponds to the history of positions of person 2404 in the store 100 during the period of time. The third person 2406 has a corresponding trajectory 2412 represented by the dotted line in FIG. 20A. Trajectory 2412 corresponds to the history of positions of person 2406 in the store 100 during the period of time.

When each of the people 2402, 2404, 2406 first enter the store 100 (e.g., when they are within region 2414), predetermined descriptors 2210 are generally determined for the people 2402, 2404, 2406 and associated with the identifiers 2208 of the people 2402, 2404, 2406. The predetermined descriptors 2210 are generally accessed when the identity of one or more of the people 2402, 2404, 2406 is not sufficiently certain (e.g., based on the corresponding candidate list 2206 and/or in response to a "collision event," as described below) in order to re-identify the person 2402, 2404, 2406. For example, re-identification may be needed following a "collision event" between two or more of the people 2402, 2404, 2406. A collision event typically corresponds to an image frame in which contours associated with different people merge to form a single contour (e.g., the detection of merged contour 1120 shown in FIG. 11 may correspond to detecting a collision event). In some embodiments, a collision event corresponds to a person being located within a threshold distance of another person (see, e.g., distance 2018a and 112022 in FIG. 16 and the corresponding description above). More generally, a collision event may correspond to any event that results in a person's candidate list 2206 indicating that re-identification is needed (e.g., based on probabilities stored in the candidate list 2206—see FIGS. 16-17 and the corresponding description above).

Figure 19:
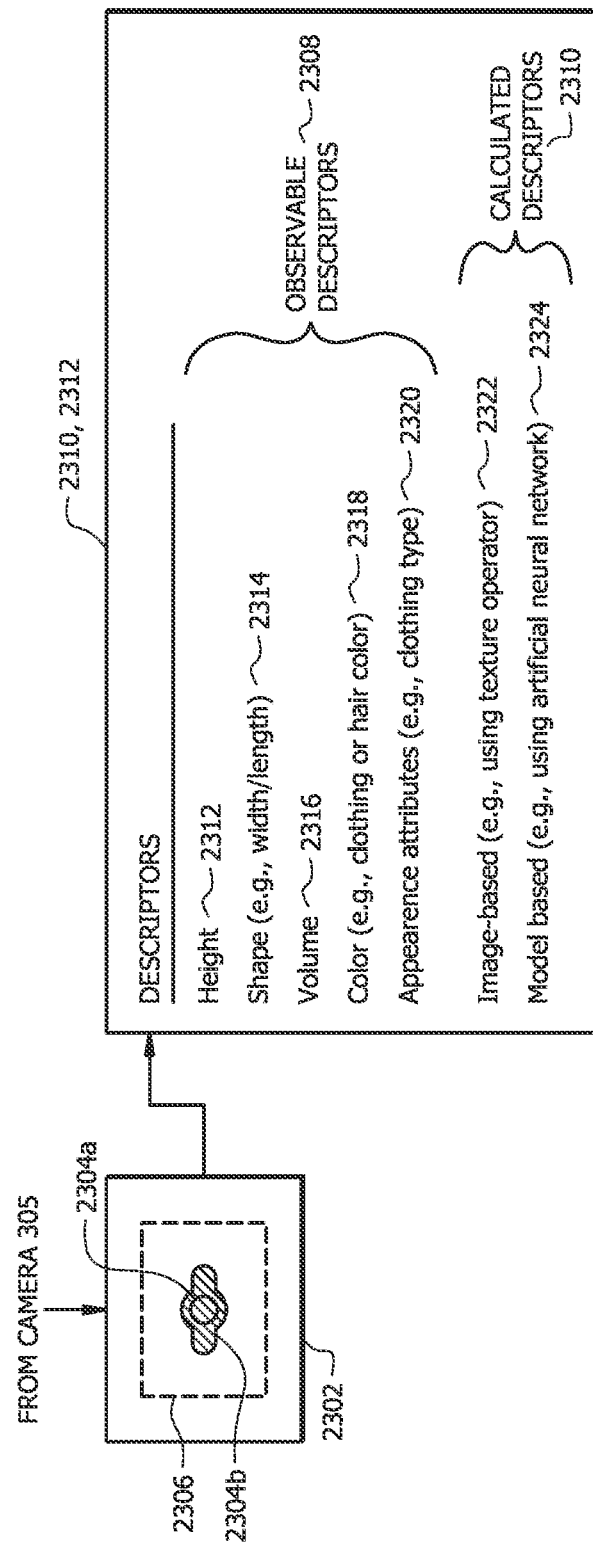
FIG. 19 illustrates a diagram of the determination of descriptors based on object features using the tracking system.

In the example of FIG. 20A, when the people 2402, 2404, 2406 are within region 2414, the tracking subsystem 2200 may determine a first height descriptor 2312 associated with a first height of the first person 2402, a first contour descriptor 2314 associated with a shape of the first person 2402, a first anchor descriptor 2324 corresponding to a first vector generated by an artificial neural network for the first person 2402, and/or any other descriptors 2210 described with respect to FIG. 19 above. Each of these descriptors is stored for use as a predetermined descriptor 2210 for re-identifying the first person 2402. These predetermined descriptors 2210 are associated with the first identifier (i.e., of identifiers 2208) of the first person 2402. When the identity of the first person 2402 is certain (e.g., prior to the first collision event at position 2416), each of the descriptors 2210 described above may be determined again to update the predetermined descriptors 2210. For example, if person 2402 moves to a position in the store 100 that allows the person 2402 to be within a desired region-of-interest (e.g., region-of-interest 2306 of FIG. 19), new descriptors 2212 may be determined. The tracking subsystem 2200 may use these new descriptors 2212 to update the previously determined descriptors 2210 (e.g., see update 2218 of FIG. 18). By intermittently updating the predetermined descriptors 2210, changes in the appearance of people being tracked can be accounted for (e.g., if a person puts on or removes an article of clothing, assumes a different posture, etc.).

At a first timestamp associated with a time $t_1$, the tracking subsystem 2200 detects a collision event between the first person 2402 and third person 2406 at position 2416 illustrated in FIG. 20A. For example, the collision event may correspond to a first tracked position of the first person 2402 being within a threshold distance of a second tracked position of the third person 2406 at the first timestamp. In some embodiments, the collision event corresponds to a first contour associated with the first person 2402 merging with a third contour associated with the third person 2406 at the first timestamp. More generally, the collision event may be associated with any occurrence which causes a highest value probability of a candidate list associated with the first person 2402 and/or the third person 2406 to fall below a threshold value (e.g., as described above with respect to view 2028 of FIG. 16). In other words, any event causing the identity of person 2402 to become uncertain may be considered a collision event.

After the collision event is detected, the tracking subsystem 2200 receives a top-view image (e.g., top-view image 2302 of FIG. 19) from camera 305. The tracking subsystem 2200 determines, based on the top-view image, a first descriptor for the first person 2402. As described above, the first descriptor includes at least one value associated with an observable, or calculated, characteristic of the first person 2404 (e.g., of representation 2304a and/or contour 2304b of FIG. 19). In some embodiments, the first descriptor may be a "lower-cost" descriptor that requires relative few processing resources to determine, as described above. For example, the tracking subsystem 2200 may be able to determine a lower-cost descriptor more efficiently than it can determine a higher-cost descriptor (e.g., a model-based descriptor 2324 described above with respect to FIG. 19). For instance, a first number of processing cores used to determine the first descriptor may be less than a second number of processing cores used to determine a model-based descriptor 2324 (e.g., using an artificial neural network). Thus, it may be beneficial to re-identify a person, whenever possible, using a lower-cost descriptor whenever possible.

However, in some cases, the first descriptor may not be sufficient for re-identifying the first person 2402. For example, if the first person 2402 and the third person 2406 correspond to people with similar heights, a height descriptor 2312 generally cannot be used to distinguish between the people 2402, 2406. Accordingly, before the first descriptor 2212 is used to re-identify the first person 2402, the tracking subsystem 2200 may determine whether certain criteria are satisfied for distinguishing the first person 2402 from the third person 2406 based on the first descriptor 2212. In some embodiments, the criteria are not satisfied when a difference, determined during a time interval associated with the collision event (e.g., at a time at or near time $t_1$), between the descriptor 2212 of the first person 2402 and a corresponding descriptor 2212 of the third person 2406 is less than a minimum value.

Figure 20B:
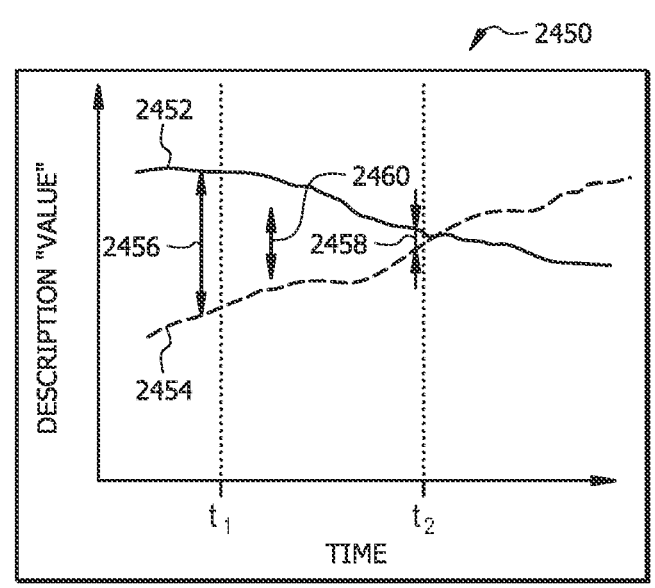

FIG. 20B illustrates the evaluation of these criteria based on the history of descriptor values for people 2402 and 2406 over time. Plot 2450, shown in FIG. 20B, shows a first descriptor value 2452 for the first person 2402 over time and a second descriptor value 2454 for the third person 2406 over time. In general, descriptor values may fluctuate over-time because of changes in the environment, the orientation of people relative to cameras 305, sensor variability, changes in appearance, etc. The descriptor values 2452, 2454 may be associated with a shape descriptor 2314, a volume 2316, a contour-based descriptor 2322, or the like, as described above with respect to FIG. 19. At time $t_1$, the descriptor values 2452, 2454 have a relatively large difference 2456 that is greater than the threshold difference 2460, illustrated in FIG. 20B. Accordingly, in this example, at or near (e.g., within a brief time interval of a few seconds or minutes following $t_1$), the criteria are satisfied and the descriptor 2212 associated with descriptor values 2452, 2454 can generally be used to re-identify the first and third people 2402, 2406.

When the criteria are satisfied for distinguishing the first person 2402 from the third person 2406 based on the first descriptor 2212 (as is the case at $t_1$), the descriptor comparator 2214 may compare the first descriptor 2212 for the first person 2402 to each of the corresponding predetermined descriptors 2210 (i.e., for all identifiers 2208). However, in some embodiments, comparator 2214 may compare the first descriptor 2212 for the first person 2402 to predetermined descriptors 2210 for only a select subset of the identifiers 2208. The subset may be selected using the candidate list 2206 for the person that is being re-identified (see, e.g., step 2608 of method 2600 described below with respect to FIG. 21). For example, the person's candidate list 2206 may indicate that only a subset (e.g., two, three, or so) of a larger number of identifiers 2208 are likely to be associated with the tracked object position 11202 that requires re-identification. Based on this comparison, the tracking subsystem 2200 may identify the predetermined descriptor 2210 that is most similar to the first descriptor 2212. For example, the tracking subsystem 2200 may determine that a first identifier 2208 corresponds to the first person 2402 by, for each member of the set (or the determined subset) of the predetermined descriptors 2210, calculating an absolute value of a difference in a value of the first descriptor 2212 and a value of the predetermined descriptor 2210. The first identifier 2208 may be selected as the identifier 2208 associated with the smallest absolute value.

Referring again to FIG. 20A, at time $t_2$, a second collision event occurs at position 2418 between people 2402, 2406. Turning back to FIG. 20B, the descriptor values 2452, 2454 have a relatively small difference 2458 at time $t_2$ (e.g., compared to difference 2456 at time $t_1$), which is less than the threshold value 2460. Thus, at time $t_2$, the descriptor 2212 associated with descriptor values 2452, 2454 generally cannot be used to re-identify the first and third people 2402, 2406, and the criteria for using the first descriptor 2212 are not satisfied. Instead, a different, and likely a "higher-cost" descriptor 2212 (e.g., a model-based descriptor 2324) should be used to re-identify the first and third people 2402, 2406 at time $t_2$.

For example, when the criteria are not satisfied for distinguishing the first person 2402 from the third person 2406 based on the first descriptor 2212 (as is the case in this example at time $t_2$), the tracking subsystem 2200 determines a new descriptor 2212 for the first person 2402. The new descriptor 2212 is typically a value or vector generated by an artificial neural network configured to identify people in top-view images (e.g., a model-based descriptor 2324 of FIG. 19). The tracking subsystem 2200 may determine, based on the new descriptor 2212, that a first identifier 2208 from the predetermined identifiers 2208 (or a subset determined based on the candidate list 2206, as described above) corresponds to the first person 2402. For example, the tracking subsystem 2200 may determine that the first identifier 2208 corresponds to the first person 2402 by, for each member of the set (or subset) of predetermined identifiers 2208, calculating an absolute value of a difference in a value of the first identifier 2208 and a value of the predetermined descriptors 2210. The first identifier 2208 may be selected as the identifier 2208 associated with the smallest absolute value.

Figure 20C:
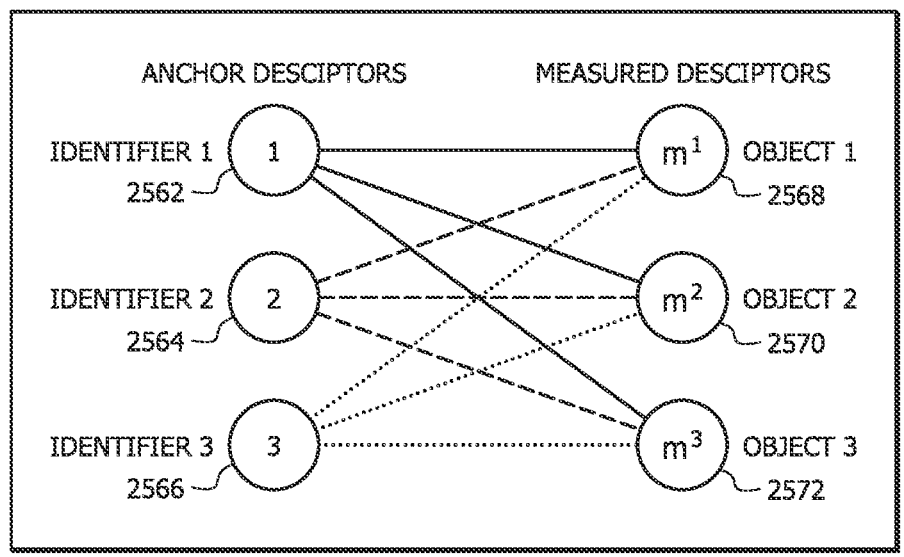

In cases where the second descriptor 2212 cannot be used to reliably re-identify the first person 2402 using the approach described above, the tracking subsystem 2200 may determine a measured descriptor 2212 for all of the "candidate identifiers" of the first person 2402. The candidate identifiers generally refer to the identifiers 2208 of people (e.g., or other tracked objects) that are known to be associated with identifiers 2208 appearing in the candidate list 2206 of the first person 2402 (e.g., as described above with respect to FIGS. 16 and 17). For instance, the candidate identifiers may be identifiers 2208 of tracked people (i.e., at tracked object positions 11202) that appear in the candidate list 2206 of the person being re-identified. FIG. 20C illustrates how predetermined descriptors 2462, 2464, 2466 for a first, second, and third identifier 2208 may be compared to each of the measured descriptors 2468, 2470, 2472 for people 2402, 2404, 2406. The comparison may involve calculating a cosine similarity value between a vectors associated with the descriptors. Based on the results of the comparison, each person 2402, 2404, 2406 is assigned the identifier 2208 corresponding to the best-matching predetermined descriptor 2462, 2464, 2466. A best matching descriptor may correspond to a highest cosine similarity value (i.e., nearest to one).

Figure 21:
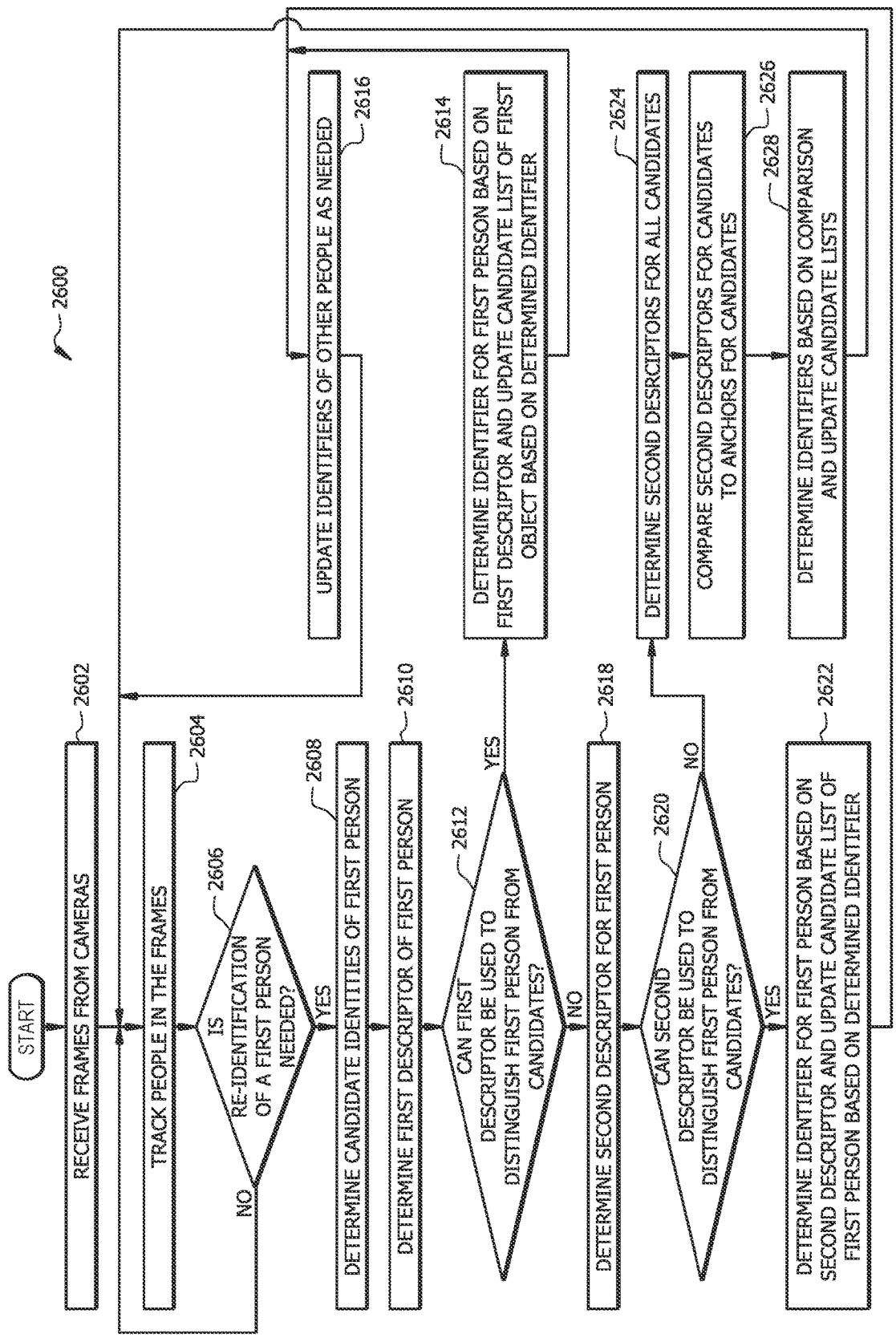
FIG. 21 illustrates a flowchart of an example method of object re-identification during object tracking using the tracking system.

FIG. 21 illustrates a method 2600 for re-identifying tracked people using tracking subsystem 2200 illustrated in FIG. 18 and described above. The method 2600 may begin at step 2602 where the tracking subsystem 2200 receives top-view image frames from one or more cameras 305. At step 2604, the tracking subsystem 2200 tracks a first person 2402 and one or more other people (e.g., people 2404, 2406) in the store 100 using at least a portion of the top-view images generated by the cameras 305. For instance, tracking may be performed as described above with respect to FIGS. 13-15, or using any appropriate object tracking algorithm. The tracking subsystem 2200 may periodically determine updated predetermined descriptors associated with the identifiers 2208 (e.g., as described with respect to update 2218 of FIG. 18). In some embodiments, the tracking subsystem 2200, in response to determining the updated descriptors, determines that one or more of the updated predetermined descriptors is different by at least a threshold amount from a corresponding previously predetermined descriptor 2210. In this case, the tracking subsystem 2200 may save both the updated descriptor and the corresponding previously predetermined descriptor 2210. This may allow for improved re-identification when characteristics of the people being tracked may change intermittently during tracking.

At step 2606, the tracking subsystem 2200 determines whether re-identification of the first tracked person 2402 is needed. This may be based on a determination that contours have merged in an image frame (e.g., as illustrated by merged contour 1120 of FIG. 11) or on a determination that a first person 2402 and a second person 2404 are within a threshold distance (e.g., distance 2218b of FIG. 18) of each other, as described above. In some embodiments, a candidate list 2206 may be used to determine that re-identification of the first person 2402 is required. For instance, if a highest probability from the candidate list 2206 associated with the tracked person 2402 is less than a threshold value (e.g., 70%), re-identification may be needed (see also FIGS. 16-17 and the corresponding description above). If re-identification is not needed, the tracking subsystem 2200 generally continues to track people in the space (e.g., by returning to step 2604).

If the tracking subsystem 2200 determines at step 2606 that re-identification of the first tracked person 2402 is needed, the tracking subsystem 2200 may determine candidate identifiers for the first tracked person 2402 at step 2608. The candidate identifiers generally include a subset of all of the identifiers 2208 associated with tracked people in the store 100, and the candidate identifiers may be determined based on the candidate list 2206 for the first tracked person 2402. In other words, the candidate 2206 which are most likely to include the correct identifier 2208 for the first tracked person 2402 based on a history of movements of the first tracked person 2402 and interactions of the first tracked person 2402 with the one or more other tracked people 2404, 2406 in the store 100 (e.g., based on the candidate list 2206 that is updated in response to these movements and interactions).

At step 2610, the tracking subsystem 2200 determines a first descriptor 2212 for the first tracked person 2402. For example, the tracking subsystem 2200 may receive, from a first camera 305, a first top-view image of the first person 2402 (e.g., such as image 2302 of FIG. 19). For instance, as illustrated in the example of FIG. 19, in some embodiments, the image 2302 used to determine the descriptor 2212 includes the representation 2304a of the object within a region-of-interest 2306 within the full frame of the image 2302. This may provide for more reliable descriptor 2212 determination. In some embodiments, the image data 2204 include depth data (i.e., image data at different depths). In such embodiments, the tracking subsystem 2200 may determine the descriptor 2212 based on a depth region-of-interest, where the depth region-of-interest corresponds to depths in the image associated with the head of person 2402. In these embodiments, descriptors 2212 may be determined that are associated with characteristics or features of the head of the person 2402.

At step 2612, the tracking subsystem 2200 may determine whether the first descriptor 2212 can be used to distinguish the first person 2402 from the candidate identifiers (e.g., one or both of people 2404, 2406) by, for example, determining whether certain criteria are satisfied for distinguishing the first person 2402 from the candidates based on the first descriptor 2212. In some embodiments, the criteria are not satisfied when a difference, determined during a time interval associated with the collision event, between the first descriptor 2212 and corresponding descriptors 2210 of the candidates is less than a minimum value, as described in greater detail above with respect to FIGS. 20A,B.

If the first descriptor can be used to distinguish the first person 2402 from the candidates (e.g., as was the case at time t₁ in the example of FIG. 20A,B), the method 2600 proceeds to step 2614 at which point the tracking subsystem 2200 determines an updated identifier for the first person 2402 based on the first descriptor 2212. For example, the tracking subsystem 2200 may compare (e.g., using comparator 2214) the first descriptor 2212 to the set of predetermined descriptors 2210 that are associated with the candidate objects determined for the first person 2402 at step 2608. In some embodiments, the first descriptor 2212 is a data vector associated with characteristics of the first person in the image (e.g., a vector determined using a texture operator such as the LBPH algorithm), and each of the predetermined descriptors 2210 includes a corresponding predetermined data vector (e.g., determined for each tracked pers 2402, 2404, 2406 upon entering the store 100). In such embodiments, the tracking subsystem 2200 compares the first descriptor 2212 to each of the predetermined descriptors 2210 associated with the candidate objects by calculating a cosine similarity value between the first data vector and each of the predetermined data vectors. The tracking subsystem 2200 determines the updated identifier as the identifier 2208 of the candidate object with the cosine similarity value nearest one (i.e., the vector that is most "similar" to the vector of the first descriptor 2212).

At step 2616, the identifiers 2208 of the other tracked people 2404, 2406 may be updated as appropriate by updating other people's candidate lists 2206. For example, if the first tracked person 2402 was found to be associated with an identifier 2208 that was previously associated with the second tracked person 2404. Steps 2608 to 2614 may be repeated for the second person 2404 to determine the correct identifier 2208 for the second person 2404. In some embodiments, when the identifier 2208 for the first person 2402 is updated, the identifiers 2208 for people (e.g., one or both of people 2404 and 2406) that are associated with the first person's candidate list 2206 are also updated at step 2616. As an example, the candidate list 2206 of the first person 2402 may have a non-zero probability that the first person 2402 is associated with a second identifier 2208 originally linked to the second person 2404 and a third probability that the first person 2402 is associated with a third identifier 2208 originally linked to the third person 2406. In this case, after the identifier 2208 of the first person 2402 is updated, the identifiers 2208 of the second and third people 2404, 2406 may also be updated according to steps 2608-2614.

If, at step 2612, the first descriptor 2212 cannot be used to distinguish the first person 2402 from the candidates (e.g., as was the case at time $t_2$ in the example of FIG. 20A,B), the method 2600 proceeds to step 2618 to determine a second descriptor 2212 for the first person 2402. As described above, the second descriptor 2212 may be a "higher-level" descriptor such as a model-based descriptor 2324 of FIG. 19). For example, the second descriptor 2212 may be less efficient (e.g., in terms of processing resources required) to determine than the first descriptor 2212. However, the second descriptor 2212 may be more effective and reliable, in some cases, for distinguishing between tracked people.

At step 2620, the tracking system 2200 determines whether the second descriptor 2212 can be used to distinguish the first person 2402 from the candidates (from step 2618) using the same or a similar approach to that described above with respect to step 2612. For example, the tracking subsystem 2200 may determine if the cosine similarity values between the second descriptor 2212 and the predetermined descriptors 2210 are greater than a threshold cosine similarity value (e.g., of 0.5). If the cosine similarity value is greater than the threshold, the second descriptor 2212 generally can be used.

If the second descriptor 2212 can be used to distinguish the first person 2402 from the candidates, the tracking subsystem 2200 proceeds to step 2622, and the tracking subsystem 2200 determines the identifier 2208 for the first person 2402 based on the second descriptor 2212 and updates the candidate list 2206 for the first person 2402 accordingly. The identifier 2208 for the first person 2402 may be determined as described above with respect to step 2614 (e.g., by calculating a cosine similarity value between a vector corresponding to the first descriptor 2212 and previously determined vectors associated with the predetermined descriptors 2210). The tracking subsystem 2200 then proceeds to step 2616 described above to update identifiers 2208 (i.e., via candidate lists 2206) of other tracked people 2404, 2406 as appropriate.

Otherwise, if the second descriptor 2212 cannot be used to distinguish the first person 2402 from the candidates, the tracking subsystem 2200 proceeds to step 2624, and the tracking subsystem 2200 determines a descriptor 2212 for all of the first person 2402 and all of the candidates. In other words, a measured descriptor 2212 is determined for all people associated with the identifiers 2208 appearing in the candidate list 2206 of the first person 2402 (e.g., as described above with respect to FIG. 20C). At step 2626, the tracking subsystem 2200 compares the second descriptor 2212 to predetermined descriptors 2210 associated with all people related to the candidate list 2206 of the first person 2402. For instance, the tracking subsystem 2200 may determine a second cosine similarity value between a second data vector determined using an artificial neural network and each corresponding vector from the predetermined descriptor values 2210 for the candidates (e.g., as illustrated in FIG. 20C, described above). The tracking subsystem 2200 then proceeds to step 2628 to determine and update the identifiers 2208 of all candidates based on the comparison at step 2626 before continuing to track people 2402, 2404, 2406 in the store 100 (e.g., by returning to step 2604).

Modifications, additions, or omissions may be made to method 2600 depicted in FIG. 21. Method 2600 may include more, fewer, or other steps. For example, steps may be performed in parallel or in any suitable order. While at times discussed as tracking system 2200 (e.g., by camera server 225 and/or camera client(s) 220) or components thereof performing steps, any suitable system or components of the system may perform one or more steps of the method 2600.

While the preceding examples and explanations are described with respect to particular use cases within a retail environment, one of ordinary skill in the art would readily appreciate that the previously described configurations and techniques may also be applied to other applications and environments. Examples of other applications and environments include, but are not limited to, security applications, surveillance applications, object tracking applications, people tracking applications, occupancy detection applications, logistics applications, warehouse management applications, operations research applications, product loading applications, retail applications, robotics applications, computer vision applications, manufacturing applications, safety applications, quality control applications, food distributing applications, retail product tracking applications, mapping applications, simultaneous localization and mapping (SLAM) applications, 3D scanning applications, autonomous vehicle applications, virtual reality applications, augmented reality applications, or any other suitable type of application.

Although the present disclosure includes several embodiments, a myriad of changes, variations, alterations, transformations, and modifications may be suggested to one skilled in the art, and it is intended that the present disclosure encompass such changes, variations, alterations, transformations, and modifications as fall within the scope of the appended claims.

While several embodiments have been provided in the present disclosure, it should be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

In addition, techniques, systems, subsystems, and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and could be made without departing from the spirit and scope disclosed herein.

To aid the Patent Office, and any readers of any patent issued on this application in interpreting the claims appended hereto, applicants note that they do not intend any of the appended claims to invoke 35 U.S.C. § 112(f) as it exists on the date of filing hereof unless the words "means for" or "step for" are explicitly used in the particular claim.

What is claimed is:

1. A system comprising:
an array of cameras positioned above a space, wherein:
  each camera of the array of cameras is operatively coupled with a camera client from an array of camera clients;
  each camera of the array of cameras is configured to capture a video of a portion of the space, the space containing a person;
the array of camera clients operably coupled with the array of cameras; wherein:
  a first camera client of the array of camera clients is operably coupled with a first camera and configured to:
    receive a first plurality of frames of a first video from the first camera, wherein each frame of the first plurality of frames shows the person within the space, the first plurality of frames comprises a first plurality of color frames and a first plurality of depth frames, wherein:
      the first plurality of color frames corresponds to visual colors of objects in the space; and
      the first plurality of depth frames corresponds to distances of objects in the space from the first camera;
    generate a timestamp when each corresponding color and depth frame is received by the first camera client;
    send the first plurality of frames labeled with one or more corresponding timestamps and an identifier number of the first camera client to a first server from among a plurality of cluster servers;
    generate a first plurality of tracks by performing a local position tracking of the person in the first plurality of depth frames;
    for a first depth frame of the first plurality of depth frames, generate a first track of the first plurality of tracks by:
      detecting a first contour associated with the person;
      determining, based on pixel coordinates of the first contour, a first bounding area around the person shown in the first depth frame;
      determining, based on the first bounding area, first coordinates of the person in the first depth frame; and
      associating a first tracking identification to the person, wherein the first tracking identification is linked to historical detections associated with the person, wherein the historical detections associated with the person comprise at least one of a contour, a bounding area, and a segmentation mask associated with the person;
    for a second depth frame of the first plurality of depth frames, generate a second track of the first plurality of tracks by:
      detecting a second contour associated with the person;
      determining, based on pixel coordinates of the second contour, a second bounding area around the person shown in the second depth frame;
      determining, based on the second bounding area, second coordinates of the person in the second depth frame;
      determining whether the second bounding area corresponds to the first bounding area; and
      in response to determining that the second bounding area corresponds to the first bounding area, associating the first tracking identification to the person;
    send the first plurality of tracks labeled with one or more corresponding timestamps, the identifier number of the first camera, the historical detections associated with the person, and the first tracking identification associated with the person to a second server from among the plurality of cluster servers;
  a second camera client of the array of camera clients is operably coupled with a second camera and separate from the first camera client, the second camera client configured to:
    receive a second plurality of frames of a second video from the second camera, wherein each frame of the second plurality of frames shows the person within the space, the second plurality of frames comprises a second plurality of color frames and a second plurality of depth frames, wherein:
      the second plurality of color frames corresponds to visual colors of objects in the space; and
      the second plurality of depth frames corresponds to distances of objects in the space from the second camera;
    generate a timestamp when each corresponding color and depth frame is received by the second camera client;
    send the second plurality of frames labeled with one or more corresponding timestamps and an identifier number of the second camera to the first server from among the plurality of cluster servers;
    generate a second plurality of tracks by performing a local position tracking of the person in the second plurality of depth frames;
    for a third depth frame of the second plurality of depth frames, generate a third track of the second plurality of tracks by:
      detecting a third contour associated with the person;
      determining, based on pixel coordinates of the third contour, a third bounding area around the person shown in the third depth frame;
      determining, based on the third bounding area, third coordinates of the person in the third depth frame; and
      associating a second tracking identification to the person, wherein the second tracking identification is linked to the historical detections associated with the person;
    for a fourth depth frame of the second plurality of depth frames, generate a fourth track of the second plurality of tracks by:
      detecting a fourth contour associated with the person;
      determining, based on pixel coordinates of the fourth contour, a fourth bounding area around the person shown in the fourth depth frame;

determining, based on the fourth bounding area, fourth coordinates of the person in the fourth depth frame;

determining whether the fourth bounding area corresponds to the third bounding area; and in response to determining that the fourth bounding area corresponds to the third bounding area, associating the second tracking identification to the person;

send the second plurality of tracks labeled with one or more corresponding timestamps, the identification number of the second camera, the historical detections associated with the person, and the second tracking identification associated with the person to the second server from among the plurality of cluster servers; and each server from among the plurality of cluster servers configured to:

receive the first plurality of frames and the first plurality of tracks from the first camera client;

receive the second plurality of frames and the second plurality of tracks from the second camera client;

store the first and second plurality of frames such that a particular frame from the first and second plurality of frames is retrievable using one or more corresponding labels comprising an identifier number of a camera associated with the particular frame and a timestamp associated with the particular frame; and store the first and second plurality of tracks such that a particular track from the first and second plurality of tracks is retrievable using one or more corresponding labels comprising an identifier number of a camera associated with the particular track, a timestamp associated with the particular track, a particular historical detection associated with a person detected in the particular track, and a particular tracking identification detected in the particular track.

2. The system of claim 1, wherein:

determining whether the second bounding area corresponds to the first bounding area is based on one or more metrics comprising:

an overlapping region between the first bounding area and the second bounding area, a ratio of intersection over union region between the first bounding area and the second bounding area, and a distance between the center of the first bounding area and the center of the second bounding area;

if it is determined that:

the overlapping region between the first bounding area and the second bounding area is above a threshold region;

the ratio of intersection over union region between the first bounding area and the second bounding area is above a threshold value; and the distance between the center of the first bounding area and the center of the second bounding area is below a threshold distance, determine that the second bounding area corresponds to the first bounding area.

3. The system of claim 1, further comprising:

a camera server, communicatively coupled with the first and second camera clients, and the plurality of cluster servers, configured to:

receive the first and second plurality of frames from the first server, in response to sending a request to the first server to send frames with one ore more labels comprising the identifier number of the first camera, the identifier number of the second camera, and a timestamp range;

receive the first and second plurality of tracks from the second server, in response to sending a request to the second server to send tracks with one ore more labels comprising an identifier number of the second camera, a timestamp range, a historical detection, and a tracking identification;

determine that a first timestamp of the first depth and color frames from the first set of frames and tracks falls within a first time window;

in response to determining that the first timestamp falls within the first time window, assign the first coordinates defining the first bounding area to the first time window;

determine that a second timestamp of the second depth and color frames falls within the first time window;

in response to determining that the second timestamp falls within the first time window, assign the second coordinates defining the second bounding area to the first time window;

determine that a third timestamp of the third depth and color frames falls within the first time window;

in response to determining that the third timestamp falls within the first time window, assign the third coordinates defining the third bounding area to the first time window;

determine that a fourth timestamp of the fourth depth and color frames falls within a second time window that follows the first time window;

in response to determining that the fourth timestamp falls within the second time window, assign the fourth coordinates defining the fourth bounding area to the second time window;

determine that coordinates assigned to the first time window should be processed;

in response to determining that coordinates assigned to the first time window should be processed:

calculate, based at least in part upon the first coordinates defining the first bounding area and the second coordinates defining the second bounding area, a combined coordinate for the person during the first time window for the first video from the first camera; and calculate, based at least in part upon the third coordinates defining the third bounding area, a combined coordinate for the person during the first time window for the second video from the second camera;

determine, based at least in part upon the combined coordinate for the person during the first time window for the first video from the first camera and the combined coordinate for the person during the first time window for the second video from the second camera, that the first tracking identification matches the second tracking identification; and determine, based at least in part upon the combined coordinate for the person during the first time window for the first video from the first camera and the combined coordinate for the person during the first time window for the second video from the second camera, a global position of the person within the space during the first time window.

4. The system of claim 3, wherein:
the first camera client is further configured to determine a height of the person shown in the first depth frame and a height of the person shown in the second depth frame;
the second camera client is further configured to determine a height of the person shown in the third depth frame and a height of the person shown in the fourth depth frame; and
the camera server is further configured to:
  calculate, based at least on the height of the person shown in the first depth frame and the height of the person shown in the second depth frame, a combined height for the person during the first time window for the first video from the first camera; and
  calculate, based at least on the height of the person shown in the third depth frame, a combined coordinate for the person during the first time window for the second video from the second camera.

5. The system of claim 1, wherein:
the first camera client implements a first clock used to generate first and second timestamps, respectively for the first depth frame and its corresponding color frame, and the second depth frame and its corresponding color frame;
the second camera client implements a second clock used to generate third and fourth timestamps, respectively for the third depth frame and its corresponding color frame, and the fourth depth frame and its corresponding color frame; and
a camera server implements a third clock, the first, second, and third clocks are synchronized using a clock synchronization protocol.

* * * * *